US008796400B2

(12) United States Patent
Fouarge et al.

(10) Patent No.: US 8,796,400 B2
(45) Date of Patent: Aug. 5, 2014

(54) DOUBLE LOOP TECHNOLOGY

(71) Applicant: Total Research & Technology Feluy, Seneffe (BE)

(72) Inventors: Louis Fouarge, Dilbeek (BE); Eric Damme, Arquenness (BE); Olivier Miserque, Mont-Saint-Guibert (BE); Daniel Siraux, Naast (BE); Philippe Bodart, Clermont sous Huy (BE); Andre Lewalle, Brussels (BE); Marc Van der Auwera, Tervuren (BE); Frans Van den Brande, Mortsel (BE); Giacomo Conti, Maurage (BE); Hugo Vandaele, Sint-Andries (BE); Mark Verleysen, Ekeren (BE); Carl Van Camp, Beveren-Waas (BE); Etienne Laurent, Seneffe (BE); Philippe Marechal, Nivelles (BE); Marc Moers, Antwerp (BE); Leopold D'Hooghe, Kapellen (BE); Marjan Sillis, Edegem (BE); Kai Hortman, Dilbeek (BE); Pascal Folie, Courcelles (BE); Renaud Oreins, Wavre (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/917,795

(22) Filed: Jun. 14, 2013

(65) Prior Publication Data

US 2013/0345374 A1 Dec. 26, 2013

Related U.S. Application Data

(62) Division of application No. 12/862,655, filed on Aug. 24, 2010, now Pat. No. 8,492,489, which is a division of application No. 12/243,346, filed on Oct. 1, 2008, now abandoned, which is a division of application No. 11/057,715, filed on Feb. 14, 2005, now abandoned.

(60) Provisional application No. 60/544,846, filed on Feb. 13, 2004.

(51) Int. Cl.
*C08F 2/12* (2006.01)
*B01J 19/18* (2006.01)

(52) U.S. Cl.
USPC .............................. 526/59; 526/64; 526/919

(58) Field of Classification Search
USPC ............................................... 526/59, 64, 919
See application file for complete search history.

(56) References Cited

U.S. PATENT DOCUMENTS

| 8,202,485 | B2 * | 6/2012 | Walworth ...................... 422/219 |
| 2002/0173598 | A1 * | 11/2002 | Kendrick et al. ............... 526/64 |
| 2003/0114608 | A1 * | 6/2003 | Tharappel et al. .............. 526/64 |
| 2004/0116625 | A1 * | 6/2004 | Hottovy et al. ................. 526/64 |

FOREIGN PATENT DOCUMENTS

WO       WO 02/28922       *    4/2002

* cited by examiner

*Primary Examiner* — Fred M Teskin

(57) ABSTRACT

A method for the copolymerization of ethylene and a $C_{3+}$ olefin in a loop reactor and polymers formed therefrom are described herein. The method generally includes introducing an ethylene monomer, a $C_{3+}$ olefin and a diluent carrier liquid into a loop reactor. A catalyst system can be supplied to said loop reactor. The diluent liquid, ethylene monomer, and $C_{3+}$ olefin can be circulated through said loop reactor, while copolymerizing said ethylene and $C_{3+}$ olefin in the presence of said catalyst system to produce a slurry. The slurry can be diverted into a settling leg, and sequentially discharged therefrom and withdrawn from said loop reactor. An ethylene monomer co-feed can be introduced into said loop reactor at spaced locations downstream of the ethylene and diluent. The ethylene co-feed can be introduced in an amount effective to reduce the variation in the ratio of ethylene and $C_{3+}$ olefin.

15 Claims, 51 Drawing Sheets

FIG. 21
SURFACE ROUGHNESS

| Parameter | Description | Specification | Definition | Diagram |
|---|---|---|---|---|
| $R_a$ (CLA) | Arithmetic means roughness value | DIN 4768/1<br>DIN 4762/1 Draft<br>ISO/DIS 4287/1 Draft | $R_a = \frac{1}{l_m} \int_{x=0}^{x=l_m} |y|\,dx$<br>The arithmetical average value of all absolute distances of the roughness profile R from the center line within the measuring length $l_m$. | |
| $R_q$ (RMS) | Root mean square roughness value | DIN 4762/1 Draft<br>ISO/DIS 4287/1 Draft | $R_a = \sqrt{\frac{1}{l_m} \int_0^{l_m} y^2(x)\,dx}$<br>(An alternative to $R_a$.) $R_q$ is defined as the RMS value of a profile calculated over a single sampling length, but can be expressed as the mean result of 5 consecutive sampling lengths. | |

MI control – final resin

US 8,796,400 B2

DOUBLE LOOP TECHNOLOGY

CROSS REFERENCE TO RELATED APPLICATION

This application is divisional of U.S. patent application Ser. No. 12/862,655, filed Aug. 24, 2010, which is a divisional of U.S. patent application Ser. No. 12/243,346, filed Oct. 1, 2008, which is a divisional of U.S. patent application Ser. No. 11/057,715, filed Feb. 14, 2005, which claims priority from U.S. Provisional Patent Application No. 60/544,846, filed on Feb. 13, 2004.

TECHNICAL FIELD OF THE INVENTION invention relates to apparatus and processes capable of producing polyolefin polymers. More particularly, embodiments of the present invention relate to the production of polyolefins, such as polyethylene, in a process utilizing two or more reactors that can be operated in series, capable of producing polyolefin polymers and/or copolymers having a broad or multimodal molecular weight distribution.

As used hereinafter, the term "invention" relates to an embodiment of the global invention.

The invention relates to the control of catalyst feeding to a polymerization reactor, in a first aspect, the invention relates to an apparatus for controlling catalyst feeding to a polymerization reactor. In another aspect the invention relates to a method for controlling catalyst feeding to a polymerization reactor. More in particular, the invention relates to an apparatus and a method for controlling the feeding of a metallocene or a chromium catalyst to a polymerization reactor wherein polyethylene is prepared.

The invention also relates to the field of olefin polymerization. In particular, the invention relates to a process for improving the polymerization of a monomer and an olefin co-monomer in a polymerization loop reactor. In another aspect, the invention relates to a polymerization reactor suitable for the polymerization process of a monomer and an olefin co-monomer.

The invention also relates to catalytic reactions. In one aspect, the invention relates to a method for optimising the supply of catalyst to a polymerization reactor. In another aspect, the invention relates to a device for preparing and supplying a catalyst to a polymerization reactor.

The invention also relates to catalytic reactions. In one aspect, the invention relates to an apparatus for preparing and supplying catalyst slurry to a polymerization reactor. In another aspect, the invention relates to a method for optimising the supply of catalyst to a polymerization reactor.

The invention also concerns a new olefin polymerization process for preventing fouling in the polymerization reactor. The invention particularly concerns olefin polymerization processes using chromium-oxide-type (so-called Phillips type) or a Ziegler Natta-type catalyst.

The invention also relates to the field of polymerization of olefin in a slurry loop reactor.

The invention also concerns a new surface finish of the internal parts of a slurry loop reactor that prevents fouling in the reactor during the polymerization of olefins.

The invention also concerns an improved method for polymerizing olefins, in particular for polymerizing ethylene. The method is advantageous, since it allows control of the polymerization reaction at higher olefin monomer concentration than in known processes, which in turn a glows greater polyolefin production per unit volume of reactor. The invention further concerns the equipment set up used for performing the method of the invention.

The invention also relates to process control. In one aspect, the invention relates to a device for taking out and analyzing a sample from a polymerization reactor, in particular a polymerization reactor suitable for polymerizing ethylene. In another aspect the invention relates to a method for improving a polymerization reaction in a polymerization reactor during a process for preparing bimodal polyethylene.

The invention also relates to the withdrawal of solid polyolefin from a slurry of such solids. In a particular aspect, it relates to a method and apparatus for controlling the recovery of particulate polyolefin from a slurry thereof, for example from a stream of polymerization mixture continuously flowing in a loop reactor.

The invention also relates to improvements in the removal of polymer slurry from a reactor for olefin slurry polymerization. The invention further relates to a polymerization process occurring in a loop reactor wherein discharge of the settled polymer slurry is optimized.

The invention also relates to the polymerization of olefin monomers in slurry loop reactors and particularly to an apparatus and a method to switch such reactors from parallel to series configuration and vice-versa.

The invention also relates to improvements in the removal of polymer slurry from a reactor for olefin slurry polymerization. More in particular the invention relates to olefin polymerization process wherein the produced polymer is sequentially discharged through sequentially operated settling legs.

The invention also relates to improvements in the transfer of polymer slurry from one olefin polymerization loop reactor to another olefin polymerization loop reactor in a multiple loop reactor. More in particular, the invention relates to a multiple loop reactor suitable for olefin polymerization comprising at least two interconnected loop reactors and to a olefin polymerization process wherein polymer slurry is substantially horizontally transferred from one loop reactor to another loop reactor through transfer lines.

The invention also concerns the use of a catalyst component having controlled grain size to prepare polyolefins and to prevent or reduce defects in products made from these polyolefins.

The invention also discloses a method for reducing gel content in polymers prepared with chromium-based catalyst systems without reducing the throughput by using a double loop reactor,

BACKGROUND OF THE INVENTION

Polyethylene (PE) is synthesized via polymerizing ethylene ($CH_2=CH_2$) monomer and optionally a higher 1-olefin comonomer such as 1-butene, 1-hexene, 1-octene or 1-decene. Because PE is cheap, safe, stable to most environments and easy to be processed polyethylene polymers are useful in many applications. According to the synthesis methods, PE can be generally classified into several types such as LDPE (Low Density Polyethylene), LLDPE (Linear Low Density Polyethylene), and HOPE (High Density Polyethylene). Each type of polyethylene has different properties and characteristics.

For polyolefins, such as PE polymers and/or co-polymers, the molecular weight distribution (MWD) of the polymer particles is one of the basic properties that determine the characteristics of the polymer resin, and thus its end-use applications. The MWD of a polymer may be described by a graphical representation of the molecular weight composition of the material obtained through analysis, for example, by gel permeation chromatography, however, the MWD can also be described by the polydispersity index D, which is the ratio $M_w/M_n$ of the weight average molecular weight $M_w$ to the number average molecular weight $M_n$.

An increase in the molecular weight of a polyolefin resin can improve certain physical properties of the resin, however, high molecular weights can also tend to make polymers more difficult to process. A polymer having a high molecular weight will typically be more difficult to melt and flow, which can be referred to as having a relatively low melt flow index (MI). An increase in the MWD of a resin can tend to improve the ability of the polymer to flow during the processing, for example, by increasing the quantity of a lower molecular weight polymer portion of the resin in relation to the higher molecular weight polymer portion of the resin. Thus, broadening the MWD is one way to improve the processing of a high molecular weight polyolefin. This can be particularly useful in applications requiring relatively fast processing, such as in some blow molding and extrusion techniques. An increase in processability of the polymer can facilitate higher processing throughput rates and lower energy requirements.

When two or more polymers having differing molecular weight characteristics are combined, the resulting mixed polymer can comprise a broadened MWD and can also comprise a multimodal molecular weight distribution. A multimodal MWD can be described as the summation of the MWD of the individual polymers being combined, which can in some embodiments result in a MWD comprising multiple molecular weight ranges having increased concentration. A typical bimodal MWD will comprise two areas of concentration within the overall molecular weight range of the polymer, often referred to as the high molecular weight HMW fraction and the low molecular weight LMW fraction. Benefits of a multi-modal MWD can include, for example, improved physical properties obtained from the HMW fraction, and improved processing capabilities obtained from the LMW fraction.

Mechanical efforts have been used in an effort to prepare resins having broad and/or bimodal MWD by blending polyolefin portions having different molecular weights, however, the results of mechanical blends are limited by the degree of physical mixing that is possible and the size of the particles being mixed, typically in a pellet type form. Mechanical means do not result in the mixing of various polyolefin pellets on a microscopic scale, and therefore will not behave like an intimate blend of polyolefins that are prepared in-situ within a common polymerization process.

In a typical polymerization reaction, monomer, diluent and a dry particulate catalyst are fed to a reactor where the monomer is polymerized. The diluent does not react but is typically utilized to control solids concentration and also to provide a convenient mechanism for introducing the catalyst into the reactor. The reactor effluent, a mixture of polymer, diluent and unreacted monomer, is removed from the reactor and fed to a flash tank where the polymer is separated from the diluent and unreacted monomer. Typically, catalyst will be contained in the polymer.

The use of metallocene catalysts in the production of polyolefins in general, and of polyethylene in particular, is known in the art.

In general for preparing catalyst slurry, a mixture of dry solid particulate catalyst and diluent are apportioned in a catalyst storage vessel for thorough mixing. Then such catalyst slurry is typically transferred directly to a polymerization reaction vessel for contact with the monomer reactants, generally under high pressure conditions. However, it is important to control catalyst flow to a reactor since unexpected or uncontrolled catalyst injection in a reactor could lead to runaway reactions. Direct feeding of catalyst slurry from a storage vessel to a reactor has the disadvantage that the feeding rate of the catalyst to the reactor cannot be adequately controlled. Also, in cases involving direct feeding of a catalyst from a mud pot to a reactor, the metallocene catalyst can be completely flushed in the reactor, when a problem occurs during the preparation of the metallocene catalyst. Such uncontrolled catalyst feeding may induce runaway reactions in the reactor.

Improvements in the feeding of catalyst to a reactor have been described, e.g. in U.S. Pat. No. 5,098,667. This US patent describes a method for feeding of a catalyst in general to a reactor comprising preparing heavy slurry in a storage vessel, and then transferring the heavy slurry to a mixing vessel, where the heavy slurry is diluted and subsequently transferred to a reactor. In the described method the flow rate of the dilute slurry is manipulated so as to provide a desired flow rate of solid particles contained in the dilute slurry. Continuous catalyst flow is maintained at a desired rate in response to a computed value of the mass flow rate of the solid catalyst particles contained in the dilute slurry. The computed mass flow rate of catalyst particles is based upon "an line" measurements of density and flow rate of the dilute catalyst slurry stream flowing to the reactor, and on predetermined densities of the solid catalyst particles and the liquid diluent constituting the slurry. However, although the method provides an improvement on the control of catalyst flow, it has the disadvantage that the catalyst flow rate is not adjusted in function of the reaction conditions in the polymerization reactor.

Therefore, there remains a need in the art for providing an improved method for controlling catalyst feeding, and in particular feeding of metallocene or chromium catalysts, to a polymerization reactor.

Furthermore, metallocene catalysts are usually employed with a co-catalyst for olefin polymerization, which can significantly enhance the polymerization efficiencies to beyond a million units of polymer per unit of catalyst. The co-catalyst is an organometallic compound, or a mixture of non-coordinated Lewis acid and alkylaluminium as it is well known in the art. A number of techniques for the introduction of the co-catalyst to a polymerization reactor has been proposed. For instance some techniques consist of introducing the co-catalyst directly into the polymerization reactor. However, such technique does not allow bringing the co-catalyst into contact with the metallocene catalyst before entering the reactor, although such pre-contact is particularly desirable in order to provide effective catalyst-co-catalyst mixtures. Another technique consists of contacting the catalyst and co-catalyst before their introduction into the polymerization medium, in this latter case, however, having regard to the fact that the catalyst systems employed usually have maximum activity at the commencement of polymerization, it may be difficult to avoid reaction runaways liable to involve the formation of hot spots and of agglomerates of molten polymer.

In view hereof, it can be concluded that there remains also a need in the art for providing an improved method for controlling catalyst feeding, in particular feeding of metallocene catalysts, in pre-contact with a co-catalyst, to a polymerization reactor.

It is therefore a general object of the present invention to provide an improved apparatus and method for feeding catalyst to a polymerization reactor, at a controlled flow rate. Another object of the present invention is to provide an apparatus and method for controlling the injection of catalyst slurry, in particular metallocene or chromium catalyst slurry, in a polymerization reactor, wherein polyethylene is prepared.

It is a further object of the present invention to provide an apparatus and method for controlling catalyst feeding, and in particular feeding of a metallocene catalyst, being in pre-contact with a co-catalyst to a polymerization reactor, wherein polyethylene is prepared.

Furthermore, the present invention aims to provide a method for improved control of the polymerization reaction of ethylene in a reactor.

Polyethylene polymerizations are frequently carried out using monomer, diluent and catalyst and optionally co-monomers and hydrogen in a loop reactor. The polymerization is usually performed under slurry conditions, wherein the product usually consists of solid particles and is in suspension in a diluent. The slurry contents of the reactor are circulated continuously with a pump to maintain efficient suspension of the polymer solid particles in the liquid diluent. The product is discharged by means of settling legs, which operate on a batch principle to recover the product. Settling in the legs is used to increase the solids concentration of the slurry finally recovered as product slurry. The product is further discharged to a flash tank, through flash lines, where most of the diluent and unreacted monomers are flashed off and recycled. The polymer particles are dried, additives can be added and finally the polymer is extruded and pelletized.

Ethylene co-polymerization is the process wherein ethylene is polymerized with an olefin co-monomer, such as e.g. propylene, butene, hexene, etc. A major problem in such co-polymerization process is that the control of reaction parameters is very difficult. In particular, the ratio of co-monomer to monomer (ethylene) differs at different points in the reactor.

As a result of the variation in the co-monomer/ethylene ratio throughout the reactor, reaction conditions will vary along the path of the polymerization reactor. As the monomer (ethylene) is depleted faster than the co-monomer in the reactor, fluctuations in reaction temperatures and fluctuations in monomer concentration along the reactor occur. In addition, due to varying reaction conditions in the reactor, the polymerization reaction is sub optimal and polymer particles will be obtained during the polymerization process, which have varying properties and have a non-homogenous composition, in certain cases, due to the variation in the co-monomer/ethylene ratio throughout the reactor, polyethylene is produced having a too low density, which could induce "swelling" of the polymer particles. Swelling refers to the process whereby formed polymer particles are dissolved in diluent, giving rise to polymer slurry which is more viscous, which has undesired properties, and which may block the polymerization reactor.

In view hereof it is a need in the art to provide a process for improving the co-polymerization reaction of ethylene with an olefin co-monomer, such that the co-polymerization process is optimized and that more homogenous polymer end products are obtained.

It is therefore an object of the present invention to provide a process for improving the co-polymerization of ethylene and an olefin co-monomer. It is in particular an object of the invention to provide a process for controlling the co-monomer/ethylene ratio in a polymerization reactor. The present invention aims to provide a process for obtaining a co-polymer end product having improved compositional homogeneity and improved quality.

It is known that the polymerization of olefins, e.g. ethylene, involves the polymerization of olefin monomer with the aid of an organometallic catalyst of Ziegler-Natta and a co-catalyst. Catalyst systems for polymerization and co-polymerization of olefins known as Ziegler-Natta systems consist on the one hand, as catalyst, of compounds of transition metals belonging to Groups IV to VII of the periodic table of elements, and on the other hand, as co-catalysts, of organometallic compounds of metals of Groups I to III of this Table. The catalysts most frequently used are the halogenated derivatives of titanium and vanadium, preferably associated with compounds of magnesium. Moreover, the co-catalysts most frequently used are organoaluminium or organozinc compounds. When the catalyst is highly active, especially when it is employed in the presence of a large quantity of co-catalyst, a formation of polymer agglomerates, which may be considerable, can be observed. In a typical Ziegler-Natta catalysis system the monomer, e.g. ethylene or propylene, is bubbled into the suspended catalyst and the ethylene or propylene rapidly polymerizes to a high molecular weight linear polyethylene or polypropylene. A characteristic of all Ziegler-Natta catalysts is that they all yield straight chain polymers.

The use of Ziegler-Natta-catalysts in a polymerization method has been improved over a number of generations since the initial work by Ziegler and Natta in the 1950s. Seeking to increase both the activity and the stereoselectivity has been the driving force for the continuous development of the catalyst system. In addition to the support material, this comprises as actual catalyst a transition metal compound, e.g. a titanium compound, which is activated only by addition of an aluminium-containing co-catalyst.

It is known that the activity of certain Ziegler catalyst systems can be improved by increasing the quantity of organometallic compound used as the co-catalyst. In this case it is generally necessary to employ in the polymerization medium relatively large quantities of organometallic compounds as co-catalysts. However, this provides disadvantages including safety problems, related to the fact that these organometallic compounds spontaneously ignite on contact with air.

In employing Ziegler-Natta catalysts, it has been customary to inject the catalyst as a slurry in a diluent into a reaction zone of the reactor and to introduce also the olefins being polymerized. Several methods for supplying catalyst to a polymerization reactor have been described in the prior art.

U.S. Pat. No. 3,846,394 describes a process for the introduction of Ziegler-Natta catalyst slurry in a reactor. The process comprises the preparation of Ziegler-Natta catalyst slurry, the transfer of the slurry via a feed conduit from a storage zone to a metering zone, and the introduction of the slurry into a reactor. In order to avoid the back flow of monomer and other contents of the reactor into the Ziegler-Natta catalyst conduits the process provides the catalyst feed conduit to be flushed with a diluent inert to the Ziegler-Natta catalyst, said diluent being introduced into said conduit downstream of the metering zone.

It is well known that the polymerization reaction is quite sensitive to the quantity of catalyst utilized, and it is also known that the amount of catalyst added to the reactor is based on the flow rate of the catalyst to the reactor. However, one of the major problems in the injection of Ziegler-Natta catalyst slurry in a diluent to a reactor in prior art methods is that it is difficult to control the amount of Ziegler-Natta catalyst injected. Also, the catalyst tends to clog catalyst injection means such as pumps and the like and lines carrying the slurry.

For instance, U.S. Pat. No. 3,726,845 describes the supply and control of the amount of catalyst and the maintenance of the catalyst line and pump free by alternately feeding catalyst slurry and diluent to the reaction zone, allowing careful control of the amount of catalyst and control of the cleanliness of equipment such as lines and pumps and freedom from clogging.

GB 838,395 relates to a process and apparatus for producing a slurry of a solid catalyst in hydrocarbon diluent for use in a chemical reaction. The process comprises preparing concentrated catalyst slurry in a hydrocarbon diluent and admixing said concentrated slurry with additional diluent and introducing said admixture to a reaction zone. According to the process, the specific inductive capacity of the slurry is continuously determined prior to the introduction of same to said reaction zone, the inductive capacity of the slurry being dependent upon the concentration of catalyst in the slurry. The process further comprises regulating the ratio of concentrated slurry to added diluent responsive to variations of said specific inductive capacity from a predetermined value so as to maintain a slurry of substantially constant dielectric value.

Moreover, another problem relates to catalyst supply is that it has been difficult to control Ziegler-Natta catalyst flow rate in an adequate way. Ziegler-Natta catalyst flow rate is generally fixed for a certain operation and catalyst feeding systems do not account for variations in the feed flow rate.

Another problem relating to the field of catalyst supply to a reactor consists of supplying a co-catalyst during a polymerization reaction. A number of techniques for the introduction of the co-catalyst has already been proposed, for example by introducing the co-catalyst directly into the polymerization reactor. However, such methods do not allow bringing co-catalyst into contact with the Ziegler-Natta catalyst before entering the reactor, although such pre-contact is particularly desirable in order to provide effective Ziegler-Natta catalyst-co-catalyst mixtures.

Another technique consists of contacting the catalyst and co-catalyst before their introduction into the polymerization medium. In this latter case however, it is difficult to control the pre-contact time of the catalyst with the co-catalyst.

It is therefore a general object of this invention to provide an improved method for optimising catalyst introduction in a polymerization reactor. It is an object of the present invention to optimise the supply of a Ziegler-Natta catalyst to a polymerization reactor wherein polyethylene is prepared. More in particular, the present invention also aims to provide a method enabling to effectively control the flow rate of a catalyst, and in particular a Ziegler-Natta catalyst, to a polymerization reactor wherein polyethylene is prepared.

It is another object the present invention to provide a method for supplying catalyst, and in particular a Ziegler-Natta catalyst, in pre-contact with a co-catalyst, to a polymerization reactor, wherein polyethylene is prepared.

Furthermore, the present invention aims to provide a device for preparing catalyst slurry, in particular a Ziegler-Natta catalyst, and for supplying said catalyst slurry to a polymerization reactor in a controlled and efficient way.

It is known that the polymerization of olefins e.g. ethylene, especially by a gas phase polymerization process, involves the polymerization of olefin monomer with the aid of catalyst and optionally, if required depending on the used catalyst, a co-catalyst. Suitable catalysts for use in the production of polyolefins, and in particular for the preparation of polyethylene, comprise chromium-type catalysts, Ziegler-Natta catalysts and metallocene catalysts.

It is well known that the polymerization reaction is quite sensitive to the quantity of catalyst utilized, it is important to control catalyst flow to a reactor since unexpected or uncontrolled catalyst injection in a reactor could lead to runaway reactions. However, one of the major problems in the injection of catalyst slurry to a reactor in prior art methods is that it is difficult to control the amount of catalyst and the flow rate of the catalyst injected.

GB 838,395 relates to a process and apparatus for producing a slurry of a solid catalyst in hydrocarbon diluent for use in a chemical reaction. The process comprises preparing concentrated catalyst slurry in a hydrocarbon diluent and admixing said concentrated slurry with additional diluent and introducing said admixture to a reaction zone. According to the process, the specific inductive capacity of the slurry is continuously determined prior to the introduction of same to said reaction zone, the inductive capacity of the slurry being dependent upon the concentration of catalyst in the slurry.

U.S. Pat. No. 5,098,667 describes a method for supply of a catalyst in general to a reactor comprising preparing heavy slurry in a storage vessel, and then transferring the heavy slurry to a mixing vessel e.g. by means of a metering valve such as a ball check valve, where the heavy slurry is diluted and subsequently transferred to a reactor. In the described method the flow rate of the diluted slurry is manipulated so as to provide a desired flow rate of solid particles contained in the diluted slurry. Continuous catalyst flow is maintained at a desired rate in response to a computed value of the mass flow rate of the solid catalyst particles contained in the dilute slurry. The computed mass flow rate of catalyst particles is based upon "on line" measurements of density and flow rate of the dilute catalyst slurry stream flowing to the reactor, and on predetermined densities of the solid catalyst particles and the liquid diluent constituting the slurry.

However, although the above-described methods provide an improvement on the control of catalyst flow, they have the disadvantage that the catalyst flow rate can not be reliably adjusted in function of the reaction conditions in the polymerization reactor.

Furthermore, direct feeding of catalyst slurry to a reactor has the disadvantage that the feeding rate of the catalyst to the reactor cannot be adequately controlled. Also, in cases involving direct supply of a catalyst to a reactor, the catalysts can completely be flushed in the reactor, when a problem occurs during the preparation of the catalysts. Such uncontrolled catalyst supply may induce runaway reactions in the reactor.

Moreover, in the case catalyst in oil suspension is provided directly to a reactor, the used pumps, generally progressive cavity pumps, are not able to dose the catalyst flow and the amount of catalyst injected in the reactor. Furthermore, such systems require the switch over of the catalyst injection system, every time a new batch of catalyst needs to be connected to the reactor for supply thereto. Therefore, such injection systems do not provide an optimal and reliable control of the catalyst flow rate.

In view hereof, it can be concluded that there remains a need in the art for providing an improved method for controlling catalyst supply to a polymerization reactor.

It is therefore a general object of this invention to provide an improved method for optimising catalyst introduction in a polymerization reactor. It is a particular object of the present invention to optimise the supply of a catalyst, commercially provided in an oil suspension, to a polymerization reactor wherein polyethylene is prepared. More in particular, the present invention also aims to provide a method enabling to effectively control the flow rate of a catalyst to a polymerization reactor wherein polyethylene is prepared.

Furthermore, the present invention aims to provide an apparatus for preparing catalyst slurry, and for supplying said catalyst slurry to a polymerization reactor in a controlled and efficient way.

Olefin polymerization processes are well known. Among the processes, slurry polymerization in suspension in a solvent or in the liquid monomer is extensively practiced. Such processes are performed in a stirred tank reactor, or in closed loop reactors. One or more reactors can be used. In such processes, solid polymer particles are grown on small catalyst particles. Released heat of polymerization is eliminated through cooling through the reactor's walls and/or a heat exchanger.

However, it has been found on an industrial scale that while the polymer particles are insoluble or substantially insoluble in the diluent, the polymer product has some tendency to deposit on the walls of the polymerization reactor. This so-called "fouling" leads to a decrease in the efficiency of heat exchange between the reactor bulk and the coolant around the reactor. This leads in some cases to loss of reactor control due to overheating, or to reactor or downstream polymer processing equipment failure due to formation of agglomerates (ropes, chunks).

This "fouling" is caused in part by fines and also by the build up of electrostatic charge on the walls on the reactor. Attempts to avoid fouling during slurry polymerization have been made by adding an antifouling agent in the polymerization medium. Typically, the antifouling agent acts for example to make the medium more conductive, thus preventing to some extent the formation of electrostatic charge, which is one cause of the build-up of polymer on the wall of the reactor.

U.S. Pat. No. 3,995,097 discloses a process whereby an olefin is polymerized in a hydrocarbon diluent using a catalyst comprising chromium oxide associated with at least one of silica, alumina, zirconia, or thoria. Fouling of the reactor is said to be reduced by adding a composition, which comprises a mixture of aluminium or chromium salts of an alkyl salicylic acid and an alkaline metal alkyl sulphur succinate.

EP 0,005,215 is concerned with a process for polymerizing olefins in a hydrocarbon diluent again using a catalyst comprising calcined chromium compound associated with at least one of silica, alumina, zirconia or thoria or using a catalyst system such as those disclosed in U.S. Pat. Nos. 2,908,671, 3,919,185 and 3,888,835. The process uses an anti-fouling agent comprising a compound containing a sulphonic acid residue. The anti-fouling agent is a composition comprising (a) a polysulphone copolymer (b) a polymeric polyamine, and (c) an oil soluble sulphonic acid. In the Example, the additive product known as Stadis 450 is used as the anti fouling agent.

U.S. Pat. No. 6,022,935 (equivalent to EP 0,803,514) discloses a process for the preparation of polymers of C2-C12 alk-1-ene using a catalyst system containing a metallocene complex. An antistatic agent is used in the process. It is said that in general, all antistatic agents which are suitable for polymerizations may be used. Examples given are salt mixtures comprising calcium salts of medialanic acid and chromium salts of N-stearylanthranilic acid, C12-C22 fatty acid soaps of sulfonic esters of the general formula (RR')—CHOSO3Me, esters of polyethylene glycols with fatty acids, and polyoxyethylene alkyl ethers.

EP 0,820,474 is concerned with preventing sheeting problems in gas phase reactors in polymerization processes, which comprise at least one loop reactor followed by at least one gas phase reactor. These problems are addressed using a fouling preventive agent that is a mixture of Cr salt of C14-18 alkyl-salicylic acid, a Ca dialkyl sulphosuccinate and a copolymer of alkylmethacrylate with 2-methyl-5-vinylpyridine in solution in xylene. Chromium-type catalysts, Ziegler-type catalysts and metallocene catalysts are mentioned.

JP 2000-327,707 discloses a slurry olefin polymerization method. The method addresses the problems of fouling and sheeting of the reactor wall, which is observed particularly with supported metallocene catalysts. The method is said to be carried out in the presence of one compound chosen from polyalkylene oxide alkyl ether, alkyl diethanolamine, polyoxyalkylene alkyl amine, and polyalkylene oxide block.

EP 1 316 566 discloses propylene polymerization in a bulk loop reactor. The disclosure is concerned specifically with the transition from one catalyst type to another in a bulk loop reactor and with the problems associated therewith. The process involves injecting a metallocene catalyst and a Ziegler-Natta catalyst system into the bulk loop reactor. There is no disclosure in EP 1318566 of the catalyst being a chromium-oxide type catalyst. It is mentioned on page 3 paragraph [0009] that in one embodiment, a volume of antifouling agent may be introduced into a catalyst mixing system. Three possible antifouling agents are mentioned. The discussion on pages 10 and 11 clearly teach that an antifouling agent is used for the metallocene catalyst systems and not for conventional Ziegler-Natta catalyst systems. Further, the metallocene catalyst and Ziegler-Natta catalyst are injected into the loop reactor sequentially in EP 1 316 566 and not simultaneously so that they are not both present in the reactor at the same time and so that any antifouling agent present in the metallocene catalyst system will not contact the Ziegler-Natta catalyst system.

In view of the above, it will be seen that many so called antifouling agents for use in various olefin polymerization processes are known. However, there have been some problems associated with prior known agents, particularly in relation to polymerization processes using chromium-type catalysts and sometimes Ziegler-Natta type catalysts. These problems include an increase of catalyst consumption due to loss of activity in the presence of the anti-fouling agent. This can be observed even at the low levels typically used in the polymerization process. Catalyst activity loss is linked to the poisoning of active sites, for example by the polar moieties of the antifouling agent (alcohol and sulphonate . . . ).

Other problems with prior known agents relate to problems of toxicity. This is a particular concern with Cr-based anti-fouling agent or with agents such as commercial Stadis 450 as described in EP 0,005,215, because of the solvent type (toluene) and/or because of the active ingredient.

Finally, practical problems are encountered with many previously known anti-fouling agents. These practical problems arise because some antifouling agents are usable only with a given catalyst type. This makes transitions between catalyst systems during processing more difficult.

Thus, there remains a need to provide new anti-fouling agents for use in olefin polymerization processes using chromium-type catalysts, late Transition Metal-type catalysts, or Ziegler-Natta type catalysts without the drawbacks of current products.

High density polyethylene (HDPE) was first produced by addition polymerization carried out in a liquid that was a solvent for the resulting polymer. That method was rapidly replaced by polymerization under slurry conditions according to Ziegler or Phillips. More specifically slurry polymerization was carried out continuously in, a pipe loop reactor. A polymerization effluent is formed which is a slurry of particulate polymer solids suspended in a liquid medium, ordinarily the reaction diluent and unreacted monomer (see for Example U.S. Pat. No. 2,285,721). It is desirable to separate the polymer and the liquid medium comprising an inert diluent and unreacted monomers without exposing the liquid medium to contamination so that said liquid medium can be recycled to the polymerization zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batch-wise manner.

The mixture is flashed in order to remove the liquid medium from the polymer fluff. It is afterwards necessary to recompress the vaporized polymerization diluent to recondition and purify it.

Due to economical incentives, the reactor is generally pushed to its limits of operability. High concentration of monomer and optional comonomer, high temperature and high solid content are three important factors that allow to increase the kinetics of the polymerization chemical reaction.

The power consumption of the circulation pump normally increases slowly with increasing solid content. When any one of the three parameters just mentioned (monomer and optional comonomer concentration, temperature and solid content) increases above a certain level, depending upon the polymer characteristics and upon the reactor characteristics, it is additionally observed that the level of noise of this power consumption starts increasing gradually and if not properly controlled may provoke the safety shut-down of operations. This behaviour is known as the swelling phenomenon. The same type of behaviour can be observed on other plant control measurements such as, without limitation, the reactor temperature, the slurry density or the temperature change experienced by the cooling water circulating in all or a portion of the cooling jacket.

Monomer concentration and reactor temperature are usually kept nominally constant to maintain the product quality in the narrow specification required. Increasing solids concentration generally improves the product quality as, at constant reactor throughput, the residence time in the reactor, defined as the mass of solids present in the reactor divided by the production, increases with increasing solids concentration.

It is indeed desired to increase the residence time in the reactor in order to maximize the contact time with the catalyst and to improve the granulometry of the final product. As the mass of solids present in the reactor is defined as the product of the reactor volume by the density of the slurry and by the solid content, and as the density of the slurry is increasing with the solid content, it is thus highly desirable to increase the solid content. Unfortunately, the most usual cause of swelling is high solid content.

It is well known that polymers of olefins can be prepared by olefin polymerization in a hydrocarbon diluent or in monomers acting as diluents. However, it has been found on an industrial scale that where the polymer is insoluble or substantially insoluble in the diluent, the polymer product has a tendency to deposit on the wall of the polymerization reactor. This so-called "fouling" leads to a decrease in the efficiency of heat exchange between the reactor bulk and the coolant around the reactor. In some cases the temperature difference between the reactor bulk temperature and temperature of the coolant (e.g. a cooling water system) can increase over time to a level, which means that the run must be terminated.

This "fouling" is caused by a combination of fines and the build up of electrostatic charge in the powder. Attempts to avoid fouling have been made by adding an antifouling agent to the diluent as a processing aid. Typically, the antifouling agent acts to make the diluent more conductive. This prevents to some extent the formation of electrostatic charge, which is one cause of the build-up of polymer on the wall of the reactor.

U.S. Pat. No. 3,995,097 discloses a process whereby an olefin is polymerized in a hydrocarbon diluent using a catalyst comprising chromium oxide associated with at least one of silica, alumina, zirconia, or thoria. Fouling of the reactor is said to be reduced by adding a composition, which comprises a mixture of aluminium or chromium salts of an alkyl salicylic acid and an alkaline metal alkyl sulphur succinate.

EP 0005215 is concerned with a process for polymerizing olefins in a hydrocarbon diluent again using a catalyst comprising calcined chromium compound associated with at least one of silica, alumina, zirconia or thoria or using a catalyst system such as those disclosed in U.S. Pat. Nos. 2,908,671, 3,919,185 and 3,888,835. The process uses an anti-fouling agent comprising a compound containing a sulphonic acid residue. The anti-fouling agent is a composition comprising (a) a polysulphone copolymer (b) a polymeric polyamine, and (c) an oil soluble sulphonic acid. In the Example, the additive product Stadis 450 is used as the anti fouling agent.

U.S. Pat. No. 6,022,935 (equivalent to EP 0803514) discloses a process for the preparation of polymers of C2-C12 alk-1-ene using a catalyst system containing a metallocene complex. An antistatic agent is used in the process. It is said that in general, all antistatic agents which are suitable for polymerizations may be used. Examples given are salt mixtures comprising calcium salts of medialanic acid and chromium salts of N-stearylanthranilic acid, C12-C22 fatty acid soaps of sulfonic esters of the general formula (RR')—CHOSO3Me, esters of polyethylene glycols with fatty acids, and polyoxyethylene alkyl ethers.

EP 0820474 is concerned with preventing sheeting problems in gas phase reactors in polymerization processes, which comprise at least one loop reactor followed by at least one gas phase reactor. These problems are addressed using a fouling preventive agent that is a mixture of Cr salt of C14-C18 alkyl-salicylic acid, a Ca dialkyl sulphosuccinate and a copolymer of alkylmethacrylate with 2-methyl-5-vinylpyridine in solution in xylene. Chromium-type catalysts, Ziegler-type catalysts and metallocene catalysts are mentioned.

In view of the above it will be seen that many so called anti-fouling agents for use in olefin polymerization processes are known. However, there has been a problem with prior known agents, particularly in relation to polymerization processes using chromium-type catalysts or Ziegler-Natta type catalysts because of loss of activity of the catalyst due to the presence of the anti-fouling agent. This is because of poisoning of the catalyst, for example by alcohol and sulphonate groups in the anti-fouling agent.

Other problems with prior known agents relate to problems of toxicity. This is a particular concern with Stadis 450 as described in EP 0005215.

Thus, there remains a need to provide new methods for preventing fouling in olefin polymerization processes, especially in the polymerization of ethylene and more especially in the polymerization of high molecular weight polyethylene.

For many years it has been desirable to increase the efficiency of polyolefin production. One goal has been to increase the quantity of polyolefin that can be produced in a given volume of reactor. The higher the quantity that can be produced, the lower the cost of product production, which provides clear market, advantages.

One method for increasing the quantity of product produced per unit volume of reactor is to increase the concentration of the monomer in the reactor. Clearly, the greater the concentration of the monomer, the greater the concentration of the final product in the reactor. However, there are a number of problems associated with increasing the monomer concentration, as discussed below.

Generally, polymerization of olefin monomers is an exothermic reaction. The reaction follows first order kinetics. Thus, the higher the monomer concentration, the faster the reaction proceeds, and the greater the quantity of heat that is released by the reaction process. This heat production may be extremely dangerous if it is not controlled. Clearly a build-up of heat in a reactor containing flammable hydrocarbons may lead to fires or explosions.

In order to solve this problem and to use as high a monomer concentration as possible, typically two measures have been taken in the past. Firstly, olefin polymerization reactors have been carefully designed to control the surface area:volume ratio of the reactor. This ensures that there is sufficient surface area to the reaction vessel to allow heat exchange with the outer environment, thus reducing the temperature inside the reactor. Single or double loop reactors are common. These reactors consist of a long pipe, arranged in one or two loops, each loop being tens of meters high. The diameter of the pipes is typically around 60 cm. Such an arrangement has a large surface area:volume ratio as compared with a conventional flask or tank arrangement. Secondly, the reactors are usually jacketed with a cooling system, such as with a water jacket. This serves to efficiently carry away heat from the surface of the reactor, to increase the efficiency of cooling.

However, generally these methods have only been suitable for monomer concentrations of from 4-6.5 wt %. This is because a further problem exists with increasing monomer concentration. Often the monomer is gaseous at the temperatures and pressures employed in the reaction. At elevated concentrations of the monomer, the monomer may pass out of solution and form pockets of gas in the reactor. This has clear disadvantages. The gas formed can lead to dangerous pressure build-up. In addition, the release of monomer from the solvent reduces the monomer available for reaction, unbalancing the carefully selected concentration of reactants and leading to undesirable products and impurities. This may have the effect of reducing the efficiency of the process rather than increasing it. Finally, the reactants are typically pumped around the reactor loop for efficient mixing and cooling, but the pumps are designed to pump liquids and will not function properly if gas is present.

In a typical polymerization reaction, monomer, diluent, catalyst, co-catalyst and optionally co-monomer and hydrogen are fed to a reactor where the monomer is polymerized. The diluent does not react but is typically utilised to control solids concentration and also to provide a convenient mechanism for introducing the catalyst into the reactor. The reactor effluent, a mixture of polymer, diluent, unreacted (co-)monomer and hydrogen, is removed from the reactor and fed to a flash tank where the polymer is separated from the diluent and unreacted (co-)monomer and hydrogen. Typically, catalyst will be contained in the polymer.

Polymerization processes of ethylene may be carried out in loop reactors, in the polymerization reaction of ethylene, different reactants including the monomer ethylene, a light hydrocarbon diluent such as isobutane, a catalyst and optionally, a co-monomer such as hexene-1 and hydrogen are fed to a reactor. When polymerizing ethylene, in the presence of a suspension of catalyst in diluent, said diluent having low solubility for the polymer, the polymer is produced in the form of solid particles, insoluble in the diluent. The contents of the reactor are circulated continuously with a pump to avoid deposition of polymer on the walls of the reactor. Slurry, consisting of the reactants and polyethylene powder, is typically collected in one or more settlings legs of the polymerization reactor and discharged continuously to a flash tank, through flash lines, where most of the light hydrocarbon diluent and unreacted ethylene evaporates, yielding a dry bed of polyethylene in powder form. The powder is discharged to a purge drier in which the remaining light hydrocarbon and co-monomer are removed. Then the powder of polyethylene is transported to a finishing area where various stabilisers and additives are incorporated. Finally it is extruded into pellets.

For obtaining polymer having suitable properties, it is essential in a polymerization reaction to control the reaction conditions and input component quantities in the reactor. For doing so, it is conventional to sample the reactor contents and control several of the variables of the process in response with the analysis of the sample.

Several methods have been described to take samples from the reactor contents. Generally the reactants in loop-type reactors are propelled at relatively high velocities in order to maintain the catalyst and particulate polymer produced in a suspended state and to prevent deposition or growing of polymer on the reactor walls, it is therefore necessary that no vapor phase is present in the reactor where polymer might grow. In order to take a sample from such reactors, generally a standpipe is placed in the uppermost portion of the reactor to collect slurry. However, the slurry in said standpipe is generally not in equilibrium with the reactants, and hence it is almost entirely impossible to obtain a representative sample.

A vapor sample may be taken from the flash tank. However, sampling of gases from flash tanks has several disadvantages. In polymerization plants using flash tanks which are connected to a reactor by means of flash lines and settling legs, the settling legs themselves can present problems. Conventional settling legs have sections in which polymer can collect while waiting for next dump cycle for transferring the slurry to a flash tank. The collected polymer can melt over time and deposit on the inside walls of the settling leg. In addition, during collection of the slurry in the setting legs and before dumping it to the flash tank, the polymerization reaction still continues. Also, there is a lag in time between recovery of slurry in the settling legs and further processing of the slurry to the flash tank. As a consequence thereof, reaction conditions, which are monitored after transfer of the slurry in the flash tank, are different from the reaction conditions in the reactor. Analysis of a gas sample taken from the flash tank does not provide updated information on the reaction conditions in the polymerization reactor and will result in an inaccurate analysis of the gas composition in the polymerization reactor.

U.S. Pat. No. 3,556,730 refers to a sampling apparatus for taking a sample comprising liquid, dissolved gas and suspended particulate solids from a reactor into a fixed volume chamber, The reaction fluid in the chamber is then rendered non-reactive by immediately adding a predetermined volume of reaction termination fluid. The nonreactive sample is automatically discharged into a separation chamber from which part of the dissolved gas and liquid is continuously analyzed.

U.S. Pat. No. 6,042,790 describes an apparatus and method for maintaining unreacted monomer concentration in a polymerization reactor, in a polymerization process utilising a high pressure flash to separate polymer from unreacted monomer contained in the effluent stream from the reactor, the concentration of unreacted monomer in the reaction effluent is determined by withdrawing from the reactor an effective analyzing amount of effluent, exposing the amount to a low pressure flash and analyzing the vaporised portion to determine the concentration of monomer.

However the above-described devices and methods do not allow the control of several different variables of the polymerization process, such as e.g. monomer, co-monomer and hydrogen in the gas phase and properties of the polymerization product such as the melt flow index and density, in response with the analysis of the sample.

In view hereof, it is clear that there remains a need in the art for providing a more accurate sampling system for taking and analyzing a sample from a polymerization reactor, it is therefore an object of the present invention to provide a device capable of taking out a sample from a polymerization reactor and accurately analyzing said sample. It is further an object of the invention to provide a device capable of taking out a sample from a polymerization reactor, which consists of two reactors being connected in series.

It is another object of the present invention to provide a method for improving a polymerization reaction in a polymerization reactor. In particular, the invention aims to provide a method for improving a polymerization reaction for preparing bimodal polyethylene in a polymerization reactor, which consists of two reactors being connected in series.

U.S. Pat. No. 3,242,150 disclosed an improvement to loop reactors consisting in adding to the bottom part of a loop reactor a receiving zone, since known as settling leg, wherein the solids settle by gravitation, and withdrawing a fraction concentrated in solids from said receiving zone.

U.S. Pat. No. 3,293,000 disclosed a loop reactor with several settling legs. Control of the valve is described at column 3, lines 2 to 22.

U.S. Pat. No. 3,374,211 disclosed a modified process for removing polymer.

More recently, U.S. Pat. No. 5,183,866 related to the employment of a flash line heater in conjunction with the periodic operation of a settling leg of a loop reactor. The process is characterised by the fact that the elongated zone is constructed such that the flow time of the charge of slurry in an elongated confined zone including the flash line heater is equal to at least about 25% of the time between the closing of the settling leg valve and the next opening of the settling leg valve.

Olefin polymerization such as ethylene polymerization are frequently carried out using monomer, diluent and catalyst and optionally co-monomers in a loop reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent, the product being often taken off by means of settling legs which operate on a batch principle to recover the product. Settling legs are used to increase the solids concentration of the slurry finally recovered as product slurry. The product is further either transferred to another reactor or discharged to a flash tank, through flash lines, where most of the diluent and unreacted monomers are flashed off and recycled. This recycling may be done either through recompression and reinjection to the reactor with or without intermediate purification. An important operational cost is linked to this fluid effluent recycling. The polymer particles are dried, additives can be added and finally the polymer is extruded and pelletized. This technique has enjoyed international success with millions of tons of ethylene polymers being so produced annually.

Optial behavior of the settling legs is reached when the quantity of recovered polymer is maximized with respect to the amount of fluid effluent that must be recycled, so that the recycling cost may be minimized for a given production rate. Classically, operation of the plant is based on attempting to discharge the same amount of slurry from all settling legs in order to afford equivalent pressure drops when discharging each leg, however this operation may be far from optimal.

Various alternatives to conventional settling legs are known. For example, WO 01/05842 describes an apparatus for removing concentrated slurry from a flowing stream of slurry in a conduit characterized by a channel in an outlet area of the conduit, the outlet being adapted to continuously remove slurry.

EP 0891990 describes an olefin polymerization process wherein the product slurry is recovered by means of a continuous product take off, more in particular by means of an elongated hollow appendage provided on the reactor. Said hollow appendage being in direct fluid communication with a heated flash line and thus being adapted for continuous removal of product slurry.

However the above-described apparatus and processes have the disadvantage that the suspension withdrawn from the reactor still contains a large amount of diluent and of other reactants, such as the monomer, which it is then necessary to subsequently separate from the polymer particles and to treat for the purpose of reusing it in the reactor.

It is therefore an object of the present invention to provide a polymerization process occurring in a loop reactor wherein discharge of the settled polymer slurry is optimized. Another object of the invention is to provide processes wherein the settling efficiencies of the polymer slurry and its further discharge is optimized. A yet further object of the present invention is to decrease the fluid effluent throughput at a given polymer production rate by the use of optimized discharge. It is another object to provide a loop reactor having optimized settling legs.

The use of slurry-loop reactor systems in the polymerization of olefin monomers is well known in the art, (see for example U.S. Pat. No. 2,285,721). In such system, it is desirable to separate the polymer and the liquid medium comprising an inert diluent and unreacted monomers without exposing the liquid medium to contamination so that said liquid medium can be recycled to the polymerization on one with minimal or no purification. As described in U.S. Pat. No. 3,512,872, a slurry of polymer and the liquid medium is collected in one or more settling legs of the slurry loop reactor from which the slurry is discharged to a flash chamber.

The mixture is flashed in order to remove the liquid medium from the polymer.

For years, those slurry-loop reactors have been operated in a standalone configuration for, e.g., the production of monomodal polyolefins.

It has also been known in the art (since for example EP 0 057 420 or EP 0 022 376) that polymerization reactors can be connected in series with, as a result among others, the production of polyolefins with a wide molecular weight distribution, very good homogeneity and outstanding mechanical and processing properties.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will have their own molecular weight distribution. It is to be noted that also the chemical compositions of the different fractions may be different.

There however remains the need to be able to produce several kinds of polyolefins such as monomodal or multimodal grades from reactors whether or not connected in series, for different reasons such as a particular need for certain mechanical properties (exclusively obtained either in parallel or in series configuration), for a given residence time, for certain catalyst combination, production issues, equipment availability, plant flexibility, . . . .

Until now, polyolefin manufacturers have been able to manage production of the several kinds of above mentioned polyolefin grades by:

either having dedicated single polymerization reactors on the one hand and dedicated polymerization reactors connected to each other and operated in series, on the other hand, or being obliged to swing from series to parallel on the same reactor trains.

The first solution is extremely capital intensive.

The second one is extremely time and operation consuming. In this second option, large pieces of connection pipes must indeed be assembled and later disassembled and reassembled again, with all their related utility lines such as flushing lines, heat exchange jackets, measurement and control devices, frame supports, . . . . Connections can often be damaged and the risk for a catastrophic accident is real so that operations are not smooth and are slow down anyway.

A slurry loop reactor run on its own with its settling legs and flash line is already known and does not have to be described here; reference is made, for example, to U.S. Pat. Nos. 3,152,872-A, 3,242,150-A and 4,613,484-A.

Embodiments to operate reactors connected in series are described in details in, for instance, U.S. Pat. Nos. 6,185,349, 4,297,445, EP 0 057 420.

Olefin polymerizations such as ethylene polymerization are frequently carried out using monomer, diluent and catalyst and optionally co-monomers in a loop reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent, the product being often taken off by means of settling legs which operate on a batch principle to recover the product. Settling in the legs is used to increase the solids concentration of the slurry finally recovered as product slurry. The product is further either transferred to another reactor or discharged to a flash tank, through flash lines, where most of the diluent and unreacted monomers are flashed off and recycled. If discharged to a flash tank the polymer particles are dried, additives can be added and finally the polymer is extruded and pelletized. This technique has enjoyed international success with millions of tons of ethylene polymers being so produced annually.

In these polymerization processes, settling legs, however, do present some problems. They represent the imposition of a "batch" or "discontinuous" technique onto a basic continuous process. Each time a settling leg reaches the stage where it "discharges" or "fires" accumulated polymer slurry it causes interferences on the pressure in the loop reactor, which is thereby not kept constant. Pressure fluctuations in the loop reactor may be larger than 1 bar. At very high monomer concentration, such pressure fluctuations may generate several problems such as the creation of gas bubbles that may cause trouble in the operation of the circulation pump. They may also provoke perturbations in the control scheme of the reactor pressure.

Various alternative product removal techniques are however known. For example, WO 01/05842 describes an apparatus for removing concentrated slurry from a flowing stream of slurry in a conduit characterized by a channel in an outlet area of the conduit, the outlet being adapted to continuously remove slurry.

EP 0891990 describes an olefin polymerization process wherein the product slurry is recovered by means of a continuous product take off, more in particular by means of an elongated hollow appendage provided on the reactor. Said hollow appendage being in direct fluid communication with a heated flash line and thus being adapted for continuous removal of product slurry.

However the above-described apparatus and processes have the disadvantage that the suspension withdrawn from the reactor still contains a large amount of diluent and of other reactants, such as the monomer and optionally the comonomer, which subsequently have to be separated from the polymer particles and to treat for the purpose of reusing it in the reactor. Another disadvantage of the above-described apparatus and processes is their lack of flexibility during the phase or reaction start-up or in response to large disruptions in the normal behavior of the reactor, like sudden interruption of one of the feed streams.

It is therefore an object of the present invention to provide a polymerization process occurring in a double loop reactor wherein the polymer slurry is efficiently removed from the loop reactors through sequentially operated settling legs. It is further an object of the present invention to establish non-fluctuating reaction conditions in a reactor during a polymerization process. More in particular, it is an object of the invention to preserve pressure and to avoid pressure fluctuation in a polymerization reactor. Another object of the present invention is to increase the reactor throughput by providing stable operation conditions. A further object is to increase the monomer concentrations in the liquid medium. Another object of the present invention is to increase the weight percent (wt %) of polymer solids in the polymerization slurry circulating in the polymerization zone in the loop reactors. It is a further object of the invention to provide a flexible process that can be routinely converted to conventional settling leg removal mode in order to adapt to sudden disruption of the operating conditions caused for example by sudden large modification of the diluent or monomer feed throughput rates or start-up conditions.

Olefin polymerizations such as ethylene polymerization are frequently carried out using monomer, diluent and catalyst and optionally co-monomers and hydrogen in a reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent. The product is discharged by means of settling legs, which operate on a batch principle to recover the product. Settling in the legs is used to increase the solids concentration of the slurry finally recovered as product slurry. The product is further discharged to a flash tank, through flash lines, where most of the diluent and unreacted monomers are flashed off and recycled. The polymer particles are dried, additives can be added and finally the polymer is extruded and pelletized.

Multiple polyolefin reactors operating in series can be used for olefin polymerizations, as is known in the prior art. Certain polymerization processes comprise the use of two or several polymerization reactors, which are interconnected. A "bimodal olefin polymer" refers to an olefin polymer that is manufactured using two reactors, which are connected to each other in series. However, problems associated with known polymerization processes and apparatuses using a polymerization system having two or more serially disposed polymerization reactor vessels, include inaccurate inter-reactor transfer of polymer slurry between the serially disposed reactors, while maintaining each reactor at independently selected operating conditions. In certain cases, fewer fine particles (fines) are produced during transfer, which tend to hang-up or become trapped in transfer equipment and can even plug lines and valves. Frequent plugging causes system down time, lost final product and raw materials, and increased operating costs.

In the prior art systems, interconnected reactors have been described which are disposed in substantially vertical arrangements, i.e. reactors arranged in tandem vertical arrangement under an angle of inclination with respect to a horizontal axis extending from the exit of the first reactor which is more than 45°. Such arrangements require vertical product transfer lines or other vertical means for transferring polymer product from the polymerization zone of a first reactor to the polymerization zone of a second reactor. However, a problem associated with this type of configuration is that it requires the positioning of the reactors in a vertical arrangement, which is generally technically limited and results in increased fabrication costs. Also in such configurations the reactors are positioned close to one another, which limits their accessibility.

Therefore, there remains a need in the art to provide a method and a polymerization reactor system in which operating problems experienced by prior art multi-reactor systems are reduced and in which the apparatus may be built and operated more economically than prior art systems.

It is therefore a general object of the present invention to provide multiple, interconnected reactors that are built and operated more economically than known prior art multiple reactors. Another object of the invention is to provide an improved method for production of polyolefins in general, and polyethylene in particular, in multiple interconnected reactors. A further object of the present invention is to provide an improved method utilizing multiple, interconnected reactors, which reduces construction and operating costs, and improves operating performance and operating versatility of the reactor system.

Olefin polymerization processes are generally known. Further, it is well known that polymers of olefins can be prepared by olefin polymerization in a hydrocarbon diluent or in monomers acting as diluents. On an industrial scale, one reactor type which may be applied in such processes is a turbulent flow reactor such as a continuous pipe reactor in the form of a loop. However, other types of reactors such as stirred reactors may be used.

Polymerization is carried out in a loop reactor in a circulating turbulent flow. A so-called loop reactor is well known and is described in the Encyclopaedia of Chemical Technology, 3rd edition, vol. 16 page 390. This can produce LLDPE and HDPE resins in the same type of equipment.

The loop reactors may be connected in parallel or in series. In this regard, in a double loop reactor where the two reactors are connected in series, a high molecular weight fraction may be produced in the first loop reactor and a low molecular weight fraction may be produced in the second loop reactor. In this way, a bimodal polymer or a polymer having a broad molecular weight distribution is made. In a double loop reactor where the two reactors are connected in parallel, either a monomodal or a bimodal product is made.

EP0649860, the contents of which are incorporated herein by reference, describes a process for producing polyethylene in two liquid full loop reactors, connected in series.

The ethylene is injected with the comonomer in the first loop reactor as well as the catalytic system (i.e. the catalyst precontacted with the activating agent). Suitable comonomers which can be used include alpha-olefins with from 3 to 10 atoms of carbon, preferably 1-hexene. Polymerization is done at a temperature of between 50 and 120° C., preferably between 60 and 110° C., and at a pressure between 1 and 100 bars, preferably between 30 and 50 bars.

The flow of ethylene polymer obtained in the first reactor is transferred into the second reactor by means of one or more settling legs of the first reactor, for example by using two settling legs (each being filled independently with the suspension coming from the reactor the solids being concentrated by gravity settling and discharge).

In any olefin polymerization process, the polyolefin is produced in the reactor in the presence of an olefin polymerization catalyst. Such catalysts generally may be classified into three groups: metallocene-type catalysts, chromium-type catalysts and Ziegler-Natta-type catalysts. Typically, the catalyst is used in particulate form. The polyolefin is produced as a resin/powder (often referred to as "fluff") with a hard catalyst particle at the core of each grain of the powder. The "fluff" is removed from the reactor and must be extruded before it is sold. Typically, an extruder works by melting and homogenizing the "fluff" and then forcing it through holes before cutting to form pellets.

The pellets then may be transformed by subjection to further processing in applications such as pipe making, fibre making, and blow-moulding.

Polyethylene is known for use in the manufacture of a wide variety of articles. The polyethylene polymerization process can be varied in a number of respects to produce a wide variety of resultant polyethylene resins having different physical properties which render the various resins suitable for use in different applications. In particular, it is known to use polyethylene for use in applications where the polyethylene is required to have crack resistance, both resistance to rapid and to slow crack growth. It is also known to use polyethlene in the manufacture of films where the polyethylene preferably has a low gel content.

It is known in the art that the physical properties, in particular the mechanical properties, of a polyethylene product can vary depending on what catalytic system was employed to make the polyethylene. This is because different catalyst systems tend to yield different molecular weight distributions in the polyethylene produced.

For example, EP-A-0829495, EP-A-946611 and EP-A-946612 all disclose processes for producing polyethylene, these processes comprising copolymerizing ethylene and an alpha-olefinic comonomer comprising from 3 to 8 carbon atoms, in the presence of a chromium-based catalyst in a first reactor to produce a first polyethylene copolymer product having a first melt index and a first molecular weight distribution, feeding the first polyethylene copolymer product thereby produced and the chromium-based catalyst to a second reactor, and in the second reactor copolymerizing ethylene and an alpha-olefinic comonomer comprising from 3 to 8 carbon atoms, in the presence of the chromium-based catalyst under different polymerization conditions to produce a second polyethylene copolymer product having a second melt index and a second molecular weight distribution.

In many poor art polymerization processes, the amount of gel is controlled at the expense of throughput; higher residence time is resulting in higher productivity and lower gel content, at the expense of throughput.

SUMMARY OF THE INVENTION

As used hereinafter, the term "invention" relates to an embodiment of the global invention, it being understood that the global invention can be reduced to practice by carrying out parts or all of the described embodiments.

In accordance with the present invention an apparatus and a method are provided for controlling the injection of catalyst slurry into a polymerization reactor wherein polyethylene is prepared. Said catalyst slurry consists of solid catalyst in a hydrocarbon diluent.

In one aspect, the invention relates to an apparatus for controlling the injection of catalyst slurry in a polymerization reactor comprising
- one or more storage vessels for storing catalyst slurry consisting of solid catalyst in a hydrocarbon diluent, whereby each vessel is provided with means for transferring said catalyst slurry from said storage vessels to a mixing vessel,
- a mixing vessel, being connected with said storage vessels by means of said transferring means, for diluting said catalyst slurry to a suitable concentration for use in a polymerization reaction, and
- one or more conduits, connecting said mixing vessel to a polymerization reactor for transferring said diluted catalyst slurry from said mixing vessel to said reactor, whereby each conduit is provided with a pumping means for pumping said slurry to said reactor.

According to the invention, the catalyst is not introduced directly from the storage vessels to the reactor. The apparatus further comprises a mixing vessel, which acts as a "buffer" between the storage vessels and the reactor. The mixing vessel is operated at a pressure lower than the reactor pressure, thus eliminating the risk of uncontrolled high catalyst injection under high pressure to the reactor. Furthermore, such mixing vessel enables to dampen the discontinuous catalyst feed fluctuations to the reactor. Another advantage of providing a mixing vessel is that catalyst slurry can be further diluted to a concentration suitable for use in the polymerization reactor and that a slurry having a desired, substantially constant, concentration can be prepared. Moreover, a suitable, relatively low, concentration of catalyst, preferably comprised between 0.1 and 10% by weight more preferably between 0.1 and 4%, even more preferred between 0.1 and 1% and most preferred 0.5% by weight, will enable to use membrane pumps for injecting the catalyst slurry in the reactor.

The use of membrane pumps in the present apparatus permits to transfer catalyst slurry to said reactor at controllable catalyst flow rate in addition, the membrane pumps are particularly suitable for adjusting catalyst flow rate to a suitable value which is in accordance with the polymerization reaction taking place in the reactor, since these pumps are controllable in function of the concentration of a reactant in said reactor.

In another aspect, the present invention relates to a method for controlling the injection of catalyst slurry into a polymerization reactor comprising the subsequent steps of:
a) providing solid catalyst and a hydrocarbon diluent in one or more storage vessels such that a catalyst slurry is obtained in said vessel,
b) transferring said catalyst slurry from said storage vessel to a mixing vessel wherein said catalyst slurry is diluted for obtaining a suitable concentration for use in a polymerization reaction,
c) pumping said diluted catalyst slurry at a controlled flow rate from said mixing vessel to said polymerization reactor through one or more conduits, by means of a pumping means, provided in each of said conduits.

The present method provides improved injection of catalyst slurry at a suitable, controlled and limited flow rate in a polymerization reactor. Therefore, according to the present method, catalyst slurry is first transferred to a mixing vessel, where it is kept at a suitable concentration, before it is injected in the reactor. The method does not involve direct injection of catalyst from a storage vessel to a reactor.

In addition, pumping means, preferably membrane pumps, are provided in each conduit for transferring the catalyst slurry from the mixing vessel to the polymerization reactor. These pumps assure the transfer of catalyst slurry to said reactor at controllable flow rate. Moreover, the membrane pumps are capable of being regulated to adjust catalyst flow to said reactor in function of the polymerization reaction in said reactor, since these pumps are controllable and adjustable in function of a reactant concentration in the reactor.

According to the invention the present apparatus and method enable to feed a reactor with an optimal concentration of catalyst slurry at a suitable catalyst flow rate, and as a consequence thereof enable to considerably improve the productivity in the polymerization reaction in the reactor.

The present invention is in particular suitable for controlling the injection of metallocene catalyst slurry or chromium catalyst slurry in a polymerization reactor wherein polyethylene is prepared.

The various features which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

The present invention relates in another aspect in a process for improving the co-polymerization of ethylene monomer and an olefin co-monomer in a polymerization loop reactor. The process comprises the steps of:
- feeding monomer, an olefin co-monomer, diluents and optionally hydrogen into the loop reactor,
- feeding at least one polymerization catalyst into the reactor,
- co-polymerizing said monomer and said co-monomer to produce a polymer slurry comprising essentially liquid diluent and solid olefin co-polymer particles,
- allowing said polymer slurry to settle into two or more settling legs connected to the reactor, and
- sequentially discharging the settled polymer slurry from said two or more settling legs out of the reactor, and is in particular characterized in that said process further comprises the step of controlling the co-monomer/monomer ratio along the path of the reactor.

The terms "path" and "flow path" of the reactor are used herein as synonyms and are defined as the internal route followed by the reactant stream and the formed polymer slurry in the reactor.

According to the present invention the co-monomer/ethylene ratio can be adequately controlled in the polymerization reactor. Therefore, in a preferred embodiment, the invention provides a process comprising controlling the co-monomer monomer ratio by multiple, spatially separated, feeding of monomer along the path of the loop reactor. Additional monomer (ethylene) is fed into the reactor at multiple entries along the path of the reactor. The multiplied entries for feeding additional monomer are in particular positioned spatially separated from each other on the reactor.

In another preferred embodiment, the co-monomer/ethylene ratio can be adequately controlled in the polymerization reactor by multiple, spatially separated, feeding of monomer in conjunction with a diluent.

In yet another particularly preferred embodiment, the present process further comprises separately controlling the flow rate of each, spatially separated, monomer feed along the path of the loop reactor. Therefore, each additional ethylene feeding line is provided with a separate flow controlling means for controlling the flow rate of ethylene injection in the reactor.

The present invention has the major advantages of providing optimal control of the co-monomer/ethylene ratio in a polymerization reactor such that ethylene co-polymers can be produced having homogenous properties throughout the flow path of the reactor. Furthermore, the present process enables to optimize the polymerization reaction in the reactor. In particular, optimal and adequate control of co-monomer/ethylene ratio in the polymerization reactor permits to optimize and reduce fluctuations in reaction temperatures and fluctuations in monomer concentration in the reactor. A stable composition along the reactor, and a constant production rate can be obtained and thus less temperature oscillations are observed. Fluctuating temperature conditions throughout the reactor are absolutely detrimental with respect to homogeneity of composition of the prepared co-polymers. Adequate control of the co-monomer/ethylene ratio according to the present invention enables to minimize fluctuations in reaction temperatures and as a consequence to improve homogeneity of composition of the prepared polymers.

The present invention permits to prepare co-polymers having homogenous densities throughout the reactor. Furthermore, since according to the present invention co-polymers may be obtained that have desired and relatively constant densities, the risk of obtaining co-polymer particles having too low densities, which might induce "swelling" is considerably reduced. Swelling refers to the process whereby formed polymer particles are 'swelled' by a diluent, giving rise to polymer slurry which is more viscous, which perturbs the reactor flow and may lead to a blockage of the reactor. Control of the co-monomer/monomer ratio according to the invention thus enables to reduce the risk for swelling in the reactor. Alternatively it allows to produce lower density resins without increasing the risk for swelling.

The present invention will be further disclosed in detail hereunder. The description is only given by way of example and does not limit the invention. The reference numbers relate to the hereto-annexed figures.

The present invention relates in another aspect to a method for optimising catalyst supply to a polymerization reactor comprising the steps of a) preparing catalyst slurry in a vessel, said slurry comprising solid catalyst in a hydrocarbon diluent having a suitable concentration for use in a polymerization reaction, b) providing said catalyst slurry from said vessel to a buffer vessel wherein said slurry is stored, and c) supplying said catalyst slurry from said buffer vessel to said reactor through conduits at a suitable flow rate.

The present invention provides in particular a method that enables to supply catalyst slurry to a reactor at a perfectly controllable flow rate of catalyst supply. Therefore, the present invention in particular provides a method, which comprises controlling the level of catalyst slurry in said buffer vessel. In an even more preferred embodiment, the invention provides a method comprising maintaining the level of catalyst slurry in said buffer vessel substantially constant between suitable ranges above a certain suitable level, and preferably between 80 and 90%. Practically, the level of catalyst slurry in the buffer vessel is kept substantially constant by connecting a vessel wherein the slurry is prepared and containing a fluctuating amount of slurry to the buffer vessel. This connection enables to transfer slurry from the vessel to the buffer vessel when the level of slurry in the buffer vessel in going below said suitable level. By controlling the level of catalyst slurry having a suitable concentration in the buffer vessel at a substantially constant level, supply of catalyst slurry to a polymerization reactor is ensured and can be performed in a controlled way.

In addition, according to another preferred embodiment, the present invention provides a method comprising controlling the suitable flow rate of said catalyst slurry to said reactor by determining the concentration of a reactant in said reactor. Advantageously the present method enables to fine-tune catalyst supply to a reactor in function of the polymerization reaction in the reactor. The polymerization production rate in the reactor can be controlled by controlling the rate of catalyst feed to the reactor. According to this aspect the reactor is fed with an adequate and optimal concentration of catalyst slurry at a suitable feed rate, and as a consequence the productivity in the polymerization reactor and consistency of the polymerization product are considerably improved. Fluctuations in the properties and quality of the polymerization product resulting from the polymerization reaction are substantially avoided. Practically, fine-tuning of catalyst supply to a reactor in function of the polymerization reaction is enabled by providing the conduit connecting the buffer vessel to the reactor with pumping means, which are controllable and adjustable in function of a reactant concentration in the reactor.

Furthermore, the present invention also provides a method, wherein a suitable catalyst-co-catalyst system is supplied to the polymerization reactor. In particular, the method comprises bringing a suitable amount of co-catalyst into contact with the catalyst slurry for a suitable period of time before supplying said catalyst slurry to said reactor. The present method provides a better contact and formation of a co-catalyst-catalyst mixture then in the case when co-catalyst is directly supplied to a reactor. Supply of a suitable co-catalyst-catalyst mixture to the reactor provides a more controlled and more uniform level of polymerization reactivity in the reactor. Also, pre-contact between catalyst and co-catalyst positively influences the granulometry of the final polymerization product and improves the bulk density and the settling efficiency of the polymerization product prepared in the polymerization reactor. Such method also enables to more precisely control the ratio of catalyst-co-catalyst injection.

In another aspect the present invention relates to a device for preparing and supplying catalyst to a polymerization reactor comprising a vessel for preparing a catalyst slurry, said slurry comprising solid catalyst in a hydrocarbon diluent having a suitable concentration for use in a polymerization reaction, a buffer vessel for storing said catalyst slurry at a suitable concentration for use in a polymerization reaction, said buffer vessel being in connection with said vessel by means of one or more conduits and being provided with one or more conduits suitable for transferring said catalyst slurry from said buffer vessel to said reactor, and a pumping means, provided on each of said conduit, for controlling the transfer and supply of said catalyst slurry from said buffer vessel to said reactor.

The present invention provides a device that allows preparing catalyst slurry having a suitable concentration for use in a polymerization reaction. Said catalyst is prepared in the vessel, where addition of a hydrocarbon diluent is controlled in such a way as to allow slurry having a suitable concentration, preferably comprised between 0.1 and 10% by weight, to be made.

In addition, the device allows supplying catalyst slurry in a controlled way to a polymerization reactor. Therefore, the device is in particular provided with a buffer vessel, wherein the amount of slurry is kept at a substantially constant level, preferably between 80% and 90%, such that fluctuations in the transfer of slurry from the buffer vessel to a reactor are avoided. The amount of slurry in the buffer vessel is kept at said substantially constant level, by constantly refilling the buffer vessel with slurry prepared in the vessel, once the amount of slurry in the buffer vessel goes below said suitable level.

Moreover, the present invention provides a device that enables to adjust catalyst flow to said reactor in function of the concentration of reactants and thus as a function of the polymerization reaction in said reactor. Therefore, the present device is provided with a pumping means on each conduit for transferring and supplying the catalyst slurry from the buffer vessel to the reactor. Via a feed back mechanism, the pumping means are capable of being adjusted and of fine-tuning the catalyst flow rate to the reactor in function of the concentration of a reactant in said reactor.

Furthermore, the present device is further provided with a co-catalyst distribution system for bringing a suitable amount of co-catalyst into contact with the catalyst slurry for a suitable period of time before supplying said catalyst slurry to said reactor.

The present invention provides a method for optimising the polymerization reaction in a reactor by optimising the process of catalyst supply to said reactor and by providing a device for doing so, which is simple in design rugged in construction and economical to manufacture. The term "optimising the polymerization reaction" refers to the improvement of the efficiency of the polymerization reaction and/or improvement of the quality of the polymerization product obtained.

The method and the device according to the invention are particularly useful in the polymerization process of ethylene, and preferably in a process for preparing bimodal polyethylene.

The various features which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

In another aspect the present invention relates to an apparatus for preparing and supplying catalyst to a polymerization reactor comprising a vessel suitable for containing concentrated catalyst slurry comprising catalyst solid particles suspended in a mineral oil.

a buffer vessel for diluting said catalyst slurry at a suitable concentration for use in a polymerization reaction, said buffer vessel being in connection with said vessel by means of one or more conduits for transferring the concentrated catalyst slurry from said vessel to the buffer vessel and being provided with one or more conduits suitable for transferring the diluted catalyst slurry from said buffer vessel to said reactor, a pump provided on each of said conduits for transferring catalyst slurry from said vessel to said buffer vessel and a pump provided on each of said conduits for transferring diluted catalyst slurry from said buffer vessel to said reactor. The present invention provides an apparatus, which allows preparing catalyst slurry having a suitable concentration for use in a polymerization reaction, starting from catalyst, which is generally commercially supplied in a mineral oil, heptane or hexane suspension. Sometimes it is supplied in dry form.

According to the present invention, the catalyst is not introduced directly from the catalyst transport vessel to the reactor. The apparatus further comprises an intermediate vessel, which acts as a "buffer" between the catalyst transport vessels and the reactor. The buffer vessel is operated at a pressure lower than the reactor pressure, thus eliminating the risk of uncontrolled high catalyst injection to the reactor. Furthermore, such buffer vessel enables to dampen the discontinuous catalyst feed fluctuations to the reactor. Another advantage of providing a buffer vessel is that catalyst slurry can be further diluted to a concentration suitable for use in the polymerization reactor and that slurry having a desired, substantially constant, concentration can be prepared. Moreover, a suitable, relatively low, concentration of catalyst, preferably comprised between 0.1 and 10% by weight, will enable to use of membrane pumps for injecting the diluted catalyst slurry in the reactor. Using of diluted catalyst slurry has the advantage that it is easier to control the amount and the flow of injected catalyst.

The present invention provides an apparatus that enables to transfer concentrated catalyst slurry from the vessel to the buffer vessel before supplying the slurry to the reactor. Therefor, in another preferred embodiment, an apparatus is provided according to the invention wherein a pump is provided on the conduit for transferring concentrated catalyst slurry from the vessel to the buffer vessel which preferably comprises a progressive cavity pump. Such type of pump is particularly suitable for pumping significant amounts of solids, e.g. catalyst solid particles in mineral oil.

Moreover, the present invention provides an apparatus that enables to adjust catalyst flow to said reactor in function of the polymerization reaction in said reactor. Therefore, in another preferred embodiment, the pump provided on the conduit for transferring the diluted catalyst slurry from said buffer vessel to said reactor comprises a membrane pump. Such pumps have the advantage that they allow the control of catalyst flow rate. Furthermore, such pumps can in particular be regulated in function of the concentration of a reactant in said reactor. Via a feed back mechanism, the membrane pumps are capable of being adjusted and of fine-tuning the catalyst flow rate to the reactor in function of the concentration of a reactant in said reactor.

In addition, the present apparatus has the advantage to be usable for different batches of catalyst. The apparatus does not need to be replaced every time a new commercial vessel comprising catalyst is to be connected to the system.

Also, the present apparatus is particularly suitable for being used for different types of catalysts, e.g. for chromium-type, metallocene as well as Ziegler-Natta catalysts.

The present invention further relates in another aspect to a method for optimising catalyst supply to a polymerization reactor comprising the steps of a) transferring concentrated catalyst slurry from a vessel to a buffer vessel, said concentrated catalyst slurry comprising catalyst solid particles suspended in a mineral oil, b) diluting said catalyst slurry in said buffer vessel by supplying a suitable diluent in said buffer vessel, whereby diluted catalyst slurry is obtained having a suitable concentration for use in a polymerization reaction, and c) transferring said diluted catalyst slurry from said buffer vessel to said reactor at a suitable flow rate.

The present invention provides an improved method for injecting catalyst that is commercially supplied as solid particles, to a polymerization reactor. Therefor, the method broadly involves the transfer of a concentrated catalyst slurry to a buffer vessel wherein catalyst is diluted and kept at a suitable concentration, before it is injected in the reactor. The method does not involve direct injection of catalyst from a (transport) vessel to a reactor.

The present invention provides in particular a method that enables to supply catalyst slurry to a reactor at a perfectly controllable flow rate of catalyst supply. The present method comprises controlling the suitable flow rate of said catalyst slurry to said reactor by determining the concentration of a reactant in said reactor. Advantageously, the present method enables to fine-tune catalyst supply to a reactor in function of the polymerization reaction in the reactor. The polymerization production rate in the reactor can be controlled by controlling the rate of catalyst feed to the reactor. According to this aspect the reactor is fed with an adequate and optimal concentration of catalyst slurry at a suitable feed rate, and as a consequence the productivity in the polymerization reactor and consistency of the polymerization product are considerably improved. Fluctuations in the properties and quality of the polymerization product resulting from the polymerization reaction are substantially avoided. Practically, fine-tuning of catalyst supply to a reactor in function of the polymerization reaction is enabled by providing the conduit connecting the buffer vessel to the reactor with pumps, preferably membrane pumps, which are controllable and adjustable in function of a reactant concentration in the reactor.

The present invention thus provides an apparatus and method for optimising the polymerization reaction in a reactor by optimising the process of catalyst supply to said reactor and by providing a apparatus for doing so, which is simple in design, rugged in construction and economical to manufacture. The term "optimising the polymerization reaction" refers to the improvement of the efficiency of the polymerization reaction and/or to the improvement of the quality of the obtained polymerization product.

The method and the apparatus according to the invention are particularly useful in the polymerization process of ethylene, and preferably in a process for preparing bimodal polyethylene.

The various features which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

For all these reasons, it is desirable to operate the reactor at conditions that are as close as possible to the onset of swelling.

It is an object of the present invention to detect the onset of swelling

It is another object of the present invention to control and refrain the development of the swelling.

It is also an aim of the present invention to improve the catalyst productivity and therefore the reactor throughput.

It is a further object of the present invention to increase the solids concentration in the reactor or in the settling legs.

It is yet another object of the present invention to increase the production of polymer in a slurry loop reactor.

Accordingly, the swelling is controlled by diluting the reactor medium, said dilution being triggered and controlled by the standard deviation or the variance or the fluctuation range or any other function monotonically related to the variance of a plant control measurement displaying an increasing fluctuation level when swelling occurs.

The plant control measurements are for example the pump power consumption, the reactor temperature, the slurry density or the temperature difference between the entering and exiting cooling liquid or any combination of such measurements.

The present invention discloses a slurry loop reactor wherein all internal parts of the reactor in contact with the slurry are polished first by a mechanical process to a roughness level of at most 70 RMS (root mean square) and are subsequently polished by a chemical or electrochemical process, to a final level of roughness of at most 40 RMS.

It is an aim of the present invention to solve the problems associated with known methods, as discussed above. Thus, the present invention seeks to provide an improved method for polymerizing olefins, and in particular for producing polyethylene or polypropylene.

Accordingly, the present invention provides a method for polymerizing an olefin, which method comprises the following steps:

(a) polymerizing an olefin monomer in a reactor, at a selected olefin monomer concentration in a solvent;

(b) measuring a pressure curve in the reactor to determine whether the pressure curve is characteristic of a hydraulic system or a non-hydraulic system; and (c) if the pressure curve is characteristic of a non-hydraulic system, reducing the olefin monomer concentration in the reactor.

In the context of the present invention, pressure curve means a pressure curve that is deliberately created by initiating a pressure drop. The may be effected by any means, but typically by exposing at least a small part of the reactor to the surroundings for a selected period of time, it is particularly preferred that the pressure drop is initiated by removing product from the reactor. Measurement thus involves recording the change in pressure in the reactor over a specific period of time. These measurements result in a pressure curve, showing the change in pressure over time. If a gas is present, this pressure curve will have a non-hydraulic characteristic. However, if no gas is present, this will be a hydraulic characteristic.

The method of the present invention is particularly advantageous, since it allows larger quantities of polymer to be produced in the same reactor, without the need to limit the olefin concentration in the reactor in the restricted way in prior art methods. Typically up to double the olefin concentration can be achieved in the present methods, as compared with prior art methods. Polyolefins can be produced more efficiently by this method, at lower cost, leading to a significant market advantage.

To put the present method in context, a typical process for producing the polymer powder will first be described. Such a process generally employs a turbulent flow reactor such as a continuous pipe reactor in the form of a loop. However, other types of reactors such as stirred reactors may be used.

In accordance with the present invention a sampling device is provided for taking out and analyzing a sample from a polymerization reactor containing reactive fluid, said sample comprising solid particles suspended in said reactive fluid. The device according to the invention comprises one or more sample conduits, for taking a sample out of said reactor and for conducting said sample to one or more sample flash tanks, whereby said conduits each are in communication with said reactor and each are provided with at least two sampling valves, one or more sample flash tanks for separating said solid particles and evaporated gas, whereby said sample flash tanks are connected to said conduits and provided with means for analyzing said evaporated gas, and one or more sample receivers for purifying said solid particles, whereby said receivers are connected with said sample flash tanks and provided with means for analyzing said solid particles.

In another aspect the invention relates to the use of a sampling device according to the invention for taking a sample out of a polymerization reactor and for analyzing said sample.

Chemical and physical analysis of samples obtained from the reactor by use of a sampling device according to the present invention provide accurate and representative information of the reaction conditions inside the reactor as well as the properties of the composition of the gas phase and the solid particles in the reactor. Because of the negligible residence time in the sampling device samples taken by means of the present sampling device give an accurate and representative picture of the conditions inside the reactor at sampling time.

In addition, the invention further relates to the use of the present sampling device for improving a polymerization reaction in a polymerization reactor. The sampling device according to the present invention is usable for taking a sample from an individual reactor and determining the reaction conditions in said reactor. Preferably, samples are analyzed frequently, in order to accurately follow up the polymerization reaction in the reactor. Based on the analyzes results obtained, one can adapt operational reaction parameters in the reactor in order to optimise the polymerization reaction and to obtain a polymer having suitable properties and a desired product quality.

In addition, the sampling device according to the invention can also be used for improving a polymerization reaction in a polymerization reactor that consists of two reactors that are connected to each other, preferably in series. Such reactor configuration advantageously allows applying different operational conditions in the different reactors, which allows playing on the properties of the final product. The problem in such reactor configuration however, consists of correctly determining the suitable moment on which a reaction product has certain desired properties and is suitable for being transferred to means for further processing. Transfer of a reaction product having sub-optimal properties from such reactor to further processing means considerably reduces product quality. Using the sampling device according to the present invention in such configuration allows frequent analysis and follow-up of the operational reaction conditions in the reactors. The suitable moment for transferring the reaction product from the second reactor to further processing can be correctly determined, and a reaction product having optimal properties is supplied from the second reactor to further processing.

The term "improving a polymerization reaction in a polymerization reactor" as used herein relates to the following up of a polymerization reaction and the fine-tuning—if required—of operational reaction conditions thereof in an individual reactor, in order to improve the efficiency of the polymerization reaction and/or the product quality in this individual polymerization reactor. This term also refers to the following up of a polymerization reaction and the fine-tuning—if required—of operational reaction conditions thereof in two or more reactors which are connected to each other, preferably in series, such that the efficiency of the polymerization reaction is ensured and that a reaction product resulting from the polymerization reaction in said reactors is fed at a suitable time and having optimal product quality to further processing means.

In another aspect, the present invention relates to a method for improving a polymerization reaction for preparing bimodal polyethylene in a polymerization reactor, said reactor comprising a first part connected to a second part, said method comprising the steps of
 a) taking a sample out of said first part of said reactor,
 b) analyzing said sample to determine said reaction conditions in said first part of said reactor, and
 c) based on results obtained in step b), adapt reaction conditions in order to improve the polymerization reaction in said reactor.

In another preferred embodiment, the invention relates to a method comprising the steps of:
 a) taking a sample out of said first part of said reactor,
 b) b) analyzing said sample to determine said reaction conditions in said first part of said reactor, based on results obtained in step b),
 c) adapt reaction conditions in said first part of said reactor in order to provide an optimised reaction product,
 d) feeding at a suitable time said optimised reaction product from said second part of said reactor to further processing means.

In particular, in a preferred embodiment, the step a) in this method of taking a sample comprises
 providing a sample from said first part of said reactor to a sample flash tank, by transferring said sample through a conduit connecting said first part of said reactor to said sample flash tank,
 separating in said sample flash tank solid particles from evaporated gas in said sample by controlling the pressure in said flash tank,
 supplying said solid particles from said sample flash tank to one or more sample receivers, by transferring said solid particles through a conduit connecting said sample flash tank and said sample receivers, and
 purifying said solid particles in said sample receivers, by degassing and drying.

Furthermore, in another preferred embodiment the analysis step b) in the present method comprises analyzing evaporated gas obtained from said sample flash tanks with analyzing means, and analyzing solid particles obtained from said sample receivers with analyzing means.

In another preferred embodiment of said method, said sample is taken out of a reactor part and analyzed by means of a sampling device according to the present invention.

The sampling device and the method according to the invention are particularly useful in the polymerization process of ethylene. Those skilled in the art will immediate recognise the many other effects and advantages of the present method and device from the detailed description and accompanying drawings provided below.

The invention relates to a polymerization process comprising polymerizing olefins in a liquid diluent to produce a liquid slurry containing particles of normally solid polymer within a loop reactor, allowing the polymer to settle in a settling leg, periodically opening a 180° rotating product take-off valve located at the end of the settling leg to allow a charge of particles to flow out of the settling leg, the product take-off valve being operated by a pneumatically driven double-acting actuator, the pneumatic system being regulated by a system comprising pneumatic control valves, the improvement which consists in using automatic control valves.

The invention relates also to the use of automatic control valves to regulate the pneumatically driven double-acting actuator operating a 180° rotating product take-off valve of the settling leg of a loop reactor.

The invention also relates to a loop reactor comprising a settling leg, a 180° rotating product take-off valve located at the end of the settling leg, the 180° rotating product take-off valve being operated by a pneumatically driven double-acting actuator, the pneumatic system being regulated by a system comprising pneumatic control valves, characterised in that the control valves are automatic control valves.

The present objects are achieved by the processes and devices according to the present invention.

The present invention therefore relates to a polymerization process for producing olefin polymers in a loop reactor comprising the steps of: introducing into the loop reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, said process further comprising one or more cycles of:

(a) allowing said polymer slurry to settle in one or more settling legs connected to said reactor, (b) monitoring the volume of polymer slurry settled in a settling leg since its previous discharge, (c) discharging from said settling leg, a predetermined volume of polymer slurry substantially equal to the volume of polymer slurry settled in said settling leg since its previous discharge.

The present invention also relates to a loop reactor suitable for olefin polymerization process comprising; a plurality of interconnected pipes defining a flow path for a polymer slurry, said slurry consisting essentially of an olefin reactant, a polymerization catalyst liquid diluent and solid olefin polymer particles, means for introducing olefin reactant, polymerization catalyst and diluent into said reactor, a pump suitable for maintaining the polymer slurry in circulation in said reactor, one or more settling legs connected to the pipes of said reactor, at least one measurement means suitable for inferring the volume of settled slurry inside the settling legs such as for example by mathematical or statistical modeling techniques, including neural networks, and at least one valve control means operatively connected to said measurement means and to the valve of said settling legs.

The process and reactor according to the present invention present several advantages over the prior art such as allowing for an optimized discharge of settled slurry from settling legs to a product recovery zone. The volume of polymer slurry that settles in a settling leg may be different from one settling leg to another according to the position of said settling leg on the loop reactor and its geometrical characteristics. The present process allows the settling legs to be completely emptied of settled material at each discharge without substantially discharging further unsettled slurry that would impose a severe overload to the fluid recycling section for a minimal additional polymer production. The present process also allows that no settled polymer remains in the settling leg at the time it closes. This further significantly decreases the risk of plugging of the settling leg. Indeed such plugging is often due to mass polymerization of the settled slurry remaining under active polymerization conditions in the settling leg, which has poor heat removal characteristics.

The present invention will be further disclosed in detail hereunder. The description is only given by way of example and does not limit the invention. The reference numbers relate to the hereto-annexed figures.

It is an object of the present invention to provide an apparatus and an effective method to easily switch from series to parallel configuration of the slurry loop reactors and vice-versa. It is anticipated that such method can be applied to any type of olefin polymerization such as in closed reaction vessels provided with stirring means, gas phase reactors and combination of those.

Another embodiment of the present invention is a set of loop reactors suitable for the polymerization process of a monomer, preferably ethylene and optionally an olefin co-monomer, comprising for each of said reactors;

a plurality of interconnected pipes P defining a flow path for a polymer slurry, said slurry consisting essentially of ethylene, optionally a co-monomer, a polymerization catalyst, liquid diluent and solid olefin polymer particles, means for feeding monomer, optionally a co-monomer, diluent and optionally hydrogen in the reactor, means for feeding a polymerization catalyst in the reactor, a pump suitable for maintaining the polymer slurry in circulation in such reactor, one or more settling legs connected to the pipes P of such reactor for settling of polymer slurry, one or more control valves connected to the outlet of such settling legs, and one or more flash lines for discharging settled polymer slurry out of the reactor characterized in that each of said loop reactors comprises a three-or-more-way valve defining three-or-more ends, one end A being positioned at the outlet of said one or more control valves, another end B being connected to said one or more flash lines and another end C being connected to the pipes P of another reactor of the set through a connection pipe.

In another embodiment of the present invention, the diameter of the one or more control valves, flash lines, connection lines K and three-or-more-way valves are within a relative ratio of from 0.5 to 2, preferably of from 0.65 to 1.55 and more preferably of from 0.8 to 1.2

In another third embodiment of the present invention, the length of the one or more flash lines divided by the length of the one or more connection pipes K is within a range of from 6 to 14 and preferably from 8 to 12.

In another fourth embodiment of the present invention, any end of the three-or-more-way valve, which is not connected to either a flash line or another reactor of the set is flushed with a diluent suitable with the polymerization process.

In another embodiment according to the present invention, a continuous over-pressure of a diluent suitable with the polymerization process is maintained at the opposite side of the used connection (said used connection being either A to B when reactors are run in parallel configuration or, A to C when reactors are run in series configuration).

In another embodiment according to the present invention, a continuous over-pressure of a diluent suitable with the polymerization process is maintained at the side of the non-used pipe (said non-used pipe being either the transfer legs/connection lines 3-5 to the second reactor when the reactors are run in parallel configuration or, the flash lines 7 to the flash tank 8 of the first reactor when reactors are run in series configuration).

In another embodiment according to the present invention, a diluent suitable with the polymerization process is circulated throughout the reactors for a period of eight hours before transitioning from series to parallel configuration or vice versa.

In another embodiment according to the present invention, when the diluent suitable with the polymerization process is iso-butane. the full capacity of iso-butane dedicated to all reactors is applied in sequence to each individual reactor during the circulation period.

In another embodiment according to the present invention, olefin-free recycled iso-butane is fed into the reactors during the circulation period.

In another aspect, the present invention therefore relates to a polymerization process for producing olefin polymers in a double loop reactor comprising two or more settling legs for each loop reactor, comprising the steps of introducing into the loop reactors one or more olefin reactants, polymerization catalysts, diluents and, optionally, additives, and while circulating said reactants, catalysts, diluents and optional additives, polymerizing said one or more olefin reactants to produce a polymer slurry comprising essentially liquid diluent and solid olefin polymer particles, said process further comprising one or more cycles of:
(a) allowing said polymer slurry to settle into said settling legs, and
(b) sequentially discharging said settled polymer slurry from said two or more settling legs out of the reactor, whereby the aggregate time of closure of all legs is less than 50%, preferentially less than 20% and most preferably less than 5% of the time interval between two triggerings of the same settling leg.

Surprisingly, it has been found that such operation of the settling legs reduces significantly the disadvantages of the batch operation of the settling legs and allows operation of the reactor at much higher solids concentration. Hence concentrations of greater than 40 weight percent are possible in accordance with this invention.

Furthermore, the present invention also enables to establish non-fluctuating reaction conditions in a reactor during a polymerization process. More in particular, the processes according to the present invention allow to reserve pressure in the reactor at an optimized value and to avoid pressure fluctuation in a polymerization reactor. In particular, this feature is obtained by providing a process wherein the settling legs are alternatingly opened and closed such that the settling legs are alternatingly discharged. By sequentially opening and closing subsequent settlings legs, the process provides that the time when no settling leg is open and when pressure builds up in the reactor is significantly reduced and may even be absent, generating a pressure behavior of the reactor similar to the pressure profile obtained during continuous take-out techniques.

The present invention relates in another aspect to a reactor suitable for olefin polymerization comprising at least two interconnected reactors, whereby said connection essentially consists of one or more transfer lines suitable for transferring polymer slurry from a reactor to another reactor and whereby said transfer line extends substantially horizontally.

According to the present invention at least two reactors are interconnected, and preferably connected in series, so that polymer product produced in one reactor can be transferred to another polymerization reactor for further polymerization therein. In accordance with the present invention, the two reactors are disposed in a substantially same horizontal plane permitting direct substantially horizontal transfer of the polymer product from one to the other polymerization reactor. For this purpose, product transfer lines are provided for transferring polymer product from one reactor to another reactor that extend substantially horizontally.

In a preferred embodiment, the transfer line extends substantially horizontally from the exit of a settling leg of a reactor to the entry in another reactor. The transfer line thus connects the exit of a settling leg of a reactor with the entry of another reactor.

In another preferred embodiment, the transfer line extends substantially horizontally under an angle of inclination α with respect to a horizontal axis X-X' which is lower than 45° and preferably lower than 40°, lower than 35°, lower than 30°, lower than 25°, lower than 20°, and more preferably lower than 15°. In a more preferred embodiment, the transfer line extends substantially horizon tally under an angle of inclination α with respect to a horizontal axis X-X' which comprises 0°, 1°, 2°, 3°, 4°, 5°, 6°, 7°, 8°, 9° or 10°.

As used herein the term transfer lines extending "substantially horizontally" refers to the positioning of these lines with respect to a horizontal axis X-X', which differs from this axis X-X' with no more than 45°, and preferably with no more than 40°, preferably with no more than 35°, preferably with no more than 30°, preferably with no more than 25°, preferably with no more than 20°, more preferably with no more than 15°, and most preferably which differs from this axis X-X' with 0°, 1°, 2°, 3°, 4°, 5°, 6°, 7°, 8°, 9° or 10°.

The term a "substantially horizontal plane", as used herein refers to a plane that can be inclined with respect to a horizontal plane with no more than 45°, and preferably with no more than 40°, preferably with no more than 35°, preferably with no more than 30°, preferably with no more than 25°, preferably with no more than 20° more preferably with no more than 15°, and most preferably comprising 0°, 1°, 2°, 3°, 4°, 5°, 6°, 7°, 8°, 9° or 10°.

The term "substantially horizontal transfer" refers to the transfer of polymer slurry from one reactor to another whereby the transfer is performed by means of a line which has an angle of inclination with respect to a horizontal axis X-X' which is lower than 45°, preferably lower than 40°, preferably lower than 35° preferably lower than 30°, preferably lower than 25°, preferably lower than 20°, more preferably lower than 15°, and most preferably which comprises 0°, 1°, 2°, 3°, 4°, 5°, 6°, 7°, 8°, 9° or 10°.

The "angle of inclination" as used herein is defined as the angle made by the transfer line with respect to a horizontal axis X-X'. This angle of inclination is according to the invention lower than 45°, preferably lower than 40°, preferably lower than 35°, preferably lower than 30°, preferably lower than 25°, preferably lower than 20°, more preferably lower than 15°, and most preferably comprises 0°, 1°, 2°, 3°, 4°, 5°, 6°, 7°, 8°, 9° or 10°.

In another aspect, the present invention relates to a process for producing olefin polymers in a reactor, wherein said reactor consists of at least two interconnected reactors, whereby said connection essentially consists of one or more transfer lines suitable for transferring polymer slurry from a reactor to another reactor, comprising the steps of introducing into a reactor one or more olefin reactants, polymerization catalysts and diluents, polymerizing said one or more olefin reactants to produce polymer slurry, pumping said polymer slurry for maintaining the circulation in said reactor, said process further comprising one or more cycles of:

allowing said polymer slurry to settle in one or more settling legs connected to said reactor, and substantially horizontally transferring said polymer slurry from said settling legs to another reactor through said one or more transfer lines.

In a preferred embodiment the polymer slurry is transferred substantially horizontally through said transfer line from the exit of a settling leg of a reactor to the entry in the other reactor through a transfer line under an angle of inclination α with respect to a horizontal axis X-X' which is lower than 45° and which most preferably comprises 0°, 1°, 2°, 3°, 4°, 5°, 6°, 7°, 8°, 9° or 10°.

The present invention further relates to the use of a transfer line for transferring polymer slurry from a reactor to another reactor in a reactor comprising at least two interconnected reactors, whereby said transfer line extends substantially horizontally.

In a preferred embodiment the invention relates to the use of a transfer line which extends substantially horizontally from the exit of a settling leg of a reactor to the entry in the other reactor under an angle of inclination α with respect to a horizontal axis X-X' which is lower than 45° and which preferably comprises 0°, 1°, 2°, 3°, 4°, 5°, 6°, 7°, 8°, 9° or 10°.

The reactor and process according to the present invention present several advantages over the prior art, such as allowing optimized transfer of a settled slurry from settling legs from one to another reactor in a cost-effective way.

By providing transfer lines which, extend substantially horizontally between the interconnected reactor, two reactors can be positioned in a substantially same horizontal plane, which has the advantage that the installation of the reactors is easier; the reactors can be positioned at a greater distance from one another than is the case for vertically aligned reactors. In addition, horizontal alignment of the reactors permits to reduce construction and operating costs and improves the accessibility of each individual reactor, which is important from technical and safety point of view.

Surprisingly, it was shown that substantially horizontal transfer of polymer product from one to another reactor by means of the transfer lines does not increase the frequency of plugging in the polymer transfer lines but provides optimal product transfer in a cost-effective way.

In processes where the catalyst used in the olefin polymerization is a Ziegler-Natta-type catalyst, the present inventors have become aware that defects sometimes are visible in the finished product. In particular, the present inventors have become aware that dots or specks and/or rough patches sometimes are visible on the surface of a pipe made from pellets of a bimodal product that were produced using a Ziegler-Natta or metallocene catalyst. Such defects can make the pipe weaker and can affect the free flow of liquid through the pipe.

The present inventors have recognised that these defects likely occur because of homogenization problems in the extruder. As such, attempts have been made to try to prevent or reduce these defects. In particular, efforts have been concentrated on optimising the specific energy delivered to the extruder. However, this has not proved an entirely satisfactory solution to the problem.

In view of the above, there remains a need to provide a new olefin polymerization process for making polyolefin resin and, subsequently polyolefin pellets, wherein defects in any product that is produced from the polyolefin pellets are prevented or reduced.

Accordingly, the present invention discloses a process for polymerizing olefin that is carried out in the presence of a Ziegler-Natta catalyst system in two liquid full loop reactors connected in series wherein different molecular weight fractions are produced, characterised in that the Ziegler-Natta catalyst has a particle size distribution d, of less than 20 μm and greater than 5 μm.

The present invention also discloses a polyolefin obtainable by the process according to the present invention.

The present invention further discloses the use of a polyolefin formed by the process according to the present invention for making pipes, particularly for making a water or gas (such as liquid propane or natural gas) pipe distribution network.

The present invention yet further discloses a pipe and a distribution pipe network prepared from the polyolefins of the present invention.

Clearly, in the process according to the present invention, the catalyst necessarily is in particulate form.

The present invention will be further disclosed in detail hereunder. The description is only given by way of example and does not limit the invention. The reference numbers relate to the hereto-annexed figures.

In the course of the Description hereinafter, the term "invention" either relates to an embodiment of the global invention or to the global invention itself.

DETAILED DESCRIPTION OF THE DRAWINGS

FIG. 21 shows surface roughness profiles.

FIG. 31A shows a double acting pneumatic actuator directed by a two-way system driven by a solenoid, while

FIG., 41 is a diagrammatic illustration of two polymerization reactors 2, 3, which are connected in series in accordance with the present invention.

Figure 42:
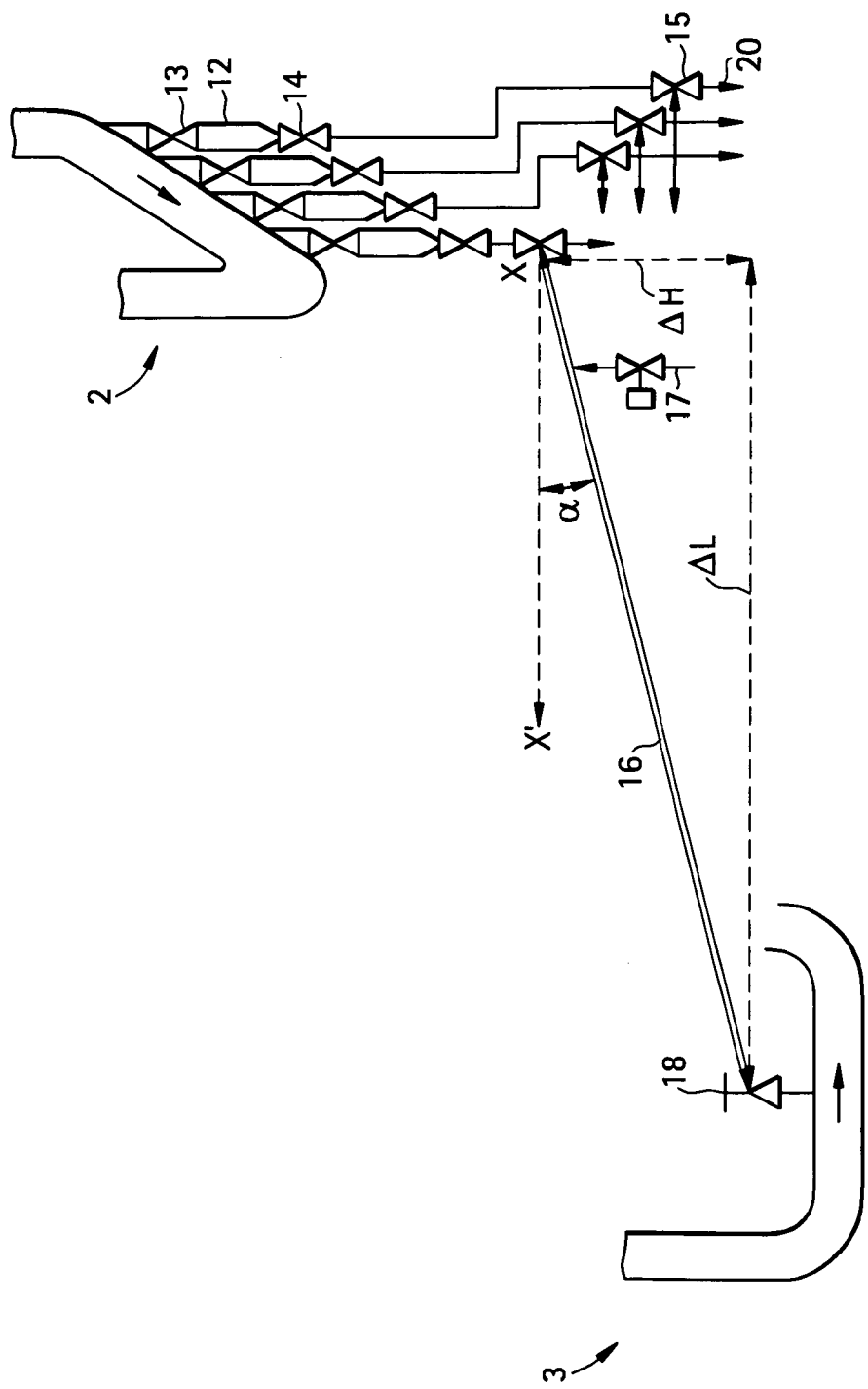

FIG. 42 is a schematic detailed representation of the connection of one loop reactor 2 to another loop reactor 3 by means of transfer lines 16.

Figure 43:
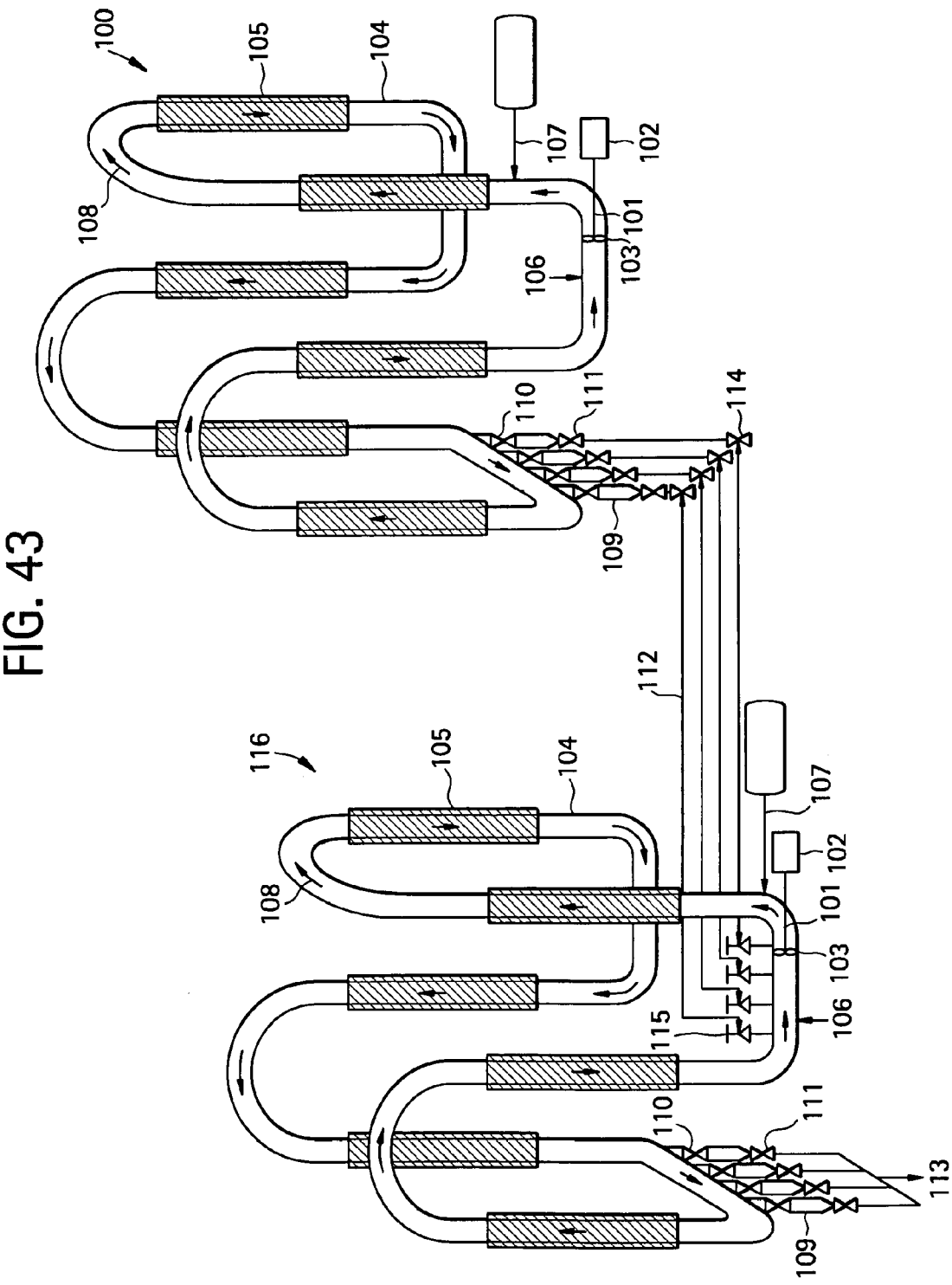

FIG. 43 is a schematic representation of a double loop polymerization reactor.

Figure 44:
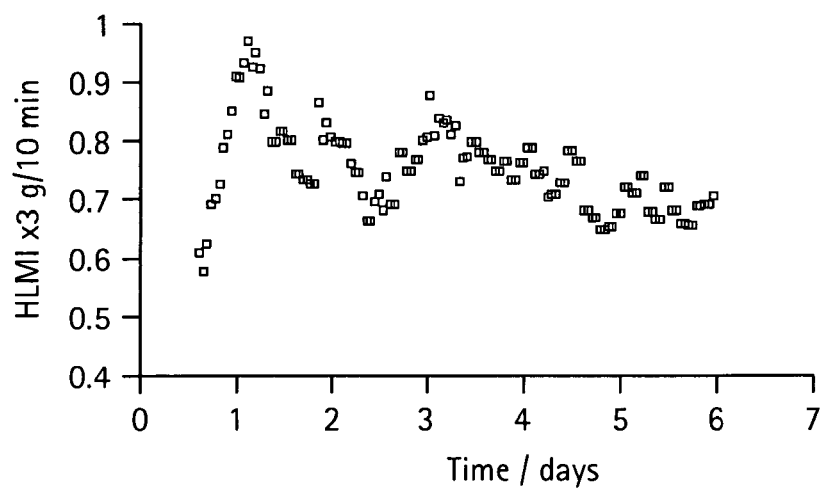

FIG. 44 represents the melt index HLMI expressed in dg/min as a function of time expressed in days for the 13 μm particles in reactor 1 at the beginning of the evaluation.

Figure 45:
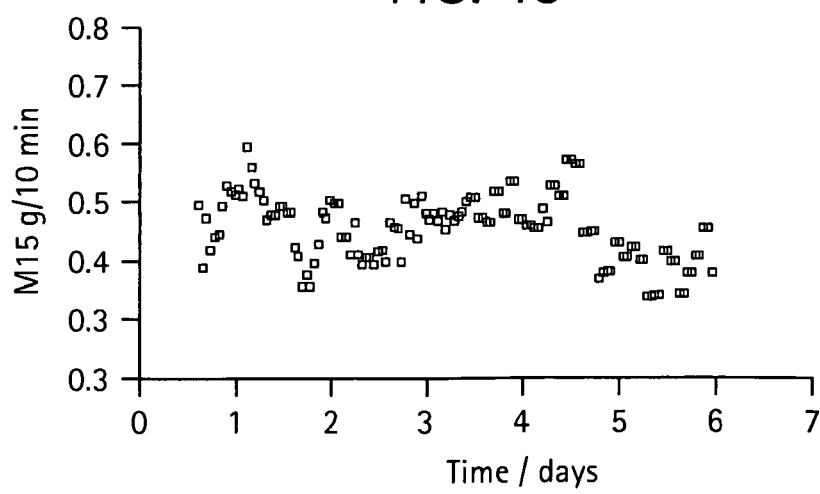

FIG. 45 represents the melt index MI5 expressed in dg/min as a function of time expressed in days in reactor 2 for the 13 μm particles at the beginning of the evaluation.

Figure 46:
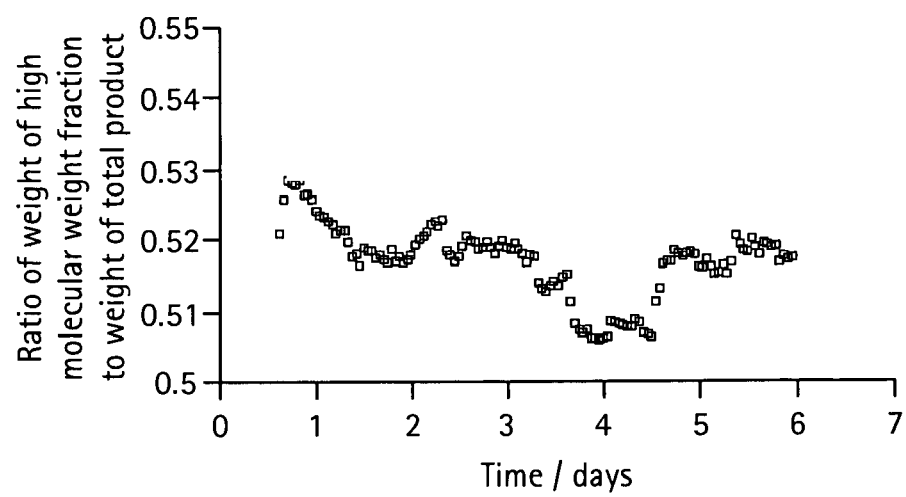

FIG. 46 represents the reactor rate expressed as the ratio of high molecular weight fraction to total production as a function of time expressed in days for the 13 μm particles at the beginning of the evaluation.

Figure 47:
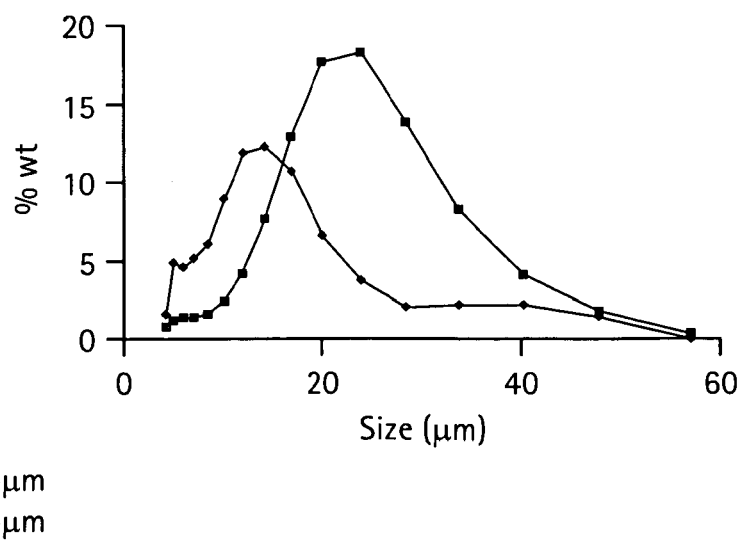

FIG. 47 represents the particle size distribution (PSD) expressed in wt % as a function of particle size expressed in microns.

Figure 48:
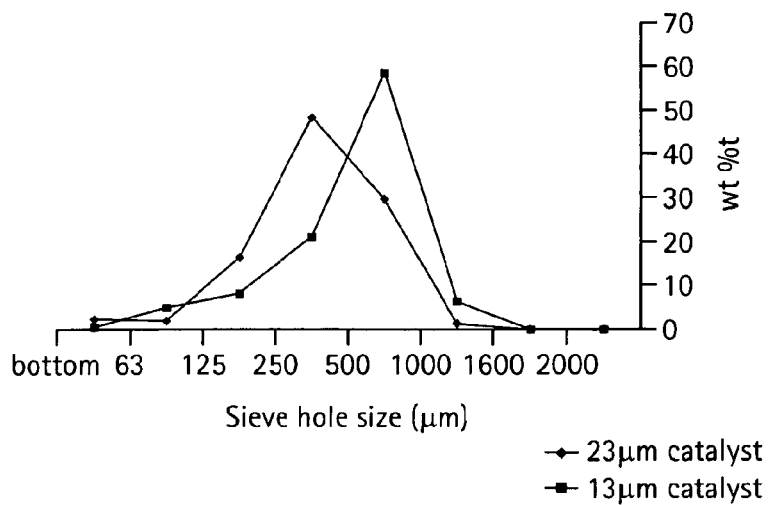

FIG. 48 shows a comparison between the 13 microns and 23 microns fluff PSD.

Figure 49:
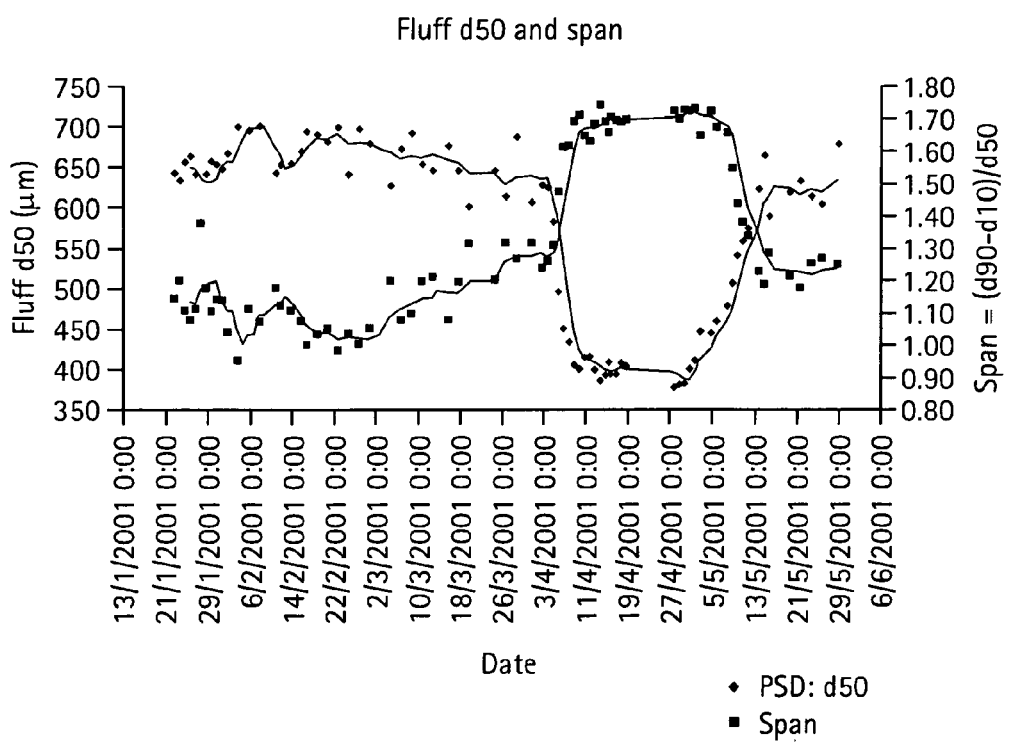

FIG. 49 shows the fluff's $d_{50}$ expressed in microns and the span evolution expressed as the ratio $(d_{90}-d_{10})/d_{50}$ as a function of time expressed as the date of experiment.

Figure 50:
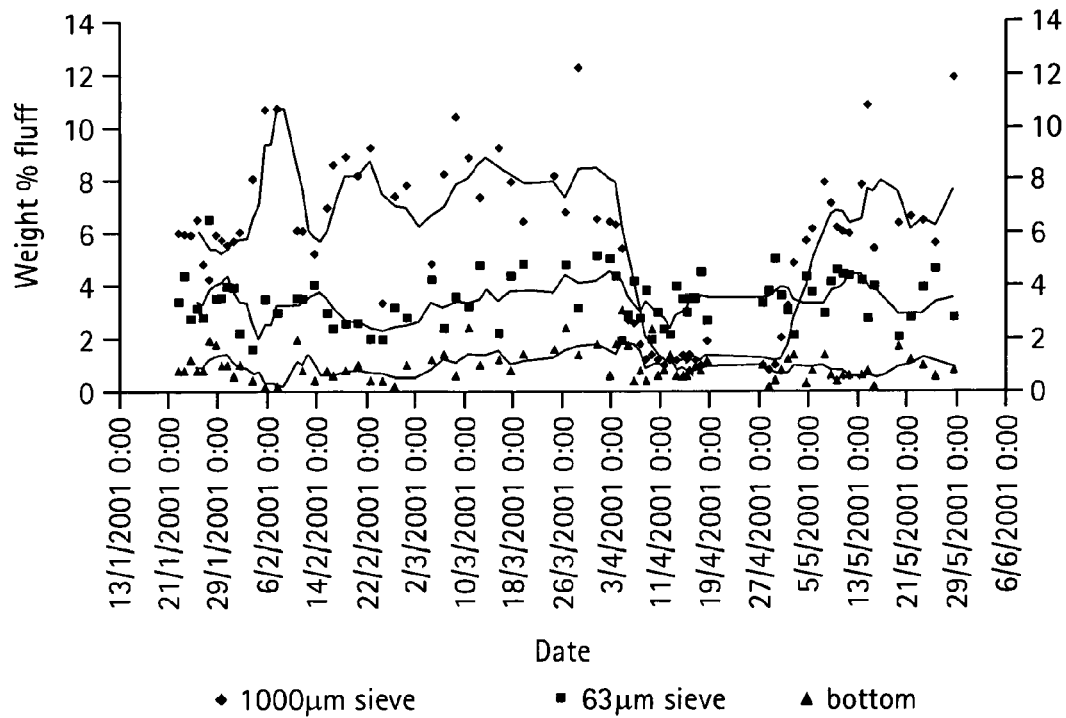

FIG. 50 represents the weight percent of fluff after respectively the 1000 microns, 63 microns and bottom sieves as a function of time expressed as the date of experiment.

Figure 51:
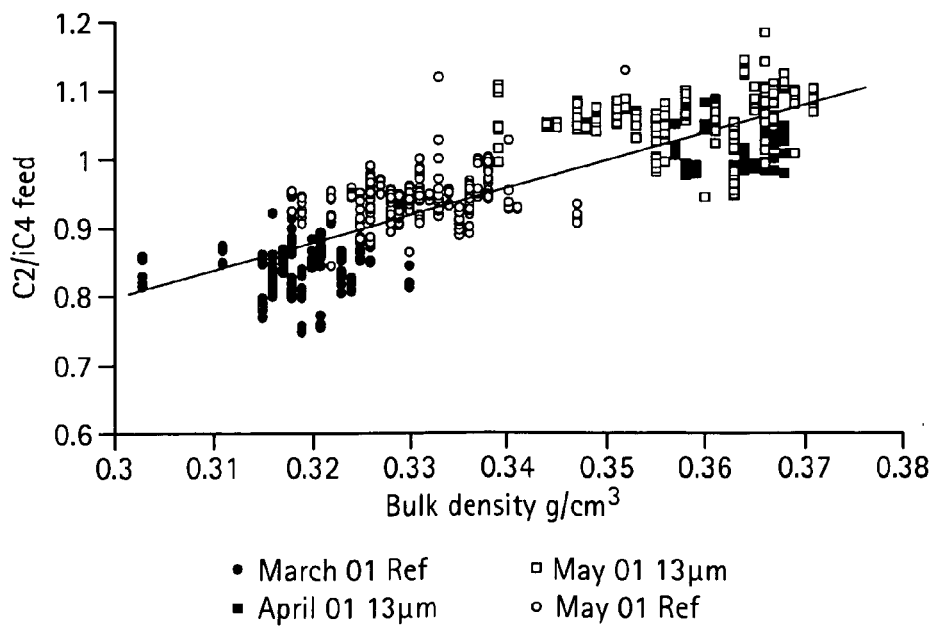

FIG. 51 is a plot of the ratio C2/iC4 in the feed versus bulk density expressed in g/cm³ of the polymer fluff in reactor 1.

Figure 52:
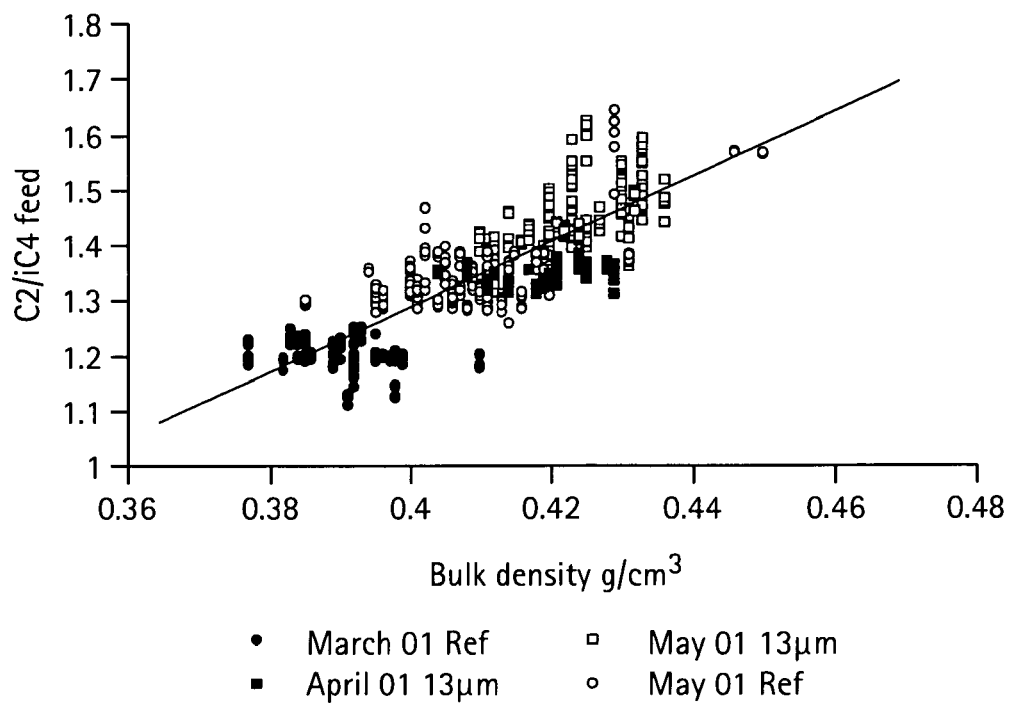

FIG. 52 is a plot of the ratio C2/iC4 of the feed versus bulk density expressed in g/cm³ of the polymer fluff in reactor 2.

Figure 53:
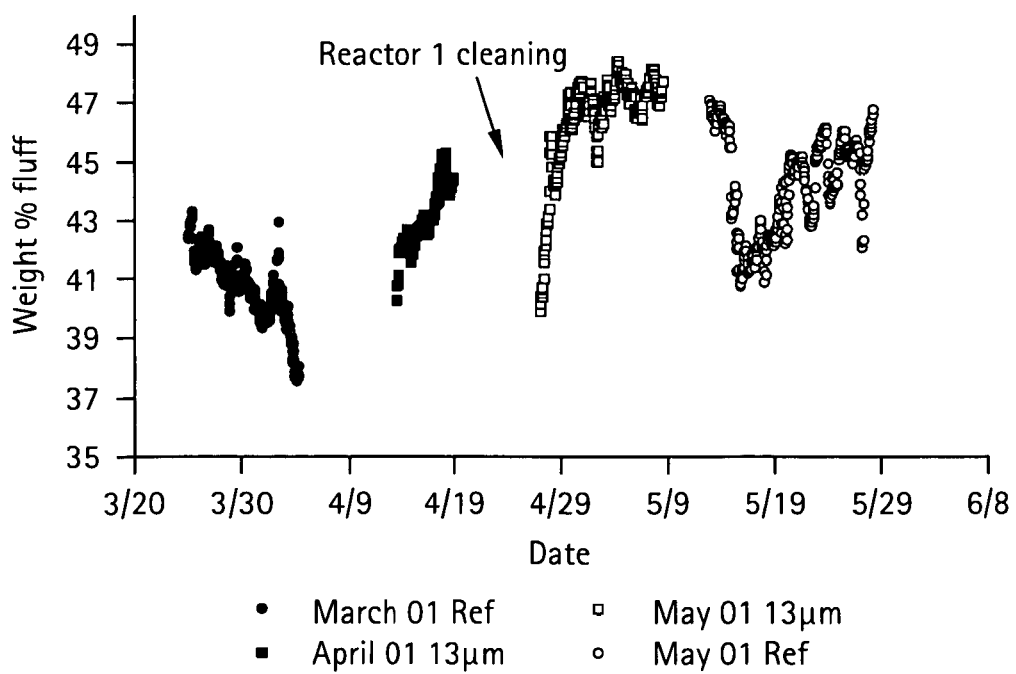

FIG. 53 represents the solid content expressed in weight percent of fluff as a function of time expressed as the date of experiment.

Figure 54:
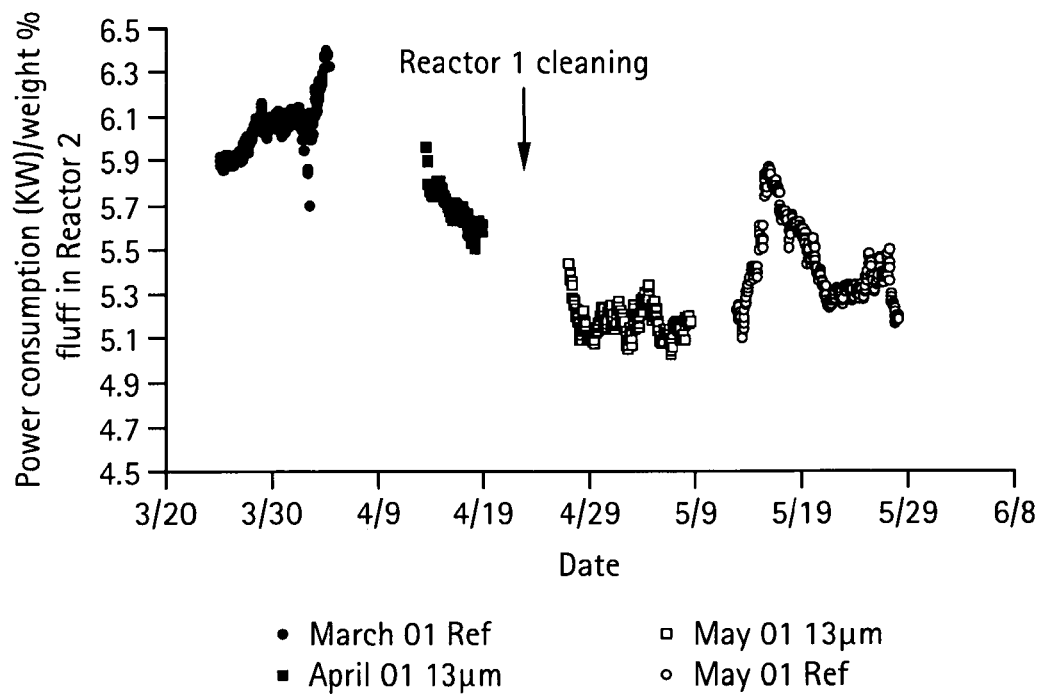

FIG. 54 represents the pump power consumption expressed in kW per weight percent of fluff as a function of time expressed as the date of experiment.

Figure 55:
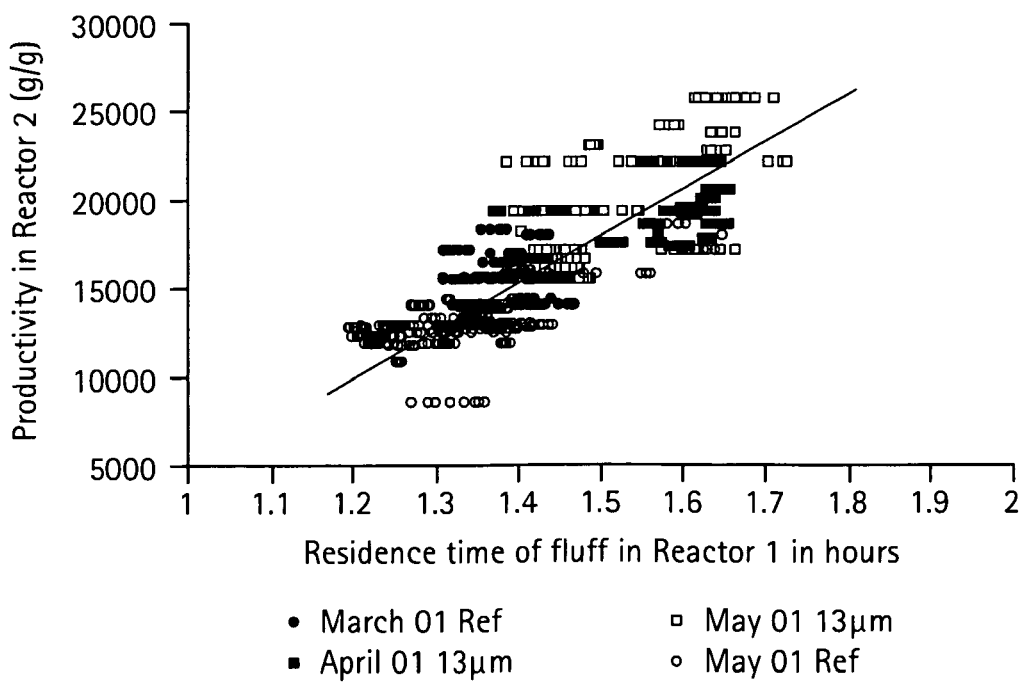

FIG. 55 shows the productivity expressed in gig as a function of solid residence time expressed in hours.

Figure 56:
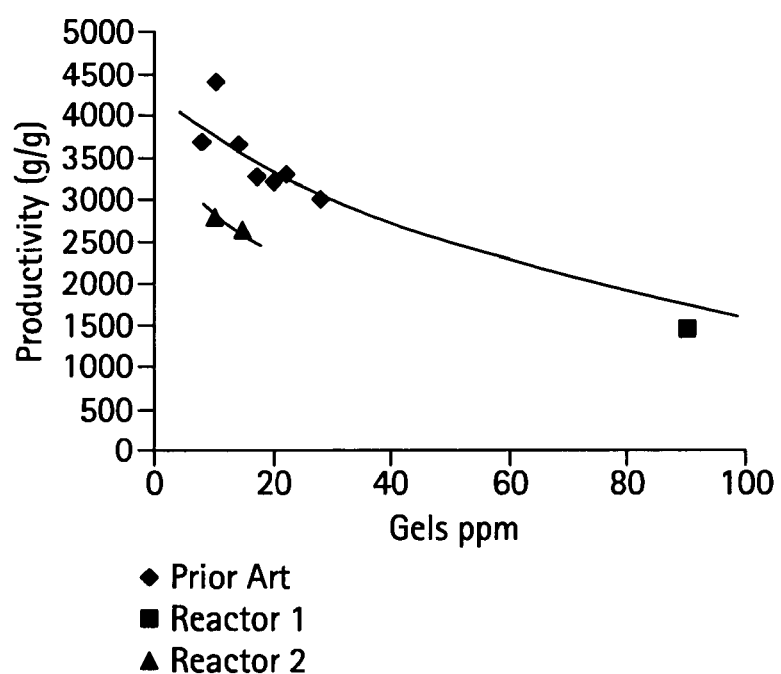

FIG. 56 represents the amount of gel expressed in ppm as a function of productivity expressed in grams of polyethylene per gram of catalyst, for a resin prepared in a double loop reactor, for a resin exiting the first reactor and a prior art resin.

Figure 57A:
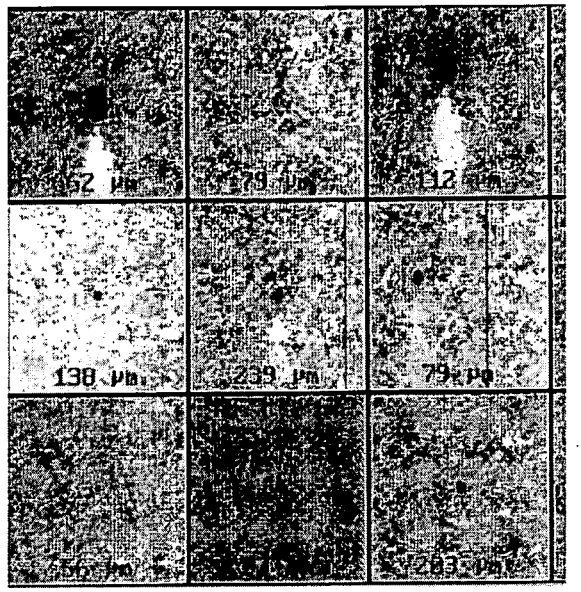
Figure 57B:
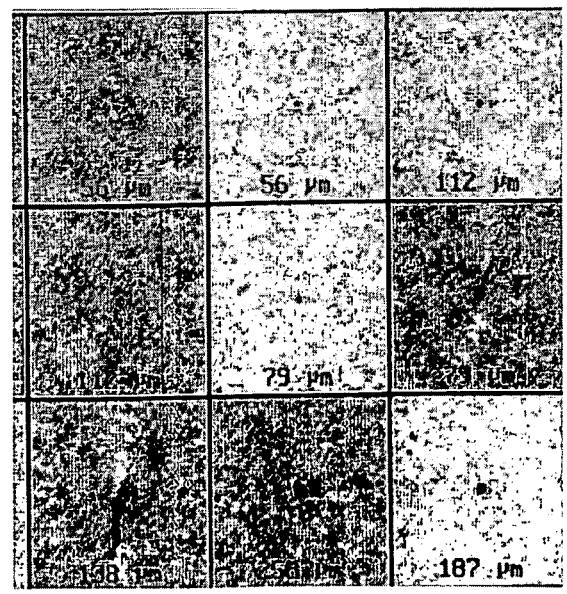

FIG. 57 represents a photograph of the gels in resin R1 retrieved respectively from the first (FIG. 57a) and from the second reactor (FIG. 57b).

Figure 58:
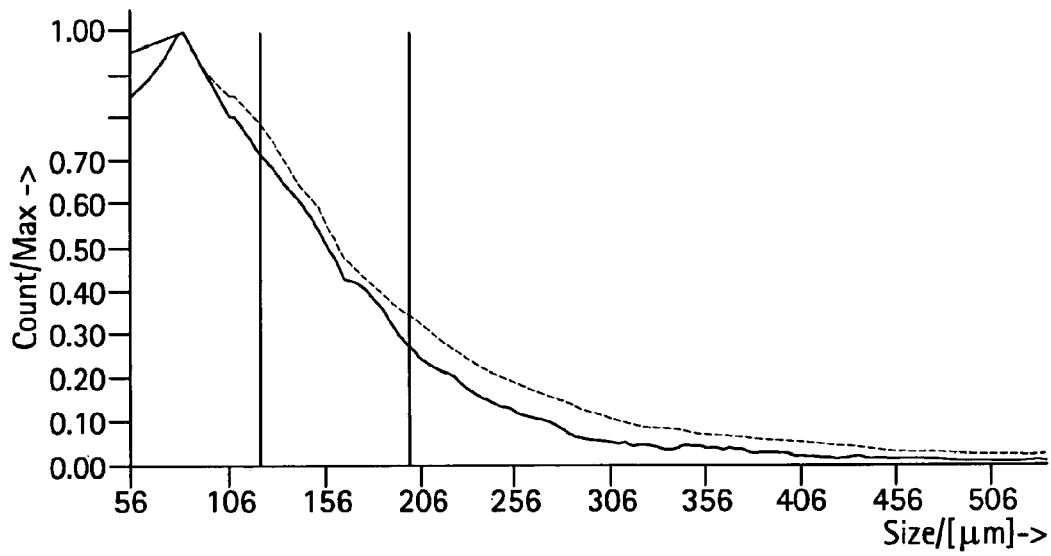

FIG. 58 represents the gel size distribution for resin R1: it is the number of counts as a function of size expressed in mm. The dashed line represents the resin exiting the first reactor and the solid line represents the resin exiting the second reactor.

Figure 59:
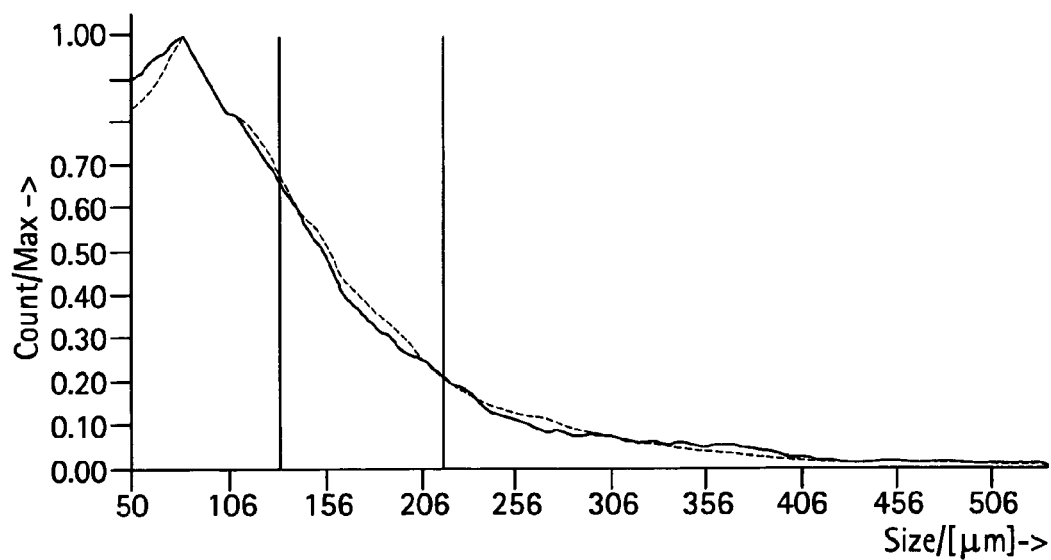

FIG. 59 represents the gel size distribution for resin R2: it is the number of counts as a function of size expressed in mm. The dashed line represents the resin exiting the first reactor and the solid line represents the resin exiting the second reactor.

DETAILED DESCRIPTION OF THE INVENTION

The present invention is described in terms of controlling the feeding of catalyst slurry to a polymerization reactor, in particular to a polymerization reactor wherein polyethylene (PE) is prepared. Polymerization of ethylene may for instance be carried out in loop reactors. In such polymerization reactions, ethylene, a co-monomer such as hexene-1, a light hydrocarbon diluent such as isobutane, a catalyst and hydrogen are fed to a reactor, in a particularly preferred embodiment, the invention relates to a process of controlling the feeding of catalyst slurry to a polymerization reactor wherein bimodal polyethylene is prepared, "Bimodal PE" refers to PE that is manufactured using two reactors, which are connected to each other in series. However, the present method for controlling catalyst feeding to a polymerization reactor should be understood to be applicable to reactors wherein other types of polymerization reactions can take place as well.

According to the present invention the term "catalyst" is defined herein as a substance that causes a change in the rate of a polymerization reaction without itself being consumed in the reaction. According to a preferred embodiment said catalyst is a metallocene or chromium catalyst. According to another embodiment, said catalyst may also be a Ziegler- Natta catalyst. In another particularly preferred embodiment, said catalyst may comprise any catalyst which is provided on a Si support.

The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

The term "metallocene catalyst" is used herein to describe any transition metal complexes consisting of metal atoms bonded to one or more ligands. In a preferred embodiment, the metallocene catalyst has a general formula MX, wherein M is a transition metal compound selected from group IV and wherein X is a ligand composed of one or two groups of cyclopentadienyl (Cp) indenyl, fluorenyl or their derivatives. Illustrative examples of metallocene catalysts comprise but are not limited to $Cp_2ZrCl_2$, $Cp_2TiCl_2$ or $Cp_2HfCl_2$.

The metallocene catalysts generally are provided on a solid support. The support should be an inert solid, which is chemically unreactive with any of the components of the conventional metallocene catalyst. The support is preferably a silica compound.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

The term "Ziegler-Natta catalyst" refers to a catalyst of the general formula $MX_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, R is chlorine or bromine, and most preferably, chlorine. Illustrative examples of the transition metal compounds comprise but are not limited to $TiCl_3$, $TiCl_4$. In a particularly preferred embodiment of the invention said catalyst is a titanium tetrachloride ($TiCl_4$) catalyst.

Ziegler-Natta catalysts generally are provided on a support, i.e. deposited on a solid support. The support should be an inert solid, which is chemically unreactive with any of the components of the conventional Ziegler-Natta catalyst. The support is preferably a silica or magnesium compound. Examples of the magnesium compounds which are to be used to provide a support source for the catalyst component are magnesium halides, dialkoxynmagnesiums, alkoxymagnesium halides, magnesium oxyhalides, dialkylmagnesiums, magnesium oxide, magnesium hydroxide, and carboxylates of magnesium.

The term "co-catalyst" as used herein is defined as a catalyst that can be used in conjunction with another catalyst in order to improve the activity and the availability of the other catalyst in a polymerization reaction. In a preferred embodiment, said co-catalyst is a catalyst suitable for being used in conjunction with a metallocene catalyst. Such co-catalysts may include organometallic compounds, or a mixture of non-coordinated Lewis acids and alkylaluminiums as it is well known in the art.

Preferably, organometallic compounds of periodic groups I to III are used as co-catalyst according to the present invention. In a particularly preferred embodiment, said co-catalyst is a catalyst suitable for being used in conjunction with a metallocene catalyst and is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen. Examples of co-catalysts comprise but are not limited to trimethyl aluminum, triethyl aluminum, di-isobutyl aluminum hydride, tri-isobutyl aluminium, tri-hexyl aluminum, diethyl aluminum chloride, or diethyl aluminum ethoxide, A particularly preferred co-catalyst for use in the present invention is tri-isobutyl aluminium.

The invention will be described hereunder with reference to the control of feeding of a metallocene catalyst supported on silica impregnated by methylaluminoxane (MAO), to a polymerization reactor wherein ethylene is polymerized. In a preferred embodiment, isobutane is used as diluent for the metallocene catalyst. As co-catalyst for the metallocene catalyst, reference is made to a tri-isobutyl aluminium co-catalyst referred to as TIBAL herein. However, it should be understood that the present device is applicable to other types of catalysts, such as for instance chromium catalysts, and to other types of co-catalysts as well.

For reasons of brevity and clarity, conventional auxiliary equipment such as pumps, additional valves, and other process equipment have not been included in this description and the accompanying drawings as they play no part in the explanation of the invention. Also additional measurement and control devices which would typically be used on a polymerization process have not been illustrated.

Figure 1:
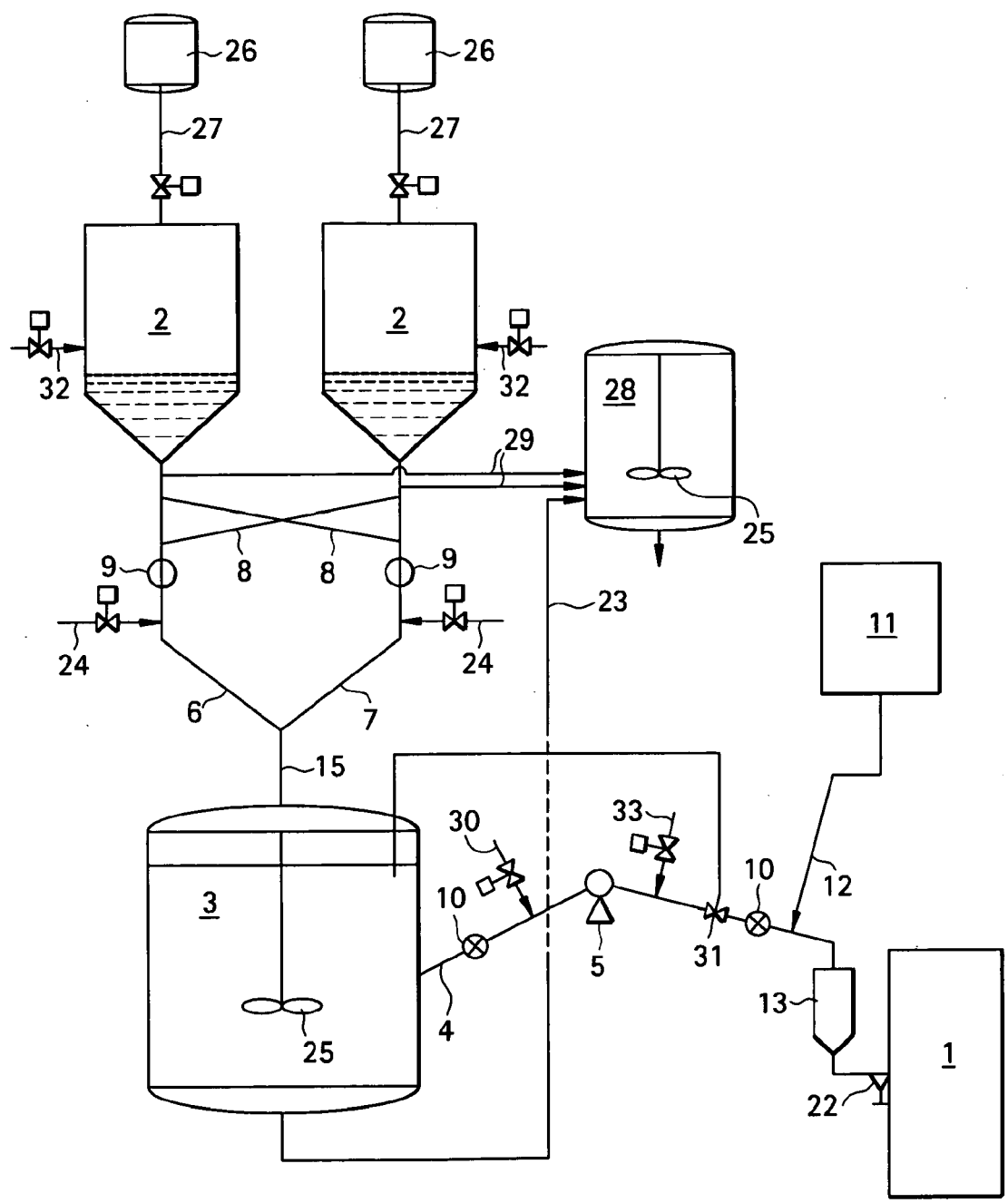
FIG. 1 is a schematic representation of a preferred embodiment of an apparatus according to the invention for controlling the injection of catalyst in a polymerization reactor.

Referring now to FIG. 1, an apparatus according to the present invention is illustrated. The apparatus comprises one or more catalyst storage vessels, or so-called mud tank or pot 2 which contain solid-liquid slurry of metallocene catalyst and isobutane diluent. The slurry is fed from the mud pot 2 through the combination of conduit 6, 7 and conduit 15 to a mixing vessel 3, wherein the slurry is diluted to a suitable concentration. In addition, the apparatus further comprises one or more conduits 4 which connect the mixing vessel 3 to a polymerization reactor 1 and through which the diluted catalyst slurry is pumped from said mixing vessel 3 to the reactor 1, by means of pumping means 5 provided in these conduits 4.

The metallocene catalysts can be provided under a dry form in commercially available drums or tote bins 26. In general such drums containing dry catalyst powder are not able to handle high pressures. For instance, the pressure in such drum may comprise approximately between 1.1 and 1.5 bar, and preferably 1.3 bar. Depending on the diluent used, it may be required to bring the catalyst under higher pressure conditions in the storage vessel 2. Using appropriate systems, the catalyst is therefore preferably transferred from such drums to a storage vessel 2, which is suitable for handling higher pressures, if this is required by the diluent. This is for instance the case when isobutane is used, since this diluent is only liquid at higher pressure levels. In case for instance hexane is used as diluent, storage vessel 2 is not required, since this diluent is liquid at low pressures. According to a preferred embodiment, the metallocene catalyst is provided from drums 26 to a storage vessel 2 through a conduit 27, preferably by means of nitrogen pneumatic transfer or by gravity. However, it is clear that also other types of catalyst feeding to the storage vessel are suitable and fall within the scope of the present invention. In an alternative embodiment, the metallocene catalyst can also be provided in a commercial container that is suitable for handling higher pressure comprised between 7 and 16 bar. In such case such commercial container is considered as a storage vessel 2 and the catalyst can be fed directly from this commercial container to a mixing vessel 3. Isobutane diluent is brought into the storage vessel 2 by means of a control valve.

In the storage vessel, the metallocene catalyst is stored under liquid olefin free isobutane pressure, preferably comprised between 7 and 16 bar. The pressure in the storage vessel is preferably lower than the pressure in the reactor, in order to avoid leakage of catalyst from the storage vessel to the reactor. Catalyst settles in storage vessel 2, since no agitation means are provided in this vessel.

The catalyst is subsequently transferred by means of transferring means from the storage vessels 2 to a mixing vessel 3 wherein said catalyst is diluted for obtaining a suitable concentration for use in a polymerization reaction. Preferably the catalyst mixtures in the storage vessel 2 which contain proportionally high amounts of solids are fed to the mixing vessel 3 through conduits 6, 7. As represented, two storage vessels are connected with two different conduits 6, 7 to a common mixing vessel 3. In such case, the catalyst mixtures in conduits 6, 7 are preferably discharged in a common conduit 15, before being supplied to the mixing vessel 3. However, according to the invention, also only one storage vessel 2 may be provided. To avoid remaining catalyst in storage vessel 2, the vessel is flushed with isobutane, such that remaining catalyst is transferred to the mixing vessel 3.

In a particularly preferred embodiment, the conduits 6, 7 are interconnected by means of connecting lines 8. Such lines 8 enable that the different storage vessels 2 can be used in accordance with all provided conduits 6, 7. For instance, as represented in FIG. 1, in case two storage vessels 2 are provided, each having a conduit 6 or 7, the conduit 6 for transferring said catalyst from a first storage vessel 2 to a mixing vessel 3 is interchangeable with a second conduit 7 for transferring said catalyst from a second storage vessel 2 to a mixing vessel 3 through lines 8 connecting said first 6 with said second 7 conduit. Such interconnection permits, in case of interruption of catalyst transfer through one conduit 6, to discharge the catalyst to the mixing vessel 3 through a second conduit 7.

Each conduit 6, 7 is preferably equipped with metering valves 9 allowing the feeding of a controlled flow rate of catalyst to the mixing vessel 3. These valves are preferably provided downstream the connecting lines 6. The pressure difference between the storage vessel 2 and the mixing vessel 3 supplies the motive force to feed the catalyst to the mixing vessel.

The metering valves 9 allow the transfer of a predetermined volume of catalyst to the mixing vessel 3. The catalyst slurry discharged by the valves is carried to the mixing vessel by an isobutane flow. Therefore, the conduits 6, 7, each are preferably further provided with a port 24, which can be connected for flushing with diluent. Said port is preferably provided downstream the valves 9.

Figure 2:
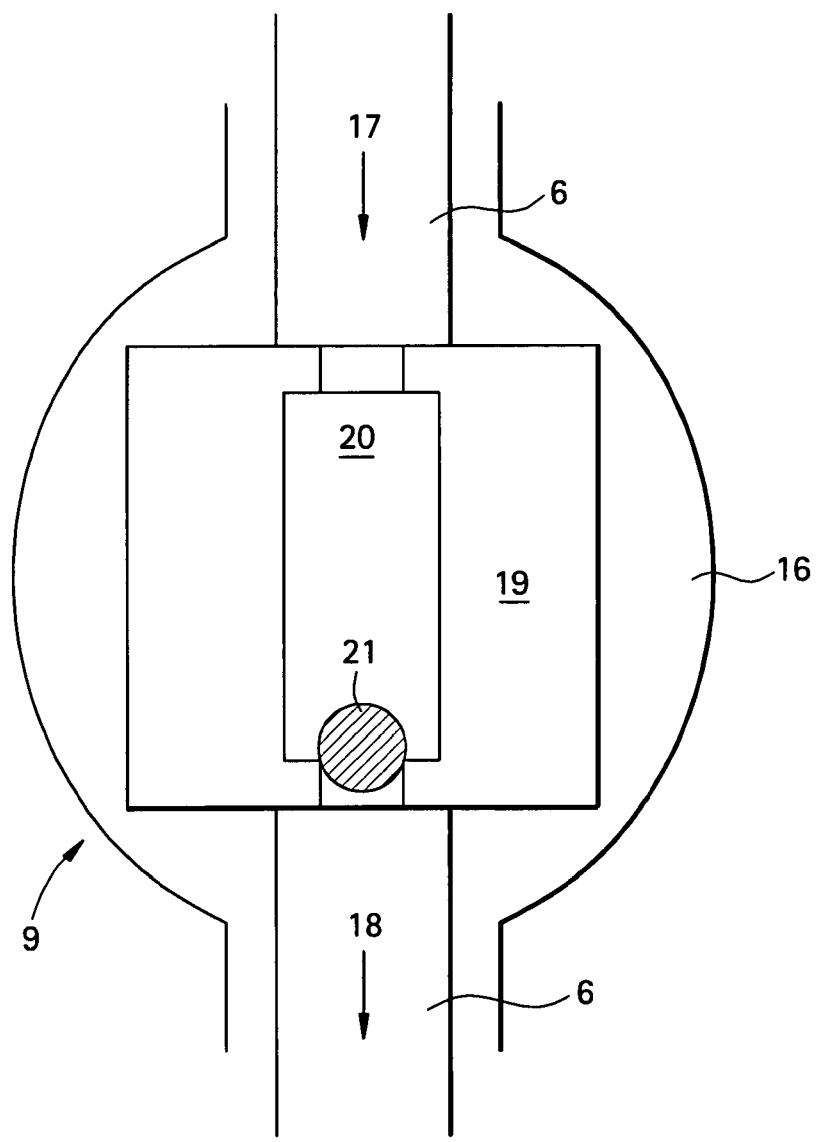
FIG. 2 is a detailed representation of a preferred embodiment of a metering valve, used in the apparatus according to the present invention for controlling the transfer of catalyst slurry from a storage vessel to a mixing vessel.

In a preferred embodiment, the metering valves 9 are ball check feeder or shot feeder valves. FIG. 2 illustrates a ball check feeder valve arrangement suitable for utilization in the present apparatus. However, it is clear that other types of valves could be used as well in accordance to the present invention. Referring to FIG. 2, a preferred embodiment of a valve is represented which includes a body 16, having an inlet 17 and an outlet 18, a member 19, containing a metering chamber 20, which is rotatable within the body 16 for communicating with the inlet 17 and outlet 18 in at least two positions, a ball shaped piston 21, which moves with a reciprocating motion within the chamber 20 as the member 20 is rotated. The working mechanism of such valve involves a sequence of charging, valve actuation and dumping of a specific volume of catalyst slurry from a storage vessel 2 to a mixing vessel 3. During operation, when the valve takes a first position, a fixed quantity of concentrated slurry flows through the inlet 17 and fills a chamber 20 within the valve 9. Said quantity is released to the mixing vessel 3 when the valve is actuated to a second position. The valve 9 thus delivers a fixed volume of concentrated slurry from storage vessel 2.

More in detail the mechanism of action of this special ball check valve 9 is the following. The valve 9 is charged or filled with a predetermined volume of a mixture of catalyst and diluent when in a first position. Periodically this ball check valve is actuated to a second position and this volume of the mixture is dumped from the valve into the mixing vessel 3. The ball check valve 9 is then recharged or refilled with the predetermined volume of the mixture in preparation for actuation back to the first position where the second volume of mixture is dumped from the valve 9 into the mixing vessel 3. Concentrated slurry flow from storage vessel 2 to the mixing vessel 3 is thus accomplished by the cyclic operation of the metering valve 9. The cycle time of the valves determines the catalyst flow rate to the mixing vessel 3. For instance, when this cycle time is increased, the flow rate of catalyst decreases.

Due to the high degree of dilution and the use of membrane pumps the catalyst feeding system from the storage vessel 2 to the mixing vessel 3 advantageously allows providing catalyst at a controlled flow rate to the mixing vessel 3. In addition, the feeding system permits to keep the concentration of catalyst slurry in the mixing vessel 3 at a substantially constant level, since catalyst flow regulated by the valve 9 to the mixing vessel 3 is dependent on the dosed amount (concentration) of catalyst and diluent in the mixing vessel 3. In a preferred embodiment of the invention the concentration of catalyst slurry in the mixing vessel is kept at a substantially constant level. According to the invention the ratio between diluent and catalyst is adequately controlled. This is enabled by adequate control of catalyst feeding from the storage vessel by means of the catalyst feeding system and metering valves 9, and by release of a suitable amount of isobutane to the mixing vessel.

Catalyst wastes can be sent to one or more dump vessels 28, which are preferably provided with stirring means 25 and contain mineral oil for neutralization and elimination of the wastes. The dump vessels are preferably connected by means of conduits 29 to the catalyst feeding conduits 6 or 7, upstream of the metering valves 9. The dump vessel 28 is preferably also connected to the mixing vessel 3, for transferring catalyst wastes by means of a conduit 23. The dump is provided with a heated vessel, e.g. steam jacket, where the isobutane is evaporated and sent to distillation or to the flare. In order to avoid the transfer of catalyst fragments when transferring the evaporated isobutane, guard filters are provided with the dump vessels 28. The dump vessels are also provided with pressure controlling means for controlling the pressure in said vessels. The catalyst waste remaining after evaporation of the diluent is removed from the vessels 28, preferably by means of a draining system, provided at the bottom of the vessel 28, and the removed waste is discharged into drums and further destroyed.

According to the present invention, the metallocene catalyst is transferred from the storage vessels 2 to a mixing vessel 3. A stream of isobutane is provided to mixing vessel 3 through a valve which is operably located in conduits 6 and 7. An additional function of this stream is to dilute the concentrated slurry. The mixing vessel 3 can be operated either when full of liquid or not. Preferably, the mixing vessel 3 is operated full of liquid, since if there is an interphase with nitrogen the catalyst slurry might settle or stick to the walls in the vessel.

Preferably, the metallocene catalyst slurry is diluted in a hydrocarbon diluent in the mixing vessel 3 to a concentration between 0.1% and 10% by weight. More preferably the slurry is diluted in a hydrocarbon diluent to a concentration comprised between 0.1% and 4% by weight, more preferred between 0.1 and 1%, and even more preferred of 0.5% by weight. Preparing diluted slur having these concentrations advantageously enables the further use of membrane pumps 5 for injecting the slurry in the reactor 1, as described into more detail below. The mixing vessel 3 is also provided with a stirrer 25 for maintaining the homogeneity of the slurry.

Dilute catalyst slurry is withdrawn from the mixing vessel 3 through one or more conduits 4 and provided through these conduits to a polymerization reactor 1. Each conduit 4 is provided with a pumping means 5, which controls the transfer and injection of the metallocene catalyst slurry into the reactors 1. In a particularly preferred embodiment, said pumping means are membrane pumps. The conduits 4 preferably leave the mixing vessel 3 in upward direction under an angle preferably superior to 10°, and more preferably superior to 30°. In addition, the conduit provided downwards the pumping means 5 conducts the catalyst slurry preferably downwardly, under an angle preferably superior to 10°. Such configuration improves the action of the pumping means 5 and also enables to avoid plugging in the pumping means 5 since under this configuration the slurry tends to settle away from the pumps 5 in case the pumps 5 are interrupted or stopped. However, it is to be understood that conducts which extend downwardly are not required if sufficient flushing of the conduit 4 can be obtained.

The conduits 4 are further provided with isobutane flushing means, either at the inlet 30, at the outlet 33 or at both sides of the membrane pumps 5, as illustrated on FIG. 1. Isobutane flushing means 30, 33 enable to flush isobutane through the conduit 4 and to keep the conduits 4 and the pumping means 5 unplugged. Preferably, there is continuous flushing of the conduit 4 downstream the membrane pump 5 to the reactor 1 by means of isobutane flushing means 33. The conduit 4 upstream the pump 5 may be flushed discontinuously by means of isobutane flushing means 30. When different conduits 4 are provided for connecting the mixing vessel 3 to the reactor 1, generally, one conduit having one active pumping means 5 will be operative, while the other conduits 4 and pumping means 5 will not be operative but will be kept in stand by mode. In this latter case, the conduit 4 downstream the pump 5 will preferably be flushed with a suitable stream of diluent. The conduit 4 upstream the pump 5 may be discontinuously flushed. In addition, two-way valves 31 can be installed on the conduits 4, in order to never stop the pumping means 5.

It is important to correctly control the metallocene catalyst flow rate to the reactor and to pump catalyst slurry into the reactor at a controlled and limited flow rate. An unexpected flow rate to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactor 1 activity. The pumping means are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e.g. the co-monomer or hydrogen concentrations in the reactor as well. By the use of membrane pumps 5 the invention provides for a good control catalyst flow, in particular, the metallocene catalyst flow rate to the reactors is controlled by adjusting the stroke and/or frequency of the membrane pumps. Furthermore, the pump flow rates are controlled by the ethylene concentration in the reactor. In case the ethylene concentration is high in the reactor, more catalyst will be added to the reactor and vice versa. In this way, the variations in ethylene polymerization rate are taken into account and actual production rate and product properties do not fluctuate significantly. Variations in ethylene polymerization rate are taken into account and polymerization reactions under optimal catalyst feeding conditions can be obtained.

In a further embodiment, the present device is further provided with a co-catalyst feeding system, for bringing a co-catalyst into contact with said catalyst slurry before feeding said catalyst slurry to said reactor. A tri-isobutyl aluminium (TIBAL) is preferably used as co-catalyst.

The cocatalyst distribution system 11 may comprise two co-catalyst storage vessels wherein co-catalyst is prepared and stored. One vessel may be in connection to the conduit 4 for providing co-catalyst thereto.

Co-catalysts are generally provided in commercial drums. In a storage vessel of the co-catalyst distribution system 11, the TIBAL co-catalyst is generally provided in a solution of hexane or heptane but can be provided in pure form too. The TIBAL co-catalyst is transferred from the storage vessel through a co-catalyst injection conduit 12, in the conduit 4, which connects the mixing vessel 3 with the reactor 1. Conduit 12 intersects conduit 4, downstream the diaphragm pumps 5 and upstream the reactor 1. In case a flow measuring means 10 is further provided on the conduits 4, the co-catalyst feeding conduit 12 preferably intersects the conduit 4, downstream of said flow meter 10.

In case the TIBAL co-catalyst is injected in the conduit 4, the injection point is at a distance from the reactor allowing a certain pre-contact time with the catalyst before being supplied to the reactor. In order to have a sufficient pre-contact time, preferably between 5 seconds and 1 minute, between the metallocene catalyst slurry and the TIBAL co-catalyst, small contact vessels 13 are installed on the conduits 4, downstream the injection point of the co-catalyst feeding system. These contact vessels 13 can be agitated or not. In another preferred embodiment, the conduits 4 have an inner diameter comprised between 0.3 and 2 cm, and preferably comprised between 0.6 and 1 cm while the diameter of the contact vessels 13 is preferably comprised between 1 and 15 cm and preferably between 6 and 9 cm.

Catalyst wastes can be sent to a dump vessel 28, which is preferably provided with stirring means 25 and contains mineral oil for neutralization and elimination. The dump is provided with a heated vessel, e.g. steam jacket, where the isobutane is evaporated and sent to distillation or to the flare.

In addition, the invention provides an apparatus having conduits 4 which are further provided with measuring means 10, for easily measuring the catalyst flow rate in the conduits 4. These flow measuring means 10 preferably are Coriolis flow measuring means. The means 10 can be provided between the mixing vessel 3 and the membrane pumps 5 or downstream from said pumping means 5. The slurry is preferably injected in ratio control of isobutane diluent to catalyst. The Coriolis meters 10 can measure the flow and the density of the catalyst slurry at the exit of the mixing vessel 3 and indirectly determine the suspended solids concentration. A correlation exists for estimating the concentration of suspended solids based on the slurry density, the carrier fluid density and the solid particle density.

In another embodiment, the catalyst slurry is injected under controlled flow into the reactor. The conduits 4 for transferring catalyst slurry into to the reactor are equipped by one or more valves, preferably piston valves 22. The piston valves 22 are capable of sealing the orifice by which the conduit 4 is connected to the reactor 1. When using different conduits 8 for transferring catalyst slurry to one reactor, only in one conduit 8 the pumping means actively pump catalyst slurry to the reactor, while in other conduits 8 the pumps are not active and the conduits are preferably flushed by isobutane.

In another preferred embodiment, by operation in accordance with the present invention, all lines, vessels, pumps, valves, etc. can be kept free of clogging by means of flushing or purging with nitrogen or diluent, i.e. isobutane. It is to be understood that where necessary flushing and purging means and lines are available on the device according to the invention in order to avoid plugging, or blocking.

It is clear from the present description that numbers and dimensions of the different parts of the apparatus according to the invention relate to the size of the polymerization reactors and can be changed in function of the reactor sizes.

It is to be understood from the present invention that all indicated pressures values are preferred pressure values, which in general can deviate from the indicated pressure values with approximately ±1 bar. It will be evident from the present description that all indicated pressure values in the vessels, conduits, etc. are values that are lower than the pressure value in the polymerization reactor.

In another preferred embodiment, it is to be understood that all lines or conduits applied in accordance with the present invention may be provided, where necessary with flow measuring means.

Figure 3:
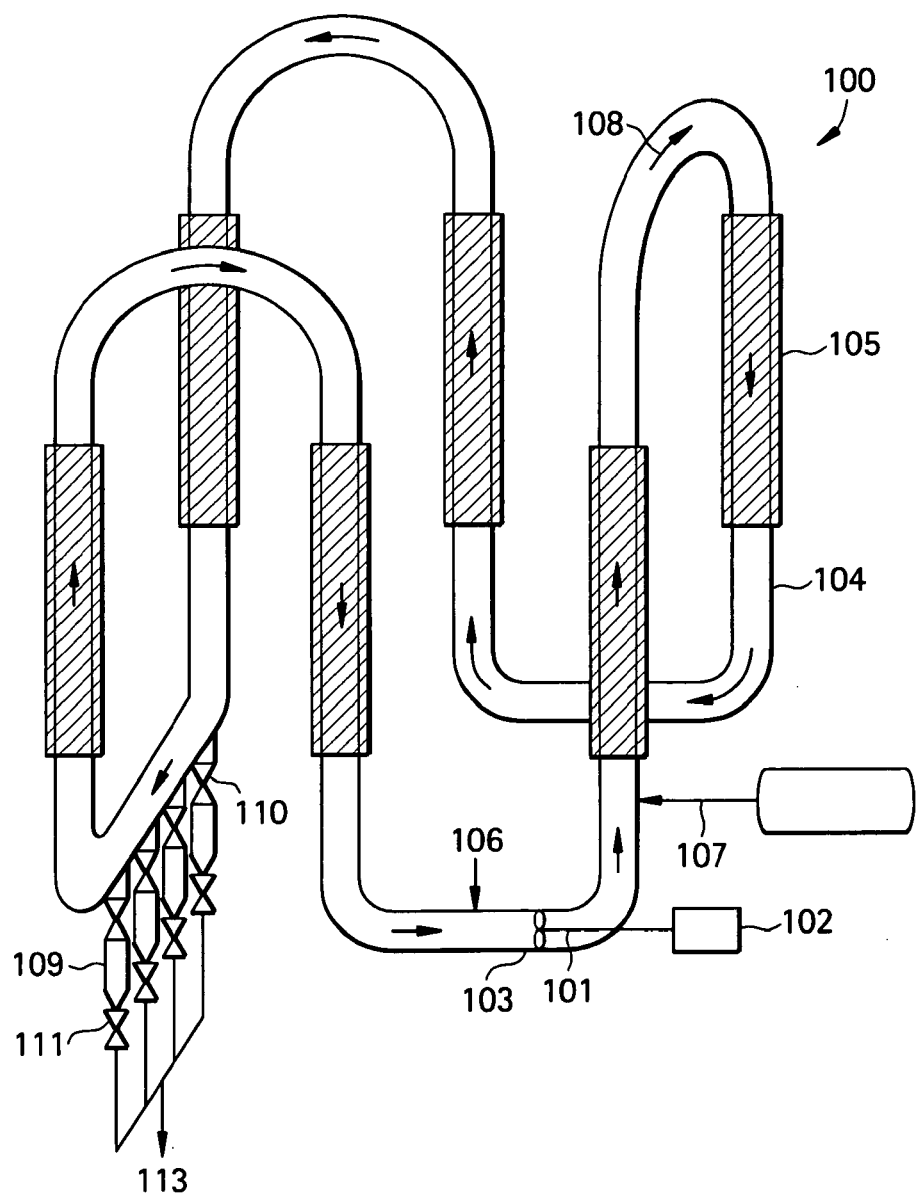
FIG. 3 is a schematic representation of a single loop polymerization reactor.
Figure 4:
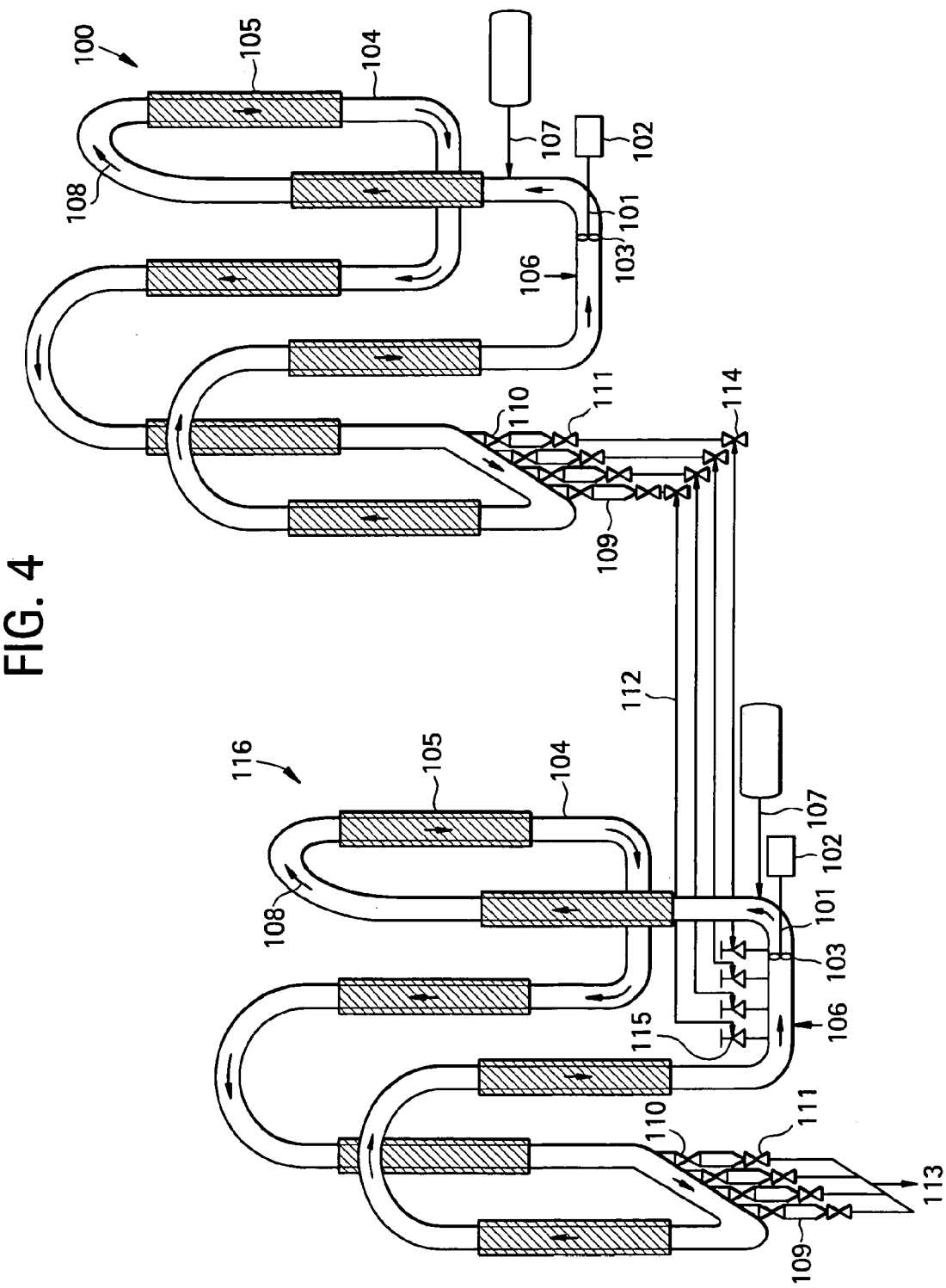
FIG. 4 is a schematic representation of a double loop polymerization reactor.

In a preferred embodiment, the apparatus according to the invention can be used in a single loop reactor as depicted on FIG. 3 or in a double loop reactor, as depicted on FIG. 4.

FIG. 3 represents a single loop reactor 100, consisting of a plurality of interconnected pipes 104. The vertical sections of the pipe segments 104 are preferably provided with heat jackets 105. Polymerization heat can be extracted by means of cooling water circulating in these jackets of the reactor. Reactants are introduced into the reactor 100 by line 107. Catalyst, optionally in conjunction with a co-catalyst or activation agent, is injected in the reactor 100 by means of the conduit 106. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103. The reactor 100 is further provided with one or more settling legs 109 connected to the pipes 104 of the reactor 100. The settling legs 109 are preferably provided with an isolation valve 110. These valves 110 are open under normal conditions and can be closed for example to isolate a settling leg from operation. Further the settling legs can be provided with product take off or discharge valves 111. The discharge valve 111 may be any type of valve, which can permit continuous or periodical discharge of polymer slurry, when it is fully open. Polymer slurry settled in the settling legs 109 may be removed by means of one or more product recovery lines 113, e.g. to a product recovery zone.

FIG. 4 represents a double loop reactor 100/116, comprising two single loop reactors 100 and 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, is injected in the reactor 100 or 116 by means of the conduit 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111. Downstream the valve 111 at the exit of the settling leg 109 of reactor 100, a three-way valve 114 is provided which allows to transfer polymer slurry settled in the settling legs 109 to the other reactor 116, by means of the transfer line 112. The transfer line 112 connects the three-way valve 114, provided at the exit of the settling leg 109 of one reactor 100, with the entry in the other reactor 116, where preferably a piston valve 115 is provided. Polymer slurry settled in the settling legs 109 of reactor 116 can be removed by means of one or more product recovery lines 113, e.g. to a product recovery zone.

The apparatus according to the invention can be applied for feeding a polymerization reactor, in a preferred embodiment the apparatus is applied for feeding a polymerization reactor consisting of two liquid full loop reactors, comprising a first and a second reactor connected in series by one or more settling legs of the first reactor connected for discharge of slurry from the first reactor to said second reactor. Such in series connected reactors are particularly suitable for the preparation of bimodal polyethylene. The present apparatus can be applied for both reactors. The number of conduits 4 can be divided between the first and the second reactor. It is also possible to use two catalyst preparation and injection apparatuses e.g. when two different catalysts are used.

At the start of the operation of the apparatus, the following subsequent steps are performed. First, the mixing vessel 3 and the conduits provided under the valves 9 are filled with the diluent isobutane. Then, the storage vessels and the conduits 6 and connecting lines 8, provided upstream the valves 9, are supplied with isobutane. Subsequently, the valves 9 are shortly brought into operation, where after the flushing to the reactor 1 is opened and catalyst is injected through conduits 4 in the reactor.

In another embodiment, the present invention relates to a method for controlling the injection of catalyst slurry in a polymerization reactor 1 wherein polyethylene is prepared, said catalyst consisting of solid catalyst, preferably a metallocene catalyst defined as described above in a hydrocarbon diluent, preferably isobutane. However, it is clear that the present method is also suitable for controlling the injection of chromium catalyst slurry in a polymerization reactor 1. The method comprises the subsequent steps of: a) providing solid catalyst and a hydrocarbon diluent in one or more storage vessels 2 such that a catalyst slurry is obtained in said vessel 2, b) transferring said catalyst slurry from said storage vessel 2 to a mixing vessel 3 wherein said catalyst slurry is diluted for obtaining a suitable concentration for use in a polymerization reaction, and c) pumping said diluted catalyst slurry at a controlled flow rate from said mixing vessel 3 to said polymerization reactor 1 through one or more conduits 4, by means of a pumping means 5, provided in each of said conduits 4.

According to a preferred embodiment, the method comprises transferring said catalyst slurry from a storage vessel 2 to a mixing vessel 3 at a controlled flow rate, by controlling the ratio between diluent and catalyst in the mixing vessel 3. Control of the flow rate is enabled by providing a catalyst feeding system for feeding catalyst slurry from the storage vessel 2 to the mixing vessel 3, which comprises a conduit 6, 7, connected to said vessel 2 and metering valves 9, preferably ball check feeder or shot feeder valves, on said conduit 6, 7. The catalyst flow from the storage vessel 2 to the mixing vessel 3 is regulated by the valves 9 and is dependent on the dosed amount (concentration) of catalyst and diluent in the mixing vessel 3. The ratio between diluent and catalyst is adequately controlled. This is enabled by adequate control of catalyst supply from the storage vessel 2 by means of the catalyst feeding system and metering valves 9, and by release of a suitable amount of isobutane diluent in the mixing vessel 3 through conduits 24. The amount of isobutane diluent can also be controlled using the catalyst concentration determined from the density measurement by Coriolis meter 10.

In another preferred embodiment, the method comprises diluting the catalyst slurry with hydrocarbon diluent, preferably isobutane, in the mixing vessel 3 to a concentration comprised between 0.1 and 10% by weight. More preferably the slurry is diluted in a hydrocarbon diluent to a concentration comprised between 0.1 and 4% by weight and more preferred between 0.1% and 1.0% by weight, and even more preferred of 0.5% by weight. Preparing diluted slurry having these concentrations advantageously enables the further use of membrane pumps 5 for injecting the slurry in the reactor 1. The use of such pumps advantageously enables to precisely and adequately control the flow of catalyst slurry injection in the reactor.

In a further preferred embodiment, the method according to the invention comprises controlling the flow rate of said catalyst slurry from the mixing vessel 3 to the polymerization reactor 1 by determining the concentration of a reactant in said reactor 1. Preferably said reactant is the concentration of monomer, i.e. ethylene, in the reactor. However, it should be clear that also determination of other reactants, such as e.g. the co-monomer or hydrogen concentrations in the reactor, is comprised within the scope of the present invention. Practically, this mechanism is obtained by providing each conduit 4 for transferring and feeding the catalyst slurry from the mixing vessel 3 to the reactor 1 with a pumping means 5 that are capable of being adjusted and regulating the catalyst flow rate in function of the concentration of a reactant in said reactor.

In another preferred embodiment of the invention, the catalyst slurry is brought into contact with a co-catalyst. Therefore, the present invention further provides a method comprising the step of bringing a suitable amount of co-catalyst into contact with the catalyst slurry for a suitable period of time before injecting said catalyst slurry to said reactor. The co-catalyst for the metallocene catalyst is preferably an aluminium based compound, preferably TIBAL, as indicated herein. The co-catalyst can be supplied to the catalyst slurry either in the vessel 3, which is suitable when a relatively long pre-contact time is required between the catalyst and the co-catalyst. Preferably, the method comprises bringing a co-catalyst into contact with said catalyst slurry present in conduits 4. The co-catalyst feeding system preferably comprises a storage vessel 11 and a conduit 12 intersecting the conduit 4, as illustrated on FIG. 1. In another preferred embodiment, the method further comprises enhancing the contact time of said co-catalyst with said catalyst slurry in the conduit, by locally enhancing the volume of said conduit 4. By locally enhancing the volume of the conduits, a better pre-contact between co-catalyst and catalyst is obtained. The present method also advantageously enables to more precisely control the ratio of catalyst/co-catalyst injection. The local enhancement of the volume is obtained by providing a contact vessel 13 in each conduit 4. Said vessels 13 have a diameter with is considerably larger than the diameter of the conduits 4.

In another preferred embodiment, the present invention provides a method for continuously feeding catalyst slurry from the mixing vessel 3 to the reactor 1 through conduits 4 at a suitable flow rate. The present invention provides a method that enables to continuously feeding catalyst to a reactor, without interruption of the catalyst flow.

In yet another preferred embodiment, the invention relates to a method wherein catalyst flow rate to the reactor is accurately measured, through liquid flow rate measurement, using flow measuring means, such as preferably Coriolis flow measuring means.

The present invention is especially applicable to the co-polymerization process of ethylene and an olefin co-monomer in a polymerization loop reactor. The term "ethylene co-polymerization" includes co-polymerization of ethylene and an olefin co-monomer. Ethylene polymerization comprises feeding to a reactor the reactants including the monomer ethylene, a light hydrocarbon diluent, a catalyst, a co-monomer and optionally a co-catalyst and a terminating agent such as hydrogen. The term "co-polymer" refers to a polymer, which is made by linking two different types of in the same polymer chain.

Olefin co-monomers which are suitable for being used in accordance with the present invention may comprise but are not limited to aliphatic $C_3$-$C_{20}$ alpha-olefins. Examples of suitable ah aliphatic $C_3$-$C_{20}$ alpha-olefins include propylene, 1-butene, 4-methyl-1-pentene, 1-hexene, 1-octane, 1-decene, 1-dodecene, 1-tetradecene, 1-hexadecene, 1-octadecene and 1-eicosene. The present invention has in particular been described with reference to the co-polymerization of ethylene with the co-monomer hexene in a loop reactor. However, it should be clear from the present invention that other co-monomers may as well be applied according to the present invention.

Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Nonlimiting illustrative examples of solvents are butane, isobutane, pentane, hexane heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

The co-polymerization reaction may utilize highly sophisticated catalyst systems that initiate polymerization and propagate the reaction. According to the present invention the term "catalyst" is defined herein as a substance that causes a change in the rate of a co-polymerization reaction without itself being consumed in the reaction. According to an embodiment said catalyst may be a Ziegler-Natta catalyst. Other suitable catalysts may comprise a metallocene catalyst or a chromium catalyst. The term "co-catalyst" as used herein refers to materials that can be used in conjunction with a catalyst in order to improve the activity of the catalyst during the polymerization reaction.

The "Ziegler-Natta catalyst" is preferably of the general formula $MX_n$ wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$.

The term "metallocene catalyst" is used herein to describe any transition metal complexes consisting of metal atoms bonded to one or two ligands. In a preferred embodiment, the metallocene catalyst has a general formula MX, wherein M is a transition metal compound selected from group IV and wherein X is a ligand composed of one or two groups of cyclopenadienyl (Cp), indenyl, fluorenyl or their derivatives. Illustrative examples of metallocene catalysts comprise but are not limited to $Cp_2ZrCl_2$, $Cp_2TiCl_2$ or $Cp_2HfCl_2$.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

It is known in the art that the ratio of co-monomer to monomer (ethylene) differs at different points in the reactor and is difficult to control during the polymerization reaction. In has been shown that just after its injection point in the reactor ethylene is preferentially polymerized. However, the concentration of ethylene changes in favor of co-monomer along the reactor as ethylene is depleted. As a result copolymer chains are formed that are higher in ethylene concentration in the chain segments grown near the reactor inlet (as defined at the point at which the polymerization reaction commences), and higher in hexene concentration in the chain segments formed near the reactor outlet.

In particular, due to the difference in monomer concentration throughout the reactor, the ratio of hexene to ethylene will vary in the polymerization reactor. A maximal difference in co-monomer/ethylethylene ratio will generally be observed when comparing the co-monomer/ethylene ratio at the point at which the polymerization reaction commences, i.e. at the reactor inlet of ethylene and co-monomer, with the co-monomer/ethylene ratio at the point downstream the reactor at which the path of the reactor has been completely passed through.

In addition, the longer the reactors, the more important this difference in ratio between the two above-mentioned points will be. According to a preferred embodiment of the present invention, the process comprises reducing the variation in the co-monomer/monomer ratio by providing multiple injection of monomer along the reactor path. Preferably, the variation in ratio will be reduced in order to be lower than 40%, preferably lower than 30%, more preferably below 20% and even more preferably lower than 10% It is clear that the reduction in variation may depend on the reactor size.

The following table 1 illustrates the difference in co-monomer/monomer ratio that may occur in a reactor of 60 m$^3$ provided with only one injection point. A variation in co-monomer/monomer ratio of more than 30% may be observed.

TABLE 1

| | Loop reactor 60 m$^3$ |
|---|---|
| Internal diameter | 0.55 m |
| Density of the resin | 0.935 g/cc |
| Length of the reactor | 252 m |
| Production | 15 tons/hour |
| Concentration monomer after injection point | 2% w/v |
| Concentration co-monomer after injection point | 3% w/v |
| Ratio co-monomer/monomer after injection point | 1.5 |
| Concentration monomer before injection point | 1.43% w/v |
| Concentration co-monomer before injection point | 2.96% w/v |
| Ratio co-monomer/monomer before injection point | 2.07 |

Table 2 illustrates co-monomer/monomer ratio in a loop reactor of 60 m$^3$ which is provided with three different, spatially separated monomer feeding systems,

TABLE 2

| | Loop reactor 60 m$^3$ |
|---|---|
| Internal diameter | 0.55 m |
| Density of the resin | 0.938 g/cc |
| Length of the reactor | 252 m |
| Production | 15 tons/hour |
| Concentration monomer after first injection point | 2% w/v |
| Concentration co-monomer after first injection point | 3% w/v |
| Ratio co-monomer/monomer after first injection point | 1.5 |
| Concentration monomer before second injection point | 1.8% w/v |
| Concentration co-monomer before second injection point | 2.99% w/v |
| Ratio co-monomer/monomer before second injection point | 1.65 |
| Concentration monomer after second injection point | 2% w/v |
| Concentration co-monomer after second injection point | 2.99% w/v |
| Ratio co-monomer/monomer after second injection point | 1.495 |
| Concentration monomer before third injection point | 1.8% w/v |
| Concentration co-monomer before third injection point | 2.98% w/v |
| Ratio co-monomer/monomer before third injection point | 1.65 |
| Concentration monomer after third injection point | 2% w/v |
| Concentration co-monomer after third injection point | 2.98% w/v |
| Ratio co-monomer/monomer after third injection point | 1.49 |
| Concentration monomer before first injection point | 1.8% w/v |
| Concentration co-monomer before first injection point | 2.97% w/v |
| Ratio co-monomer/monomer before first injection point | 1.65 |

From the tables 1 and 2 it is clear that the use of three monomer injection points allow to reduce the variation in co-monomer/monomer ratio to about 10%, whereas in reactors having only one injection point variations in co-monomer/monomer ratios of up to 30% may be observed.

The following table 3 illustrates the difference in co-monomer/monomer ratio that may occur in a reactor of 60 m³ provided with only one injection point and illustrates the swelling problems that occurs in a reactor provided with only one injection point, upon increasing the reactor temperature from 84° C. to 88° C.

TABLE 3

| | Loop reactor 60 m³ |
|---|---|
| Internal diameter | 0.55 m |
| Density of the resin | 0.925 g/cc |
| Length of the reactor | 252 m |
| Production | 15 tons/hour |
| Concentration monomer after injection point | 1.3% w/v |
| Concentration co-monomer after injection point | 3% w/v |
| Ratio co-monomer/monomer after injection point | 2.31 |
| Concentration monomer before injection point | 0.73% w/v |
| Concentration co-monomer before injection point | 2.95% w/v |
| Ratio co-monomer/monomer before injection point | 4.07 |
| Temperature 84° C. | possible to run the production, productivity = 6340 gPE/gcata |
| temperature 88° C. | swelling and fouling of the reactor |

Table 4 illustrates co-monomer/monomer ratio, and the production productivity at 88° in a loop reactor of 60 m³ which is provided with three different, spatially separated monomer feeding systems,

TABLE 4

| | Loop reactor 60 m³ |
|---|---|
| Internal diameter | 0.55 m |
| Density of the resin | 0.925 g/cc |
| Length of the reactor | 252 m |
| Production | 15 tons/hour |
| Concentration monomer after first injection point | 1.1% w/v |
| Concentration co-monomer after first injection point | 3% w/v |
| Ratio co-monomer/monomer after first injection point | 2.72 |
| Concentration monomer before second injection point | 0.91% w/v |
| Concentration co-monomer before second injection point | 2.99% w/v |
| Ratio co-monomer/monomer before second injection point | 3.29 |
| Concentration monomer after second injection point | 1.1% w/v |
| Concentration co-monomer after second injection point | 2.99% w/v |
| Ratio co-monomer/monomer after second injection point | 2.72 |
| Concentration monomer before third injection point | 0.91% w/v |
| Concentration co-monomer before third injection point | 2.98% w/v |
| Ratio co-monomer/monomer before third injection point | 3.28 |
| Concentration monomer after third injection point | 1.1% w/v |
| Concentration co-monomer after third injection point | 2.98% w/v |
| Ratio co-monomer/monomer after third injection point | 2.71 |
| Concentration monomer before first injection point | 0.91% w/v |
| Concentration co-monomer before first injection point | 2.97% w/v |
| Ratio co-monomer/monomer before first injection point | 3.26 |
| Temperature 88° C. | possible to run the production, productivity = 7480 gPE/gcata |

From tables 3 and 4, it is clear that the use of three monomer injection points allows the temperature in the reactor to be increased when compared with the case of single injection wherein swelling is observed at 88° C. in the case of a single injection point the temperature had to be reduced to avoid the swelling phenomena. With three injection points, the temperature can be higher, while producing the polymer with a suitable final density and with a higher productivity.

A major disadvantage of a non-optimal control of the co-monomer/monomer ratio in a polymerization reactor is that co-polymers will be produced having varying and thus non-homogenous properties throughout the reactor, and that the polymerization reaction in the reactor will not be optimal, in addition, due to these varying co-monomer/monomer ratios reaction temperatures will vary throughout the reactor. The polymerization reaction is exothermic. Due to the consumption of ethylene monomer in the loop reactor, the reaction temperature will differ throughout the reactor flow path. In parts of the loops where less ethylene monomer is present, the polymerization rate will be reduced and the reaction temperature will decrease. Fluctuating temperature conditions throughout the reactor are absolutely detrimental with respect to homogeneity of composition of the prepared polymers. Furthermore, as a consequence of these varying ratios in the loop reactor, co-polymers will be produced having varying densities throughout the reactor.

Swelling refers to the process whereby formed polymer particles are 'swelled' by a diluent, giving rise to polymer slurry which is more viscous and which has undesired properties. Temperature and slurry densities must be well controlled in order to avoid the solubility of the lightest polymer fractions in the diluent. Solubility may occur at temperatures and particular polymer slurry densities, which depend on the quantity of co-monomer present in the diluent. For a given polymer density there is a maximum operating temperature. In certain cases, when the operation conditions are not well controlled, the risk for swelling is considerable. As a result of the variation in co-monomer/monomer ratio, varying reaction temperatures and depletion of monomer in the reactor may occur which can induce too low polymer densities, and may lead to swelling. The present invention enables to effectively reduce the risk for this swelling phenomenon by adequately controlling the co-monomer/monomer ratio, the concentration of monomer in the reactor and the reaction temperatures.

The present invention now provides a solution to the above-cited problems by providing additional monomer feed along the path of the reactor. Preferably the co-monomer/monomer ratio is controlled by providing at least two, preferably at least three spatially separated, feeding entries of monomer along the path of the loop reactor.

Figure 6:
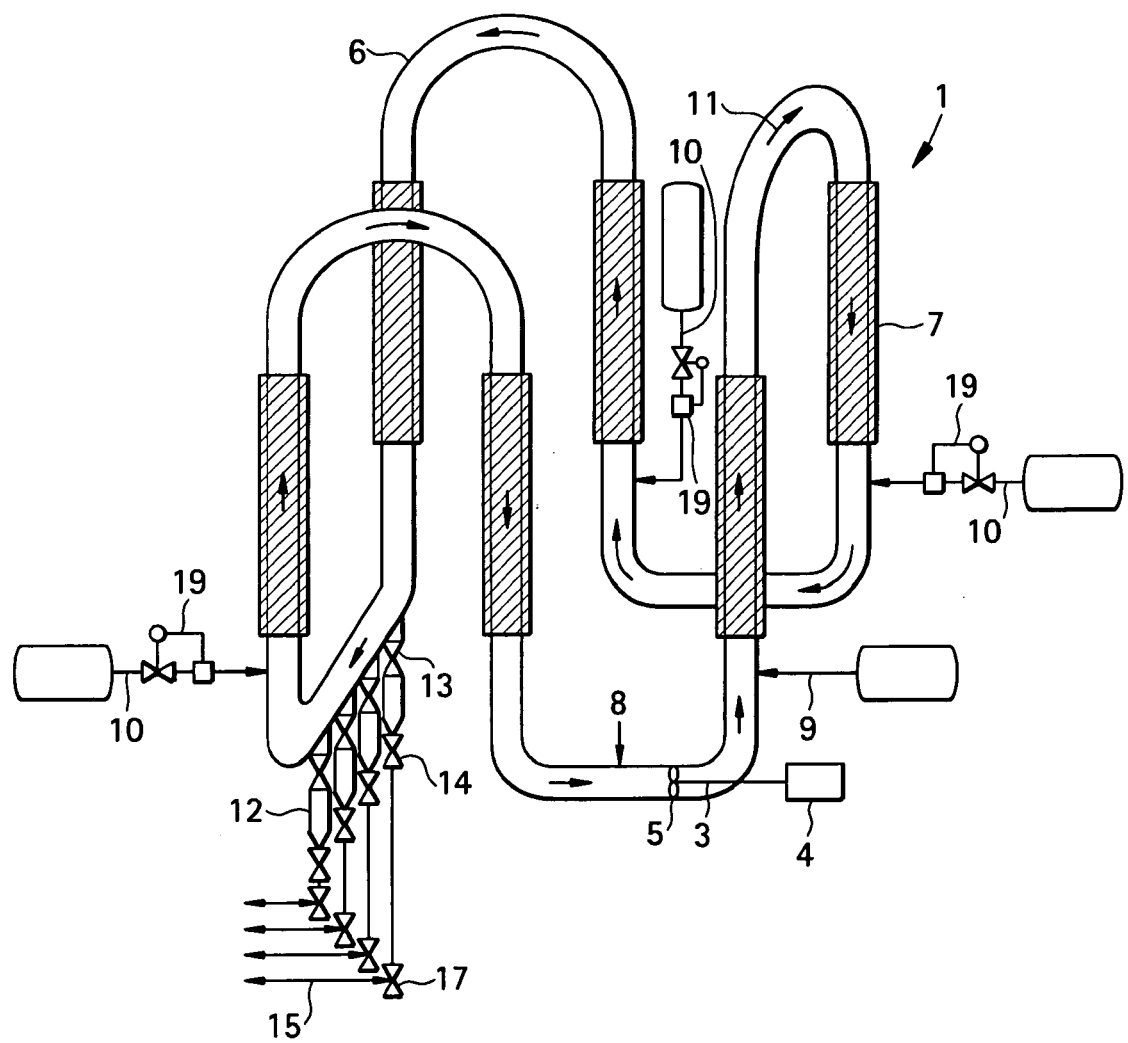
FIG. 6 is a detailed representation of a loop reactor having multiple feed points for feeding monomer into the reactor.

In another preferred embodiment, the invention provides a process for determining suitable positions for multiple, spatially separated, feeding entries of monomer along the path of the loop reactor in order to control the co-monomer/monomer ratio along the path of the reactor. In particular, the feeding entries of additional monomer may be positioned equidistantly along the reactor path in order to keep the co-monomer/monomer ratio substantially constant along the complete path of the reactor. Alternatively, additional monomer feed entries may be provided at non-equidistant positions on the reactor. Particular suitable positioning sites for additional monomer feeding may be chosen in function of reaction parameters, such as reaction temperature, co-monomer/monomer ratio, reactor pump activity, distribution of solids in the reactors, reactant flow in the reactor, etc. Preferably, the injection feeds are positioned close to bottom elbows of the reactor, as illustrated in FIG. 6.

It is also preferred according to the invention to control the co-monomer/monomer ratio by multiple, spatially separated, feeding of monomer in conjunction with a diluent. Preferably, the monomer/diluent ratio is lower than 5/1, and for instance 3/1. Ethylene is a gas. The reactor is preferably operated as full of liquid. Therefore it is preferred to inject ethylene together with diluent so that part of the ethylene is already dissolved in the diluent. The feed thus either comprises a liquid or a liquid with bubbles of ethylene.

In a preferred embodiment, the present process is suitable for being applied in a single loop reactor. Such a loop reactor is in particular illustrated on FIG. 7.

Figure 7:
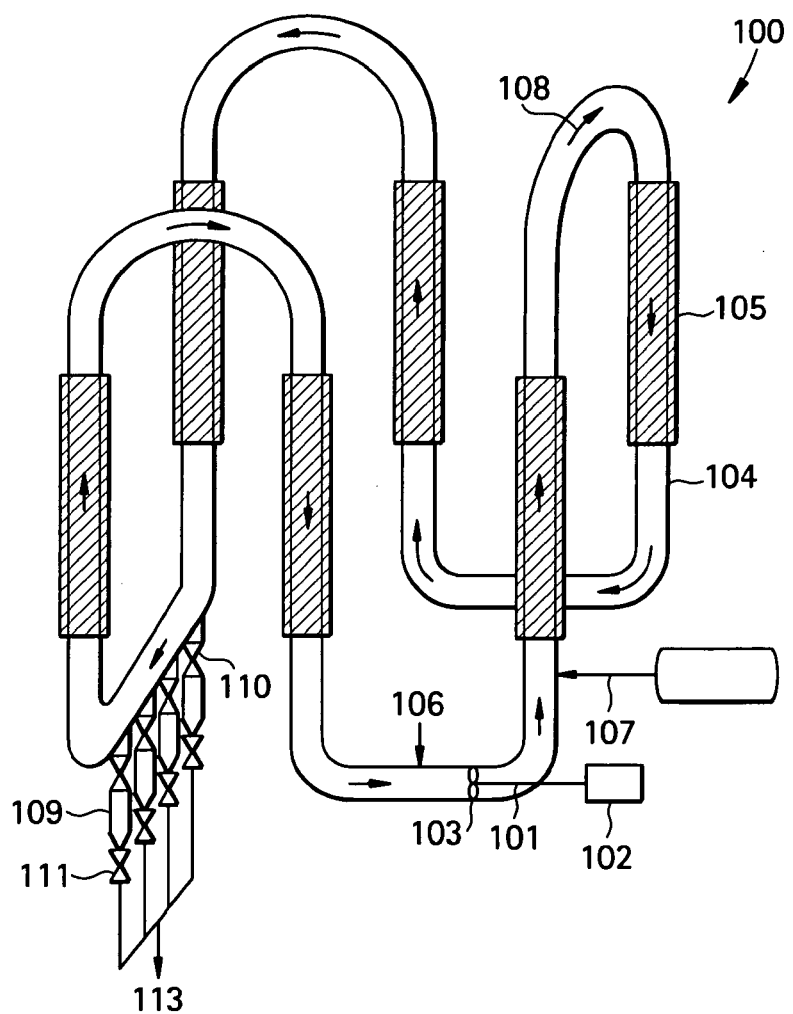
FIG. 7 is a schematic representation of a single loop polymerization reactor

FIG. 7 represents a single loop reactor 100, consisting of a plurality of interconnected pipes 104. The vertical sections of the pipe segments 104 are preferably provided with heat jackets 105. Polymerization heat can be extracted by means of cooling water circulating in these jackets of the reactor. Reactants are introduced into the reactor 100 by line 107. Catalyst, optionally in conjunction with a co-catalyst or activation agent, is injected in the reactor 100 by means of the conduit 106. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103. The reactor 100 is further provided with one or more settling legs 109 connected to the pipes 104 of the reactor 100. The settling legs 109 are preferably provided with an isolation valve 110. These valves 110 are open under normal conditions and can be closed for example to isolate a settling leg from operation. Further the settling legs can be provided with product take off or discharge valves 111. The discharge valve 111 may be any type of valve, which can permit continuous or periodical discharge of polymer slurry, when it is fully open. Polymer slurry settled in the settling legs 109 may be removed by means of one or more product recovery lines 113, e.g. to a product recovery zone.

In an example, linear low-density polyethylene may be prepared in a single loop reactor. The process may involve feeding ethylene at a preferred concentration of % w/v, hexene co-monomer at a preferred concentration of 3% w/v, isobutane diluent, a catalyst, e.g. a Ziegler-Natta catalyst, and hydrogen at a low concentration to a polymerization reactor. Hexene/ethylene ratio comprises 3. The reaction temperature may comprise around 83 to 88° C. and polyethylene co-polymers having a density comprised around 0.925 g/cm$^3$ may be obtained. Depletion of ethylene throughout the reaction induces the production of polymer particles having lower density values, which in some cases may even become so low as to induce swelling. Depletion of ethylene also induces fluctuations in the reaction temperatures. Therefore, ethylene is preferably additionally fed at different sites, preferably at three different sites, in the reactor in such a concentration that the ethylene/hexene ratio remains substantially constant throughout the reactor.

According to another embodiment, the process according to the present invention may also be applied in a double loop polymerization reactor consisting of two liquid full loop reactors, comprising a first and a second reactor connected in series by one or more settling legs of the first reactor connected for discharge of slurry from the first reactor to said second reactor. Such double loop reactor is illustrated on FIG. 8.

Figure 8:
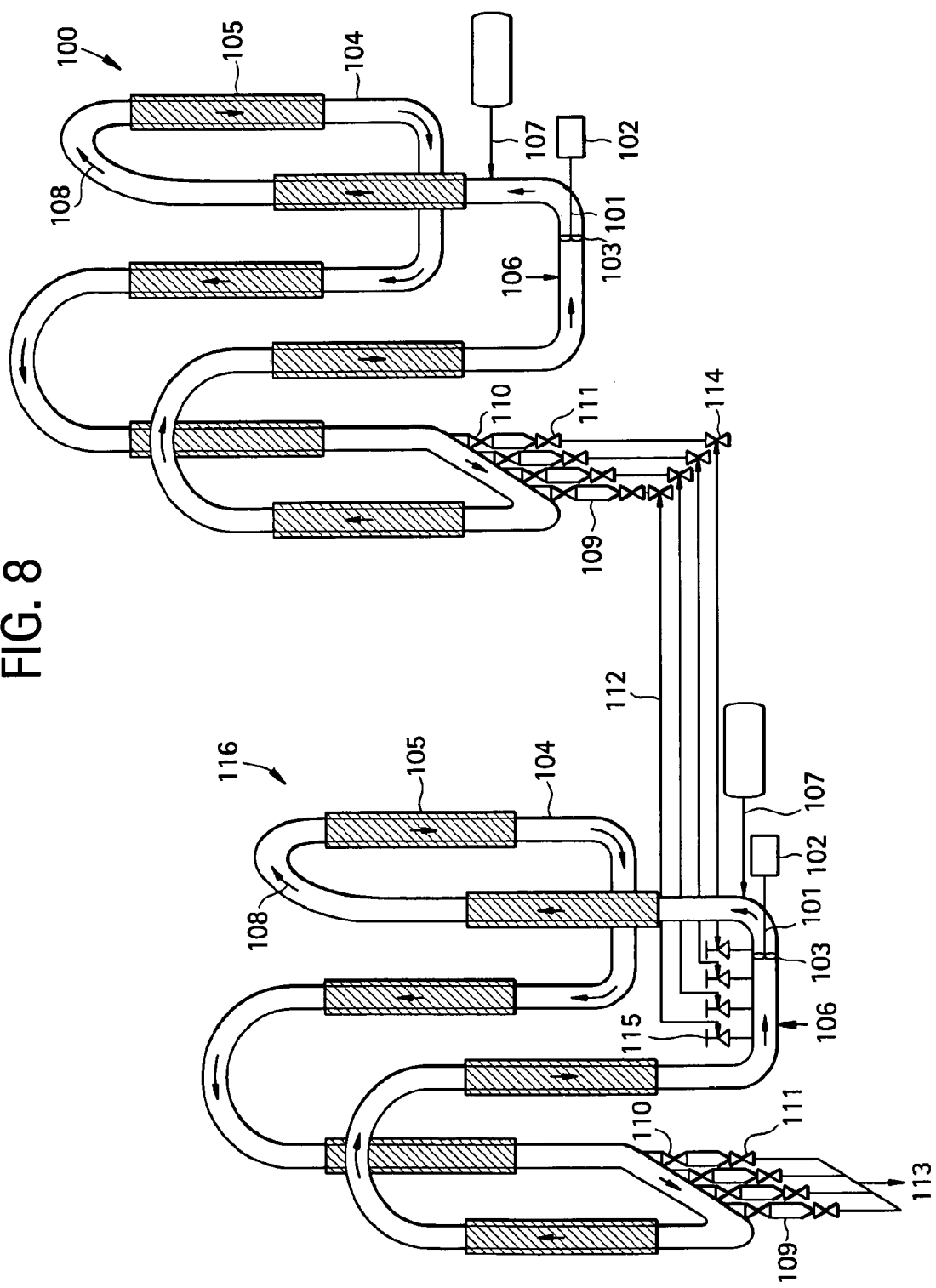
FIG. 8 is a schematic representation of a double loop polymerization reactor.

FIG. 8 represents two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, may be injected in one or both reactors 100 and 116 by means of conduit 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the exit of the settling leg 109 of reactor 100, a transfer line 112 is provided which allows to transfer polymer slurry settled in the settling legs 109 to the other reactor 116 through a piston valve 115. Along transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

In series connected reactors are particularly suitable for the preparation of bimodal polyethylene (PE). "Bimodal PE" refers to PE that is manufactured using two reactors, which are connected to each other in series. Polymerization reactors, which are connected in series, may in particular be used to prepare polyolefin polymers having different properties in the different reactors.

In an example, such polymerization double loop reactor, consisting of two interconnected loop reactors, whereby the reaction conditions are different in each of said loop reactors may be used to produce high molecular weight ethylene co-polymers in a first reactor and a low molecular weight ethylene co-polymers in a second reactor. Concentration of reactants fed to the first reactor may then for instance comprise 1% w/v ethylene, 3% w/v hexene, isobutane diluent, a low concentration of hydrogen. The reaction temperature may comprise around 83 to 88° C. and polyethylene co-polymers having a density comprised around 0.925 g/cm³ may be obtained. Polymer slurry may be transferred to the second reactor, wherein further ethylene is fed, preferably at a concentration of 4% w/v and hydrogen is added, preferably at a concentration of 2 vol %. Preferably, no additional catalyst is added in the second reactor. Also, preferably no hexene co-monomer is added in the second reactor and co-monomer concentrations in the second reactor result from the transfer of co-monomer together with polymer slurry from the first reactor. Generally residence time of the slurry in the reactor is higher in the first reactor than in the second reactor.

When the hexene/ethylene ratio is not adequately controlled in the first reactor of a double loop system, polymer particles having undesired and non-homogenous properties transferred from the first reactor to the second reactor. In addition, due to an inadequate control of the hexene/ethylene ratio in the first reactor, also the transfer of hexene together with polymer slurry from the first reactor to the second reaction, wherein it is used for further co-polymerization is not inefficiently controlled. As a result thereof, the polymerization reaction in the second reactor may be sub-optimal and co-polymers having non-homogenous and undesired properties are prepared in the second reactor.

In order to overcome at least some of the above-cited problems associated with co-polymerization in a double loop reactor, the invention further provides a process for improving the co-polymerization of monomer and an olefin co-monomer in a polymerization loop reactor, said reactor being interconnected with a first loop reactor, comprising the steps of:

sequentially transferring polymer slurry comprising essentially liquid diluent and solid olefin co-polymer particles from the first reactor to the second reactor, feeding reactants comprising monomer, diluents and optionally hydrogen, polymerization catalyst additional co-monomer into the loop reactor, further co-polymerizing said reactants in said reactor to produce a polymer slurry comprising essentially liquid diluent and solid olefin co-polymer particles;

allowing said polymer slurry to settle into two or more settling legs connected to the reactor, and sequentially discharging the settled polymer slurry from said two or more settling legs out of the reactor, characterized in that said process comprises the step of controlling the amount of co-monomer transferred from said first reactor to the reactor.

In a preferred embodiment the process comprises the step of controlling the amount of co-monomer transferred from said first reactor to the reactor by controlling the co-monomer/monomer ratio along the path in the first reactor.

Controlling correctly the ratio along the path flow allows to improve the productivity of the catalyst and to minimize the production of co-monomer in the first reactor. Consequently less co-monomer is transferred to the second reactor.

In a particular preferred embodiment, the amount of co-monomer transferred from said first reactor to the reactor is controlled by controlling the co-monomer/monomer ratio and thus by multiple, spatially separated, feeding of monomer along the path of the first reactor Preferably, the amount of co-monomer transferred from said first reactor to the reactor is controlled by controlling the co-monomer/monomer ratio and thus by providing at least two, preferably at least three spatially separated, feeding entries of monomer along the path of the loop reactor. The multiple injection allows to optimize the working conditions of the first reactor and the consequence is that less co-monomer is transferred to the second reactor As indicated above for a single loop reactor, the co-monomer/monomer ratio along the path in the first reactor can be further controlled by multiple spatially separated, feeding of monomer in conjunction with a diluent in said first reactor and by separately controlling the flow rate of each spatially separated monomer feed along the path of the first reactor.

Figure 5:
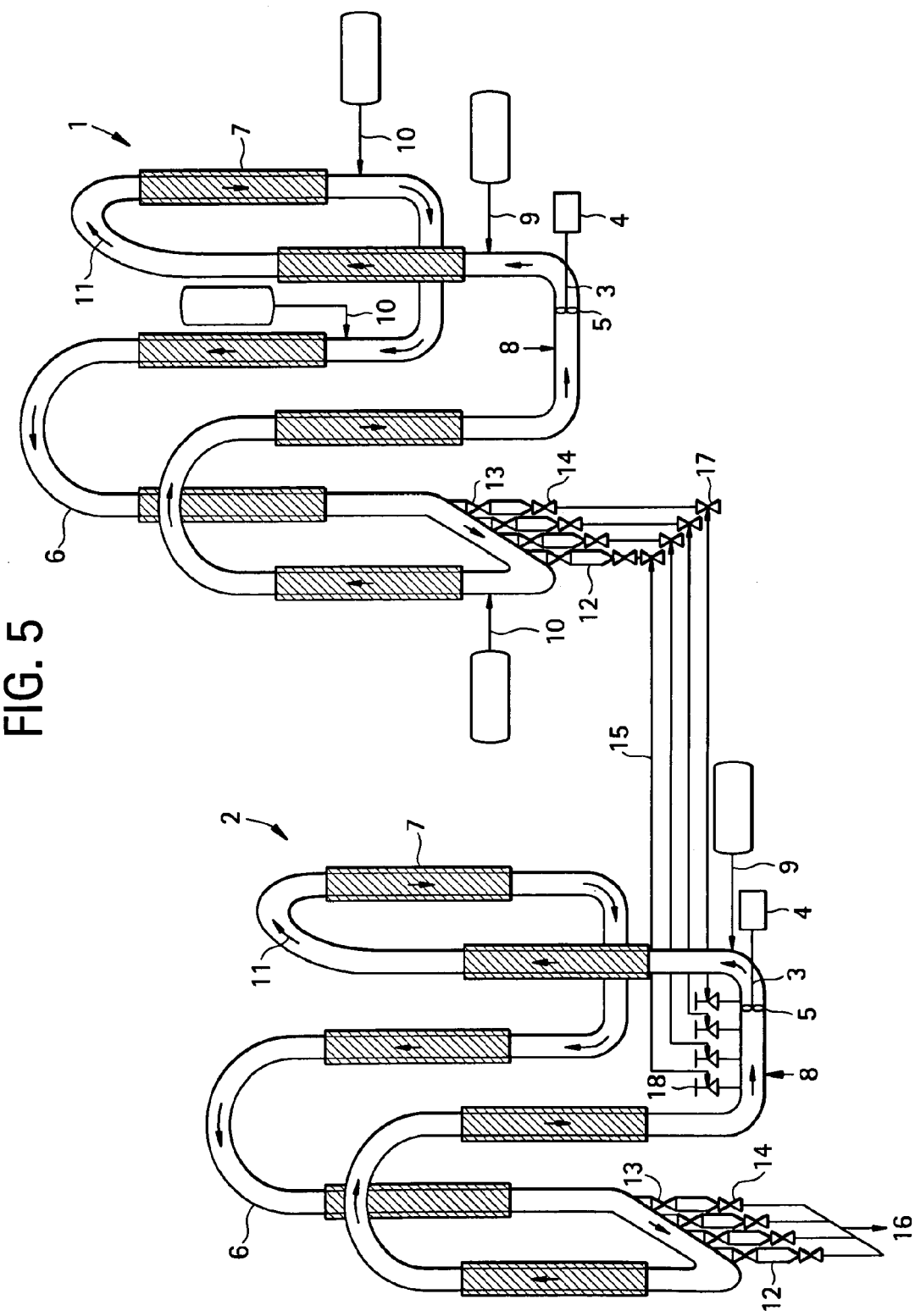
FIG. 5 is a schematic representation of a double loop polymerization reactor wherein multiple ethylene feed points are provided on one reactor.

In another embodiment, the invention relates to a polymerization loop reactor suitable for the co-polymerization process of ethylene and an olefin co-monomer, preferably hexene. Such a reactor may comprise a single loop or a double loop reactor. Referring now to FIG. 5, a double loop polymerization reactor according to the invention is illustrated which is in particular characterized in that said reactor comprises multiple additional means for feeding monomer, which are positioned spatially separated along the path of the loop reactor. In particular, the present reactor comprises at least two, preferably at least three additional means for feeding monomer, which are positioned spatially separated along the path of the loop reactor.

In FIG. 5, a first reactor 1 comprises a plurality of interconnected pipes 6 defining a flow path 8 for polymer slurry, said slurry consisting essentially of ethylene, hexene, a polymerization catalyst, liquid diluent, preferably isobutane, and solid olefin polymer particles. Each loop reactor 1, 2 consists of a plurality of interconnected pipes 6, such as a plurality of vertical pipe segments, a plurality of upper lateral pipe segments, a plurality of lower lateral pipe segments, wherein each of said vertical pipe segments is connected at an upper end thereof to one of said upper lateral pipe segments and is connected at a lower end thereof to one of said lower lateral pipe segments through elbow shaped connecting segments, thus, defining a continuous flow path 11 for a polymer slurry. It will be understood that while the loop reactor 1 and 2 are illustrated with four vertical pipes, said loop reactors 1,2 may be equipped with less or more pipes, such as 4 or more pipes, for example between 4 and 20 vertical pipes. The vertical sections of the pipe segments are preferably provided with heat jackets 7. Polymerization heat can be extracted by means of cooling water circulating in these jackets of the reactor. Said reactors preferably operate in a liquid full mode.

The reactants including ethylene, isobutane, hexene and optionally hydrogen are introduced into the reactor 2 by means 9. At least one reactor 1 is also fed with catalyst, optionally in conjunction with a co-catalyst or activation agent by means of the conduct 8. In a preferred embodiment, catalysts are introduced upstream from the circulation pump 3 via line 8, while diluent, monomer, co-monomers and reaction additives are preferably introduced downstream of the circulation pump 3 via line 9.

The first reactor 1 further comprises at least one means 10 for additionally feeding ethylene in said reactor. In FIG. 5 three additional ethylene feeding means 10 are illustrated.

In addition, the reactor according to the invention further comprises flow controlling means. The flow controlling means can be multiple and spatially separated, or they can be centralized and close to each other in space. In an embodiment, there can be one control per inlet or feeding means. In another embodiment, the control can be spatially separated from the inlet.

In an embodiment of the present invention, the number of flow controlling means corresponds to the number of additional means for feeding monomer, which are positioned spatially separated along the path of the loop reactor. Referring to FIG. 6 there is further illustrated that each means 10 for separately feeding additional ethylene to the reactor is provided with a flow controlling means 19.

The polymerization slurry is maintained in circulation in the loop reactors. As illustrated in FIG. 5. The polymerization slurry is directionally circulated throughout the loop reactor 1, 2 as illustrated by the arrows 11 by one or more pumps, such as axial flow pumps 3. The pump may be powered by an electric motor 4. As used herein the term "pump" includes any device from compressing driving, raising the pressure of a fluid, by means for example of a piston or set of rotating impellers 5. According to the present invention, the pump is preferably of axial type.

Each loop reactor 1, 2 is further provided with one or more settling legs 12 connected to the pipes 6 of the reactor 1, 2. Intermediate polymer slurry or polymer product may be removed from the loop reactors, by continuous or periodical discharge through one or more settling legs 12 along with some diluent. In the settling legs 12, the solid content is increased with respect to its concentration in the body of the loop reactor. As illustrated in FIG. 5, polymer slurry settled in the settling legs 12 of reactor 1 may be removed by means of a three-way valve 17 to another reactor 2, to which it is transferred by means of one or more transfer lines 15, while polymer slurry settled in the settling legs 12 of reactor 2 may be removed to a product recovery zone, for instance by means of conduit 16. As used herein "product recovery zone" includes but is not limited to heated or not heated flash lines, flash tank, cyclones, filters and the associated vapor recovery and solids recovery systems or transfer lines to a following reactor and said following reactor when several reactors are connected in series.

The settling legs can be located on any segment or any elbow of said loop reactor. In said settling legs the polymerization slurry decants so that the slurry exiting the reactor is more concentrated in solid than the circulating slurry. This permits to limit the quantity of diluent that has to be treated and re-fed to the reactor, it will be understood that the discharge of said settling legs may be operated in a continuous or discontinuous mode, but preferably in a continuous mode.

The settling legs 12 are preferably provided with an isolation valve 13. These valves 13 may for example be ball valves. Under normal conditions these valves are open. These valves can be closed for example to isolate a settling leg from operation. Said valves 13 can be closed when the reactor pressure falls below a chosen value.

Further the settling legs can be provided with product take off or discharge valves 14. Discharging is performed in such a way that the volume discharged from a settling leg substantially corresponds to the volume of polymer slurry settled in said settling leg since its previous discharge. The discharge valve 14 may be any type of valve, which can permit continuous or periodical discharge of polymer slurry, when it is fully open. The type and structure of the discharge valve can be selected by those skilled in the art as required. According an embodiment of the present invention the totality of settled slurry is discharged at each opening of the discharge valve. When a plurality of legs are employed, the discharge of the settled polymer slurry may be discharged in sequence on a rotating basis for more uniform discharging to a subsequent reactor or to a product recovery zone.

Still referring to FIG. 5, downstream the valve 14, at the exit of the settling leg 12, a three-way valve 17 is provided which allows to transfer polymer slurry settled in the settling legs, for instance to another reactor by means of the transfer line 15. The transfer line 15 connects the three-way valve 17, provided at the exit of the settling leg 12 of one reactor 1, with the entry in the other reactor 2, where a piston valve 18 is provided.

For reasons of brevity and clarity, conventional auxiliary equipment such as pumps, additional valves, and other process equipment have not been included in this description and the accompanying drawings as they play no part in the explanation of the invention, also additional measurement and control devices which would typically be used on a polymerization process have not been illustrated.

In a preferred embodiment, it is to be understood that all lines or conduits applied in accordance with the present invention for feeding reactants may be provided, where necessary with flow measuring means.

It should be clear from the present description that concentrations of the different reactants in the co-polymerization reaction relate to the size of the polymerization reactors and the characteristics of the co-polymer end products and can be changed if desired, e.g. in function of the reactor sizes.

This invention is especially applicable to a process of supplying a catalyst to a polymerization reactor. The invention is in particular described with reference to the supply of catalyst to a polymerization reactor wherein ethylene is polymerized. The polymerization process of ethylene may for instance be carried out in loop reactors. Suitable "ethylene polymerization" includes but is not limited to homo-polymerization of ethylene, co-polymerization of ethylene and a higher 1-olefin co-monomer such as butene, 1-pentene, 1-hexene, 1-octene or 1-decene. Ethylene polymerization comprises feeding to a reactor the reactants including the monomer ethylene, a light hydrocarbon diluent, a catalyst and optionally, a co-monomer and hydrogen. In an embodiment of the present invention, said co-monomer is hexene and said diluent is isobutane.

In a particularly preferred embodiment, the invention relates to a process of supplying a catalyst to a polymerization reactor wherein bimodal polyethylene is prepared, "Bimodal PE" refers to PE that is manufactured using two reactors, which are connected to each other in series. However, the present method for improving and optimising catalyst supply to a polymerization reactor should be understood to be applicable to reactors wherein other types of polymerization reactions take place as well.

According to the present invention the term "catalyst" is defined herein as a substance that cause a change in the rate of a polymerization reaction without itself being consumed in the reaction. According to a preferred embodiment said catalyst is a Ziegler-Natta catalyst. Any of the conventional supported Ziegler-Natta transition meta, compound catalyst components can be used in the present invention.

The Ziegler-Natta catalyst is preferably of the general formula $MX_n$ wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, R is chlorine or bromine, and most preferably, chorine. Illustrative examples of the transition metal compounds comprise but are not limited to $TiCl_3$, $TiCl_4$. In a particularly preferred embodiment of the invention said catalyst is a titanium tetrachloride ($TiCl_4$) catalyst.

Ziegler-Natta catalysts generally are provided on a support, i.e. deposited on a solid crystalline support. The support should be an inert solid, which is chemically unreactive with any of the components of the conventional Ziegler-Natta catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The term "co-catalyst" as used herein is defined as a catalyst that can be used in conjunction with another catalyst in order to improve the activity and the availability of the other catalyst in a polymerization reaction, in a preferred embodiment, said co-catalyst is a catalyst suitable for being used in conjunction with a Ziegler-Natta catalyst. The co-catalyst is used to promote the polymerization activity of the Ziegler-Natta catalyst. Broadly, organometallic compounds of periodic groups I to III can be used as co-catalyst according to the present invention. In a particularly preferred embodiment, said co-catalyst is a catalyst suitable for being used in conjunction with a Ziegler-Natta catalyst and is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen. Examples of co-catalysts comprise but are not limited to trimethyl aluminum, triethyl aluminum, di-isobutyl aluminum hydride, is tri-isobutyl aluminium, tri-hexyl aluminum, diethyl aluminum chloride, or diethyl aluminum ethoxide. A particularly preferred co-catalyst for use in the present invention is tri-isobutyl aluminium (TIBAL).

The invention will be described hereunder with reference to a method and device for supplying a Ziegler-Natta catalyst, in particular a titanium tetrachloride ($TiCl_4$) catalyst to a polymerization reactor wherein ethylene is polymerized. As co-catalyst for the Ziegler-Natta catalyst, reference is made to a tri-isobutyl aluminium co-catalyst. However, it should be clear that the present device is applicable to other types of catalysts and co-catalysts as well.

As used herein, the term "catalyst slurry" refers to a composition comprising catalyst solid particles that are in suspension in a diluent. According to a preferred embodiment of this invention, the catalyst solid particles are Ziegler-Natta catalyst solid particles and the diluent is isobutane.

The hereunder-described device corresponds to the required equipment for preparation and injection of one catalyst. If two or more (different) catalysts need to be fed to a reactor, two or more devices according to the present invention can be supplied or a catalyst blend can be prepared and supplied using a device according to the present invention. It is also clear that in case two or more reactors are used, one or more devices according to the invention can be used, in the two or more reactors, as desired.

Figure 9:
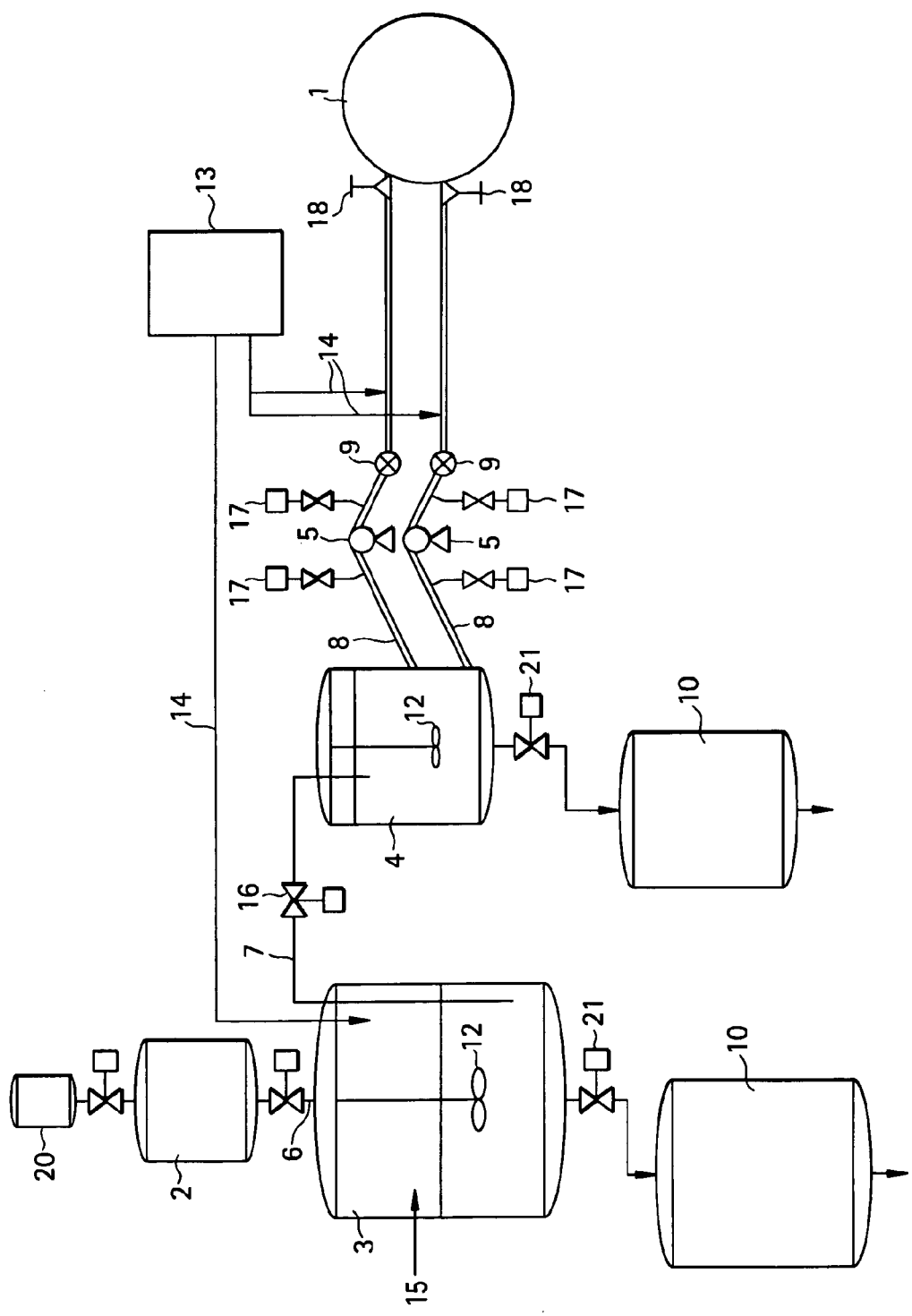
FIG. 9 is a schematic representation of a preferred embodiment of a device according to the invention for preparing and supplying catalyst to a polymerization reactor.

Referring to FIG. 9 a preferred embodiment of a device according to the present invention is illustrated. In general, the device according to the invention comprises a vessel 3 for preparing catalyst slurry and a buffer vessel 4 for storing said catalyst slurry at a suitable concentration for use in a polymerization reaction. The catalyst slurry is continuously pumped from the buffer vessel 4 to a reactor 1 through one or more conduits 8. The constructional details of valves, pumps etc. have been omitted in the drawings for clarity, it being within the skill of the art to supply these.

The Ziegler-Natta catalyst $TiCl_4$ is solid and is generally provided under a dry form in commercially available drums 20. In general such drums containing dry catalyst powder are not able to handle high pressures. For instance, the pressure in such drum may comprise approximately between 1.1 and 1.5, and preferably 1.3 bar. Using appropriate systems, the catalyst is therefore preferably transferred from such drums to a container vessel 2, which is suitable for handling higher pressures, if this is required by the diluent. Depending on the diluent used, it may be required to bring the catalyst under higher pressure conditions in the container vessel 2. This is for instance the case when isobutane is used, since this diluent is only liquid at higher pressure levels. In case for instance hexane is used as diluent, container vessel 2 is not required, since this diluent is liquid at low pressures.

The container vessel 2 is generally much larger than the drums 20 and is suitable for handling higher pressure levels than the drums, preferably between 1.1 and 16 bar. Purging in such container vessel 2 is preferably performed by means of nitrogen and venting to the flare.

According to a preferred embodiment, the Ziegler-Natta catalyst is provided from drums 20 to a container vessel 2. However, in an alternative embodiment, the Ziegler Natta catalyst can also be provided in a commercial container that is suitable for handling higher pressure comprised between 1.1 and 16 bar, and preferably of 0 bar, in such case the use of a container vessel 2 is not required, and the catalyst can be fed directly from the commercial container to a preparation vessel 3.

Catalyst slurry having a suitable concentration is prepared according to the invention in a vessel 3. The catalyst slurry comprises solid catalyst in a hydrocarbon diluent. When using $TiCl_4$ as catalyst, hydrocarbons such as hexane or isobutane can be used to dilute the catalyst and to obtain a catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerization process than hexane. For instance, since in the polymerization process of ethylene, isobutane is applied as diluent in the reaction, isobutane used as diluent for the catalyst can easily be re-used in the polymerization process. Therefore, in a preferred embodiment, isobutane is used as diluent for the $TiCl_4$ catalyst, in a particularly preferred embodiment, pure isobutane is used to prepare the catalyst. Isobutane is generally present in gas form at room temperature and atmospheric pressure. In other to obtain liquid isobutane for preparing the catalyst slurry, increased pressures need to be obtained. Therefore, the solid catalyst particles are provided to a container vessel 2, and later on to a vessel 3, wherein an increased pressure, preferably comprised between 7 and 16 bar, and preferably of 8 bar can be applied.

Still referring to FIG. 9, the transfer of the Ziegler-Natta catalyst from the container vessel 2 to the vessel 3 is preferably done by gravity. Before transferring the Ziegler-Natta catalyst from the container vessel 2 to the vessel 3, isobutane is admitted into the vessel 3. The vessel 3 is provided with an inlet system 15 for supply of this diluent. The diluent is filled in the vessel 3, and the container vessel 2 is emptied. To avoid remaining catalyst in container vessel 2, the vessel is flushed with isobutane, such that remaining catalyst is transferred to the preparation vessel 3. The preparation vessel 3 is agitated by means of stirring or mixing means 12 provided in said vessel to maintain the homogeneity of the catalyst slurry.

Preferably catalyst slurry comprising solid catalyst in a hydrocarbon diluent is prepared having a concentration comprised between 0.1 and 10% by weight, and even more preferred having a concentration comprised between 0.5 and 5% by weight, and even more preferred between 3 and 4% by weight. Preparing diluted catalyst slurry having these concentrations advantageously enables the further use of diaphragm pumps 5 for injecting the catalyst slurry in the reactor 1, as described into more detail below in case other concentrations of catalyst slurry would be applied, it is clear that other types of pumping means can be applied.

After homogenous Ziegler-Natta catalyst slurry has been prepared in the vessel 3, the catalyst slurry is transferred from the vessel 3 to the buffer vessel 4 by way of one or more conduits 7 connecting the vessel 3 to a buffer vessel 4. A control valve 16 is involved in the transfer from the vessel 3 to the buffer vessel 4. The transfer can take place manually or automatically. Preferably the transfer of catalyst slurry from the vessel 3 to the buffer vessel 4 is performed by means of tubes 7 controlled by pumping means. Said pumping means preferably comprise dip pumps. The amount of catalyst slurry in the buffer vessel 4 is kept at a substantially constant level by pumping catalyst slurry prepared in the vessel 3 to the buffer vessel 4, once the amount of catalyst slurry in the buffer vessel 4 goes below a certain level.

According to a preferred embodiment the amount of catalyst slurry prepared in the vessel 3 fluctuates. In a preferred embodiment, the vessel 3 is fed with Ziegler-Natta catalyst from the container vessel 2, at the moment that the level in the vessel 3 is below 20% and even more preferred below 35%. Lower values may lead to unwanted fluctuations in the concentration of the catalyst slurry in the vessel 3 and can cause the transfer of catalyst slurry to the buffer vessel 4, wherein a substantially constant level of catalyst slurry is maintained, to be interrupted, leading to fluctuating levels of catalyst slurry in the buffer vessel 4 as well, which is undesirable according to the present invention.

However, while the amount of catalyst slurry in the vessel 3 may vary, the level of catalyst slurry in the buffer vessel 4 is substantially constant, i.e. above a certain level and between certain suitable ranges. The level of catalyst slurry in the buffer vessel 4 is substantially constant between 40 and 100% of the vessel volume, and more preferred between 60 and 95%, and even more preferred between 80 and 90%. In order to maintain such substantially constant level of catalyst slurry in the buffer vessel, slurry is transferred from the vessel 3 to the buffer vessel 4, whenever the level of catalyst slurry in the buffer vessel 4 reaches a level below 40% and more preferred a level below 60%, or even more preferred a level below 80%.

In one example, the catalyst slurry level in the buffer vessel can be determined by pressure measurement, e.g. by measuring the pressure in the lower part of the vessel and in the upper part of the vessel.

The buffer vessel 4 is preferably large enough to contain sufficient catalyst slurry and large enough such that a day vessel capacity is equivalent to the time to prepare a new batch. This enables to assure the continuous production and availability of the catalyst in, the polymerization reaction. In addition, in another preferred embodiment, the pressure in the buffer vessel 4 is preferably maintained between 6 and 16 bar and preferably at 7 bar.

Catalyst wastes can be sent through a conduit, which is provided with a control valve 21, to one or more dump vessels 10. The preparation vessel 3 and the buffer vessel 4 can be emptied in a common or in separate dump vessels 10. Preferably said dump vessel 10 are larger than the vessel 3 and the buffer vessel 4. In case of the preparation of unsuitable catalyst, these can be emptied from the vessels 3, 4 to these dump vessels 10. The dump vessel 10 is preferably a heated vessel, having a steam jacket, where the diluent, i.e. isobutane, is evaporated. The steam jacket is preferred, for desorbing isobutane. The evaporated diluent is sent to distillation or to the flare. In order to avoid the transfer of catalyst fragments when transferring the evaporated diluent, guard filters are provided with the dump vessels 10. The dump vessels 10 are also provided with pressure controlling means for controlling the pressure in said vessels. The catalyst waste remaining after evaporation of the diluent is removed from the vessels 10, preferably by means of a draining system, provided at the bottom of the vessel 10, and the removed waste is discharged into drums and further destroyed.

Still referring to FIG. 9, the Ziegler-Natta catalyst slurry is subsequently transferred from the buffer vessel 4 to the reactor 1 through one or more conduits 8. The conduits 8 preferably have a diameter comprised between 0.3 and 2 cm, and preferably between 0.6 and 1 cm. Each conduit 8 is provided with a pumping means 5, which controls the transfer and injection of the Ziegler-Natta catalyst slurry into the reactors 1. In a particularly preferred embodiment, said pumping means are diaphragm pumps.

Figure 10:
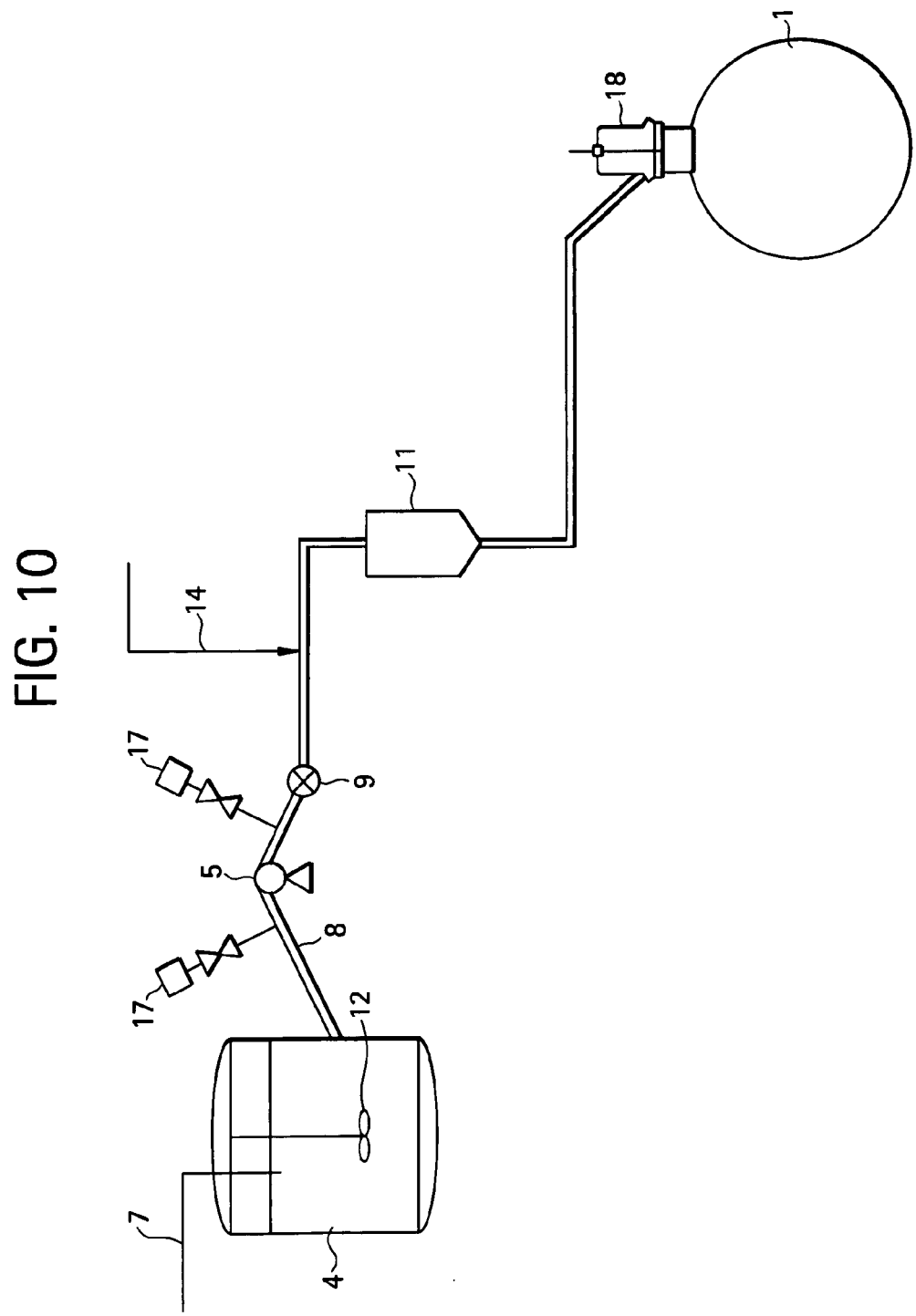
FIG. 10 is a detailed representation of a system for bringing a co-catalyst into contact with catalyst slurry in a device according to the present invention.

As represented in FIG. 10, the conduits 8 preferably leave the buffer vessel 4 upwardly under an angle preferably superior to 10°, and more preferably superior to 30°. In addition, the conduit provided downwards the pumping means 5 conducts the catalyst slurry downwardly, under an angle preferably superior to 10°. Such configuration improves the action of the pumping means 5 and also enables to avoid plugging in the pumping means 5 since under this configuration the catalyst slurry tends to settle away from the pumps 5 in case the pumps 5 are interrupted or stopped.

The conduits 8 are further provided with a pulsation dampener, safety valves and isobutane flushing means 17, either at the inlet, at the outlet or at both sides of the diaphragm pumps 5, as illustrated on FIG. 10. Isobutane flushing means 17 enable to flush isobutane through the conduit 8 and to keep the conduits 8 and the pumping means 5 unplugged. When different conduits 8 are provided for connecting the buffer vessel 4 to the reactor 1, generally, one conduit having one active pumping means 5 will be operative, while the other conduits 8 and pumping means 5 will not be operative but will be kept in stand by mode. In this latter case, the conduit 8 remains open and the pumping means 5 will preferably be constantly flushed with a suitable stream of diluent.

In order to reduce the risk of leakage, the catalyst should be stored at a lower pressure than the reactor which is generally comprised around 43 bar, e.g. stored in the buffer vessel at approximately 7 bar.

The pressure in the conduits 8 is preferably comprised between 45 and 65 bar. This elevated pressure, in comparison with the pressure values provided in the vessel 3 and the buffer vessel 4, is required in order to bring the catalyst under sufficient pressure into the reactor.

It is important to control correctly the catalyst flow to the reactor and to pump catalyst slurry into the reactor at a controlled and limited flow. An unexpected flow to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactors' activity. The pumping means are in particular controllable in function of the concentration of a reactant in said reactor. Preferably said reactant is the concentration of monomer, i.e. ethylene, in the reactor. However, it should be clear that the pumping means are controllable in function of the concentration of other reactants, such as e.g. the co-monomer or hydrogen concentrations in the reactor as well. By the use of pumping means 5 the invention provides for a good control of the catalyst flow. In particular the Ziegler-Natta catalyst flow rate to the reactors is controlled by adjusting the stroke and/or frequency of the diaphragm pumps. Furthermore, the pump flow rates are controlled by the ethylene concentration in the reactor. In case the ethylene concentration is high in, the reactor, more catalyst will be added to the reactor and vice versa. In this way, the variations in ethylene polymerization rate are taken into account and actual production rate and product properties do not fluctuate significantly.

In addition, the conduits 8 are further provided with flow measuring means 9 for easily measuring the catalyst flow rate in the conduits 8. These flow measuring means 9 preferably are Coriolis flow measuring means that are preferably provided downstream from said pumping means 5.

In a further embodiment, the present device is further provided with a co-catalyst distribution system, for bringing a co-catalyst into contact with said catalyst slurry before supplying said catalyst slurry to said reactor. When using a Ziegler-Natta catalyst, tri isobutyl aluminium (TIBAL) is preferably used as co-catalyst. Such co-catalyst acts as a real catalyst, which means that the co-catalyst participates to the polymerization reaction in the reactor.

The co-catalyst distribution system 13 may comprises two co-catalyst storage vessels wherein co-catalyst is prepared and stored. One vessel comprises a high level of co-catalyst and is in connection via a conduit 14 to the preparation vessel 3 for supply of co-catalyst thereto. This vessel can also be in connection to the conduit 8 for providing co-catalyst thereto. Another vessel is in connection to the conduit 8 through conduit 14, for transferring said co-catalyst to the conduit 8, as illustrated on FIG. 10.

Referring to FIG. 9 and FIG. 10 the contact time between the Ziegler-Natta catalyst and the TIBAL co-catalyst and the ratio between the Ziegler-Natta catalyst and the TIBAL co-catalyst have an important influence on the granulometry but also on the activity of the final polymerization product. Using a TIBAL co-catalyst, bigger polyethylene particles can be obtained through activity. Also, pre-contact of the TIBAL co-catalyst with the Ziegler-Natta catalyst improves the bulk density and the settling efficiency of the polyethylene prepared in the polymerization reactor. Depending on the pre-contact time desired, a suitable amount of TIBAL co-catalyst is injected either in the vessel 3, in case a long pre-contact time is required between the Ziegler-Natta catalyst and the TIBAL co-catalyst, or in the conduits 8, downstream the diaphragm pumps 5, before entering the reactors 1, in case a short pre-contact time is required between the Ziegler-Natta catalyst and the TIBAL co-catalyst.

Co-catalysts are generally provided in commercial drums. In a storage vessel of the co-catalyst distribution system 13 the TIBAL co-catalyst is generally provided in a solution of hexane, but can be provided in pure form too. The TIBAL co-catalyst is transferred from the storage vessel through a co-catalyst injection conduit 14, in the conduit 8, which connects the buffer vessel 4 with the reactor 1. Conduit 14 intersects conduit 8, downstream the diaphragm pumps 5 and upstream the reactor 1. In case a flow measuring means 9 is further provided on the conduits 8, the co-catalyst feeding conduit 14 intersects the conduit 8, preferably downstream of said flow meter 6.

In case the TIBAL co-catalyst is injected in the conduit 8, the injection point is at a distance from the reactor allowing a certain pre-contact time with the catalyst before being supplied to the reactor. In order to have a sufficient pre-contact time, preferably between 5 seconds and 1 minute, between the Ziegler-Natta catalyst slurry and the TIBAL co-catalyst, small contact vessels 11 are installed on the conduits 8, downstream the injection point of the co-catalyst distribution system. This contact vessel can be agitated or not. In another preferred embodiment, the conduits 8 have a diameter comprised between 0.3 and 2 cm, and preferably comprised between 0.6 and 1 cm while the diameter of the contact vessels 11 is preferably comprised between 1 and 15 cm and preferably between 6 and 9 cm.

In another preferred embodiment, by operation in accordance with the present invention, all lines, vessels, pumps, valves, etc. can be kept free of clogging by means of flushing or purging with nitrogen or diluent, isobutane. It is to be understood that where necessary flushing and purging means and lines are available on the device according to the invention in order to avoid plugging, or blocking.

In an example, using the device according to the present invention, a drum of 80 kg comprising solid Ziegler-Natta catalyst is diluted in approximately 2000 kg of diluent isobutane. This amount of catalyst enables to prepare 1,000,000 kg of polyethylene, and the prepared catalyst is suitable for feeding a reactor at a slow flow rate during 4 to 5 days.

In another embodiment, the catalyst slurry is injected under controlled flow into the reactor. The conduits 8 for transferring catalyst slurry into to the reactor are equipped by one or more valves, preferably piston valves 18. The piston valves 18 are capable of sealing the orifice by which the conduit 8 is connected to the reactor 1 as illustrated on FIG. 2. When using different conduits 8 for transferring catalyst slurry to one reactor, only in one conduit 8 the pumping means actively pump catalyst slurry to the reactor, while in other conduits 8 the pumps are not active and the conduits are preferably flushed by isobutane.

The device according to the invention can be applied for feeding a single polymerization reactor. In a preferred embodiment the device according to the invention is applied for feeding a polymerization reactor consisting of two liquid full loop reactors, comprising a first and a second reactor connected in series by one or more settling legs of the first reactor connected for discharge of slurry from the first reactor to said second reactor. Such in series connected reactors are particularly suitable for the preparation of bimodal polyethylene. The present device, comprising the container vessel 2, the vessel 3, the buffer vessel 4 and the co-catalyst storage distribution system 13, and optionally one or more dump vessels 10, can be applied for both reactors. The number of conduits 8 can be divided between the first and the second reactor. It is also possible to use two catalyst preparation and injection device, e.g. when two different catalysts are used.

It is clear from the present description that numbers of dimensions of the different parts of the device relate to the size of the polymerization reactors and can be changed in function of the reaction sizes.

Still referring to FIG. 9 and/or FIG. 10, in another embodiment, the present invention relates to a method for optimising catalyst supply to a polymerization reactor 1 comprising the steps of
  a) preparing catalyst slurry in a vessel 3, said slurry comprising solid catalyst, preferably a Ziegler-Natta catalyst as defined above, in a hydrocarbon diluent having a suitable concentration for use in a polymerization reaction,
  b) providing said catalyst slurry from said vessel 3 to a buffer vessel 4 wherein said slurry is stored, and
  c) supplying said catalyst slurry from said buffer vessel 4 to said reactor 1 through conduits 8 at a suitable flow rate.

Preferably, said method is a method for optimising catalyst supply to a polymerization reactor 1 wherein polyethylene, and preferably bimodal polyethylene, is prepared.

The catalyst slurry is generally prepared from solid catalyst, which is suspended in a hydrocarbon diluent. Since solid catalyst is generally provided in commercial drums, under conditions that do not allow the preparation of catalyst slurry, e.g. the commercial drums are too small or do not allow to apply increased pressure, if required by the used diluent. Depending on the diluent used, it may be required to bring the catalyst under higher pressure conditions. Therefore, in a preferred embodiment said method further comprises the additional step of transferring solid catalyst from a container vessel 2 to the vessel 3, wherein diluted catalyst slurry of a suitable concentration is prepared. Alternatively, the Ziegler Natta catalyst can also be provided in a commercial container that is suitable for handling higher pressures. In such case the use of a container vessel 2 is not required, and the concentrated catalyst slurry can be fed directly from the commercial container to a preparation vessel 3.

Preferably, the method comprises controlling the level of catalyst slurry in said buffer vessel 4. Even more preferred the invention relates to a method for maintaining the level of catalyst slurry in said buffer vessel 4 substantially constant. This is in particular enabled by providing two vessels, a vessel 3 wherein the slurry is prepared and which is allowed to have a fluctuating amount of catalyst slurry comprised therein, and a buffer vessel 4, containing a substantially constant level of catalyst slurry, preferably between 40% and 100% and more preferred between 60% and 95% and even more preferred between 80% and 90%. The level of catalyst slurry in the buffer vessel 4 is kept constant by contacting the buffer vessel 4 to the vessel 3 through tubes 7, in particular tubes under the control of pumping means. Through these tubes 7, catalyst slurry is pumped from the vessel 3 to the buffer vessel 4 when the level of catalyst slurry in the buffer vessel 4 in going down the above-indicated values. By this mechanism continuous supply of catalyst slurry without relevant fluctuations to a polymerization reactor is ensured. The polymerization reactor will thus continuously be provided with catalyst slurry at a suitable concentration, which will increase the efficiency of the polymerization reaction in the reactor.

In another embodiment, the method according to the invention comprises controlling the suitable flow rate of the catalyst slurry to the reactor 1 by determining the concentration of a reactant in said reactor 1. Preferably said reactant is the concentration of monomer, i.e. ethylene, in the reactor. However, it should be clear that also determination of other reactants, such as e.g. the co-monomer or hydrogen concentrations in the reactor, is comprised within the scope of the present invention. Practically, this mechanism is obtained by providing each conduit for transferring and supplying the catalyst slurry from the buffer vessel to the reactor with a pumping means, that is capable of being adjusted and regulating the catalyst flow rate in function of the concentration of a reactant in said reactor.

In certain cases it might be required or advantageous to bring the catalyst into contact with a co-catalyst, as indicated above. Therefore, the present invention further provides a method comprising the step of bringing a co-catalyst into contact with said catalyst slurry before supplying said catalyst slurry to said reactor. The co-catalyst is preferably an aluminium based compound as defined above.

The co-catalyst can be supplied to the catalyst slurry either in the vessel 3, which is suitable when a relatively long pre-contact time is required between the catalyst and the co-catalyst. Alternatively, the method comprises bringing a co-catalyst, preferably a co-catalyst as defined above, into contact with said catalyst slurry present in conduits 8. The co-catalyst distribution system 13 preferably comprises a storage vessel and a conduit 14 intersecting the conduit 8. In another preferred embodiment, the method further comprises enhancing the contact time of said co-catalyst with said catalyst slurry in conduits 8, by locally enhancing the volume of said conduits 8. By locally enhancing the volume of the conduits, a better pre-contact between co-catalysts and catalysts is obtained. Pre-contact between catalyst and co-catalyst positively influences the granulometry of the final polymerization product and improves the bulk density and the settling efficiency of the polymerization product prepared in the polymerization reactor. During the activation process, if too much co-catalyst contacts the catalyst particle, the catalytic activity is not only reduced, but actual harm may result. The present method also advantageously enables to more precisely control the ratio of catalyst/co-catalyst injection.

Still referring to FIG. 9 and/or FIG. 10, in another preferred embodiment, the present invention provides a method for continuously supplying catalyst slurry from the buffer vessel 4 to the reactor 1 through conduits 8 at a suitable flow rate. In a preferred embodiment, the present invention provides in particular a method that enables to continuously supply catalyst to a reactor, without interruption of the catalyst, flow.

In yet another preferred embodiment, the invention relates to a method wherein catalyst flow rate to the reactor is accurately measured, through liquid flow rate measurement, using flow measuring means, such as preferably Coriolis flow measuring means.

This invention is especially applicable to a process of supplying a catalyst to a polymerization reactor. The invention is in particular described with reference to the supply of catalyst to a slurry loop polymerization reactor wherein ethylene is polymerized. The polymerization process of ethylene may for instance be carried out in loop reactors. Suitable "ethylene polymerization" includes but is not limited to homo-polymerization of ethylene, co-polymerization of ethylene and a higher 1-olefin co-monomer such as butene, 1-pentene, 1-hexene, 1-octene or 1-decene. Ethylene polymerization comprises feeding to a reactor the reactants including the monomer ethylene, a light hydrocarbon diluent, a catalyst and optionally, a co-monomer and hydrogen. In an embodiment of the present invention, said co-monomer is hexene and said diluent is isobutane.

In a particularly preferred embodiment, the invention relates to a process of supplying a catalyst to a polymerization reactor wherein bimodal polyethylene is prepared. "Bimodal PE" refers to PE that is manufactured using two reactors, which are connected to each other in series. However, the present method for improving and optimising catalyst supply to a polymerization reactor should be understood to be applicable to reactors wherein other types of polymerization reactions take place as well.

According to the present invention the term "catalyst" is defined herein as a substance that cause a change in the rate of a polymerization reaction without itself being consumed in the reaction. Any catalyst allowing ethylene to be polymerized may be used. By way of examples of such catalysts, mention may be made of catalysts of the Ziegler-Natta type, catalysts based on vanadium or chromium, and metallocene catalysts.

Catalyst slurry can be prepared in different ways. One way consists of preparing catalyst slurry staring from solid catalyst particles, which are suspended in a suitable diluent, e.g. a hydrocarbon. Generally, such catalyst slurry can be transferred directly to a polymerization reaction vessel for contact with the monomer reactants.

Catalyst slurry can also be obtained commercially in the form of solid catalyst particles, which are suspended in a mineral oil. Direct injection of such catalyst slurry in the reactor can be done by connecting the commercial vessel containing the catalyst in oil suspension with the reactor by means of conduits that are provided with suitable pumps. Such pumps typically are suitable for pumping liquids with significant amounts of solids, e.g. solid particles in crude oil. Examples of pumps of this type are commonly known as Moineau pumps or progressive cavity pumps, and are available commercially.

Several methods for supplying catalyst to a polymerization reactor have been described in the prior art. For instance, U.S. Pat. No. 3,846,394 describes a process for the introduction of Ziegler-Natta catalyst slurry in a reactor. The process comprises the preparation of Ziegler-Natta catalyst slurry, the transfer of the slurry via a feed conduit from a storage zone to a metering zone, and the introduction of the slurry into a reactor. In order to avoid the back flow of monomer and other contents of the reactor into the Ziegler-Natta catalyst conduits the process provides the catalyst feed conduit to be flushed with an inert diluent to the Ziegler-Natta catalyst, said diluent being introduced into said conduit downstream of the metering zone.

Catalyst systems for polymerization and co-polymerization of olefins known as Ziegler-Natta systems consist on the one hand, as catalyst, of compounds of transition metals belonging to Groups. IV to VII of the periodic table of elements, and on the other hand, as co-catalysts, of organometallic compounds of metals of Groups I to II of this Table. The catalysts most frequently used are the halogenated derivatives of titanium and vanadium, preferably associated with compounds of magnesium. Moreover, the co-catalysts most frequently used are organoaluminium or organozinc compounds. A characteristic of all Ziegler-Natta catalysts is that they all yield straight chain polymers.

The Ziegler-Natta catalyst is preferably of the general formula $MX_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, R is chlorine or bromine, and most preferably, chlorine, illustrative examples of the transition metal compounds comprise but are not limited to $TiCl_3$, $TiCl_4$. In a particularly preferred embodiment of the invention said catalyst is a titanium tetrachloride ($TiCl_4$) catalyst.

The term "metallocene catalyst" is used to describe any transition metal complexes consisting of metal atoms "sandwiched" between one or two ligands. In a preferred embodiment, the metallocene catalyst has a general formula MX, wherein M is a transition metal compound selected from group IV and wherein X is a ligand composed of one or two groups of cyclopentadienyl (Cp), indenyl, fluorenyl or their derivatives. Illustrative examples of metallocene catalysts comprise but are not limited to $Cp_2ZrCl_2$, $Cp_2TiCl_2$ or $Cp_2HfCl_2$.

The use of metallocene catalysts in the production of polyolefins in general, and of polyethylene in particular, is known in the art. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. Metallocene catalysts are usually employed with a co-catalyst such as an organometallic compound, or a mixture of non-coordinated Lewis acid and alkylaluminium as it is well known in the art. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and growing chain of polymer.

Chromium-type catalysts refer to catalysts obtained by deposition of chromium oxide on a support, e.g. a silica or aluminum support. Illustrative examples of chromium catalysts comprise but are not limited to $CrSiO_2$ or $CrAl_2O_3$.

According to a preferred embodiment the catalyst prepared and supplied according to the present invention is a Ziegler-Natta catalyst. In a preferred embodiment, said catalyst is provided as solid particles suspended in a mineral oil.

Generally co-catalysts are used to improve the activity of a Ziegler-Natta or a metallocene catalyst. The term "co-catalyst" as used herein is defined as a catalyst that can be used in conjunction with another catalyst in order to improve the activity and the availability of the other catalyst in a polymerization reaction. In a preferred embodiment, said co-catalyst is a catalyst suitable for being used in conjunction with a Ziegler-Natta catalyst or a metallocene catalyst. The co-catalyst is used to promote the polymerization activity of the Ziegler-Natta catalyst or the metallocene catalyst. Broadly, organometallic compounds of periodic groups I to III can be used as co-catalyst according to the present invention. In a particularly preferred embodiment, said co-catalyst is a catalyst suitable for being used in conjunction with a Ziegler-Natta or a metallocene catalyst and is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen. Examples of co-catalysts comprise but are not limited to trimethyl aluminum, triethyl aluminum, di-isobutyl aluminum hydride, is tri-isobutyl aluminium, tri-hexyl aluminum, diethyl aluminum chloride, or diethyl aluminum ethoxide. A particularly preferred co-catalyst for use in the present invention is tri-isobutyl aluminium (TIBAL).

The invention will be described hereunder with reference to a method and apparatus for supplying a Ziegler-Natta catalyst, in particular a titanium tetrachloride ($TiCl_4$) catalyst to a polymerization reactor wherein ethylene is polymerized. As co-catalyst for the Ziegler-Natta catalyst, reference is made to a tri-isobutyl aluminium co-catalyst. However, it should be clear that the present apparatus is applicable to other types of catalysts and co-catalysts as well, as indicated above.

As used herein, the term "catalyst slurry" refers to a composition comprising catalyst solid particles that are in suspension. The term "concentrated catalyst slurry" refers to a composition comprising catalyst solid particles that are in suspension whereby the concentration of catalyst is at least higher than 10% by weight. The term "diluted catalyst slurry" refers to a composition comprising catalyst solid particles that are in suspension, whereby the concentration of catalyst is lower than or equal to 10% by weight.

The hereunder-described apparatus corresponds to the required equipment for preparation and injection of one catalyst. If two or more (different) catalysts need to be fed to a reactor, two or more apparatuses according to the present invention can be supplied or a catalyst blend can be prepared and supplied using a apparatus according to the present invention.

Figure 11:
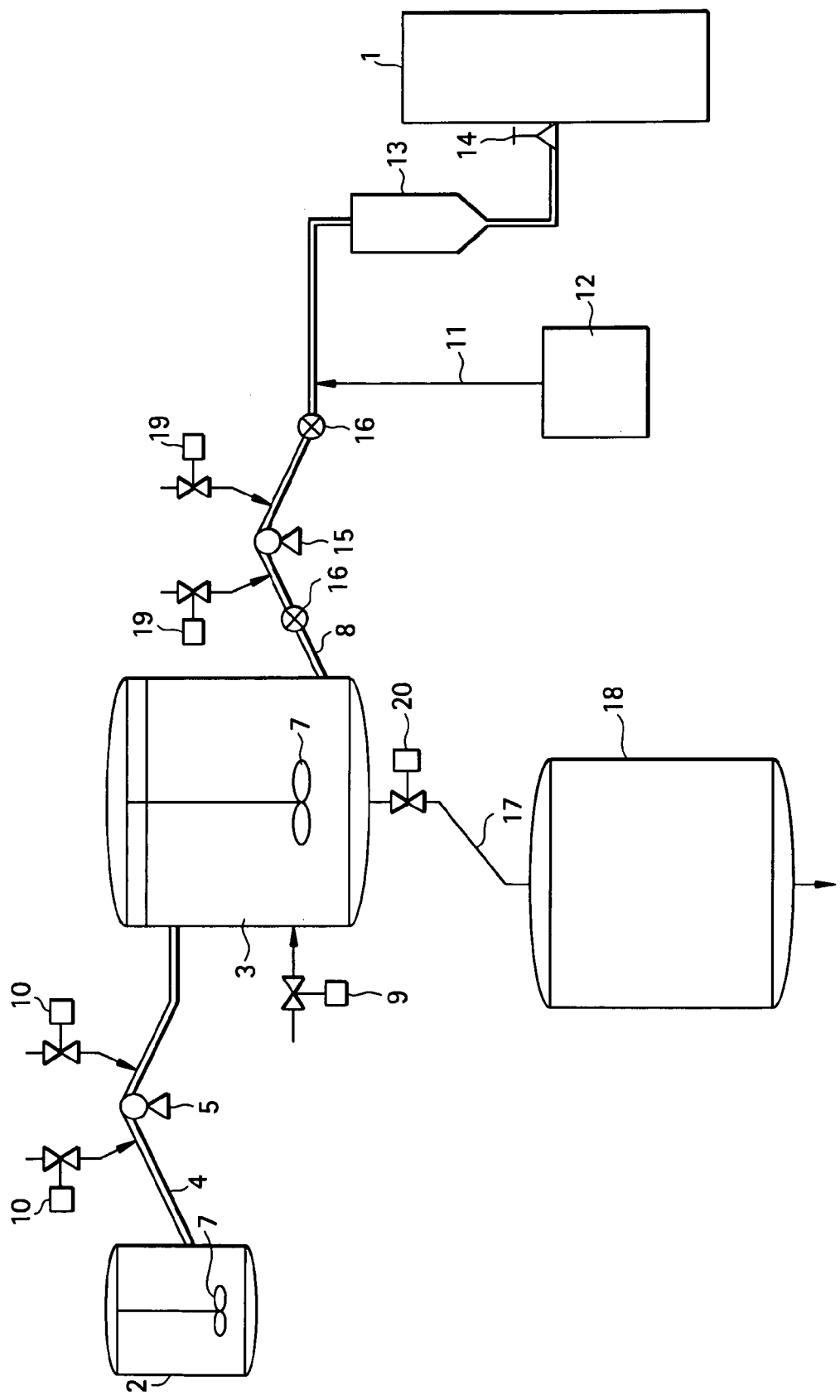
FIG. 11 is a schematic representation of a preferred embodiment of an apparatus according to the invention for preparing and supplying catalyst to a polymerization reactor.

Referring to FIG. 11 a preferred embodiment of an apparatus according to the present invention is illustrated. In general, the apparatus according to the invention comprises a vessel 2 for receiving catalyst in oil suspension, and a buffer vessel 3 for preparing and storing diluted catalyst slurry at a suitable concentration for use in a polymerization reaction. Concentrated catalyst slurry is transferred from the vessel 2 to the buffer vessel 3 through one or more conduits 4 by means of pumps 5, while diluted catalyst slurry is continuously transferred from the buffer vessel 3 to the reactor through one or more conduits 8 by means of pumps 15. The constructional details of valves, pumps etc. have been omitted in the drawings for clarity, it being within the skill of the art to supply these.

According to the present, invention, the Ziegler-Natta catalyst $TiCl_4$ is provided as a suspension of solid particles in a mineral oil or hexane or heptane in a commercially available drum, it can also be supplied in dry form. The catalyst can be transferred to a vessel 2 from this commercial drum. According to an embodiment, the catalyst can be provided from such commercial drums to vessel 2 by means of nitrogen pneumatic transfer or by gravity. The catalyst concentration in vessel 2 can be adjusted by adding mineral oil; alternatively other hydrocarbons can be used.

In general, the pressure in the vessel 2 may comprise approximately between 7 and 16 bar. The slurry in the vessel 2 is referred to as "concentrated" or "heavy" slurry since it contains a proportionally high amount of particulate catalyst solids. Such concentration preferably ranges from 10 to 50% by weight, and even more preferred from 20 to 40% by weight.

According to a preferred embodiment, the concentrated Ziegler-Natta catalyst is transferred from vessel 2 to the buffer vessel 3, wherein the catalyst is diluted to a concentration suitable for use in the polymerization reactor. The buffer vessel 3 therefore is provided with means 9 for supplying a suitable diluent to said buffer vessel 3. The concentrated catalyst supplied to the buffer vessel 3 through conduit 4 is diluted by the diluent supplied through conduit 9 to obtain diluted catalyst slurry in the buffer vessel 3. The buffer vessel 3 can be operated either when full of liquid or not. Preferably, the buffer vessel 3 is operated when full of liquid, since if there is an interphase with nitrogen the catalyst slurry might stick to the walls settle in the vessel.

When using $TiCl_4$ as catalyst, hydrocarbons such as hexane or isobutane can be used to dilute the catalyst and to obtain diluted catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerization process than hexane. For instance, since in the polymerization process of ethylene, isobutane is applied as diluent in the reaction, isobutane used as diluent for the catalyst can easily be re-used in the polymerization process. Therefore, in a preferred embodiment, isobutane is used as diluent for the $TiCl_4$ catalyst. Isobutane is generally present in gas form at room temperature and at atmospheric pressure. In other to obtain liquid isobutane for preparing the diluted catalyst slurry, the buffer vessel 3 is preferably operated at pressure levels comprised between 8 and 17 bar, and preferably at pressure levels comprised between 4 and 5 bar. The pressure in the buffer vessel 3 is preferably lower than the pressure in the reactor, in order to avoid leakage of catalyst from the buffer vessel to the reactor.

Still referring to FIG. 11, before transferring the Ziegler-Natta catalyst from the vessel 2 to the buffer vessel 3, isobutane is admitted into the vessel 3. The vessel 3 is provided with an inlet system 9 for supply of this diluent. The vessel 2 and the buffer vessel 3 are agitated by means of stirring or mixing means 7 provided in said vessel to maintain the homogeneity of the concentrated and diluted catalyst slurry, respectively. The buffer vessel 3 is preferably large enough to contain sufficient catalyst slurry and large enough such that a day vessel capacity is equivalent to the time to prepare a new batch. This enables to assure the continuous production and availability of the catalyst in the polymerization reaction. Alternatively, a second vessel 2 can be provided to prepare a new batch.

The slurry in the buffer vessel 3 is referred to as "diluted" slurry since it contains a proportionally low amount of particulate catalyst solids. The diluted slurry has a concentration comprised between 0.1 and 10% by weight, and preferably comprised between 0.1 and 5% by weight, and even more preferred between 0.5 and 4% by weight. Preparing diluted catalyst slurry having these concentrations advantageously enables the further use of diaphragm pumps 15 for injecting the diluted catalyst slurry in the reactor 1, as described into more detail below. In case other concentrations of catalyst slurry would be applied, it is clear that other types of pumps can be applied.

The transfer of the Ziegler-Natta catalyst from the vessel 2 to the buffer vessel 3 is preferably done through one or more conduits 4. For transfer of Ziegler-Natta catalyst from the vessel 2 to the buffer vessel 3 a pump 5 is provided on each conduit 4. In a preferred embodiment, said pump 5 comprises a pump which is suitable for pumping liquids with significant amounts of solids, e.g. solid particles in crude oil, which would otherwise easily damage more common types of reciprocating oil well pumping systems. Examples of pumps of this type are commonly known as Moineau pumps or progressive cavity pumps, and are available commercially. Such progressive cavity pumps operate on the Moineau principle, which is based on the geometrical fit between the rotating element (rotor), and the stationary element (stator). The interference fit between the rotor and the stator creates a series of sealed chambers called cavities. Pumping action is achieved by the rotor turning eccentrically within the stator. Fluid enters the cavity formed at the inlet and progresses within that cavity to the outlet. The result is a positive displacement, non-pulsating flow that is directly proportional to the pump's speed. This allows the progressive cavity pump to deliver material at a wide range of flow rates from small shots to continuous flow.

As represented in FIG. 11, the conduits 4 preferably leave the vessel 2 in upward direction under an angle preferably superior to 10° and more preferably superior to 30°. In addition, the conduits 4 provided downwards the pumping means 5 conducts the catalyst slurry preferably downwardly, under an angle preferably superior to 10°. Such configuration improves the action of the pump 5 and also enables to avoid plugging in the pump 5 since under this configuration the concentrated catalyst slurry tends to settle away from the pumps 5 in case the pumps 5 are interrupted or stopped.

The conduits 4 are further preferably provided with a pulsation dampener, safety valves and isobutane flushing means 10, either at the inlet, at the outlet or at both sides of the slurry pumps 5, as illustrated on FIG. 11. Isobutane flushing means 10 enable to flush isobutane diluent through the conduit 4 and to keep the conduits 4 and the pumps 5 unplugged. On conduits 10 for injecting isobutane flow measuring means can be provided. When different conduits 4 are provided for connecting the vessel 2 to the buffer vessel 3, generally, one conduit having one active pump 5 will be operative, while the other conduits 4 and pumps 5 will not be operative but will be kept in stand by mode.

The concentrated slurry is preferably injected in ratio control of isobutane diluent to catalyst in the buffer vessel to have a constant concentration of slurry in the buffer vessel. In addition, the conduits 4 can be further provided with flow measuring means for easily measuring the flow rate of the concentrated catalyst slurry in the conduits 4. The ratio of catalyst to diluent is adequately controlled and adjusted by controlling the speed of the pump 5 and by measuring the density of the isobutane diluent.

Catalyst wastes can be sent through conduit 17, which is provided with a valve 20, to one or more dump vessels 18, which are preferably provided with stirring means and contain mineral oil for neutralization and elimination of the wastes. Preferably said dump vessel 18 is larger than the buffer vessel 3. In case of the preparation of unsuitable catalyst, these can be emptied from the vessels 3 to these dump vessels 18. The dump vessel 18 is preferably a heated vessel, having a steam jacket, where the diluent, i.e. isobutane, is evaporated. The steam jacket is preferred for desorbing isobutane. The evaporated diluent is sent to distillation or to the flare. In order to avoid the transfer of catalyst fragments when transferring the evaporated diluent, guard filters are provided with the dump vessels 18. The dump vessels 18 are also provided with pressure controlling means for controlling the pressure in said vessels. The catalyst waste remaining after evaporation of the diluent is removed from the vessels 18, preferably by means of a draining system, provided at the bottom of the vessel 18, and the removed waste is discharged into drums and further destroyed.

The diluted Ziegler-Natta catalyst slurry is subsequently transferred from the buffer vessel 3 to the reactor 1 through one or more conduits 8. The conduits 8 preferably have an inner diameter comprised between 0.3 and 2 cm, and preferably between 0.6 and 1 cm. Each conduit 8 is provided with a pump 15 which controls the transfer and injection of the diluted Ziegler-Natta catalyst slurry into the reactors 1. In a particularly preferred embodiment, said pumps are diaphragm pumps.

As represented in FIG. 11, the conduits 8 preferably leave the buffer vessel 3 upwardly under an angle preferably superior to 10°, and more preferably superior to 30 preferably superior to 10°. In addition, the conduit 8 provided downwards the pump 15 conducts the diluted catalyst slurry downwardly, under an angle preferably superior to 10°. Such configuration improves the action of the pump 15 and also enables to avoid plugging in the pump 15 since under this configuration the diluted catalyst slurry tends to settle away from the pumps 15 in case the pumps 15 are interrupted or stopped.

The conduits 8 are further provided with a pulsation dampener, safety valves and isobutane flushing means 19, either at the inlet, at the outlet or the outlet or at both sides of the diaphragm pumps 15. Isobutane flushing means 19 enable to flush isobutane through the conduit 8 and to keep the conduits 8 and the pump 15 unplugged. Preferably, there is continuous flushing of the conduit 8 downstream the membrane pump 15 to the reactor 1 by means of isobutane flushing means. The conduit 8 upstream the pump 15 may be flushed discontinuously, by means of isobutane flushing means. When different conduits 8 are provided for connecting the buffer vessel 3 to the reactor 1, generally, one conduit having one active pumps 15 will be operative, while the other conduits 8 and pump 15 will not be operative but will be kept in stand by mode. In this latter case, the conduit 8 downstream the pump 15 will preferably be flushed with a suitable stream of diluent. The conduit 8 upstream the pump 15 may be discontinuously flushed.

In order to reduce the risk of leakage, the catalyst should be stored at a lower pressure than the reactor that is generally comprised around 43 bar, e.g. stored in the buffer vessel 3 at approximately 6-16 bar. The pressure in the conduits 8 downstream of the pumps 15 is preferably comprised between 45 and 65 bar. This elevated pressure, in comparison with the pressure values provided in the vessel 2 and the buffer vessel 3, is required in order to bring the diluted catalyst under sufficient pressure into the reactor.

It is important to control correctly the catalyst flow to the reactor and to pump catalyst slurry into the reactor at a controlled and limited flow. An unexpected flow to the reactor could lead to a runaway reaction. A fluctuating flow to the reactor could lead to reduced efficiency and fluctuations in product quality. Therefore, in a particularly preferred embodiment, the injection pump 15 flow rates are controlled by the reactors' 1 activity. The pumps are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e.g. the co-monomer or hydrogen concentrations in the reactor as well. By the use of membrane pumps 15 the invention provides for a good control of the diluted catalyst flow. In particular, the catalyst flow rate to the reactors is controlled by adjusting the stroke and/or frequency of the diaphragm pumps. Furthermore, the pump flow rates are controlled by the ethylene concentration in the reactor. In case the ethylene concentration is high in the reactor, more catalyst will be added to the reactor and vice versa, in this way, the variations in ethylene polymerization rate are taken into account and actual production rate and product properties do not fluctuate significantly.

Another problem relating to the field of catalyst supply to a reactor consists of supplying a co-catalyst during a polymerization reaction. A number of techniques for the introduction of the co-catalyst have already been proposed, for example by introducing the co-catalyst directly into the polymerization reactor. However, such methods do not allow bringing co-catalyst into contact with the catalyst before entering the reactor, although such pre-contact may be particularly desirable in order to provide effective catalyst-co catalyst mixtures. Another technique consists of contacting the catalyst and co-catalyst before their introduction into the polymerization medium. In this latter case, however, it is difficult to control the pre-contact time of the catalyst with the co-catalyst.

In a further embodiment, the present apparatus is further provided with a co-catalyst distribution system, for bringing a suitable amount of co-catalyst into contact with the catalyst slurry for a suitable period of time before supplying said catalyst slurry to said reactor. When using a Ziegler-Natta catalyst, tri isobutyl aluminium (TIBAL) is preferably used as co-catalyst.

The co-catalyst distribution system 12 comprises at least one co-catalyst storage vessel wherein co-catalyst is prepared and stored and a conduit 11 connected thereto for transferring said co-catalyst, as illustrated on FIG. 11. Co-catalysts are generally provided in commercial drums. In a storage vessel of the co-catalyst distribution system 13, the TIBAL co-catalyst is generally provided in a solution of hexane or heptane, but can be provided in pure form too. The TIBAL co-catalyst is transferred from the storage vessel through a co-catalyst injection conduit 11, in the conduit 8, which connects the buffer vessel 3 with the reactor 1. Conduit 11 intersects conduit 8, downstream the diaphragm pumps 15 and upstream the reactor 1.

Co-catalyst wastes can be sent to a dump vessel, which is preferably provided with stirring means and contains mineral oil for neutralization and elimination. The dump is provided with a heated vessel, e.g. steam jacket, where the isobutane is evaporated and sent to distillation or to the flare.

The contact time between the Ziegler-Natta catalyst and the TIBAL co-catalyst and the ratio between the Ziegler-Natta catalyst and the TIBAL co-catalyst have an important influence on the granulometry but also on the activity of the final polymerization product. Using a TIBAL co-catalyst, bigger polyethylene particles can be obtained through activity. Also, pre-contact of the TIBAL co-catalyst with the Ziegler-Natta catalyst improves the bulk density and the settling efficiency of the polyethylene prepared in the polymerization reactor. According to the invention a suitable amount of TIBAL co-catalyst is injected in the conduits 8, downstream the diaphragm pumps 15, before entering the reactors 1.

In case the TIBAL co-catalyst is injected in the conduit 8, the injection point is at a distance from the reactor allowing a certain pre-contact time with the catalyst before being supplied to the reactor. In order to have a sufficient pre-contact time, preferably between 5 seconds and 1 minute, between the Ziegler-Natta catalyst slurry and the TIBAL co-catalyst, each conduit 8 is provided with a contact vessel 13, preferably downstream the injection point of the co-catalyst distribution system, for enhancing the contact time of said co-catalyst with said catalyst slurry in the conduits 8. These contact vessels can be agitated or not. In another preferred embodiment the conduits 8 have an inner diameter comprised between 0.3 and 2 cm, and preferably comprised between 0.6 and 1 cm while the diameter of the contact vessels 13 is preferably comprised between 1 and 15 cm and preferably between 6 and 9 cm.

In addition, at least one flow measuring means 16 is further provided on conduits 8 for easily measuring the catalyst slurry flow rate in the conduits 8. These flow measuring means 16 preferably are Coriolis flow measuring means that are preferably provided downstream from said diaphragm pumps 15. The flow measuring means 16 can however also be provided between the buffer vessel 3 and the membrane pumps 5. Preferably, said means 16 are provided upstream of the co-catalyst injection conduit 11. The diluted slurry is preferably injected in ratio control of isobutane diluent to catalyst. The ratio of catalyst to diluent is adequately controlled and adjusted by controlling the speed of the pump 15 and by measuring the density of the isobutane diluent. The Coriolis meters 16 can measure the flow and the density of the catalyst slurry at the exit of the buffer vessel 3 and indirectly determine the suspended solids concentration. A correlation exists for estimating the concentration of suspended solids based on the slurry density, the carrier fluid density and the solid particle density.

In another embodiment, the catalyst slurry is injected under controlled flow rate into the reactor. The conduits 8 for transferring catalyst slurry into to the reactor are equipped by one or more valves, preferably piston valves 14. The piston valves 14 are capable of sealing the orifice by which the conduit 8 is connected to the reactor 1. When using different conduits 8 for transferring catalyst slurry to one reactor, only in one conduit 8 the pumps actively pump catalyst slurry to the reactor, while in other conduits 8 the pumps are not active and the conduits are preferably flushed by isobutane.

The apparatus according to the invention can be applied for feeding a single polymerization reactor, in a preferred embodiment the apparatus according to the invention is applied for feeding a polymerization reactor consisting of two liquid full loop reactors, comprising a first and a second reactor connected in series by one or more settling legs of the first reactor connected for discharge of slurry from the first reactor to said second reactor. Such in series connected reactors are particularly suitable for the preparation of bimodal polyethylene. The present apparatus, comprising the vessel 2, buffer vessel 3, the conduits 4 and 8, each provided with their respective pumps, the co-catalyst distribution system 12, and optionally one or more dump vessels 18, can be applied for both reactors. The number of conduits 8 can be divided between the first and the second reactor. It is also possible to use two or more apparatuses according to the invention, e.g. when two or more different catalysts are used.

It is clear from the present description that numbers and dimensions of the different parts of the apparatus according to the present invention relate to the size of the polymerization reactors and can be changed in function of the reactor sizes.

In another preferred embodiment, by operation in accordance with the present invention, all lines, vessels, pumps, valves, etc. can be kept free of clogging by means of flushing or purging with nitrogen or diluent, i.e. isobutane. It is to be understood that where necessary flushing and purging means and lines are available on the apparatus according to the invention in order to avoid plugging or blocking.

It is to be understood from the present invention that all indicated pressures values are preferred pressure values, which in general can deviate from the indicated pressure values with approximately ±1 bar. It will be evident from the present description that all indicated pressure values in the vessels, conduits, etc., are values that are lower than the pressure value in the polymerization reactor.

In another preferred embodiment, it is to be understood that all lines or conduits applied in accordance with the present invention may be provided, where necessary with flow measuring means.

Figure 12:
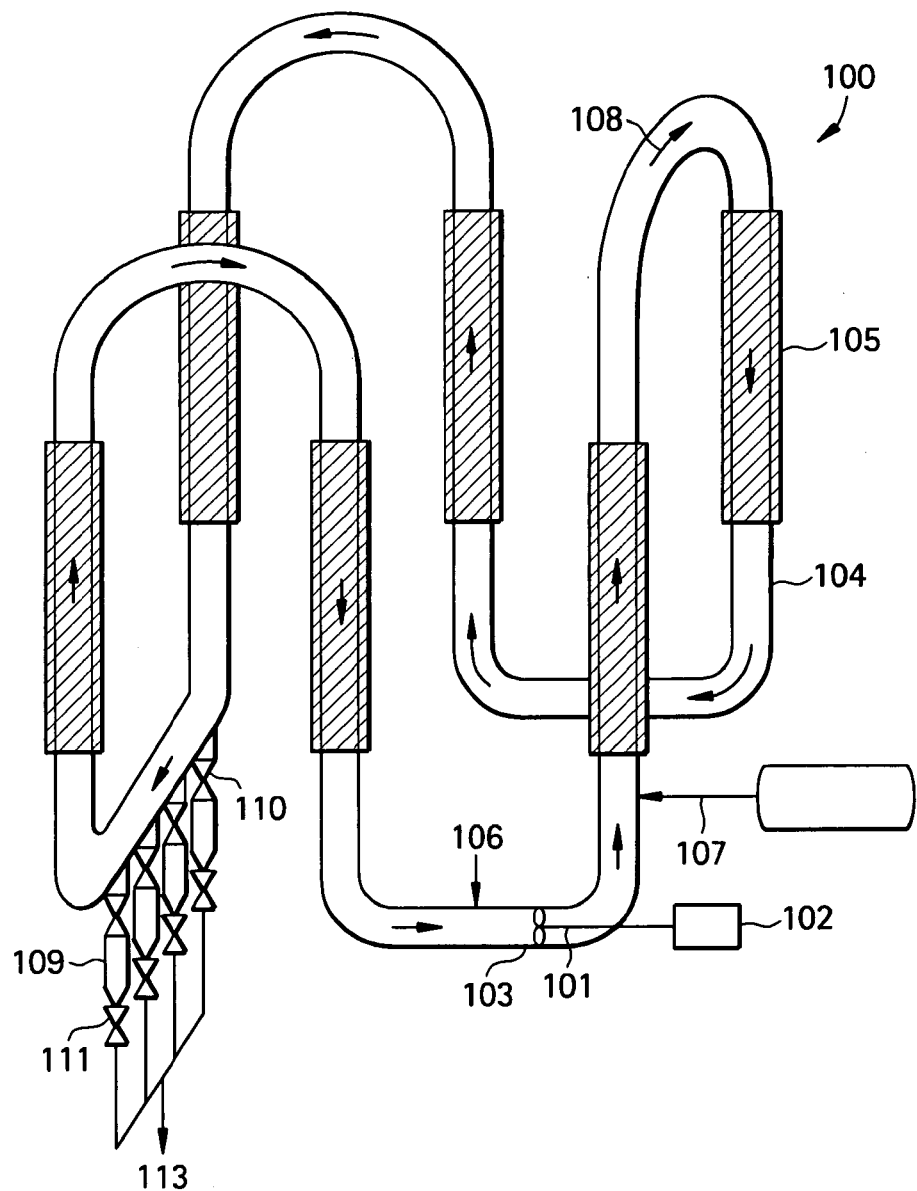
FIG. 12 is a schematic representation of a single loop polymerization reactor.
Figure 13:
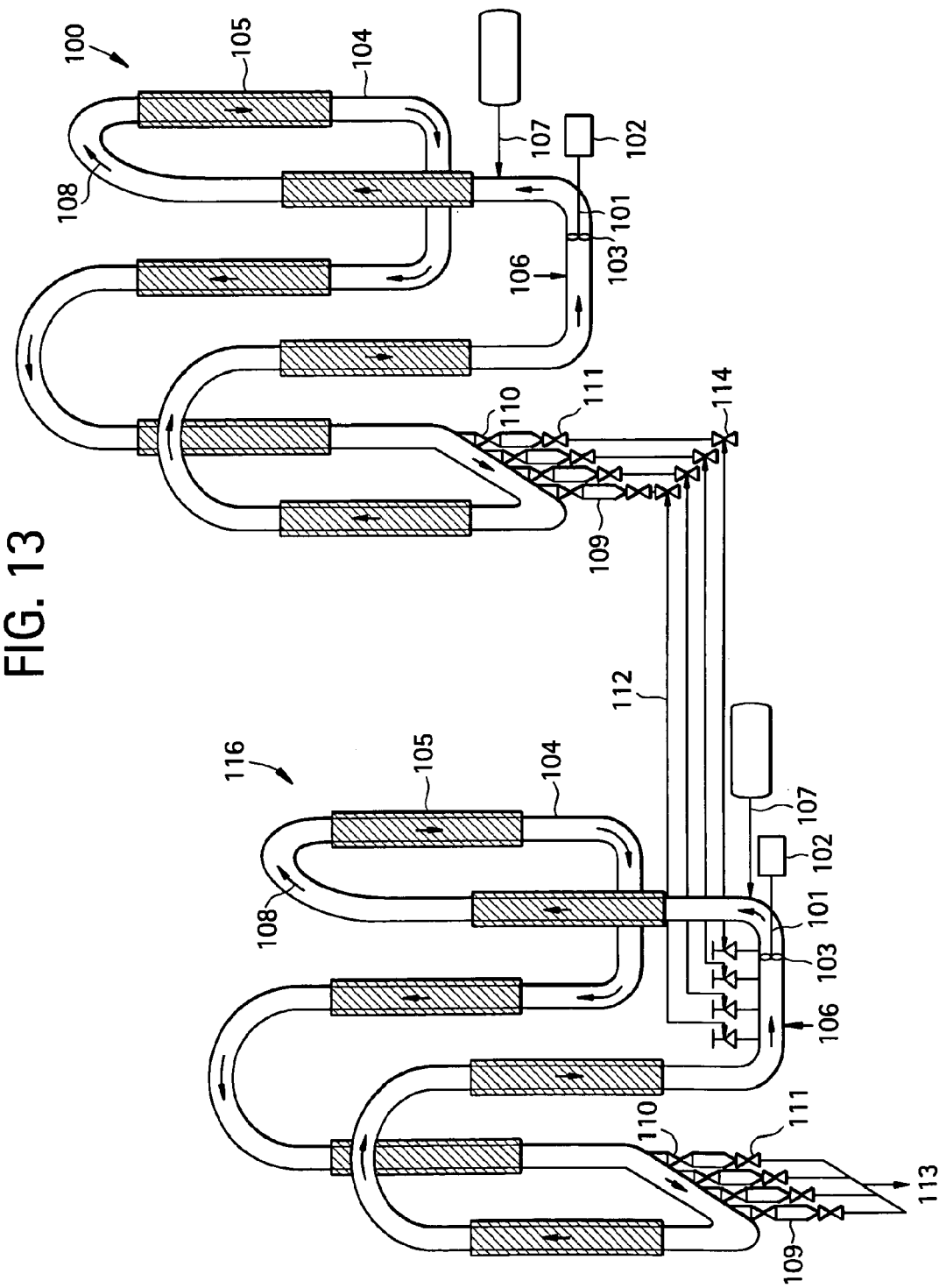
FIG. 13 is a schematic representation of a double loop polymerization reactor.

In a preferred embodiment, the device according to the invention can be used in a single loop reactor as depicted on FIG. 12 or in a double loop reactor, as depicted on FIG. 13.

FIG. 12 represents a single loop reactor 100, consisting of a plurality of interconnected pipes 104. The vertical sections of the pipe segments 104 are preferably provided with heat jackets 105. Polymerization heat can be extracted by means of cooling water circulating in these jackets of the reactor. Reactants are introduced into the reactor 100 by line 107. Catalyst, optionally in conjunction with a co-catalyst or activation agent, is injected in the reactor 100 by means of the conduct 106. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103. The reactor 100 is further provided with one or more settling legs 109 connected to the pipes 104 of the reactor 100. The settling legs 109 are preferably provided with an isolation valve 110. These valves 110 are open under normal conditions and can be closed for example to isolate a settling leg from operation. Further the settling legs can be provided with product take off or discharge valves 111. The discharge valve 111 may be any type of valve, which can permit continuous or periodical discharge of polymer slurry, when it is fully open. Polymer slurry settled in the settling legs 109 may be removed by means of one or more product recovery lines 113, e.g. to a product recovery zone.

FIG. 13 represents two single loop reactors 100, 116, which are interconnected in series. Both reactors 100, 116 consist of a plurality of interconnected pipes 104. The vertical sections of the pipe segments 104 are preferably provided with heat jackets 106. Reactants are introduced into the reactors 100 by line 107. Catalyst, optionally in conjunction with a co-catalyst or activation agent, is injected in the reactor 100 or 100 or 116 by means of the conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111. Downstream the valve 111 at the exit of the settling leg 109 of reactor 100, a three-way valve 114 is provided which allows to transfer polymer slurry settled in the settling legs 109 to the other reactor 110, by means of the transfer line 112. The transfer line 112 connects the three-way valve 114, provided at the exit of the settling leg 109 of one reactor 100, with the entry in the other reactor 116, where preferably a piston valve 115 is provided. Polymer slurry settled in the settling legs 109 of reactor 116 can be removed by means of one or more product recovery lines 113, e.g. to a product recovery zone.

Referring back to FIG. 11, in another embodiment, the present invention relates to a method for optimising catalyst supply to a polymerization reactor 1 comprising the steps of a) transferring concentrated catalyst slurry from a vessel 2 to a buffer vessel 3, said concentrated catalyst slurry comprising catalyst solid particles suspended in a mineral oil, b) diluting said catalyst slurry in said buffer vessel 3 by supplying a suitable diluent in said buffer vessel 3 whereby diluted catalyst slurry is obtained having a suitable concentration for use in a polymerization reaction, and c) transferring said diluted catalyst slurry from said buffer vessel 3 to said reactor 1 at a suitable flow rate.

Preferably, said method is a method for optimising catalyst supply to a polymerization reactor 1 wherein polyethylene, and preferably bimodal polyethylene, is prepared.

According to the present invention, the Ziegler-Natta catalyst $TiCl_4$ is provided in a commercial container 2 and transferred to vessel 3 as a suspension of solid particles in a mineral oil. The method comprises the step of transferring concentrated catalyst slurry from a vessel 2 to a buffer vessel 3 through conduits 4 provided with pumps 5, preferably progressive cavity pumps.

In the buffer vessel 3 the catalyst slurry is diluted to a suitable concentration, preferably between 0.1 and 10% by weight, and more preferred having a concentration comprised between 0.1 and 5% by weight, and even more preferred between 0.5 and 4% by weight by adding diluent, isobutane, to the vessel 3. Preparing diluted catalyst slurry having these concentrations advantageously enables the further use of diaphragm pumps 15 for injecting the diluted catalyst slurry in the reactor 1. The amount of isobutane diluent can be controlled using the catalyst concentration determined from the density measurement by Coriolis meter 16.

In another embodiment, the method according to the invention comprises controlling the flow rate of the catalyst slurry to the reactor 1 by determining the concentration of a reactant in said reactor 1. Preferably said reactant is the concentration of monomer, i.e. ethylene, in the reactor. However, it should be clear that also determination of other reactants, such as e.g. the co-monomer or the diluent concentrations in the reactor, is comprised within the scope of the present invention. Practically, this mechanism is obtained by providing each conduit for transferring and supplying the catalyst, slurry from the buffer vessel to the reactor with a membrane pump that is capable of being adjusted and regulating the catalyst flow rate in function of the concentration of a reactant in said reactor.

In certain cases it might be required or advantageous to bring the catalyst into contact with a co-catalyst, as indicated above. Therefore, the present invention further provides a method comprising the step of bringing a co-catalyst into contact with said catalyst slurry before supplying said catalyst slurry to said reactor. The present method provides a better contact and formation of a co-catalyst-catalyst mixture then in the case when co-catalyst is directly supplied to a reactor. Supply of a suitable co-catalyst-catalyst mixture to the reactor provides a more controlled and more uniform level of polymerization reactivity in the reactor. Also, pre-contact between catalyst and co-catalyst positively influences the granulometry of the final polymerization product and improves the bulk density and the settling efficiency of the polymerization product prepared in the polymerization reactor. Such method also enables to more precisely control the ratio of catalyst-co-catalyst injection.

Still referring to FIG. 11, in a preferred embodiment, the method comprises bringing a co-catalyst, preferably a co-catalyst as defined above, into contact with said diluted catalyst slurry present in conduits 8. The co-catalyst distribution system 12 preferably comprises at least one storage vessel and a conduit 11 intersecting the conduit 8. In another preferred embodiment the method further comprises enhancing the contact time and the pre-contact of said co-catalyst with said catalyst slurry in conduits 8, by locally enhancing the volume of said conduits 8. Pre-contact between catalyst and co-catalyst positively influences the granulometry of the final polymerization product and improves the bulk density and the settling efficiency of the polymerization product prepared in the polymerization reactor. During the activation process, if too much co-catalyst contacts the catalyst particle, the catalytic activity is not only reduced, but actual harm may result. The present method also advantageously enables to more precisely control the ratio of catalyst/co-catalyst injection.

In another preferred embodiment, the present invention provides a method for continuously supplying catalyst slurry from the buffer vessel 3 to the reactor 1 through conduits 8 at a suitable flow rate. The present invention provides a method that enables to continuously supply catalyst to a reactor, without interruption of the catalyst flow. By this mechanism continuous supply of catalyst slurry without relevant fluctuations to a polymerization reactor is ensured, which will increase the efficiency of the polymerization reaction in the reactor.

In yet another preferred embodiment, the invention relates to a method wherein catalyst flow rate to the reactor is accurately measured, through liquid flow rate measurement using flow measuring means, such as preferably Coriolis flow measuring means.

The present invention also relates to the use of an apparatus according to the present invention for preparing and optimising the supply of a Ziegler-Natta catalyst to a polymerization reactor wherein polyethylene, and preferably bimodal polyethylene, is prepared.

This problem has been solved at least partially by the provision of an olefin polymerization process carried out in the presence of an anti-fouling agent and a chromium-type catalyst, a late Transition Metal type catalyst, or Ziegler Natta catalyst; characterised in that the anti-fouling agent comprises an anti-fouling polymer having an average molecular weight (Mw) of greater than 1000 daltons and containing:

one or more —(CH$_2$.CH$_2$.O)$_k$— where each k is in the range from 1 to 50; and one or more —(CH$_2$.CH(R)—O)$_n$— where R comprises an alkyl group having from 1 to 6 carbon atoms and each n is in the range from 1 to 50, and terminated by a R' and a R" end groups, wherein R' is OH or an alkoxy having from 1 to 6 carbon atoms and R" is H or an alkyl having from 1 to 6 carbon atoms.

In the present process, (CH$_2$CH(R)O)$_n$ blocks generally may be considered to be lipophilic whereas (CH$_2$CH$_2$O)k blocks may be considered to be hydrophilic. Preferably, one end of the polymer is hydrophilic and the other end or the middle of the polymer is lipophilic.

Such an anti-fouling agent is known per se, particularly outside the field of olefin polymerization. In this regard, such an agent is known as a washing detergent.

However, it has been surprisingly found by the present inventors that such an agent may be used advantageously in an olefin polymerization method which uses a chromium-type catalyst, a late Transition Metal-type catalyst, or Ziegler-Natta type catalyst. In particular it has been unexpectedly found that improved activity of the catalyst occurs when this anti-fouling agent is used in a process, which uses a chromium-type catalyst, as compared with using other known anti fouling agents such as Stadis 450. In fact, up to twice the activity has been observed. This is especially unexpected because catalyst poisoning in presence of an anti-fouling agent is a particular problem with chromium-type catalysts because no scavenger such as a metal alkyl is used.

Furthermore, it has been found that no loss of activity occurs when this anti-fouling agent, is used in a process, which uses a late Transition Metal-type catalyst or a Ziegler-Natta type catalyst. This is particularly advantageous since, for logistical reasons, it is preferable to be able to use a single anti-fouling agent in olefin polymerization processes regardless of the type of catalyst (i.e. chromium-type, late Transition Metal-type, Ziegler-Natta type or metallocene. This is however not possible with most previously known anti-fouling agents, without loss of activity with one of the catalyst types.

Also, importantly, the rheology and mechanical properties of the resin product are not substantially modified when the present anti-fouling agent is used.

The present anti-fouling agent has the further advantage in that it is safer to humans than Cr-compounds or agents using an aromatic diluent, for example. This is in part because the present anti-fouling agent does not necessarily require a solvent, thereby avoiding the presence of for example toluene.

Preferably, the anti-fouling polymer is a block polymer, more preferably a triblock polymer.

Preferably, the antifouling polymer is a block polymer of general formula:

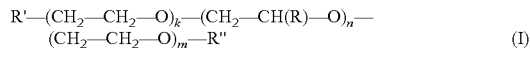

Or

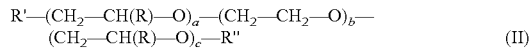

where R comprises an alkyl group; R' and R" are end groups; k is from 1 to 50; n is from 1 to 50; m is greater than or equal to 1; a is from 1 to 50; b is from 1 to 50; and c is from 0 to 50; k and m and a and c may be the same or different.

Preferably R is a C1 to C3 alkyl group. More preferably, R is a methyl group.

Preferably, in one embodiment, k is greater than 1 and m is greater than 1. Also preferably, in another embodiment a is 0 or c is 0.

Preferred R' and R" groups include H; OH; alkyl, and alkoxy groups. Preferred alkyl groups are C1 to C3 alkyl groups. Preferred alkoxy groups are C1 to C3 alkoxy groups. In this regard, as mentioned above, the ends of the polymer should be hydrophilic. Therefore, in formulae (I) and (II) above, it is preferred that R' is OH or an alkoxy group, preferably OH or a C1 to C3 alkoxy group. Further, it is preferred that R" is H or an alkyl group, preferably H or a C1 to C3 alkyl group.

A particularly preferred polymer has general formula (III):

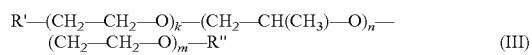

where R', R", k, n, and m independently are as defined anywhere above.

A further preferred polymer has general formula (IV):

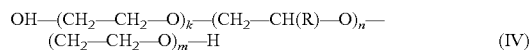

where R, k, n, and m independently are as defined anywhere above.

It will be appreciated that, by virtue of the preferred molecular weights for the present anti-fouling polymer and the preferred ethylene oxide contents in the present anti-fouling polymer given above, preferred values for a, b, c, k, n, and m can be derived.

It will be understood in the present process that, where necessary, an activating agent will be needed to activate the catalyst (e.g; Ziegler-Natta catalyst) or to modify the product polymer properties. Suitable activating agents, where needed, are well known in this art. Suitable activating agents include organometallic or hydride compounds of Group I to III, for example those of general formula AlR$_3$ such as Et$_3$Al, Et$_2$AlCl, and (i-Bu)$_3$Al. One preferred activating agent is triisobutylaluminium.

When the polymerization process is a slurry polymerization process, it is carried out in suspension in a liquid diluent. The diluent can be the liquid monomer or comonomer per se (e.g. propylene, hexene), or an inert liquid such as an alkane. Preferred alkane diluents include isobutane, propane, butane, pentane, hexane, isohexane, cyclohexane, and mixtures thereof.

The anti-fouling agent may be added at any suitable stage in the process. The addition can be carried out continuously or batch wise. The anti-fouling agent may be added to the polymerization medium separately or may be mixed with the monomer or with the comonomer and then added to the polymerization medium. Advantageously, the anti-fouling agent may be added via the monomer header in order to introduce the agent evenly in the reactor.

The anti-fouling agent desirably is liquid at room temperature and, as such, the anti-fouling polymer is liquid at room temperature. There are two principle factors which determine whether the anti-fouling polymer is liquid at room temperature. These are: the molecular weight of the anti-fouling polymer and the wt % ethylene oxide in the anti-fouling polymer.

Preferably, the wt % ethylene oxide in the anti-fouling polymer is in the range of from 5 to 40 wt %, more preferably from 8 to 30 wt %, even more preferably from 10 to 20 wt %, most preferably about 10 wt %.

Further, the anti-fouling polymer preferably has a molecular weight (MW), not higher than 5000. In order to avoid any poisoning effect on the catalyst and to minimise elution of residues from the formed polymer product, the molecular weight is greater than 1000 Daltons, preferably greater than 2000 Daltons, more preferably in the range from 200-4500 Daltons.

It will be understood from the above that in order to ensure that the anti-fouling agent is liquid at room temperature, one must balance the molecular weight of the anti-fouling polymer and the wt % ethylene oxide in the anti-fouling polymer. It is to be noted that the activity of the anti-fouling polymer decreases as the molecular weight increases. Therefore, in practice, it may be desirable to increase the wt % ethylene oxide in the anti-fouling polymer in order to ensure that the anti-fouling agent is liquid at room temperature, rather than increase the molecular weight of the anti-fouling polymer.

It will be appreciated from the above that the molecular weight of the antifouling polymer should be selected in combination with the wt % ethylene oxide content in the anti-fouling polymer. For guidance value, the present inventors have found that an anti-fouling polymer having an ethylene oxide content of 10 wt % and a molecular weight in the range of from 4000 to 4500 is particularly useful in the present process.

Generally, the anti-fouling polymer is used at the lowest possible concentration effective to prevent or substantially reduce fouling. This can be determined by routine experimentation. Preferably it is used at a concentration of from 0.5 to 20 ppmw in the polymerization medium, more preferably from 2 to ppmw.

Preferably the present process may be used to make homopolymers of ethylene or copolymers or higher order polymers of ethylene and one or more comonomers. The copolymer or higher order polymer may be in a random, alternating, or block configuration. Preferred comonomers are alpha olefins including, for example, propylene, 1-butene, 1-hexene, 4-methyl 1-pentene, 1-octene. The process can further be used to make homopolymers or copolymers of other alpha olefins, for example propylene, butene and the like. It has been found that the present process is particularly effective when making high density polyethylene, although the process is not so limited.

Where the copolymer or higher order polymer is in a block configuration, one way of making the polymer is to make the homopolymer "blocks" and, subsequently, to introduce these pre-made "blocks" into the polymerization medium with a comonomer. Alternatively, the "block" polymer can be made in a polymerization medium containing the propylene monomer with a small quantity of the comonomer.

A preferred reaction temperature range may be said to be from 40° C. to 130° C., preferably from 50 to 120° C., more preferably from 70 to 10° C. for ethylene polymers.

A preferred applied pressure range may be said to be from 5 to 200 bars, more preferably from 30 to 70 barg, depending on the reactor configuration and on the diluent.

Generally, chromium-type catalysts usable in the present process comprise a chromium-oxide type catalyst, preferably chromium oxide associated with at least one of silica, alumina, titania, aluminophosphate or thoria. Such catalysts are well known in the art. Preferred chromium-oxide-type catalysts include Cr on silica, Cr on silica doped with titania, alumina, aluminophosphate, fluorine or mixtures thereof, and Cr on aluminophosphate.

Late transition metal catalysts usable in the present process include nickel complexes and iron complexes such as disclosed for example in Ittel at al. (S. T. Ittel L. K. Johnson and M. Brookhart, in Chem. Rev., 2000, 1169.) and in Gibson and Spitzmesser (V. C. Gibson and S. K. Spitzmesser, in Chem. Rev., 2003, 283. Catalysts of this type will be well known to a person skilled in this art.

Generally, Ziegler-Natta type catalysts usable in the present process comprise a transition metal compound of Group IV-VII (mainly Ti, Zr or V) supported on a carrier. Such catalysts are well known in the art. Examples of Ziegler-Natta catalysts are $TiCl_4$, $TiCl_3$, $VCl_4$, $VOCl_3$. Titanium chloride supported on a $MgCl_2$ support or a $MgCl_2$/silica support are preferred.

One bulk reactor type which may be applied in slurry polymerization processes is a turbulent flow reactor such as a continuous pipe reactor in the form of a loop. A continuous pipe reactor in the form of a loop is operated in liquid full mode, using liquid monomer or a diluent as the liquid medium. Such a so-called loop reactor is well known and is described in the Encyclopedia of Chemical Technology, $3^{rd}$ edition, vol. 16 page 390. This can produce LLDPE and HDPE resins in the same type of equipment.

A loop reactor may be connected to one or more further reactors, such as another loop reactor. A loop reactor that is connected to another loop reactor may be referred to as a "double loop" reactor.

Other types of bulk reactors such as stirred tank reactors may be used instead of a loop reactor again using the bulk monomer or a diluent as the liquid medium. A stirred tank reactor also may be used in combination with a loop reactor, where a first reactor that is a loop reactor is connected to a second reactor that is a stirred tank reactor.

In some cases it may be advantageous for a gas phase reactor also to be incorporated. The gas phase reactor may be a second reactor that is connected to a first reactor such as a loop reactor or a stirred tank reactor. Alternatively, a gas phase reactor may be connected as a third reactor in the apparatus. In the gas phase reactor (if present), the elastomeric part of a copolymer or higher order polymer product may be produced. The elastomeric part of the polymer product gives impact properties to the product. The elastomeric part of the polymer product typically is comonomer rich.

The bulk reactor(s) may be connected to a gas phase reactor, for example where it is desirable to prepare a "block" polymer.

Figure 16:
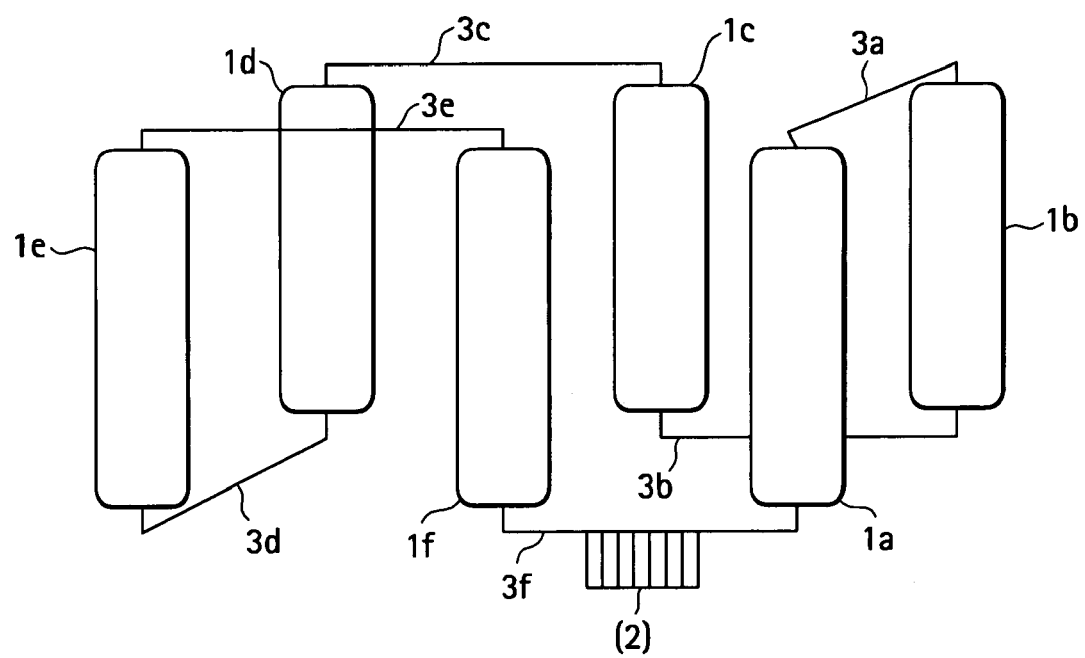
FIG. 16 shows a loop reactor usable in a process according to the present invention.

The following embodiment describes a loop reactor system with reference to FIG. 16:

A monomer (for example ethylene) polymerizes in a liquid diluent (for example isobutane), hydrogen, catalyst, activating agent, anti-fouling gent, and optionally in the presence of a comonomer (for example hexene). A reactor essentially consists of four or more vertical jacketed pipe sections (1a, 1b, 1c, 1d, 1e, 1f) connected by trough elbows (3a, 3b, 3c, 3d, 3e, 3f), see FIG. 16 which shows a reactor with six vertical jacketed pipe sections. There are three lower trough elbows in the reactor in FIG. 3 (3b, 3d, 3f) and three upper trough elbows (3a, 3c, 3e). The slurry is maintained in circulation in the reactor by an axial pump (2). The polymerization heat may be extracted by water cooling jackets around the vertical pipe sections (legs). The reactants, diluent and antifouling agent conveniently are introduced into one of the lower trough elbows of the reactor. Typically, the reactants, diluent and antifouling agent are introduced close to the circulating pump, for example in position "4", as shown in FIG. 16.

The product (for example polyethylene) may be taken out of one or more of the lower trough elbows of the reactor, with some diluent. Typically, the product is removed from a different trough elbow to the trough elbow into which the reactants, diluent and antifouling agent are introduced. For example, in FIG. 16, when the reactants, diluent and antifouling agent are introduced at position "4", the product could be removed from trough elbow 3b or 3d.

Slurry removal can be performed using a wash column or centrifuge apparatus.

Alternatively, slurry removal can be performed through settling legs and discontinuous discharge valves. In this discontinuous discharge system, a small fraction of the total circulating flow is withdrawn.

Alternatively, a continuous discharge system can be used.

If run in series, the product of the first loop reactor collected through the slurry removal system is reinjected in the second reactor with additional diluent and monomer. If required, additional antifouling agent can also be added to the second reactor. A concentration of the slurry between the reactors can sometimes be performed, e.g. through the use of hydro-cyclone systems.

If the slurry does not need to be transferred to another reactor, it is moved to a polymer degassing section in which the solid content is increase.

While being depressurised, the slurry is degassed, for example during transfer through heated flash lines to a flash tank, in the flash tank, the product and diluent are separated. The degassing is completed in a purge column. The powder product is then further additivated and processed into pellets or additivated powder.

Figure 17:
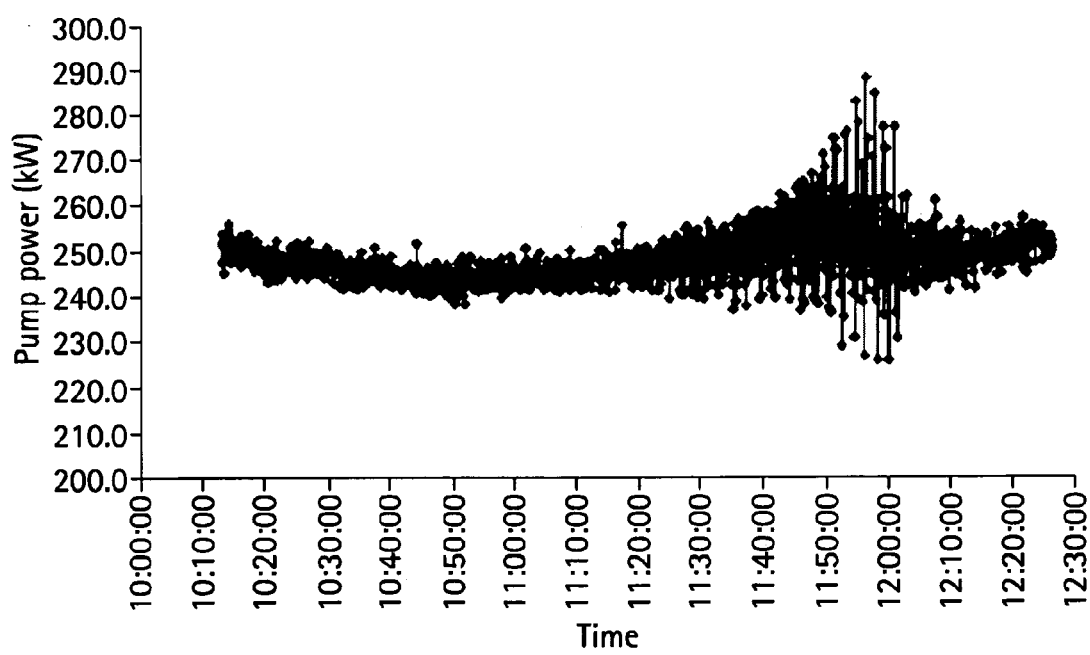
FIG. 17 represents the pump power expressed in kW as a function of time expressed in hours for a loop reactor without by-pass during an uncontrolled swelling.

The pump power consumption in normal operating conditions is displayed on FIG. 17 representing the pump power expressed in kW as a function of time expressed in hours. Typically the pump power consumption is of the order of 200 kW to 800 kW depending on the reactor size and shape and the standard deviation of the signal due to white noise is of the order of 1 to 10 kW. As the solid content increases, the pump power consumption increases very slowly keeping the same level of white noise. When swelling occurs, the standard deviation starts increasing and reaches progressively an unacceptable level causing the system to shut-off as seen on the same FIG. 17.

Figure 18:
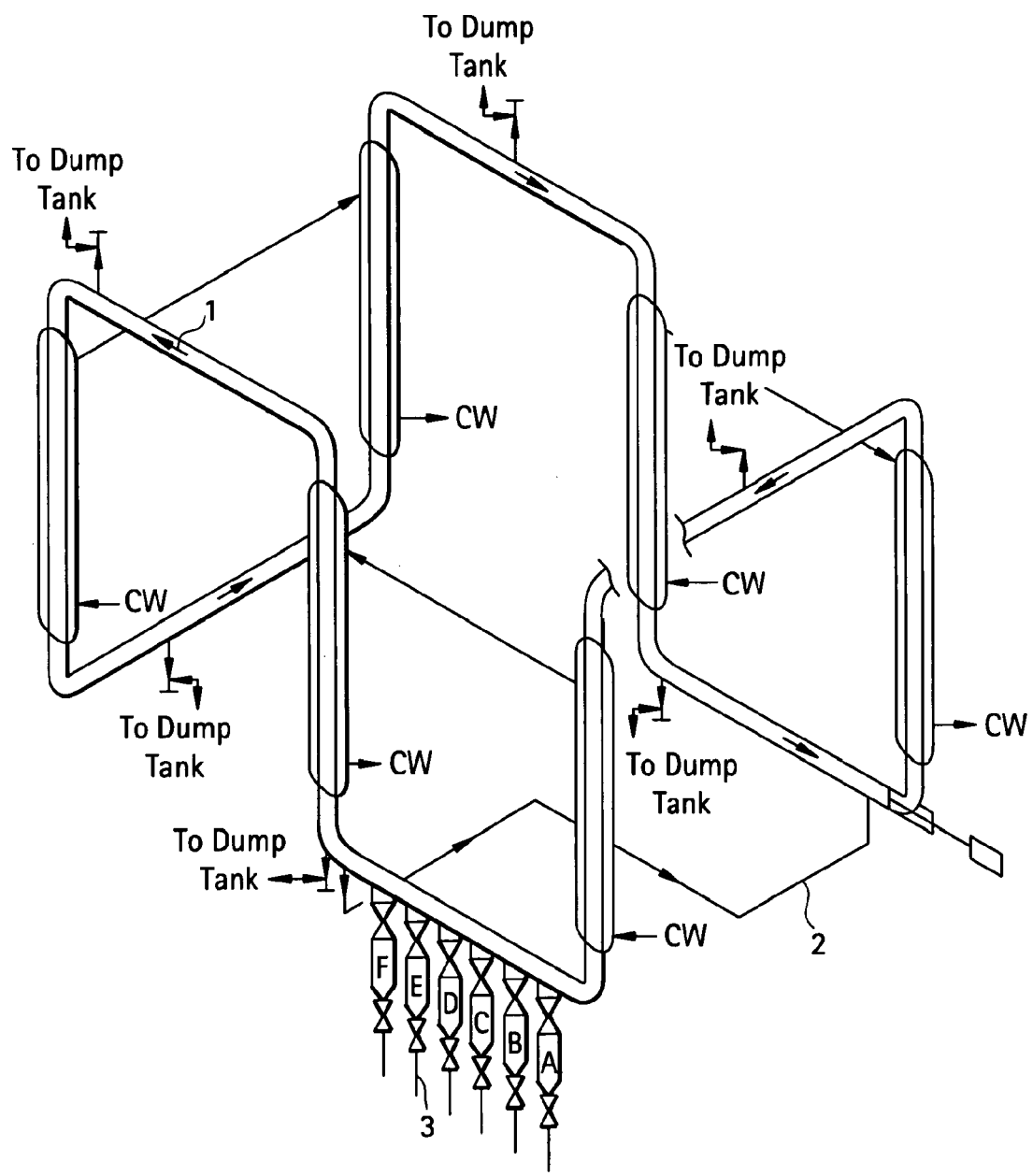
FIG. 18 represents schematically the loop reactor (1) with a by-pass line (2) inserted between two points of the main loop, it also includes the settling legs (3).

The invention is further illustrated in the following figures:

FIG. 18 represents schematically the loop reactor (1) width a by-pass line (2) inserted between two points of the main loop, it also includes the settling legs (3).

Figure 19:
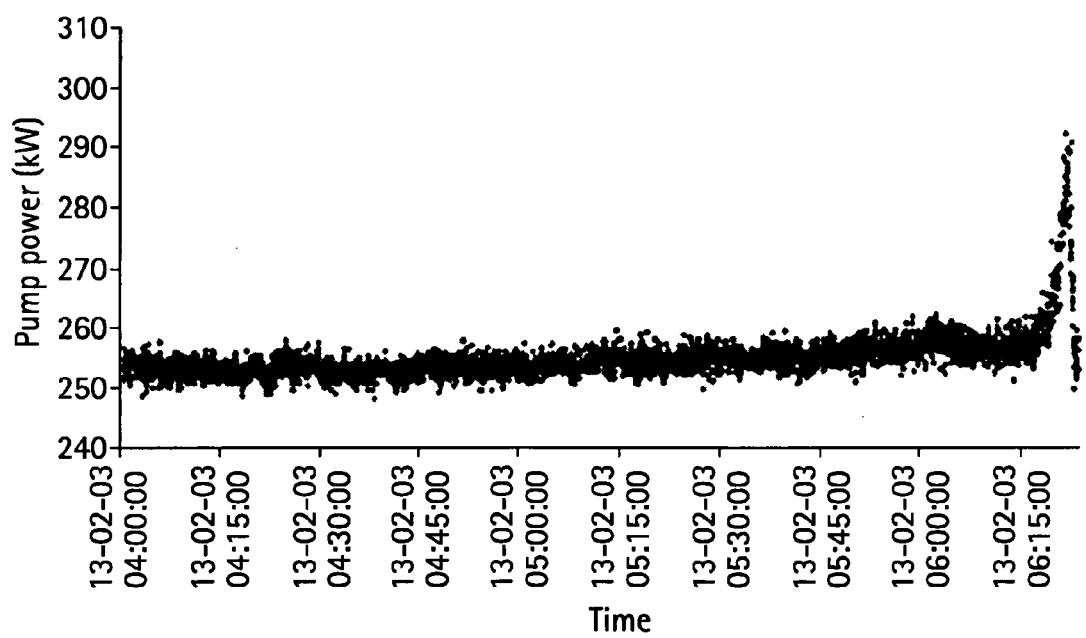
FIG. 19 represents the pump power expressed in kW as a function of time expressed in hours for a loop reactor equipped with a by-pass line during an uncontrolled swelling.

FIG. 19 represents the pump power expressed in kW as a function of time expressed in hours for a loop reactor equipped with a by-pass line during an uncontrolled swelling.

Figure 20:
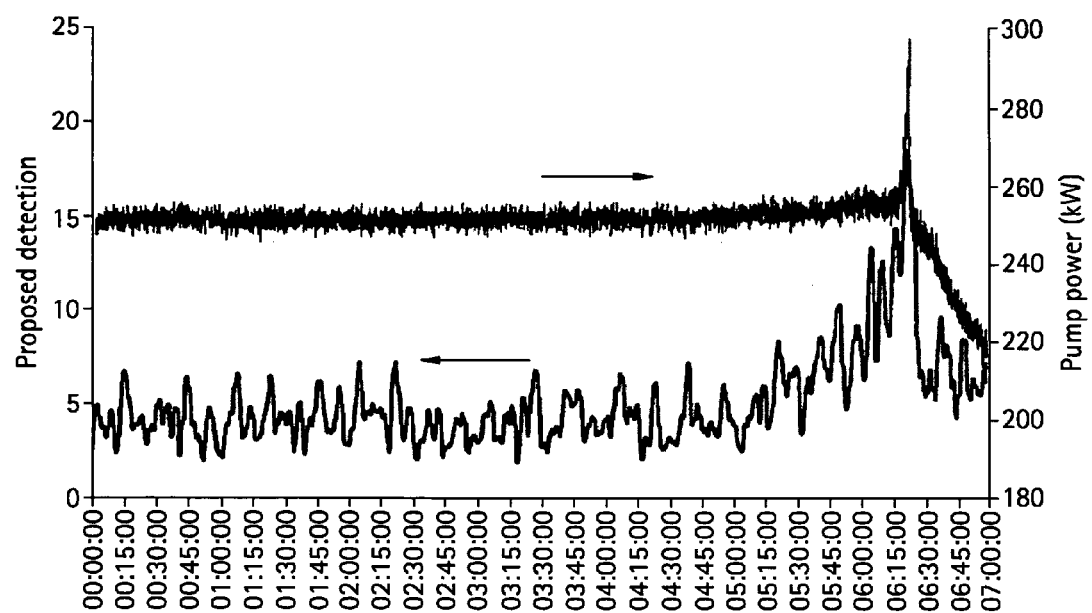
FIG. 20 represents the proposed processed signal used for controlling the dilution of the reactor in the case of the swelling corresponding to FIG. 3. The pump power is displayed on top to allow a better visualisation of the reaction time of the detection.

FIG. 20 represents the proposed processed signal used for controlling the dilution of the reactor in the case of the swelling corresponding to FIG. 3. The pump power is displayed on top to allow a better visualisation of the reaction time of the detection.

Other plant control measurements like (but not limited to) the temperature of the reactor, the density of the slurry and the temperature change experienced by the cooling water circulating in all or a portion of the cooling jacket also all exhibit variations in the standard deviation that increases with increasing solids concentration.

Surprisingly, it is found that this fluctuation increase is due to the superposition to the constant white noise of a unique signal characteristic of the reactor. The amplitude of said unique signal progressively increases during the swelling phenomenon.

Several parameters of the signal have been studied such as for example the standard deviation, or the variance, or the fluctuation range, or any other function monotonically related to the standard deviation. Usual mathematical signal treatments, such as for example deconvolution, frequency filtering, standard pattern recognition techniques may be applied to the signal before computation of the variance related detector, depending on the strength of the unique signal characteristic of the reactor just mentioned here above.

The swelling is controlled by diluting the reactor medium, thereby decreasing the solid content and the temperature.

As soon as the signal parameters of pump power consumption increase above a pre-determined threshold, the control loops of the reactor are modified in order to inject more diluent in the reactor. The amount of injected diluent increases progressively up to a new value that is typically twice larger than the starting value. A typical diluent is isobutane. This control scheme is tuned to keep the reactor just at the onset of swelling in order to maximise the solids concentration and thus the yield of the installation.

The present invention thus discloses a method for controlling the swelling that comprises the steps of:
  a) providing a loop reactor, said reactor being optionally equipped with one or more devices aimed at improving the homogeneity of the circulating slurry;
  b) measuring as a function of time, one or more plant control parameters that displays an increasing level of fluctuation during swelling;
  c) processing these measurements in real-time, including amplifying the signal to noise ratio if required;
  d) identifying in real-time the onset of swelling;
  e) progressively diluting the reactor when the fluctuation level reaches a pre-determined level.

The device aimed at improving the homogeneity of the circulating slurry can be a by-pass line wherein the circulating slurry has a different travel time than in the main line.

The pre-determined level is defined as a percentage of the fluctuation level measured at low solid content. This percentage is of less than 300%, preferably of less than 250%, most preferably of less than 180%.

The present invention discloses a slurry loop reactor wherein all internal parts of the reactor in contact with the slurry are polished first by a mechanical process to a roughness level of at most 70 RMS (root mean square) and are subsequently polished by a chemical or electrochemical process, to a final level of roughness of at most 40 RMS.

There are two methods for defining the level of roughness of a surface; the arithmetic mean roughness value $R_a$ (CLA), specified by the methods of standard tests DIN 4768/1, DIN 4762/1 or ISO/DIS 4287/1, and the root mean square roughness value $R_q$ (RMS), specified by the methods of standard tests DIN 4762/1 or ISO/DIS 4287/1.

Ra is the arithmetical average value of all absolute distances y of the roughness profile R from the centre line with measuring length $l_m$; it can be written as $$Ra = 1/l_m \int_{x=0}^{x=l_m} |y(x)| dx$$

Rq is defined as the RMS value of a profile calculated over a single sampling length, but it can be expressed as the mean result of 5 consecutive sampling lengths $l_m$; it can be expressed as $$Rq = sqrt\left(1/lm \int_{x=0}^{x=l_m} y^2(x) dx\right)$$

These are represented in FIG. 21 showing surface roughness profiles calculated both with the arithmetic and with the root mean square methods.

In the present invention the RMS method was adopted.

Preferably, the final level of roughness is of about 32 RMS (0.8 microns)

The present invention also discloses the use, in the production of a polyolefin, of a slurry loop reactor wherein all internal parts in contact with the slurry are first polished by a mechanical process to a level of at most 70 RMS roughness value and are subsequently polished by a chemical or electrochemical process to a final level of at most 40 RMS roughness value.

The reactor material can be selected from carbon steel, stainless steel or carbon steel with stainless steel cladding. Preferably, it is carbon steel. Typically the level of roughness of the untreated material is of at least 250 RMS.

The mechanical polishing is known in the art and uses consecutive sand papers having appropriately decreasing level of coarseness. Typically the mechanical polishing can bring the level of roughness down to a value of about 63 RMS.

The electrochemical polishing is known in the art and is disclosed for example in U.S. Pat. No. 4,772,367 that describes a method for polishing and/or pickling the inner surfaces of tubes with a polishing head. The polishing head comprises a dielectric, outer wall defining a narrow working gap with respect to the surface to be polished allowing for the electrolyte to flow through said gap.

The chemical polishing is also known in the art and is described for example in U.S. Pat. No. 5,047,095. Large objects such as the reactor parts are treated using a spray-on technique. For tubes or pipes the treating solution is pumped through the tube. The amount of metal removed is controlled by the immersion time whereas the rate of metal removal is controlled by the concentration of the polishing solution. Typically the rate of removal is of from 1 to 3 microns/minute.

Typically, the polishing aqueous solution has a pH of from 1 to 6, preferably of from 3.5 to 5. It comprises, as an essential ingredient, orthophosphoric acid and/or condensed phosphoric acids and/or water soluble salts thereof and one or more carboxylic acids having either two or three carboxyl groups per molecule, optionally one or more surfactants and optionally one or more corrosion inhibitor.

Preferably, alkali metal salts and/or ammonium salts or orthophosphoric acid and/or condensed phosphoric acids are used as the phosphate component.

Suitable alkali metal salts include salts of lithium, sodium, potassium, rubidium or cesium. The preferred alkali metal salts are sodium and potassium salts.

Suitable ammonium salts contain either an $NH_4^+$ cation or one or more organic substituents on the nitrogen atom, said substituents being preferably alkyls having from 1 to 6 carbo atoms. $NH_4^+$ salts are most preferred.

Typically the aqueous solution contains 0.2 to 12 wt % of the phosphate component. The quantities by weight are based on the prepared in-use solution.

Individual compounds or mixtures of di- and tri-carboxylic acids are used in amounts of 0.01 to 1 wt % in the aqueous solution.

Surfactants, if present can be added in amounts of at most 2 wt %, preferably from 0.005 to 2 wt %.

Corrosion inhibitors, if present can be added in amounts of at most 0.2 wt %, preferably from 0.01 to 0.2 wt %.

Polishing is carried out at a temperature of from 20 to 60° C., preferably at room temperature (about 25° C.).

The treatment time depends upon the nature of the material and upon the final level of roughness to be achieved. Typically it is of from 10 to 60 minutes.

Preferably, the solution is circulated in order to carry away the detached metal particles and impurities, thereby increasing the rate of metal removal.

The chemical polishing comprises the steps of:
degreasing and activating the surfaces (pre-treatment);
polishing and deburring with the polishing solution (treatment);
passivating and drying (post-treatment).

Rinsing with water is carried out between each step.

Typically, 0.1 $dm^2$ of surface can be treated by about 1 liter of polishing solution.

The finished internal surfaces of the reactor have a level of roughness inferior to 1 μm, and they are free of burrs and fissures.

It has been observed that polishing the internal surfaces of the reactor is particularly useful in the polymerization of a polyolefin, especially in the polymerization of ethylene, more especially in the polymerization of high molecular weight polyethylene.

Polymerization is carried out in a loop reactor in a circulating turbulent flow. A so-called loop reactor is well known and is described in the Encyclopaedia of Chemical Technology, $3^{rd}$ edition, vol. 16 page 390. This can produce LLDPE (linear low density polyethylene) and HDPE (high density polyethylene) resins in the same type of equipment. A loop reactor may be connected in parallel or in series to one or more further reactors, such as another loop reactor. A loop reactor that is connected in series or in parallel to another loop reactor may be referred to as a "double loop" reactor.

In a double loop reactor the process is a continuous process. A monomer (e.g. ethylene polymerizes in a liquid diluent (e.g. isobutene) in the presence of a comonomer (e.g. hexene), hydrogen, catalyst, and activating agent. The slurry is maintained in circulation by an axial pump consisting in a reactor essentially of vertical jacketed pipe sections connected by trough elbows. The polymerization heat is extracted by a water cooling jacket. The reactor line includes two double loop reactors that can be used in parallel or in series. The approximate volume of the reactors may be about 100 $m^3$. Monomodal grades are produced with the parallel or series configuration and bimodal grades are produced with the series configuration.

The product (e.g. polyethylene) is taken out of the reactor with some diluent through settling legs and discontinuous discharge valves. A small fraction of the total circulating flow is withdrawn. It is moved to a polymer degassing section in which the solid content is increased.

While being depressurised, the slurry is transferred through heated flash lines to a flash tank. In the flash tank, the product and diluent are separated. The degassing is completed in a purge column. A conveyor drying unit may be employed before the purge column in some instances The powder product is transported under nitrogen to fluff silos and extruded into pellets along with some specific additives. A pellet treatment unit comprising silos and hot and cool air flows allows the removal of residual components from the pellets. The pellets then are directed to homogenization silos before final storage.

This embodiment of the double loop reactor process is usable with chromium type, Ziegler-Natta-type and metallocene-type catalysts. Each catalyst type would have a specific injection system.

It will be seen from the above that the present invention relates to control of the polymerization reaction in the production process.

Figure 22:
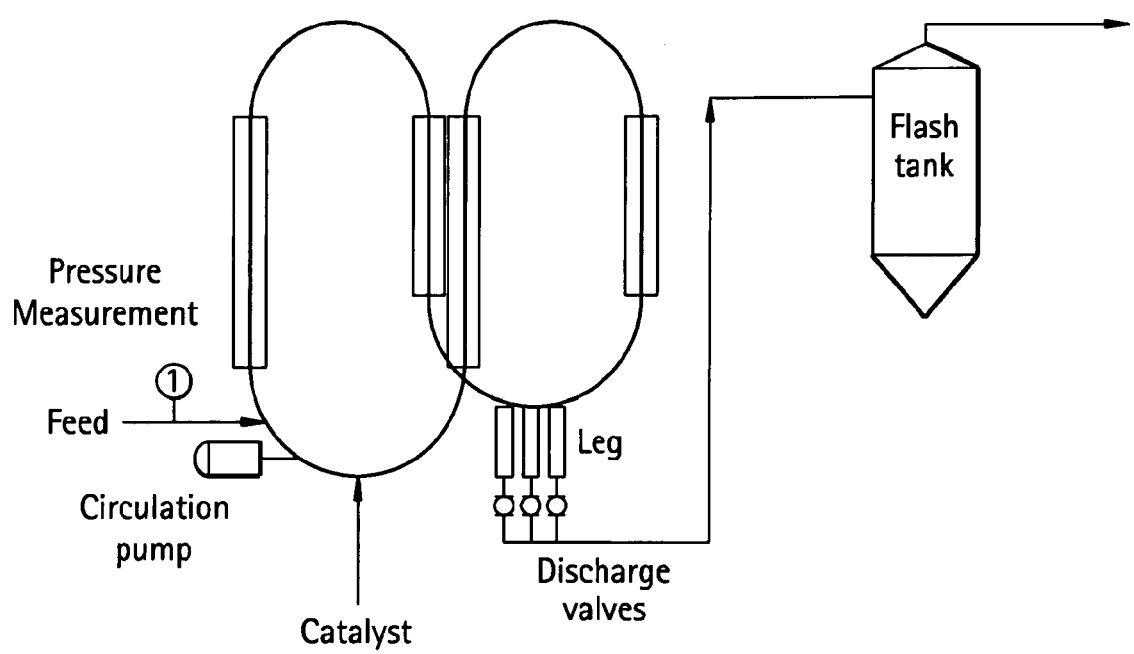
FIG. 22 shows a diagram of a double loop reactor with a pressure monitoring means attached.

FIG. 22 shows a diagram of a double loop reactor with a pressure monitoring means attached.

The pressure curve can be measured using a pressure meter of any standard type. The pressure meter may be connected to the reactor by any means, such as via a connection pipe comprising a valve. Preferably it is installed in the ethylene feed line at the entrance of the reactor. Alternatively, a Dynisco® type transmitter can be placed in the reactor itself in order to better represent the pressure status inside the reactor. The valve may be opened or closed to initiate and end the pressure drop process which gives rise to the pressure curve. Preferably the valve is electronically controlled. Typically, the pressure is continuously measured; this allows the time between discharges through the discharge valves to be controlled in addition to providing the data necessary to identify the pressure drop after a discharge as hydraulic or non-hydraulic.

In a preferred embodiment, the pressure drop is only initiated when the pressure in the reactor reaches a certain threshold pressure. This threshold pressure may be selected depending on the nature of the reactants, the temperature in the reactor, the monomer concentration, and other characteristics of the reaction system (e.g. choice of catalyst, choice of solvent). These factors all have an influence on the solubility of the reactants, which affects the desired pressure, and are well known in the art. The type of reactor employed may also influence this choice if desired. For instance, a reactor that is taller needs more pressure at the bottom, because the pressure at the top will be lower. Typically a threshold pressure of 35-50 Bar is employed, more preferably from 38-45 Bar and most preferably from 40-43 Bar. A pressure of approximately 43 Bar is particularly preferred. 40-43 bar, is desirable in a preferred process, using isobutane as a solvent, but other pressures may be appropriate depending on reactants and solvent. Either in addition to this, or as an alternative, pressure drop measurements may be made at a desired time, or point in the process, or simply over regular time periods. The nature of the process and apparatus will determine the frequency and timing of pressure drop measurements.

Figure 23:
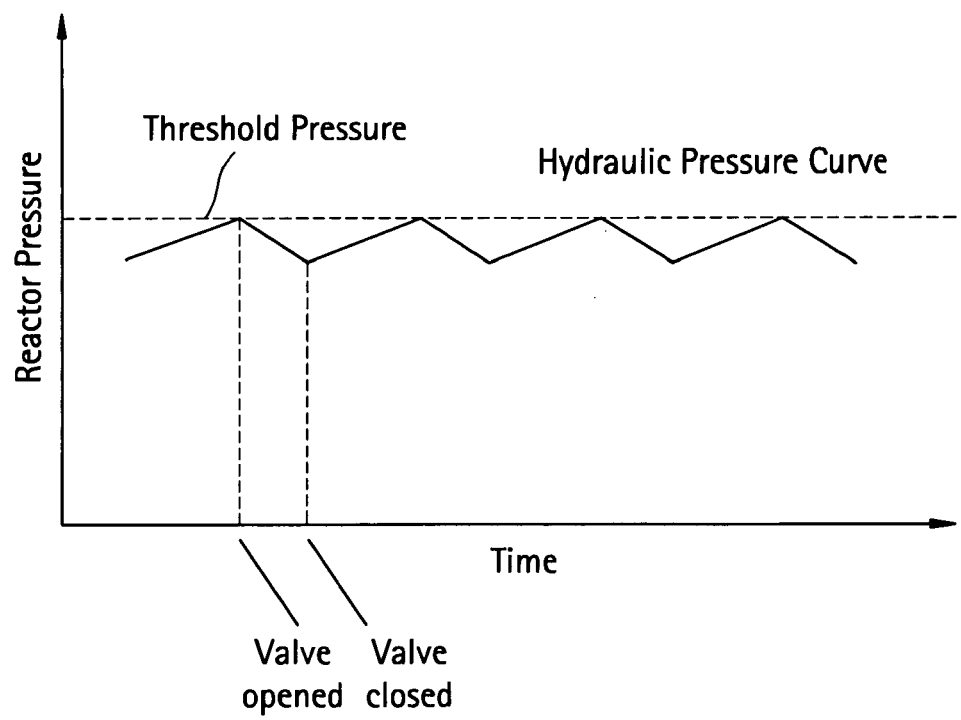
FIG. 23 shows an example of a hydraulic pressure curve.
Figure 24:
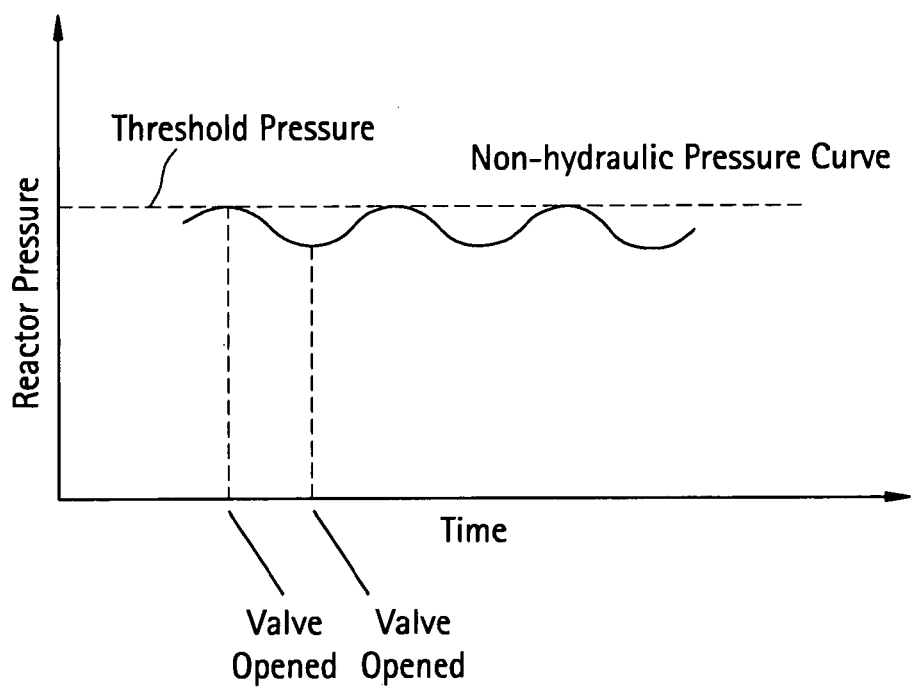
FIG. 24 shows an example of a non-hydraulic pressure curve.

Generally the pressure drop is initiated by opening a valve to remove product from the reactor. Since product must be removed from the reactor at periodic intervals (after it collects in the settling legs), and since there is inevitably a pressure drop at this time, then it is often most convenient to initiate the pressure drop by removing product, rather than introducing a separate pressure drop initiation. In a typical embodiment according to the present invention, the valve opens intermittently with a frequency of from 4 to 7 seconds and for a length of time of less than 5 seconds, allowing for a pressure drop of from 0.5 to 1.5 bars, preferably, of about 1 bar. The valve itself has a diameter of from 4 to 8 cm. (see FIGS. 23 and 24).

In the present invention, it is important to distinguish between a hydraulic pressure curve and a non-hydraulic pressure curve. A hydraulic pressure curve is characteristic of a liquid system wherein the liquid is non-compressible, whereas a non-hydraulic pressure curve is characteristic of a system containing at least some gas. The shapes of these curves are distinctive, and measuring a pressure curve for a pressure drop as defined above will allow the determination of whether the system comprises any gaseous products. The nature of hydraulic and non-hydraulic systems is well known in the art allowing ready identification of which system is present from the measured pressure curve. The shape of the pressure curve allows the distinction between hydraulic and non-hydraulic systems to be determined. Thus, in a non-hydraulic system the shape of the pressure curve is much smoother and there are less pressure variations when product discharge from the reactor occurs, since the gas that is present acts as a damper (see FIGS. 23 and 24). It will be clear from these Figures that the pressure curve is preferably identified as characteristic of a non-hydraulic system if the curve is not a saw-toothed type curve.

In the present invention the selected monomer concentration is higher than in known methods. Typically, the selected monomer concentration ranges from 7-15 wt. %. More preferably, the selected monomer concentration ranges from 10-12 wt. %, and most preferably from 11-12 wt. %. The concentration is maintained as high as possible using the present method. Monomer concentration may be selected initially at a desired level, and maintained at that level over the course of the reaction. Preferably, the pressure curve is continuously monitored. However, in some embodiments the pressure curve may be measured after a certain time, and/or if the pressure reaches a certain threshold. The monomer concentration may be reduced, maintained or increased as desired, based upon the results of the pressure curve monitoring or measurement. If desired, a feedback mechanism may be employed to automate the control of the monomer concentration.

The temperature employed in the reactor is not particularly limited, and may be selected depending upon the reactants employed, the reactor vessel and the monomer concentration, amongst other factors. Preferably, however, the temperature employed for polymerization ranges from 70-120° C. More preferably the temperature employed ranges from 80-110° C.

The solvent employed in the process is not especially limited, provided that it is suitable for polymerizing the chosen monomer under the selected reaction conditions. Preferably the solvent comprises butane and/or hexane, especially for the polymerization of ethylene or propylene. The temperature has an influence on the solubility of the reactants and in general solubility will be higher at lower temperatures. Thus the choice of temperature and solvent is typically taken in combination.

In a particularly preferred embodiment of the invention, the olefin monomer is selected from ethylene and propylene.

The present invention also provides an apparatus for polymerizing an olefin monomer, which apparatus comprises the following:

(a) a reactor for polymerizing the olefin monomer;
(b) a means for measuring the presence of gas in the reactor; and
(c) a means for controlling the concentration of olefin monomer in the reactor;

wherein, the means for measuring the presence of gas in the reactor is a means capable of measuring a pressure curve in the reactor to determine whether the pressure curve is characteristic of a hydraulic system or a non-hydraulic system.

As mentioned above, the pressure measurement may be automated and may feed back to the means for controlling the monomer concentration Thus, after a certain period of time, or at a threshold pressure in the reactor, the pressure curve is measured. The results of this measurement may be fed into an electronic system for controlling monomer concentration, which may prevent or slow the introduction of monomer into the reactor, or may increase the introduction, as desired.

Preferably, the means for measuring the presence of gas in the reactor comprises a pressure meter and a valve for releasing pressure in the reactor.

The invention is described in terms of the polymerization of ethylene. Suitable "ethylene polymerization" includes but is not limited to homo-polymerization of ethylene, co-polymerization of ethylene and a higher 1-olefin co-monomer such as butane, 1-pentene, 1-hexene, 1-octene or 1-decene. More in particular, the present invention is described in terms of the polymerization of ethylene for manufacturing bimodal polyethylene (PE). "Bimodal PE" refers to PE that is manufactured using two reactors, which are connected to each other in series. However, the invention is applicable to any polymerization reaction where it is desired to take and analyze a sample from a polymerization reactor in an accurate way, or to improve the polymerization reaction in the reactor.

In a preferred embodiment, ethylene polymerization comprises feeding to a reactor the reactants including the monomer ethylene, a light hydrocarbon diluent, a catalyst and optionally a co-monomer and hydrogen. In an embodiment of the present invention, said co-monomer is hexene and said diluent is isobutane.

As used herein, the term "polymerization slurry" or "polymer slurry" or "slurry" means substantially a two-phase composition including polymer solids and liquid. The solids include catalyst and a polymerized olefin, such as polyethylene. The liquids include an inert diluent, such as isobutane, with dissolved monomer such as ethylene, co-monomer, molecular weight control agents, such as hydrogen, antistatic agents, antifouling agents, scavengers, and other process additives.

Figure 25:
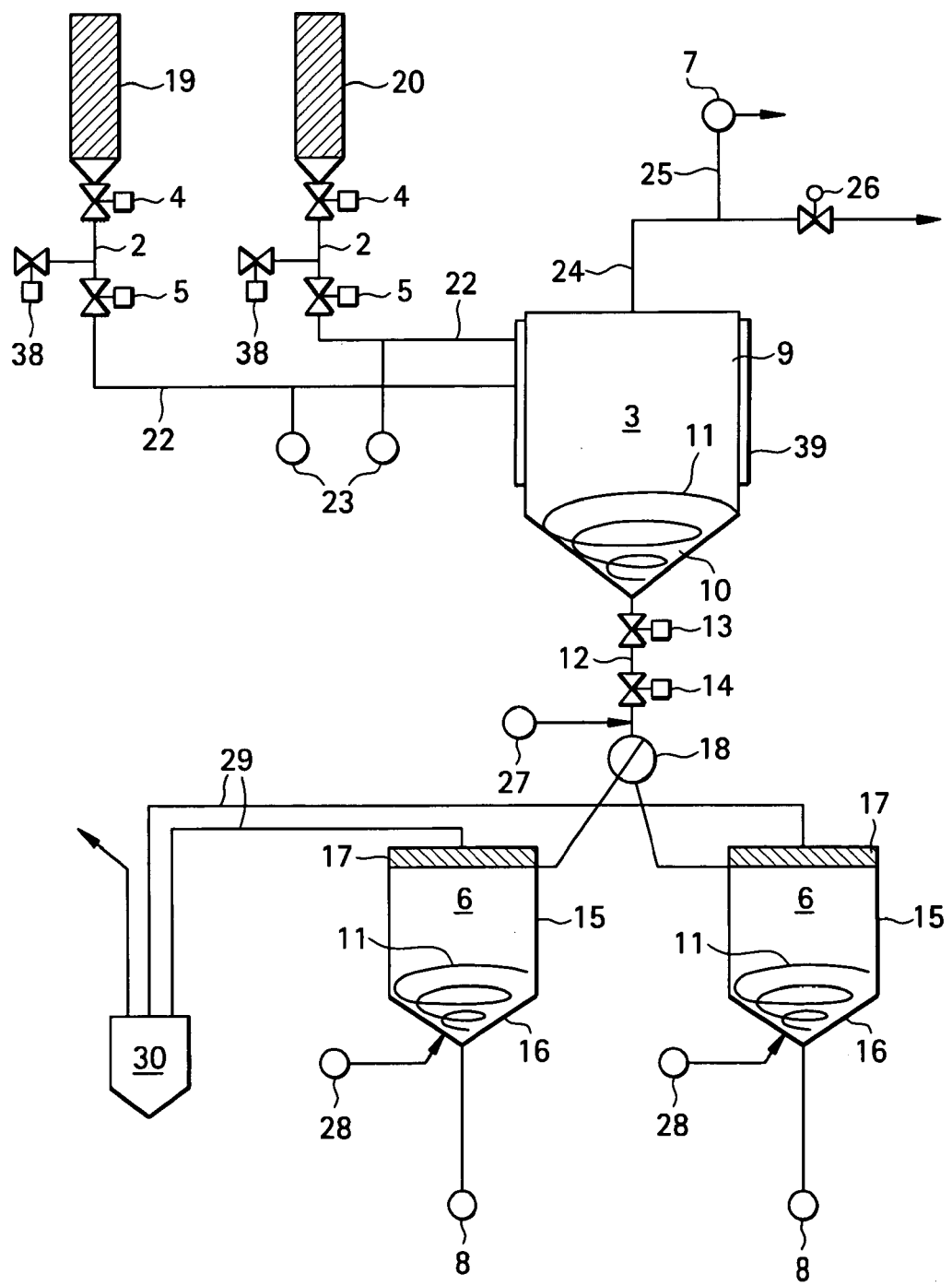
FIG. 25 represents a schematic view of an embodiment of a sampling device according to the present invention.

In another aspect, the present invention relates to a sampling device for taking out and analyzing a sample from a polymerization reactor. Referring to FIG. 25, there is illustrated an embodiment of a sampling device 1 according to the invention. In a particularly preferred embodiment, the sampling device 1 according to the invention consists of two conduits 2, each connected to one sample flash tank 3, which is connected to two sample receivers 6, as illustrated on FIG. 25. However, it is clear that the present device may contemplate more conduits, sample flash tanks and/or sample receivers. It is clear from the present description that numbers of dimensions of the different parts of the sampling device can be related to the size of the polymerization reactors and can be changed in function of the reaction sizes.

The term "sample" as used herein refers to a slurry sample that is taken out of the reactor. In the sample flash tank, most of the light hydrocarbon diluent, unreacted ethylene and co-monomer evaporates and is removed from the sample flash tank. A portion of the removed gas is taken for analysis. The solids, i.e. polyethylene in powder form, remaining in the sample flash tank are transferred to sample receivers in which remaining light hydrocarbon and co-monomer is removed and the resulting polyethylene powder is analyzed. Thus, according to this invention, the sample is separated in a gas and a solid phase, which are both analyzed.

The device comprises one or more sample conduits 2, for taking a sample out of said reactor. An effective analyzing amount of slurry is removed via two conduits 2 from a polymerization reactor 19. In FIG. 25, it is illustrated that a sample is obtained from two separate reactors 19, 20, which are not interconnected. In a preferred embodiment said reactors consist of liquid full loop reactors. Loop reactors are known in the art and need not be described herein in detail. However, it should be understood that the present device can also be applied to take samples of reactors, in particular liquid full loop reactors, which are connected in series, as illustrated on FIG. 26. In a more preferred embodiment the device can be used on a polymerization reactor comprising a first 19 and a second reactor 20 which are interconnected in series by one or more settling legs 21 of the first reactor 19 connected for discharge of slurry from the first reactor 19 to said second reactor 20, as illustrated on FIG. 26.

The sampling device according to the present invention may be placed at one of the elbows of the loop reactor or at other places. Preferably, the device 1 is positioned on an elbow of the reactor, but not in the proximity of the pump for continuously circulating the contents of the reactor through the reactor loops. For instance, on one of the elbows of such loop reactor 19, 20, one or more conduits 2 can be provided for removing a sample from the reactor and transferring such sample to a sample flash tanks 3. The conduits 2 each are in communication with said reactor 19, 20 and the sample flash tank 3. Several conduits may be provided which can be used separately or simultaneously.

In a preferred embodiment, the conduits 2 are provided with at least two sampling valves 4, 5. The valves are preferably placed as close to the reactor as is possible due to the limitations of valve size, fittings, etc. Preferably, between the valves 4 and the reactor 19, 20, flushing means are provided in order to avoid plugging and blocking of the conduit part between the valves 4 and the reactor 19, 20.

Figure 26:
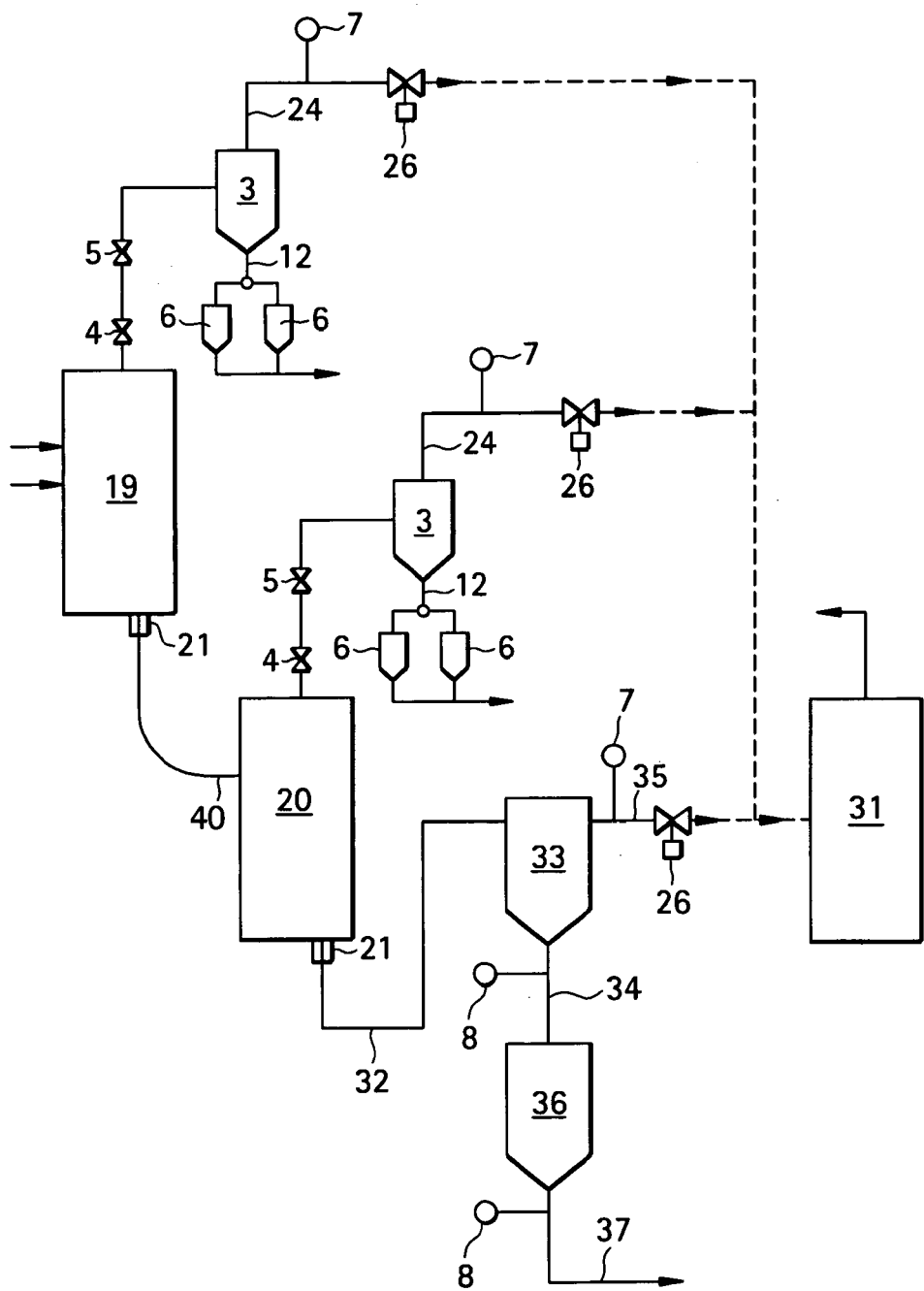
FIG. 26 is a schematic representation of a polymerization reaction and recovery system, which utilises a sampling device according to the present invention.

Still referring to FIGS. 25 and 26, the conduits 2 are provided with means for periodically sequentially opening and closing said valves 4, 5. The mechanism of closing and opening the valves 4, 5 is as follows: first the first valve 4 is opened while maintaining said second valve 5 closed, then said first valve 4 is dosed while maintaining said second valve 5 closed, subsequently, the second valve 5 is opened while maintaining said first valve 4 closed and finally, said second valve 5 is closed while maintaining said first valve 4 closed. According to this mechanism, the valve closest to the reactor 4 is open while the second valve 5 is dosed. The volume between the two valves is filled with slurry coming from the reactor. The valve near the reactor 4 is closed and the second valve 5 is opened. As the pressure is lowered, the slurry flashes and pushes the product to a sample flash tank 3. Valve 4 is open only long enough to take a sufficient sized sample such that analytical error is minimised. Preferably the sequence of opening and closing the valves 4, 5 follows fixed time limits. By way of illustration, a suitable sequence of opening and closing the valves may comprise opening of the valve 4 between two and ten seconds, and preferably for four seconds, while keeping valve 5 closed; followed by closing the first valve 4 between one and five seconds, and preferably for two seconds while keeping the second valve 5 closed; opening the valve 5 between two and twenty seconds, and preferably for six seconds, while valve 4 remains closed and closing the valve 5 between one and sixty seconds, and preferably for five seconds while keeping the valve 4 closed. After this sequence, the sequential mechanism can be repeated.

The size of the sample is determined by the volume of pipe, which extends between valve 4 and valve 5, which is closed during the sampling of the reactor. Typically, an effective analyzing amount will be a minor volume proportion of the amount produced by the polymerization reactor. In a preferred embodiment, the size of the sample volume is adapted by providing different conduits lengths and thus different volumes of pipe extending between valve 4 and valve 5. According to the present invention, taking a relative small amount of sample from said reactor provides reliable data on the polymerization reaction in the reactor. A small amount of sample in this invention means the smallest possible amount of material that it is technically feasible to withdraw. Accordingly, the size of the sample flash tank is less than 10%, preferably less than 1%, more preferably less than 0.1% of that of a single flash tank of a size adapted to that of the reactor.

In addition, the device provides additional flushing valves 38, provided on the conduit downstream the first valve 4 and upstream the second valve 5. These valves 38 play a role in an automatic flushing mechanism, which is activated after taking a sample from the reactor. Automatic flushing enables cleaning and rinsing of the sample volume in the conduit with diluent, in particular isobutane, and keeps the conduit free.

When taking a sample from the reactor, the sequential opening/closing mechanism of the valves 4, 5 is activated. Interruption of said sequential mechanism stops sample out take and activates the automatic flushing mechanism. During automatic flushing the first valve 4 remains open together with the flushing valve 38, in order to provide continue flushing to the reactor such that plugging is avoided. The flushing valve 38 is always closed prior to opening valve 5. By way of illustration, a suitable sequential mechanism for activating the automatic flushing mechanism is as follows: the first valve 4 is closed, the flushing valve 38 is closed and the second valve 5 is opened, preferably for ten seconds, and subsequently closed again. The flushing valve 38 is then opened, between five and thirty seconds, and preferably for fifteen seconds and closed again. The second valve 5 is subsequently re-opened, preferably for ten seconds and then closed. The flushing valve 38 is opened and remains open, while also the first valve 4 is opened and remains open.

When a novel sample needs to be taken out of a reactor, the automatic flushing mechanism needs to be interrupted, which preferably takes place as follows: the flushing valve 38 is closed and remains closed, the first valve 4 is closed. The second valve 5 is opened during preferably ten seconds and closed again, while the flushing valve 38 is closed. After preferably twenty to thirty seconds, the sequential mechanisms of opening and closing the valves 4, 5 as described above, can be re-activated in order to obtain a sample in the conduit volume provided between said valves 4, 5.

When the valves 4 near the reactor 19 are opened, the sample is introduced in the conduit 2 and a sample volume is further transported to the sample flash tank 3, by means of sample flash lines 22. In a preferred embodiment, the slurry is provided at the entrance of the sample flash tank at a suitable temperature and pressure, such that the slurry is entered into the sample flash tank in gas form.

Preferably the pressure in reactor 19 is around 43 bars. In the sample flash lines, the pressure is reduced in order to reach a pressure preferably comprised between 1.1 bar and 3 bar in the sample flash tank 3. The major drop in pressure preferably takes place at the second valve 5, and is further linearly reduced between the second valve 5 and the sample flash tank 3 in the flash lines 22.

Still referring to FIGS. 25 and 26, in a preferred embodiment, said sample flash lines 22 are constructed as jacketed pipes, i.e. double envelope tube exchangers. The sample flash lines 22 consist of an inner tube for transporting the sample, and an outer tube, provided as a coat on said inner tube, which can be heated, e.g. by means of a steam stream flowing through said outer tube. Heating of the sample improves and facilitates further purification of the sample and increases the degassing efficiency in the sample flash tank, which guarantees a reliable and accurate gas analysis. Preferably the size of the sample flash lines 22 is chosen in order to have the slurry at a correct temperature entering the sample flash tank 3. The size of the sample flash lines 22 is also chosen in order to obtain a suitable velocity of the slurry. The temperature in the coating tube is preferably regulated by adapting steam pressure by means of steam pressure controlling means 23. It is preferred that the temperature in the sample flash tank is at least higher than 35° C. and preferably higher than 50° C.

The slurry transferred through conduit 2 and 22 is provided to a sample flash tank 3 wherein a more complete separation between the polyethylene and the unreacted reactants including ethylene, hexene, hydrogen and isobutane occurs. Preferably, said sample flash tank 3 consists of a tubular body 9 and a conical bottom 10.

Providing a suitable temperature and pressure in the sample flash tank 3 enables to increase the degassing efficiency in the sample flash tank and to obtain a substantially degassed polyethylene powder remaining in the tank. Increased degassing efficiency also permits to increase the accuracy of the gas analysis performed on a portion of the gas removed from the sample flash tank. The sample flash tank 3 is heatable. The tubular body 9 is provided with a heatable coat 39 and the conical bottom 10 is preferably provided on its surface with conduits 11 wherein steam or hot water can be provided. Preferably, the temperature in the sample flash tank is higher than 35° C., and even more preferred, higher than 50° C. The pressure in the sample flash tank 3 will vary depending on the nature of the diluent and monomer and the temperature selected. Preferably, according to the present invention, the pressure value in the sample flash tank 3 comprises between 1.1 and 3 bar and more preferred between 1.5 and 1.6 bar. In the sample flash tank 3 free unreacted ethylene, isobutane, hexene co-monomer and hydrogen are released as vapor; any hydrocarbons trapped in the pores of the polymer powder are carried away.

Flash gas, comprising essentially unreacted ethylene, isobutane, hexene co-monomer and hydrogen, is removed from the sample flash tank 3 through a conduit 24, preferably provided at the top of the sample flash tank 3. Means 26 are preferably provided on conduit 24 which regulate the pressure in said conduit such that the pressure is higher upstream the means 26 than downstream the means, in order to avoid reflux of the gases from the reactor, which could induce a deficient off gas analysis. Preferably, the pressure from the sample flash tank is used as control, and the means 26 installs a pressure, which preferably exceeds the flash tank pressure with 100 mbar.

The flash gas, which is a mixture of unreacted reactants, is preferably transferred to a recycle section 31, wherein the gas is compressed, the reactants are separated from the mixture, and fed to the polymerization reactor if desired at a suitable flow rate.

Still referring to FIGS. 25 and 26, a sample of the fluid (gas) flowing through the conduit 24 is provided to a gas analyzer 7 through conduit means 25. Samples taken from the vapor phase are indicative of the compositions in the vapor phase existing in the reactor. The analyzer 7 is preferably a chromatographic analyzer. The analyzer 7 provides an output signal, which is representative of the concentration of one or several reactants in the fluid flowing through conduit 24. Essentially, this signal is representative of the concentration of unreacted ethylene, hexene, and hydrogen removed from reactor 19. The signal can be provided from the analyzer 7 as an input to a computer. In response to this signal, the computer may determine the concentration of unreacted ethylene, hexene, and hydrogen in the and determines whether adjustment of ethylene, hexene, and hydrogen flow to the reactor 19 is needed. Additionally, instead of adjusting these feeds, the system also could be set up so that other or additional reactants such as diluent (isobutane) feed or catalyst feed are adjusted in response to a signal from the computer.

A solid fraction or powder essentially consisting of PE and dissolved isobutane and co-monomer is collected at the bottom of the sample flash tank 3 from which it is transferred to sample receivers 6 for further purification. Transfer of the powder is done by means of a conduit 12, provided with at least two valves 13, 14. Said conduit 12 is preferably provided with means for periodically sequentially opening said first valve 13 while maintaining said second valve 14 closed, closing said first valve 13 while maintaining said second valve 14 closed, opening said second valve 14 while maintaining said first valve 13 closed and closing said second valve 14 while maintaining said first valve 13 closed. This mechanism allows a well-defined amount of powder to be transferred to the sample receiving means 6. The valves also avoid the entrance of nitrogen, provided downstream in the system, into the sample flash tank 3. Preferably, the sampling device is further provided with means 27 for purging with wet nitrogen, preferably downstream the second valve 14 on conduit 12. Providing wet nitrogen enables to kill residual alkyl and catalyst in the powder.

Still referring to FIGS. 25 and 26, powder removed from the sample flash tank 3 through conduit means 12 will be treated to remove any remaining co-monomer and diluent. Such treatments preferably include degassing and drying in a sample receiver 6. Preferably, said sample receiver 6 consists of a tubular body 15 and a conical bottom 16. The sample receiver 6 is heatable. The conical bottom 16 is preferably provided on the surface with conduits 11 wherein steam or hot water is provided. It is preferred to heat up the receivers in order to increase the degassing efficiency and purification in the sample receiver. Preferably, one sample flash tank 3 may be connected to several sample receivers 6 by means of the conduit 12. In order to alternately send powder to the one or the other receiver 6, a diverter 18 is provided, downstream the second valve 14 and upstream of the sample receivers 6 on said conduit 12.

Generally, PE powder is collected in one sample receiver 6, which is in connection with means 8 for analyzing said polymer powder. If it is necessary to take a sample for analysis, or to switch to another receiver 6, e.g. when one of the receivers is full and needs to be emptied, the PE powder can be directed, by regulation of the diverter 18, to a second sample receiver, while the first receiver can at the meantime be drained. Subsequently, the flash tank is again connected to the first receiver, and from the second receiver a sample can be taken for analysis.

In particular, the purpose of the sample receivers 6 is to strip hydrocarbons trapped in the pores of the polymer. This is preferably done with a long residence time in the receiver and a nitrogen sweep. The sample receivers 6 comprise means 28 for providing nitrogen, preferably at the bottom of said receiver 6. Providing nitrogen to the receiver enables to further purge and purify the PE powder in the receiver 6. Nitrogen flushed in the receivers can be removed by means of a conduit 29 to a collecting vessel 30, e.g. seal oil pot, which may be common for two or several sample receivers 6. From this collecting vessel, nitrogen is released to the atmosphere. In addition, the sample receivers 6 can be further provided with means for measuring explosiveness.

In another preferred embodiment, the sample receivers 6 are provided with a filter 17, preferably at the top of the tubular body 15 of the receivers 6, for avoiding powder fines to be swept away with the conduit 29 releasing nitrogen. These filters preferably are bag filters having a nitrogen pulse-jet for cleaning.

The sampling device according to the present invention comprises several protection mechanisms in order to correctly and efficiently control operations of the sampling device. For instance, when the pressure becomes too high in the sample flash tank or when a high level is reached in the sample flash tank, the sampling sequential mechanism is stopped and automatic flushing is activated. When a very high pressure is obtained in the sample flash tank, the valves 4, 5 and the flushing valves 38 are closed. In another example, one sample receiver can be drained and emptied, when the diverter 18 is oriented towards another sample receiver, provided explosiveness is sufficiently low. Another control system consists of diverting the transfer of PE powder from the sample flash tank 3 to another sample receivers 6 when a high level is obtained in a first sample receiver. The transfer of PE powder from the sample flash tank 3 to the sample receivers 6 via conduit 12 can be interrupted in case of a high pressure in the sample flash tank 3 or a high level in the sample receivers 6. Another control system consists of closing the conduit to the gas analyzer 7 in case a high pressure is obtained in the sample flash tank 3. Furthermore, when a low pressure is registered in the polymerization reactor 19, the sampling sequence mechanism is stopped and automatic flushing is activated.

Referring now to FIG. 26, a schematic representation of a polymerization reaction and recovery system, which utilises sampling devices according to the present invention, is illustrated. The figure shows two liquid full loop reactors, comprising a first 19 and a second reactor 20 connected in series by one or more settling legs 21 of the first reactor connected for discharge of slurry from the first reactor 19 to said second reactor 20. Such configuration can be applied for manufacturing bimodal PE. Each reactor 19, 20 is provided with a sampling device 1 according to the invention. Preferably, in case two reactors are used, the pressures in the first reactor 19, is preferably comprised between 43 and 44 bar, while the pressure in the second reactor comprises between 41 and 42 bar. The pressure is generally lower in the second reactor compared to the first reactor to ensure a sufficient flow rate.

The process for manufacturing bimodal PE is known in the art and for instance disclosed in U.S. Pat. No. 5,639,834, which describes a process for the co-polymerization of ethylene in two liquid full loop reactors in series wherein high and low average molecular weight polymers are produced respectively in a first and a second reactor. The reaction conditions in the first and the second reactors are different in order to obtain high and low average molecular weight polymers respectively in the first and second reactor. The ethylene polymer stream obtained in the first reactor is transferred to the second loop reactor through one or more settling legs of the first reactor, e.g. using six settling legs each one being independently filled with reactor slurry, solids being concentrated by gravity settling, and discharged.

For taking a sample of slurry that is produced in the reactors 19, 20 in such configuration, for off gas analysis and determination of the characteristics of the produced gas composition and PE powder, a specific sampling device according to the present invention is provided on the first reactor 19 or on both the first 19 and the second reactor 20, as illustrated on FIG. 26. However, it should be clear that the sampling device according to the present invention is also very suitable for use on individual reactors for manufacturing polyethylene, or on reactors for manufacturing of monomodal PE. "Monomodal PE" is produced using two reactors, which are operating in parallel. In accordance with such reactors, the sampling device according to the present invention can be provided on both reactors.

As illustrated on FIG. 26, the following reactants are provided to polymerization reactor 19; ethylene, hexene-1 co-monomer, isobutane diluent, a catalyst and hydrogen. The several reactants can be introduced to the reactor by means of one or several conduits. The majority of the reaction effluent, i.e. polymerization slurry, is removed from the reactor 19 by one or more settling legs 21 of the first reactor and discharged from the first reactor 19 to said second reactor 20. A sampling device 1 according to the invention is connected to said first reactor 19. Slurry removed through conduit means 2 and 22 is provided to a sample flash tank 3. In the sample flash tank 3 vaporisation of the monomer, co-monomer, hydrogen and diluent occurs; however, vaporisation can also occur at least partially within conduit 22. Unreacted reactants are removed from sample flash tank 3 through conduit means 24. A sample of the gas flowing through conduit means 24 is provided to an analyzer 7, preferably a chromatographic analyzer. The remaining gas flowing through conduit 24 can be recycled by means of a recycle section 31, and the separated reactants can be fed to the polymerization reactor 19 if desired. Solid polyethylene is provided from the sample flash tank 3 through conduit means 12 to a sample receiver 6. The reaction conditions in the first reactor are monitored by means of a sampling device according to the present invention. Based on the results obtained from this analysis, the reaction conditions in the first reactor are adapted in order to obtain an optimal reaction product leaving the first reactor 19.

Slurry is transferred from the first 19 to the second reactor 20 by means of lines 40. Transfer of slurry from one to another reactor is preferably continuously performed by using the settling legs 21.

The second reactor 20 is further connected by means of flash lines 32 to a flash tank 33. Unreacted reactants are separated from the incoming slurry in said flash tank 33. Polyethylene powder is removed from the tank 33 through conduit means 34 which conduct the polyethylene powder to a purge column 36. Within the flash tank 33 unreacted reactants are removed as vapor from flash tank 33 via conduit 35. The gas flowing through conduit 35 can be transferred to a recycle section 31, where the reactants in the gas are separated and if desired again fed to the polymerization reactor 19. The conduit 35 can be further provided with a gas analyzer 7 for analyzing a portion of the gas flowing through said conduit 35. PE powder removed from the flash tank 33 will be further treated to remove any remaining co-monomer and diluent by providing it to a purge column 36, where after PE is further removed through conduit means 37. Analysis of the PE powder can be done by means of analyzing means 8 which are provided in connection to conduit 34 or to conduit 37. Preferably, means 8 provided in connection to conduit 34 are utilised when the residence time in the purge column 36 is long, while means 8 provided in connection to conduit 37 can be utilised when the residence time in the purge column 36 is short.

Again, a sampling device according to the invention can be connected to said second reactor 20, in order to take a sample and analyze a sample from the second reactor 20. Slurry removed through conduit means 2 and 22 is provided to a sample flash tank 3. Unreacted reactants are vaporised and removed from sample flash tank 3 through conduit means 24. A sample of the gas flowing through conduit means 24 can be provided to a gas analyzer 7, preferably a chromatographic analyzer. The remaining fluid flowing through conduit 24 can be compressed and recycled back to the polymerization reactor 19 or 20 after passage through a recycle section 31 if desired. PE powder is provided from the sample flash tank 3 through conduit means 12 to a sample receiver 6 for further purification.

In another preferred embodiment, it is to be understood that where necessary flushing and purging means and lines are available on the sampling device according to the invention in order to avoid plugging, blocking or explosiveness risk.

With reference to FIG. 26, it should be noted that the sample flash tank 3 and the sample receivers 6, preferably have a similar configuration as the flash tank 33 and the purge column 36, respectively, but are relatively much smaller than the flash tank 33 and the purge column 36. In a preferred embodiment, the sample flash tank 3 and the sample receivers 6 are at least 10 times, and preferably 100 times and even more preferred 1000 times smaller than the flash tank 33 and the purge column 36. This indicates that according to the invention small volumes of samples, preferably around 40 $cm^3$, are sufficient to provide accurate and reliable data on the reaction in a reactor.

In another aspect the present invention relates to a method for improving a polymerization reaction in a polymerization reactor. In one aspect the method comprises the improvement and optimisation of a polymerization reaction in an individual polymerization reactor. In an embodiment said method comprises the steps of a) taking a sample out of said reactor, preferably by means of a sampling device according to the present invention, b) analyzing said sample to determine said reaction conditions in said first part of said reactor, and c) based on results obtained in step b), adapt reaction conditions in order to improve the polymerization reaction in said reactor.

In another aspect, the method comprises the improvement and optimisation of a polymerization reaction in a polymerization reactor, which consists of several parts or several reactors, which are connected to each other in series. Preferably said polymerization reaction comprises the polymerization of ethylene to prepare bimodal polyethylene. In another embodiment said method comprises the steps of a) taking a sample out of said first part 19 of said reactor.

b) analyzing said sample to determine said reaction conditions in said first part of said reactor 19, c) based on results obtained in step b), adapt reaction conditions in order to improve the polymerization reaction in said reactor.

In a preferred embodiment, said method comprises the steps of a) taking a sample out of said first part of said reactor 19, b) analyzing said sample to determine said reaction conditions in said first part 19 of said reactor, c) based on results obtained in step b), adapt reaction conditions in said first part 19 of said reactor in order to provide an optimised reaction product, and d) feeding at a suitable time said optimised reaction product from said second part 20 of said reactor to further processing means.

In a particularly preferred embodiment, the method comprises providing a reactor wherein said first part and said second part of said polymerization reactor consists of a first 19 and a second 20 liquid loop reactor, connected to each other in series, wherein the first reactor 19 has one or more settling legs 21 for discharge of slurry from the first reactor 19 to said second reactor 20. The method is particularly suitable for being applied for improving a polymerization reaction in a polymerization reactor during a process for preparing bimodal polyethylene. For preparing bimodal polyethylene, two polymerization reactors are used that are connected to each other in series, as e.g. illustrated on FIG. 26.

The present invention provides a method for monitoring and optimising the operational conditions in a first reactor in the polymerization process for obtaining polyethylene. The method consists of taking a sample taken out of reactor, analyzing said sample to determine the operation reaction conditions in the first reactor. A sampling device according to the invention is preferably provided on said first reactor and enables to analyze a sample from said reactor and to determine the reaction conditions in the first reactor. Based on the analyzes results obtained, one can adapt or fine-tune the operational reaction parameters in the first reactor if required, in order to improve the polymerization reaction in said reactor and to obtain polyethylene having the desired properties.

Preferably, sampling is performed continuously and the samples are analyzed frequently, in order to accurately follow up the polymerization reaction in the first reactor. Analysis of these samples is preferably done at defined time points. Preferably, a PE powder sample obtained from the sample receivers 6 is analyzed every one or two hours, and a gas sample, obtained from the sample flash tank 3 is analyzed automatically every five to fifteen minutes.

In another embodiment, the sampling device according to the invention can be provided on both a first and a second reactor. By additionally providing a sampling device according to the invention on the second reactor, samples from said second reactor can be continuously taken and frequently analyzed and one is capable of following up the reaction conditions and the polymerization reaction in the second reactor, and adapt operational reaction parameters if required, to improve the polymerization reaction and to obtain an end product having the desired properties. Once the reaction product of the first reactor has been transferred to the second reaction the method may further comprise taking a sample out of the second reactor; analyzing said sample to determine said reaction conditions in said second reactor and based on results obtained on the reaction conditions, fine-tune and adapt the reaction conditions in the second part of said reactor in order to provide a optimised reaction product as a result of the reaction in said second part of in said reactor.

Figure 27:
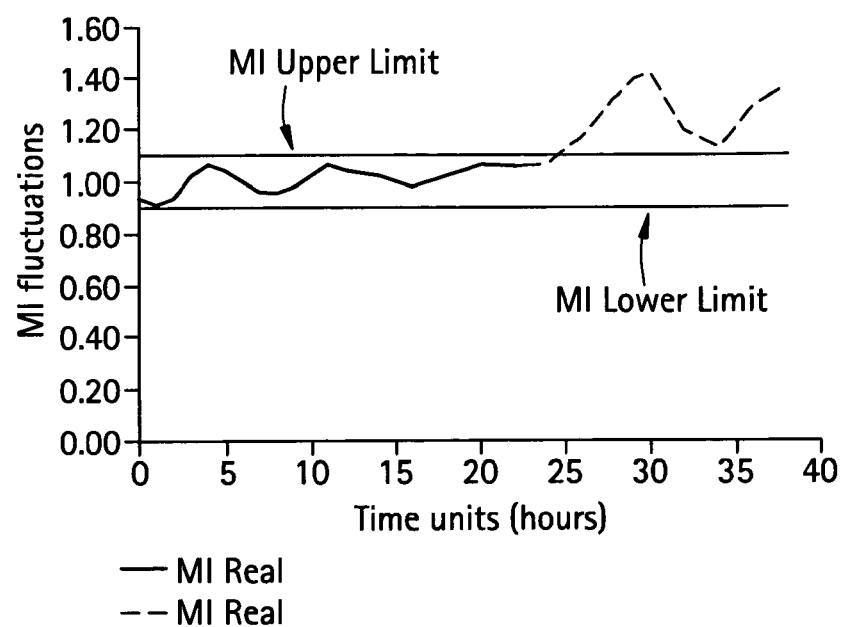
FIG. 27 shows the effect of using the present invention for controlling polymerization conditions for a bimodal polyethylene.

The method further allows determining the suitable moment for transferring the reaction product having optimal desired properties to further processing means. Transfer of a reaction product having optimal properties at an optimal moment for further processing, considerably improves the quality of the obtained reaction product. FIG. 27 showing the effects of using the sampling system of the invention will be discussed later.

The different properties of the polyethylene (molecular weight, density, . . . ) can be adjusted by controlling operating parameters of the reactors such as temperature, ethylene concentration, hexene concentration, hydrogen concentration, residence time. Other reactor parameters could be controlled as well, such as reactor pressure, solid concentration inside the reactor and catalyst productivity, powder properties, etc. . . .

In another preferred embodiment, the method comprises taking a specific volume of a sample from said first part 19 of said reactor. This can be obtained by using a specific sampling mechanism. The method consists of providing valves 4, 5 on conduits 2 connecting the reactor 19 with a sample flush tanks 3, having means for periodically sequentially opening and closing said valves 4, 5. The mechanism of closing and opening the valves 4, 5 is described in more detailed above. The size of the sample is determined by the volume of pipe, which extends between valve 4 and valve 5.

In a further embodiment, the present invention relates to a method, wherein step a) wherein a sample is taken comprises providing a sample from said first part 19 of said reactor to a sample flash tanks 3, by transferring said sample though a conduit 2 connecting said first part 19 of said reactor to said sample flash tank 3, separating in said sample flash tank 3 solid particles from evaporated gas in said sample by controlling the pressure in said flash tank 3, supplying said solid particles from said sample flash tank 3 to one or more sample receivers 6, by transferring said solid particles though a conduit 12 connecting said sample flash tank 3 and said sample receivers 6, and purifying said solid particles in said sample receivers 6, by degassing and drying.

In addition, still referring to FIG. 26, in another further embodiment, the step b) in the present method comprises analyzing evaporated gas obtained from said sample flash tanks 3 with analyzing means 7, and analyzing solid particles obtained from said sample receivers 6 with analyzing means 8.

Figure 28:
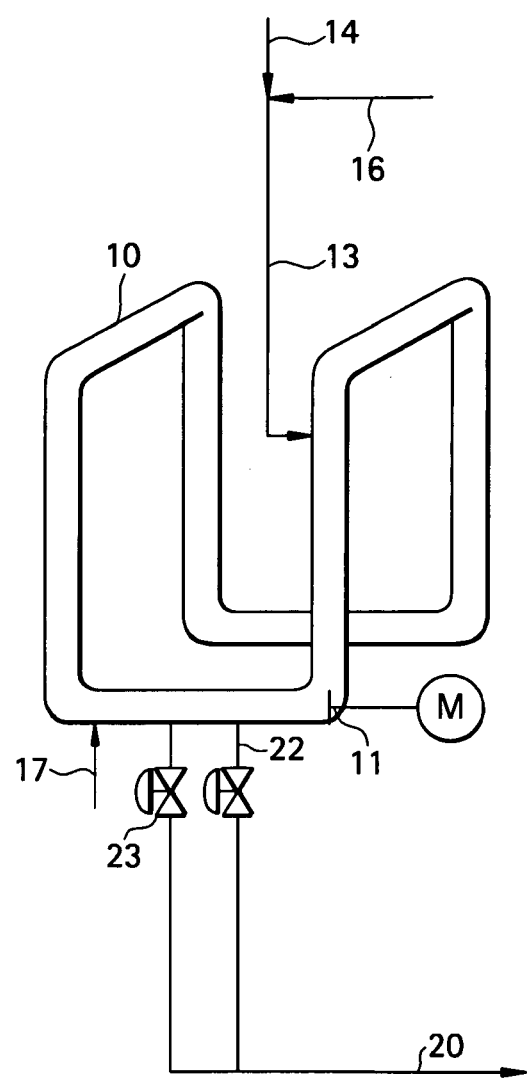
FIG. 28 is a schematic diagram of a loop reactor with two settling legs and their control system.

In the embodiment illustrated in FIG. 28, polymerization is carried out in a loop reactor 10. The monomer and the diluent are introduced respectively through lines 14 and 16 merging into line 13, and the catalyst is introduced through line 17. A propeller 11 linked to a motor M circulates the mixture. As polymer particles are produced, they accumulate in settling legs 22. The settling legs are each provided with a product take-off valve (PTO valve or PTO) 23 connected to a conduit 20.

Figure 29:
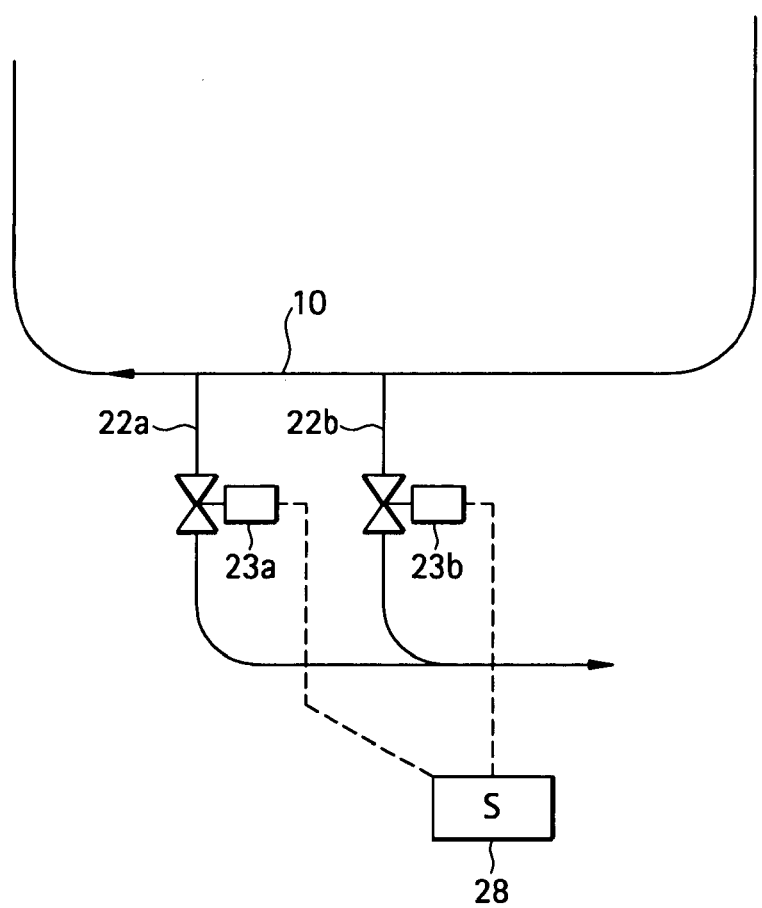
FIG. 29 is a schematic diagram of the control system.

Referring now to FIG. 29, there is shown a loop reactor 10 provided with two settling legs 22a and 22b, each provided with a PTO valve (respectively 23a and 23b) controlled by a control unit 28.

Figure 30:
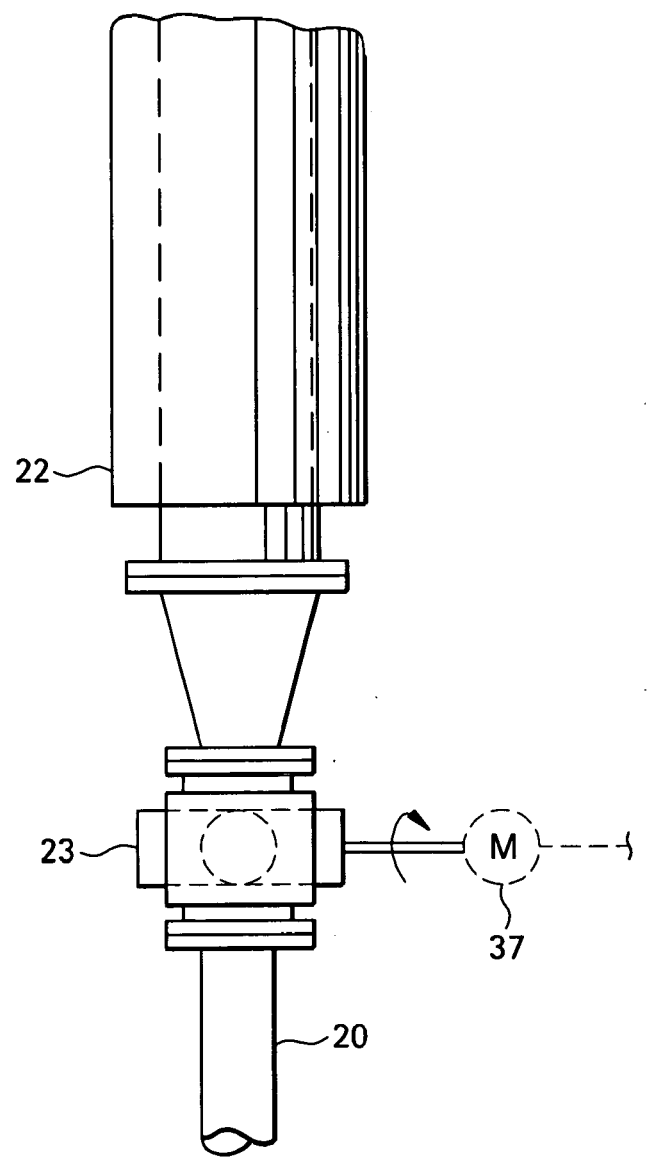
FIG. 30 is a schematic diagram of the bottom part of a settling leg, showing the product take-off valve and its actuating mechanism.

FIG. 30 shows the bottom of a settling leg 22, with a PTO valve 23 connecting it to conduit 20. The PTO valve is a rotating valve, the rotation being controlled by a mechanism M.

The PTO valve 23 of the settling leg 22 is only periodically opened, whereby the polymer particles present in the settling leg 22 can pass into conduit 20. The opening time of the PTO valve 23 should be closely controlled, in order that substantially all particles present in the settling leg 22 pass into conduit 20, whilst substantially no monomer and diluent leave the reactor 10.

Two types of PTO valves are in use. The most common relies on a 180° rotation of the moving part of the valve, whereby the valve turns from closed (0°) to open (90°) then closed (180°); during the next cycle, the valve rotates backwards. Valves with a 90° rotation are also in use, whereby the moving part turns from closed (0°) to open (90°) then backwards to closed (0°). The present invention provides an improved control system for the first type of PTO valves.

PTO valves are generally pneumatically actuated. Each PTO is provided with a double acting pneumatic actuator 40, which controls the speed at which it turns. In the case of a 180° rotation, the speed at which the PTO turns is particularly important in the sense that it directly controls the time it remains open.

Figure 31A:
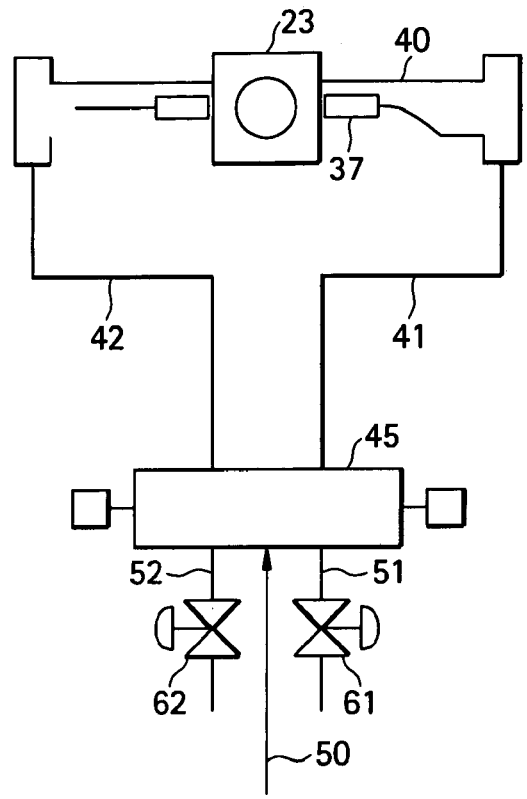
Figure 31B:
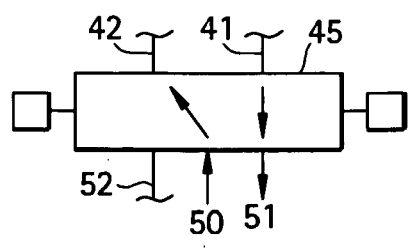
FIG. 31B shows a detail of a first position of the two-way system.
Figure 31C:
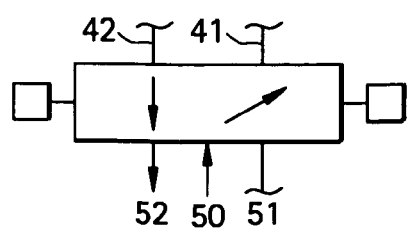
FIG. 31C shows a detail of a second position of the two-way system.

On FIGS. 31A. 31B, and 31C, the air flow sent to the double acting pneumatic actuator 40 is directed by a two-way system 45 driven by a solenoid. FIG. 31B shows one position of the system 45, wherein air coming from conduit 50 is sent via conduit 42 into the actuator 40, returns via conduit 41 and exits through conduit 51. FIG. 31C shows the other position of the system 45, wherein air coming from conduit 50 is sent via conduit 41 into the actuator 40, returns via conduit 42 and exits through conduit 52.

Pneumatically actuated PTO valves were always controlled by manually adjusting the outlet flow of air using control valves 61 and 62. There is provided a separate control for each valve 61 and 62, in case the ball in the PTO valve 23 would turn at different speed in each direction.

It has now been surprisingly found that control of a PTO valve 23 is improved by using automatic control valves 61 and 62. In a preferred embodiment, V-ball control valves are used. Such valves throttle using the rotation of a notched ball segment whose shape is such that it allows at the same time to have a very precise control of the flow air for small openings while having a full bore opening when needed. As an example of V-ball valve, there can be cited a Worcester V-flow control valve type V44-66UMPTN90.

It was not obvious to find appropriate control valves 61 and 62, because all control valves tested up to now did not provide a precise control of the flow of air, taking into account that the amount of air in the actuator 40 is relatively small. More importantly, it was not obvious that operation of the reactor 10 would be more stable.

The use of automatic control valves provides several advantages with regard to a better reliability of the PTO valves. Indeed, the frequent operation of the PTO valves, such as every 15 to 90 seconds, leads to the wear of said valves which then operate slower. This effect is immediately compensated by an automatic increasing of the amount of air needed by the actuators. An automatic control of the amount of air needed by the actuators avoids that the PTO valves get stuck in an open position. The use of automatic control valves allows also a more precise control of the amount of air entering into the actuators than the manual control valves do. When using manual control valves, there is always a risk that when reducing the amount of air entering into the actuators, the PTO valves finally get blocked in an open position leading to the depressurization of the reactor. This may occur with the first reactor of a double loop system when long opening times of the PTO valve of said reactor are needed.

The use of automatic control valves and of 180° rotating PTO valves allows a good control opening time of said PTO valves. This could not be achieved in the same way by using 90° rotating PTO valves.

It has also been found that the inner volume of conduits 51 and 52 had to be reduced to the maximum possible without creating a restriction to airflow. In a preferred embodiment, conduits 51 and 52 have a diameter of about 1.9 cm (¾ inch) and a length of about 20 cm between the system 45 to the automatic control valves 61 and 62.

Figure 32:
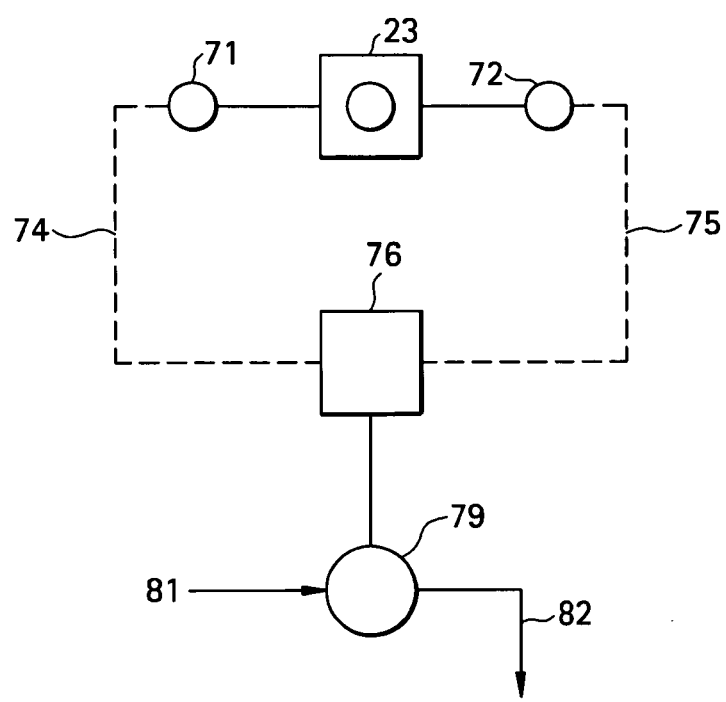
FIG. 32 is a schematic diagram of the electronic control system.

Referring now to FIG. 32, there is shown a preferred embodiment of the control mechanism. The PTO valve 23 is provided with sensors 71 and 72, located in the double actuating actuator, which indicate the position of the valve 23. Information from the sensors 71 and 72 is sent respectively via transmitter 73 and cables 74 and 75 to a computer 76 to determine the rotation time of the PTO valve. The rotation time of the PTO valve is sent to a rotation controller 79, which also receives a set point for rotation time 81 of the PTO valve from the operator. Depending on the difference between the rotation time of the working PTO valve and of the desired rotation time introduced by the operator, the opening of the V-ball valve either increases by 1% at every cycle when the rotation time is slower than the operator set point or decreases by 1% when the rotation time is faster than the operator set time.

The set point of the rotation time of the PTO valve may be adjusted manually by the operator or controlled by the system as a function of the reactor pressure drop at each opening of the reactor.

The polymerization processes according to the present invention are suitable for any process producing an effluent comprising a slurry of particulate solids suspended in a liquid medium. Such reaction processes include but are not limited to those that have come to be known in the art as particle form polymerizations.

This invention is particularly suitable for polymerization processes occurring in loop reactors for the production of polymer, more particularly polyethylene, wherein a polymerization effluent is formed which is a slurry of particulate polymer solids suspended in a liquid medium, ordinarily the reaction diluent and unreacted reactants.

The present invention is suitable for polymerization process for the manufacture of particulate olefin polymers consisting of the catalytic polymerization or copolymerization of one or several olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at a temperature of from 70 to 115° C., more preferably at a temperature of from 80 to 110° C., and at a pressure of from 20 to 100 bars, preferably at a pressure of from 30 to 50 bars, more preferably at a pressure of 37 to 45 bars.

In a preferred embodiment, the present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene.

Ethylene polymerizes in a liquid diluent in the presence of a catalyst, optionally a co-catalyst, optionally a co-monomer, optionally hydrogen and optionally other additives, thereby producing a polymerization slurry.

As used herein, the term "polymerization slurry" or "polymer slurry" or "slurry" means substantially a multi-phase composition including at least polymer solid particles and a liquid phase and allowing for a third phase (gas) to be at least locally present in the process, the liquid phase being the continuous phase. The solids include catalyst and polymerized olefin, such as polyethylene. The liquids include an inert diluent, such as isobutane, with dissolved monomer such as ethylene and optionally one or more co-monomers, molecular weight control agents, such as hydrogen, antistatic agents, antifouling agents, scavengers, and other process additives.

Suitable diluents are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

The polymerization slurry is maintained in circulation in a loop reactor comprising a plurality of interconnected pipes such as vertical jacketed pipe sections connected through elbows. The polymerization heat can be extracted by means of cooling water circulating in the jacket of the reactor. Said polymerization may be performed in a single or in two or more loop reactors according to the present invention, which can be used in parallel or in series. Said reactors are aimed to operate in a liquid full mode. When used in series they can be connected through means such as for example through one or more settling legs of the first reactor. The produced polymer may be withdrawn from the loop reactor along with some diluent through at least one settling leg in which the solid content is increased with respect to its concentration in the body of the reactor.

Settling legs may be in continuous fluid connection with the "product recovery zone". As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of the settling legs, the extracted slurry may be depressurized and transferred through for example heated or not heated flash lines to a flash tank where the polymer and the unreacted monomer and/or co-monomers and diluent are separated. The degassing of the polymer may be further completed in a purge column.

When at least one reactor is present downstream of the settling legs, the extracted slurry is transferred through transfer lines to the next reactor. Transfer is made possible by injecting the slurry in the downstream reactor in a point where the pressure is lower than the pressure at the outlet of the settling legs.

The present invention more particularly relates to a polymerization process for producing olefin polymers in a loop reactor as described above, said process comprising one or more cycles of:
a) allowing said polymer slurry to settle in one or more settling legs connected to said reactor,
b) monitoring the volume of polymer slurry settled in a settling leg since its previous discharge,
c) discharging from said settling leg, a predetermined volume of polymer slurry substantially equal to the volume of polymer slurry settled in said settling leg since its previous discharge.

As used herein the term "substantially equal" refers to a volume ±20% equal to the volume of slurry settled in a given settling leg.

As used herein the term "equal" refers to a volume ±5% equal to the volume of slurry settled in a given settling leg.

In an embodiment of the present invention, a predetermined volume of polymer slurry can be discharged which is equal to the volume of polymer slurry settled in a given settling leg since its previous discharge. In another embodiment, a predetermined volume of polymer slurry can be discharged which is superior to the volume of polymer slurry settled in said settling leg since its previous discharge.

The process according to the present invention presents several advantages over the prior art such as allowing for an optimized discharge of settled slurry from settling legs to a product recovery zone. The present process allows the settling legs to be completely emptied from settled materials at each discharge without substantially discharging further unsettled slurry that would impose a severe overload to the fluid recycling section for a minimal additional polymer production.

In one embodiment, the present process is further characterized in that it comprises one or more cycles of: (a) allowing said polymer slurry to settle in one or more settling legs connected to said reactor, (b) assessing the time T required for the settling of a predetermined volume of polymer slurry in a given settling leg after the previous closing of that given settling leg, (c) triggering the discharge of said predetermined volume of settled polymer slurry from said given settling leg into a product recovery zone at said time T after the previous closing of said leg, and (d) discharging during a predetermined period Δt, said predetermined volume of settled polymer slurry from said settling leg, wherein said predetermined volume is substantially equal to the volume of polymer slurry settled in said settling leg since its previous discharge.

In another embodiment, the present process is further characterized in that it comprises one or more cycles of: (a) allowing said polymer slurry to settle in one or more settling legs connected to said reactor, (b) evaluating the volume of polymer settled in a leg since its previous discharge, (c) adjusting the opening speed of the valve and/or the aperture of a flow adjusting device so that the volume discharged from the leg is substantially equal to the evaluated settled volume.

According to an embodiment of the present invention, said process comprises the step of adjusting the opening time of a settling leg such that the volume of polymer slurry to be discharged from said settling leg is substantially equal to the volume of polymer slurry settled in said settling leg since its previous discharge.

According to another embodiment of the present invention, said process comprises the step of adjusting the time between two discharges for a settling leg such that the volume of polymer slurry to be discharged from said settling leg is substantially equal to the volume of polymer slurry settled in said settling leg since its previous discharge.

According to yet another embodiment of the present invention, said process comprises the step of adjusting the discharge aperture of a settling leg such that the volume of polymer slurry to be discharged from said settling leg is substantially equal to the volume of polymer slurry settled in said settling leg since its previous discharge.

The present processes can be suitably performed in conventional single and double loop reactor. In the case of a single loop reactor the present invention facilitates the treatment of the recycle stream. In the case of a double loop reactor the present invention minimizes the transfer of comonomer into the second reactor. The present invention further encompasses single and double loop reactors comprising adequate measurement means suitable for inferring the settling characteristics in each settling leg and the volume of settled slurry inside said legs and valve control means in operative connection with the settlings legs of said reactor.

Figure 33:
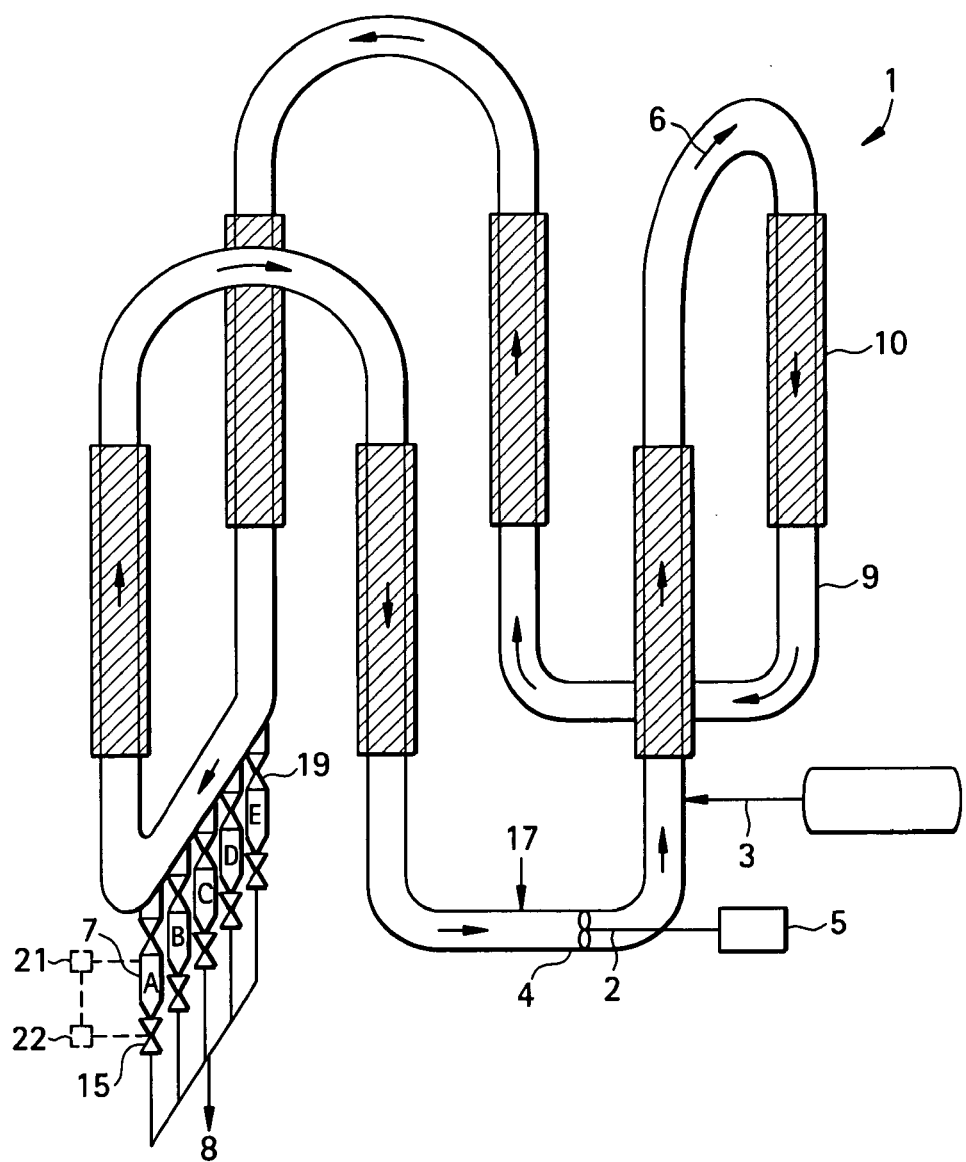
FIG. 33 represents a schematic representation of a single loop polymerization reactor according to an embodiment of the present invention.

Referring now to the drawings, FIG. 33 schematically illustrates an example of a loop reactor 1 for use in the invention. Said loop reactor 1 comprises a plurality of interconnected pipes 9. It will be understood that while the loop reactor 1 is illustrated with six vertical pipes, said loop reactor 1 may be equipped with less or more pipes, such as 4 or more pipes, for example between 4 and 20 vertical pipes. The vertical sections of the pipe segments 9 are preferably provided with heat jackets 10. Polymerization heat can be extracted by means of cooling water circulating in these jackets of the reactor. Reactants are introduced into the reactor 1 by line 3. Catalyst, optionally in conjunction with a co-catalyst or activation agent, is injected in the reactor 1 by means of the conduit 17. It is to be understood that FIG. 33 is a simplified illustration of a loop reactor and that said diluent, co-monomers, monomers, catalysts and other additives may enter the reactor separately. In a preferred embodiment as illustrated herein, catalysts are introduced just upstream from the circulation pump 2, diluent, monomer, potential co-monomers and reaction additives just downstream of the circulation pump 2.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 is further provided with one or more settling legs 7 connected to the pipes 9 of the reactor 1. Although only five settling legs 7A to 7E are illustrated in FIG. 33, the present process encompasses a loop reactor comprising one or more settling legs. In an embodiment of the present invention, said loop reactor comprises 1 to 20 settling legs, preferably 4 to 12 settling legs, more preferably 6 to 10 settling legs.

The settling legs 7 are preferably provided with an isolation valve 19. These valves 19 may be ball valves for example. These valves 19 are open under normal conditions and can be closed for example to isolate a settling leg from operation. Said valves can be closed when the reactor pressure falls below a chosen value.

Furthermore, the settling legs can be provided with product take off or discharge valves 15. The discharge valve 15 may be any type of valve, which can permit continuous or periodical discharge of polymer slurry, when it is fully open. Polymer slurry settled in the settling legs 7 may be removed by means of one or more product recovery lines 8, e.g. to a product recovery zone.

The discharge valve 15 that can be used in this invention may be any type of valve which can permit continuous or periodical discharge of a polymer slurry, when it is fully open. An angle valve, or ball valves may be suitably used. For example, the valve may have such a structure that solid matter is prevented from accumulating or precipitating at the main body portion of the valve. However, the type and structure of the discharge valve can be selected by those skilled in the art as required.

Said loop reactor 1 further comprises measuring means 21, one or more, located on the leg and/or on the reactor, that allow inferring the settling characteristics in each settling leg and valve control means 22 in operative communication with said measuring means 21 and with the valves 15 of the settling legs 7. Any conventional measuring device may be used to infer the volume of polymer slurry settled in the settling legs 7, which may then transmit a signal to the valve control means 22 to for example discharge the settled volume, when a predetermined volume is reached in a given settling leg. Examples of suitable devices include but are not limited to gamma ray density gauge, or level radiography devices or sonometric measuring devices. Those measures may be either directly transmitted to the valve control means or be input to a mathematical or statistical model whose output is transmitted to the valve control means.

Figure 34:
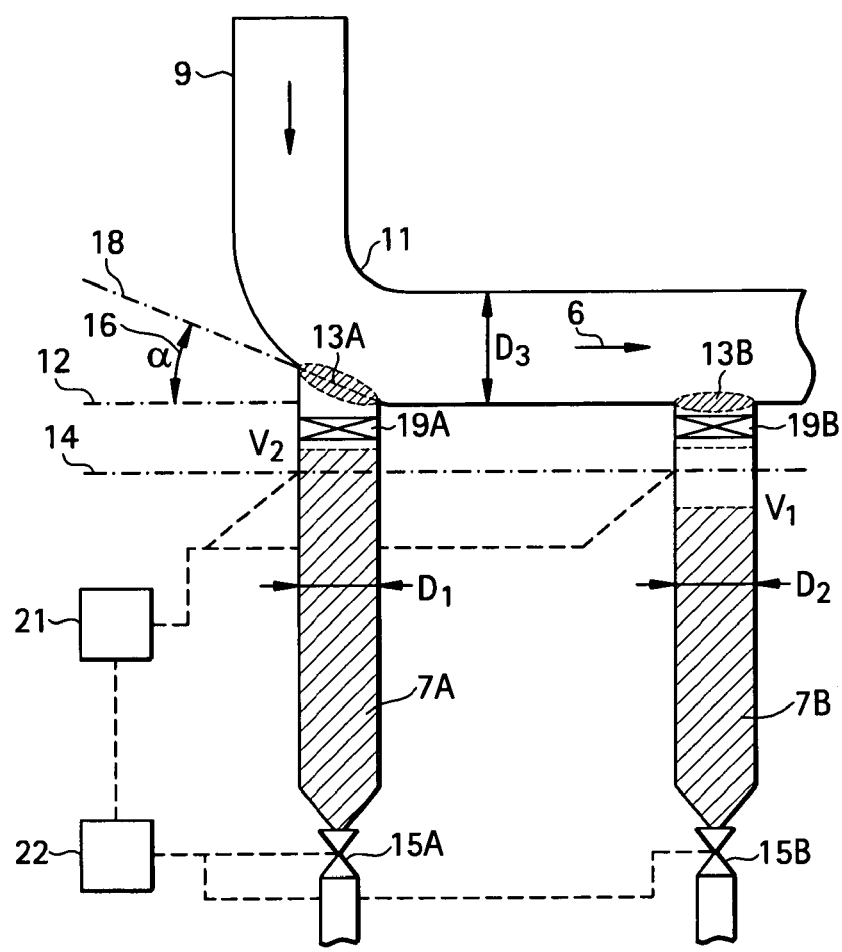
FIG. 34 represents a schematic cross-sectional side view of a section of the loop reactor of FIG. 33, showing two settling legs positioned on said section with their connection to said section having different angles alpha from a horizontal line.

FIG. 34 illustrates a section of the loop reactor 1 of FIG. 33. Two settling legs 7A and 7B are connected to a section of said reactor, the settling leg 7A with area of contact 13A and settling leg 7B with the area of contact 13B. Said settling legs 7A and 7B are also illustrated respectively with arbitrary volume V1 and V2. The settling leg 7A located on the curved section 11 of the reactor may have a diameter D1 identical to the diameter D2 of the settling leg 7B located on a straight section of said reactor. However, due to its position characterized by the angle alpha 16, delimited from a horizontal line 12 by the line 18, the settling leg 7A has different settling characteristics compared to settling leg 7B. Its location in the curved portion of the pipe 9 modifies the amount of polymer slurry settling in settling leg 7A compared to settling leg 7B, for a given time T. Due to the positioning of the leg 7A in the elbow section of the reactor, said settling leg is not equivalent in term of settling rate with the other settling legs. More precisely, the rate at which the slurry settles in the bottom part of a settling leg is not equal for all the legs.

When setting the parameters of the present process the volume of settled slurry in each settling leg can be inferred using measurements means 21. The measurements means 21 can indicate, directly or through the use of a mathematical or statistical model when the settled polymer slurry depth is outside the desired range arbitrarily represented by line 14. At this time, a signal is transmitted to the valve control means 22. The valve control means will then actuate the discharge valve 15 of said settling legs and thereby control the discharge of the settled polymer slurry from said settling legs.

In said settling legs 7 the polymerization slurry decants so that the slurry exiting the reactor is more concentrated in solid than the circulating slurry. Its concentration is actually as high as it can be because in the settled phase the polymer solid particles are in close contact to each other. The liquid phase occupies only the solids internal and inter-granular porosity. The present process and reactor allow the optimized discharge of settled slurry from said settling leg, and therefore permit to limit the quantity of diluent that has to be treated and re-fed to the reactor. Typically settled polymer slurry comprises from 60 to 65% of polymer particles, whereas the unsettled slurry in said leg comprises from 30 to 45% of polymer particles.

According to an embodiment of the present invention, when a predetermined volume of settled polymer slurry is reached in a given settling leg at time T, the discharge of that particular leg is triggered. The settling leg is actuated during a time $\Delta t$ required to allow the complete discharge of said predetermined volume.

Said volume V can be efficiently discharged by adjusting the opening time of said given settling leg. In another embodiment, said volume V can be efficiently discharged by adjusting the discharge aperture of said given settling leg so as to limit the volume discharged from said leg to the volume V. In an embodiment of the present invention, the discharge of said settled polymer slurry from said settling legs is triggered when said settled slurry has reached an optimum predetermined volume in said settling legs.

Adjusting the discharge aperture of a given settling leg includes but is not limited to reducing or enlarging the size of the opening of a discharge valve, or adding downstream of said discharge valve another flow regulating device of adjustable smaller aperture or an adjustable reduction of smaller aperture.

The present process encompasses any measuring means able to determine the volume of settled slurry at a time T in a settling leg. The monitoring step can be performed using measuring means selected from the group comprising level radiography means and gamma ray probes or using models.

Discharging said settled polymer slurry from said settling legs through discharge valves into a product recovery zone, is performed in such a way that the volume discharged from a settling leg is substantially equal to the volume of polymer slurry settled in said settling leg since its previous discharge.

According to the present invention, the actuation of the discharge valve is controlled by valve control means 22 which can be also operatively connected with said volume control means 21 for example. The valve control means 22 allow the adjustment and the control of the periodical opening at predetermined frequencies and sequence of the settling legs to permit the continuous or periodical discharge of said polymer slurry. Other control means such as pressure controllers and flow controllers, flow transducers and flow sensors may be used to further fine-tune the discharging process.

The process and reactor according to the invention, provides the advantage of optimizing the discharge of settled polymer slurry from a given settling leg without discharging further unsettled slurry thereby reducing the amount of diluent to be recycled, and further reducing the operation costs.

In another embodiment, the loop reactor according to the present invention comprises settling legs wherein the area of contact between said settling leg and said reactor pipe is at an angle alpha within the range of 0° to 60° from a horizontal line.

The present invention also encompasses a loop reactor suitable for an olefin polymerization process comprising two or more settling legs connected to the pipes of said reactor, wherein the effective volume or the settling rate of at least one settling leg is substantially different from the effective volume or the settling rate of at least another settling leg.

As used herein the term "effective volume" refers to the volume of polymer slurry which may settle into a settling leg if the settling is continuously under the same circulation conditions in the reactor. This effective volume may be smaller than the total settling leg volume because turbulence created on the top of the leg will prevent settling up to the top of the leg.

As used herein, the term settling rate refers to the volume of the currently produced polymer that may settle in a given settling leg per unit of time when the settled volume is 50% of the previously defined effective volume.

As used herein the term "substantially different" refers to a difference larger than 2%.

The present invention also encompasses a loop reactor as described above wherein the settling legs are modified and/or designed such as to obtain a substantially different settling rate and/or settling volume in each settling leg.

In an embodiment of the present invention, the loop reactor comprises settling legs having an internal diameter within the range of 0.2 to 0.5 times the internal diameter $D_3$ of the pipes of said reactor.

In another embodiment of the present invention, the settling legs connected to a section of said loop reactor may have an internal diameter within the range of 0.3 to 0.5 times the internal diameter of said reactor pipe section.

The present invention is particularly suited for the discharge of multiple loop reactors connected in series.

Figure 35:
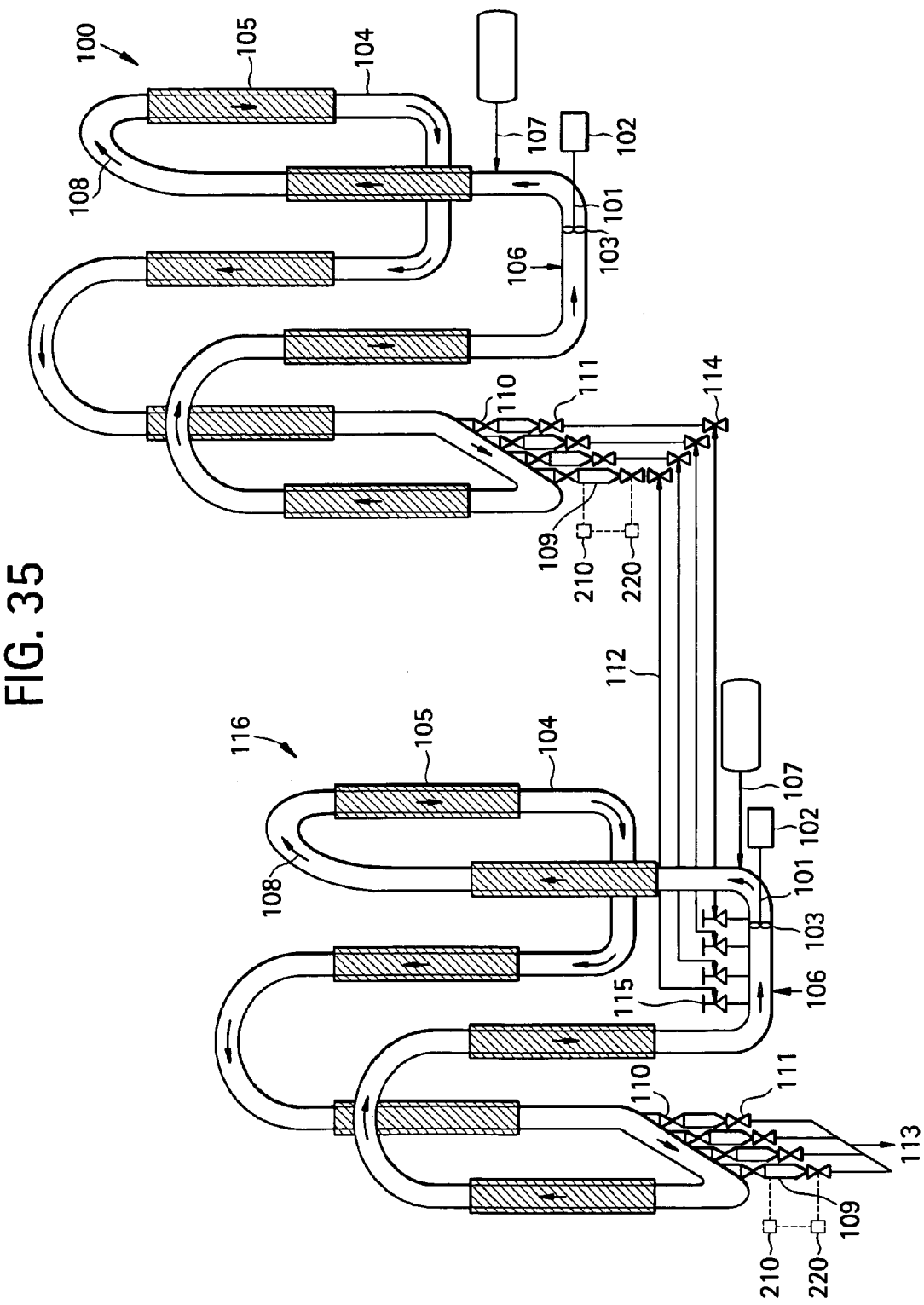
FIG. 35 is a schematic representation of a double loop polymerization reactor according to an embodiment of the present invention.

FIG. 35 represents a double loop reactor 100/116, comprising two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, may be injected in one or both of the reactors 100 and 116 by means of conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the exit of the settling leg 109 of reactor 100, a transfer line 112 is provided which allows to transfer polymer slurry settled in the settling legs 109 to the other reactor 116, preferably through a piston valve 115. Along the transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

Both reactors 100 and 106 and/or their respective settling legs are furthermore operatively connected to measurements means 210, which are further directly or through mathematical or statistical models in operative communication with valve control means 220.

The present invention encompasses different types of measurements means and valve control means, which can accomplish the purpose of the invention. The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The actuation and the control of a periodical discharging process can be implemented using electrical analog, digital electronic, pneumatic, hydraulic, mechanical or other similar types of equipment or combinations of one or more such equipment types. A computational means is used in the preferred embodiment of this invention to operate and control the process parameters. Computers or other types of computing devices can be used in the invention.

The present invention also relates to computational means comprising a process controller operatively connected to the discharge valves of said settling legs.

The present processes and reactors allow the discharge of each settling leg at a different time and for a different time period, thereby controlling the volume of polymer slurry to be discharged from said leg such that said discharged volume is substantially equal to the volume of polymer slurry settled in said settling leg since the previous discharge of said leg without substantially discharging further unsettled slurry.

Adjusting the opening duration of the discharge valve of each settling leg can be a function of (a) the position of each settling leg on the loop reactor, and/or (b) the geometrical characteristic of each settling leg, and/or (c) the volume of settled polymer slurry in each settling leg.

This provides the advantage of optimizing the discharge of settled polymer slurry from a given settling leg without discharging further unsettled slurry thereby reducing the amount of diluent to be recycled, and further reducing the operation costs.

An example of current disassembling procedure "series-parallel" is given here below supported by FIG. 36.

When operated in series, according to one embodiment, reactor 1 and reactor 2 are connected to each other, in particular, through one or more settling leg 3 (said settling leg being regulated by a control valve 4) and line 5. Iso-butane flushing connections 6 are made into connection line 5. Slurry is transferred from reactor 1 to reactor 2. In this series configuration, flash line 7 going to flash tank 8 is not in service. Flash line 11 going from reactor 2 to flash tank 12 is in service. For transitioning to parallel configuration, one has to stop the reaction, empty the reactors, dismount connections 6, take away connection line 5, and connect flash line 7 to the control valve 4. The complete operation from shut down to start up (indifferently from series to parallel or vice versa) takes up to 72 hrs.

It is an object of the present invention to provide an apparatus and an effective method to easily switch from series to parallel configuration of the slurry loop reactors and vice-versa. It is anticipated that such method can be applied to any type of olefin polymerization such as in closed reaction vessels provided with stirring means, gas phase reactors and combination of those.

Accordingly the present invention discloses an apparatus to easily switch from series to parallel configuration of slurry loop reactors and vice-versa and the related method. The disclosure is supported by FIG. 37, which represents a schematic part of the process flow diagram of an ethylene polymerization unit, incorporating the present invention.

All connections 6 remain at their place for series or parallel and the choice for one configuration or the other is made through the position of the three- or more-way valve 9 positioned after the control valve 4 of the one or more settling legs 3. The three- or more-way valve is open in the direction 1-2 when the reactors are operated in series. The three- or more-way valve is open in the direction 1-8 when reactor 1 is run individually.

Up to the invention, three- or more-way valves were not expected to work properly because they are known to leak in their non-used direction and to get easily blocked by undesired polymerization in the non-used pipe (said non-used pipe being either the one or more transfer legs/connection lines 3-5 to reactor 2 when the reactors are run in parallel configuration or, the one or more flash lines 7 to the flash tank 8 of reactor 1 when reactors are run in series configuration). Blocking the non-used pipe means the obligation for the exploitation manager to kill the polymerization reaction in the two reactors, empty the reactors from all their slurry, clean the blocked sections, possibly change the blocked valve and reassemble everything. The complete operation takes up to 120 hrs, which makes it completely prohibitory from a financial point of view. Safety issues are not of the least either.

Moreover, control valves were not expected to work properly from a process point of view (i.e. to enable transfer of sufficient amounts of solids) together with three- or more-way valves, said three- or more-way valves that would have indifferently imposed on the control valves a pressure differential of about the value of the nominal pressure of each reactor—i.e. several tens of bars—(when reactors are operated in parallel, i.e. with the settling leg discharging the slurry from reactor 1 run at its nominal pressure $p_1$ into the flash line maintained around atmospheric pressure) or a pressure differential of a few bars (when reactors are operated in series, i.e. with the settling leg transferring the slurry from reactor 1 run at pressure $p_1$ into reactor 2 run at pressure $p_2$, with $p_1 > p_2$, allowing the transfer).

It has been surprisingly found that control valves 4 and three- or more-way valves 9 can however be positively used in the following apparatus:

A set of loop reactors suitable for the polymerization process of a monomer, preferably ethylene and optionally an olefin co-monomer, comprising for each of said reactors:
 a plurality of interconnected pipes P defining a flow path for a polymer slurry, said slurry consisting essentially of ethylene, optionally a co-monomer, a polymerization catalyst, liquid diluent and solid olefin polymer particles,
 means for feeding monomer, optionally a co-monomer, diluent and optionally hydrogen in the reactor,
 means for feeding a polymerization catalyst in the reactor,
 a pump suitable for maintaining the polymer slurry in circulation in such reactor,
 one or more settling legs connected to the pipes P of such reactor for settling of polymer slurry,
 one or more control valves connected to the outlet of such settling legs, and
 one or more flash lines for discharging settled polymer slurry out of the reactor characterized in that each of said loop reactors comprises a three-or-more-way valve defining three-or-more ends, one end A being positioned at the outlet of said one or more control valves, another end B being connected to said one or more flash lines and another end C being connected to the pipes P of another reactor of the set through a connection pipe 5.

In a second embodiment of the present invention, the diameter of the one or more control valves, flash lines, connection lines K and three-or-more-way valves are within a relative ratio of from 0.5 to 2, preferably of from 0.65 to 1.55 and more preferably of from 0.8 to 1.2

In a third embodiment of the present invention, the length of the one or more flash lines divided by the length of the one or more connection pipes K is within a range of from 6 to 14 and preferably from 8 to 12.

In a fourth embodiment of the present invention, any end of the three-or-more-way valve, which is not connected to either a flash line or another reactor of the set is flushed with a diluent suitable with the polymerization process.

In a fifth embodiment according to the present invention, a continuous over-pressure of a diluent suitable with the polymerization process is maintained at the opposite side of the used connection (said used connection being either A to B when reactors are run in parallel configuration or, A to C when reactors are run in series configuration).

Figure 36:
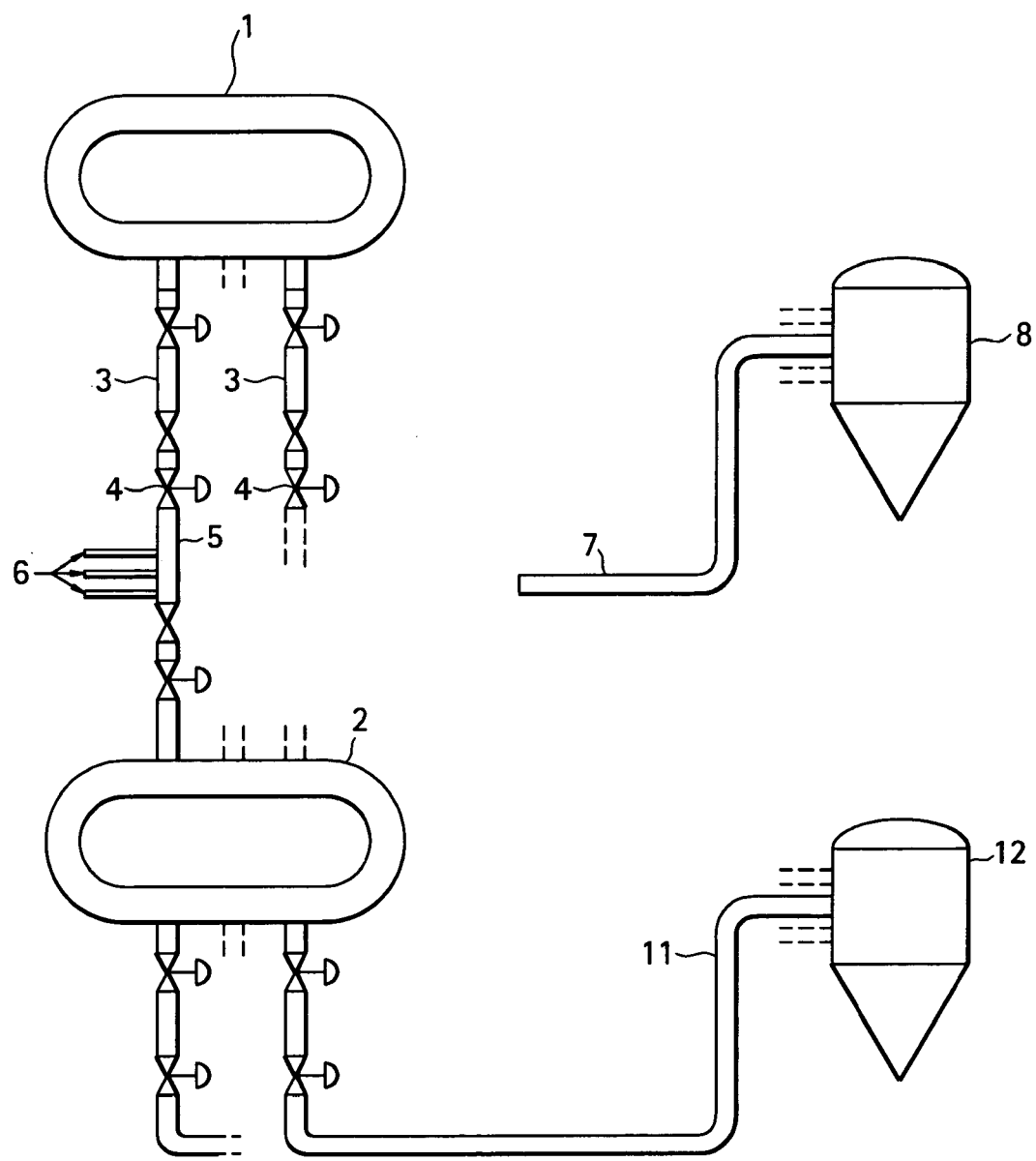
FIG. 36 represents a schematic part of the process flow diagram of an ethylene polymerization unit.
Figure 37:
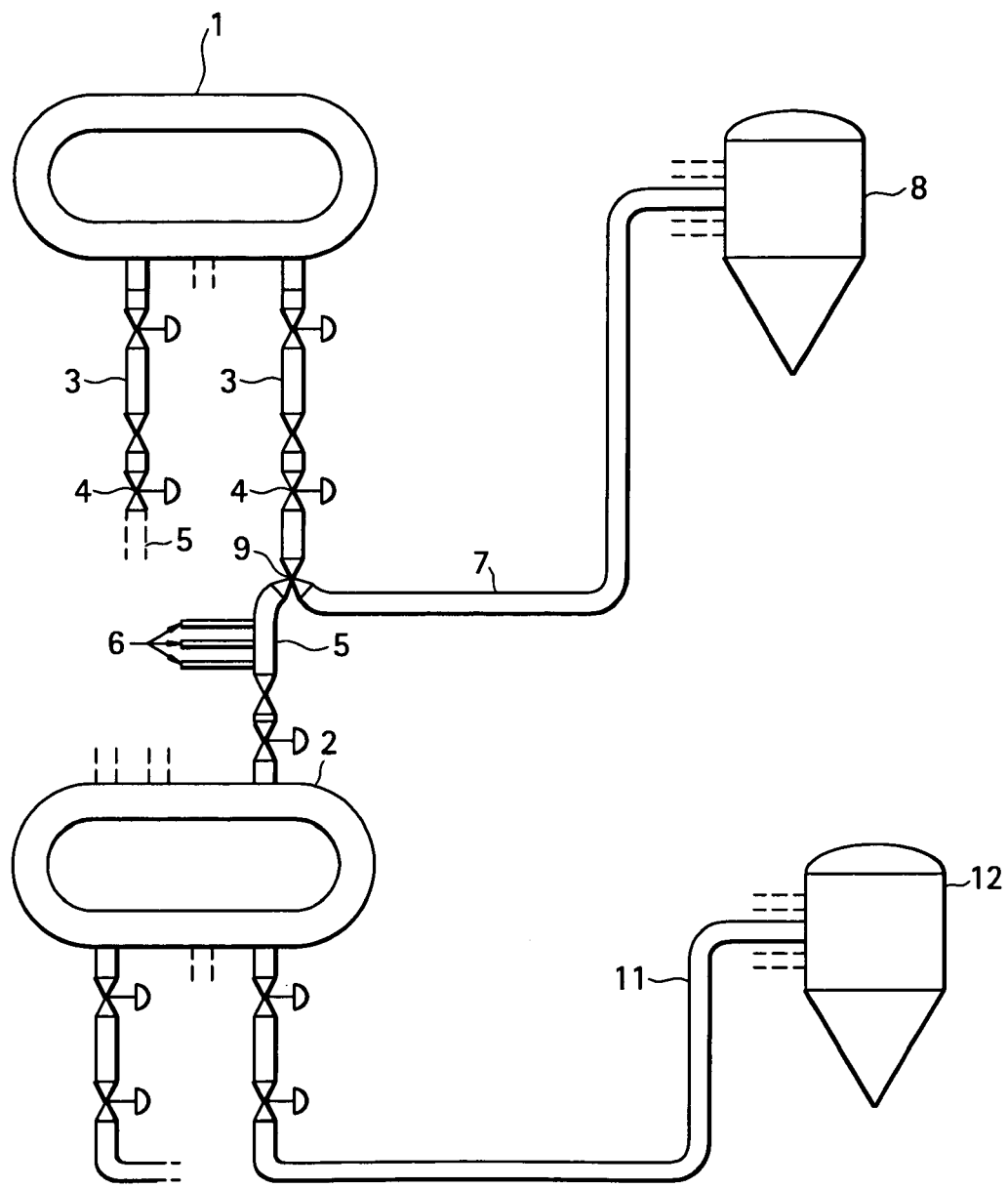
FIG. 37, represents a schematic part of the process flow diagram of an ethylene polymerization unit, incorporating the present invention.

In a sixth embodiment according to the present invention, a continuous over-pressure of a diluent suitable with the polymerization process is maintained at the side of the non-used pipe (said non-used pipe being either the transfer legs/connection lines 3-5 to the second reactor when the reactors are run in parallel configuration or, the flash lines 7 to the flash tank 8 of the first reactor when reactors are run in series configuration, as shown in FIGS. 36 and 37).

In a seventh embodiment according to the present invention, a diluent suitable with the polymerization process is circulated throughout the reactors for a period of eight hours before transitioning from series to parallel configuration or vice versa.

In a eight embodiment according to the present invention, when the diluent suitable with the polymerization process is iso-butane, the full capacity of iso-butane dedicated to all reactors is applied in sequence to each individual reactor during the circulation period.

In a ninth embodiment according to the present invention, olefin-free recycled iso-butane is fed into the reactors during the circulation period.

This invention relates to an olefin polymerization process in a double loop reactor utilizing a diluent, so as to produce a product slurry of polymer and diluent. This invention more in particular relates to a polymerization processes for the production of polymer, wherein a polymerization effluent is formed which is a slurry of particulate polymer solids suspended in a liquid medium, ordinarily the reaction diluent and unreacted monomers.

The present invention is applicable to any process producing an effluent comprising a slurry of particulate polymer solids suspended in a liquid medium comprising a diluent and unreacted monomer. Such reaction processes include those which have come to be known in the art as particle form polymerizations.

The settled polymer slurry may be discharged from said two or more settling legs through discharge valves in a predetermined sequential pattern so that the aggregate time of closure for all the legs is less than 50%, preferentially less than 20% and most preferably less than 5% of the time between two triggerings of the same settling leg. In a most preferred embodiment the aggregate time of closure for all the legs is from 5% to 0% of the time duration between two triggerings of the same settling leg.

As used herein the term "aggregate time of discharge" refers to the sum of the duration over which the discharge valve of each settling leg is open, said sum being across all settling legs and being limited to a single opening of each settling leg.

By keeping at least one settling leg open more than 50%, preferably more than 80%, most likely more than 95% and most preferably 100% of the time between two consecutive triggerings of any single settling leg, fluctuations of reaction conditions in the reactor, and in particular of pressure values, are significantly reduced and even may be avoided.

The present process comprises the step of maintaining a flow of settled polymer slurry out of said reactor by sequentially discharging said settling leg.

The present process according to the invention provides several advantages over the prior art including: allowing for a stable pressure profile of the product recovery zone (e.g. a stable pressure profile at the gas outlet of the flash tank allows a better operation of the recycle gas compressor); because of minor or even absent pressure drops in the reactor, significantly increasing the maximum monomer concentration in the loop reactor liquid medium thereby increasing reactor throughput; significantly increasing the wt % of polymer solids in the polymerization slurry. Another advantage of the present processes is an easier response to a sudden drop in reactor pressure, which can happen if the monomer flow is quickly reduced. The present invention also enables to establish non-fluctuating reaction conditions in a reactor during a polymerization process. More in particular, the processes according to the present invention allow to preserve pressure in the reactor at a certain value and to avoid pressure fluctuation in a polymerization reactor. Furthermore, polymerization product slurry discharging operated according to the present invention allows the monomers concentrations to be limited only by the monomer solubility in the liquid diluent in the reactor, thereby increasing the specific reaction rate for polymerization and increasing reactor throughput.

More in particular, the present invention relates to a polymerization process for the manufacture of particulate olefin polymers consisting of the catalytic polymerization of olefins such as $C_2$ to $C_8$ olefins in a diluent containing the monomer to be polymerized, the polymerization slurry being circulated in a double loop reactor to which the starting material is fed and from which the polymer formed is removed. Examples of suitable monomers include but are not limited to those having 2 to 8 carbon atoms per molecule, such as ethylene, propylene, butylene pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 130 bars, preferably at pressure of from 30 to 50 bars, more preferably at pressure of 37 to 45 bars.

In a preferred embodiment, the present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene.

Ethylene polymerizes in a liquid diluent in the presence of a catalyst, optionally a co-catalyst, optionally co-monomer, optionally hydrogen and optionally other additives, thereby producing a polymerization slurry.

As used herein, the term "polymerization slurry" or "polymer slurry" means substantially a multi-phase composition including at least polymer solid particles and a liquid phase and allow for a third phase (gas) to be at least locally present in the process, the liquid phase being the continuous phase. The solids include catalyst and polymerized olefin, such as polyethylene. The liquids include an inert diluent, such as isobutane, with dissolved monomer such as ethylene and optionally, one or more co-monomers, molecular weight control agents, such as hydrogen, antistatic agents, antifouling agents, scavengers, and other process additives.

Suitable diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

The polymerization slurry is maintained in circulation in the double loop reactor made of two loops, potentially even more than two loops, comprising vertical jacketed pipe sections connected through elbows. The polymerization heat can be extracted by means of cooling water circulating in the jacket of the reactor. By extension, said polymerization may also be performed in a loop reactor made of one or more single loops, which if more than one loop reactor is present can be used in parallel or in series. Said reactors operate in a liquid full mode. When used in series they can be connected through means such as for example through one or more settling legs of the first reactor. Said polymerization may also be performed in a single loop reactor.

The produced polymer is discharged according to the process of the present invention from a loop reactor along with some diluent through two or more settling legs in which the solid content is increased with respect to its concentration in the body of the reactor.

Sequentially discharging includes also the situations where said settling legs may be alternately or simultaneously discharged.

According to an embodiment of the present invention, the rate of discharge of the polymer slurry is such as to allow substantially uninterrupted outgoing flow from a loop reactor (from the points of discharge of the polymer slurry through two or more settling legs and also through the product recovery zone) equal to the in-going flow of feeds to the reactor.

As used herein the term "substantially uninterrupted" refers to a flow that can be interrupted no more than 50% of the time, preferably no more than 20% of the time, most preferably no more than 5% of the time.

The rate of discharge of the polymerization slurry out of the reactor and into a product recovery zone is such as to maintain a pressure as constant as possible in the slurry reactor and to eliminate intermittent low-pressure pulses associated with a more important and more sudden discharge of a portion of the reactor contents that occurs with the conventional batch operating settling legs on slurry reactors.

As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When as in the case of a double loop reactor at least one additional reactor is present downstream of the settling legs the discharged slurry is transferred through transfer lines to this next reactor. Transfer is made possible by injecting the slurry in the downstream reactor in a point where the pressure is lower than the pressure at the outlet of the settling legs.

When no reactor is present downstream of the settling legs, the extracted slurry may be depressurized and transferred through for example heated or not heated flash lines to a flash tank where the polymer and the unreacted monomer and/or co-monomer and diluent are separated. The degassing of the polymer may be further completed in a purge column.

Figure 38:
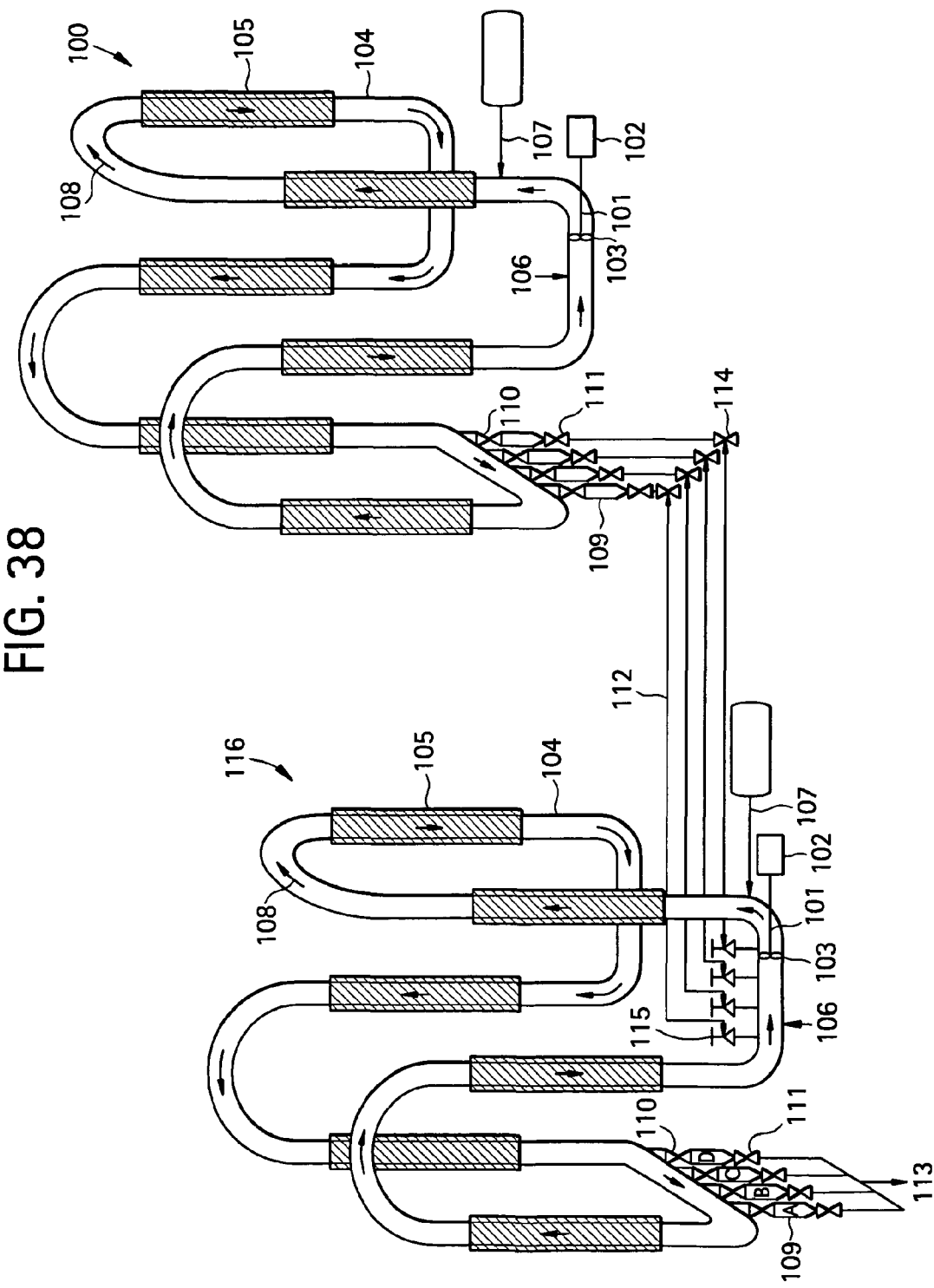
FIG. 38 represents a schematic perspective view of a double loop polymerization reactor.

Referring now to the drawings, FIG. 38 schematically illustrates an example of a double loop reactor 100/116 suitable for the polymerization process according to the invention. Said polymerization process is carried out in said double loop reactor 100/116, consisting of two loop reactors 100 and 116, each of which typically comprises a plurality of interconnected pipes 104 such as a plurality of vertical pipe segments, a plurality of upper lateral pipe segments, a plurality of lower lateral pipe segments, wherein each of said vertical pipe segment is connected at an upper end thereof to one of said upper lateral pipe segment and is connected at a lower end thereof to one of said lower lateral pipe segments through elbow shaped connecting segments, thus defining a continuous flow path for said slurry. It will be understood that while each of the reactors 100 and 116 of the double loop reactor 100/116 is illustrated with six vertical pipes, said reactors 100 and 116 may be equipped with less or more pipes, such as 4 or more pipes, for example between 4 and 20 vertical pipes. The vertical sections of the pipe segments 104 are preferably provided with heat jackets 105. Polymerization heat can be extracted by means of cooling water circulating in these jackets of the reactor. Reactants are introduced into the reactor 100 by line 107. Catalyst, optionally in conjunction with a co-catalyst or activation agent, is injected in the reactors 100 and 116 by means of the conduct 106. In a preferred embodiment, catalysts are introduced through conduct 106 just upstream from the circulation pump, and diluent, monomer, optional co-monomers and reaction additives are introduced through line 107 just downstream of the circulation pump.

The polymerization slurry is directionally circulated throughout the reactors 100 and 116 as illustrated by the arrows 108 by one or more pumps, such as axial flow pump 101. Each pump may be powered by an electric motor 102. As used herein the term "pump" includes any device from compressing driving, raising the pressure of a fluid, by means for example of a piston or set of rotating impellers 103.

As illustrated in FIG. 38, one of the horizontal sections of loop reactors 100 and 116 is equipped with four settling legs A, B, C and D. In a preferred embodiment the processes according to the present invention are performed in loop reactors comprising at least two settling legs. In another embodiment the processes according to the present invention are performed in loop reactors comprising 2 to 20 settling legs, preferably 4 to 12 settling legs, more preferably 6 to 10 settling legs. The settling legs can be located on any segment or any elbow of said reactors. In said settling legs the polymerization slurry settles so that the slurry exiting the reactor is more concentrated in solid than the circulating slurry. This permits to limit the quantity of diluent that has to be treated and re-fed to the reactor for example for the last reactor of a multiple reactor set-up. This also limits the transfer of reactants into the next reactor, which should be minimum when loop reactors are in series as mentioned in EP 649 860. It will be understood that the discharge of said settling legs may be operated in a continuous, sequential or discontinuous mode, but preferably in a sequential mode.

The settling legs are preferably provided with an isolation valve 110. These valves 110 may be ball valves for example. These valves 110 are open under normal conditions and can be closed for example to isolate a settling leg from operation. Said valves can be closed when the reactor pressure falls below a chosen value. Furthermore, the settling legs can be provided with product take off or discharge valves 111 or can be in direct communication with the downstream section.

In an embodiment of the present invention, the discharging is obtained by synchronizing the opening and closing time of the discharge valve 111 of each settling leg thereby maintaining a flow of settled polymer slurry out of said reactor.

The discharge valve 111 that can be used in this invention may be any type of valve which can permit efficient discharge of a polymer slurry, when it is fully open. An angle valve, or ball valves may be suitably used. For example, the valve may have such a structure that solid matter is prevented from accumulating or precipitating at the main body portion of the valve. However, the type and structure of the discharge valve can be selected by those skilled in the art as required. A part or the totality of the leg is discharged at each opening of the discharge valve.

In a preferred embodiment, the discharge from each individual settling leg is adjusted so that the amount of settled slurry discharged through the valve into the product recovery zone is less than 10% larger or smaller than the amount that settles in said individual leg between two consecutive openings of said valve.

Downstream the exit of the settling leg 109 or reactor 100, a transfer line 112 is provided which allows to transfer polymer slurry settled in the settling legs 109 to the second reactor 116, preferably through a piston valve 115. Along the transfer line 112, a three-way valve 114 may divert the flow to a product recovery zone if the multiple loop reactor has to be used in parallel configuration.

Polymer slurry settled in the settling legs 109 of reactor 116 can be removed by means of one or more product recovery lines 113, e.g. to a product recovery zone.

Figure 39A:
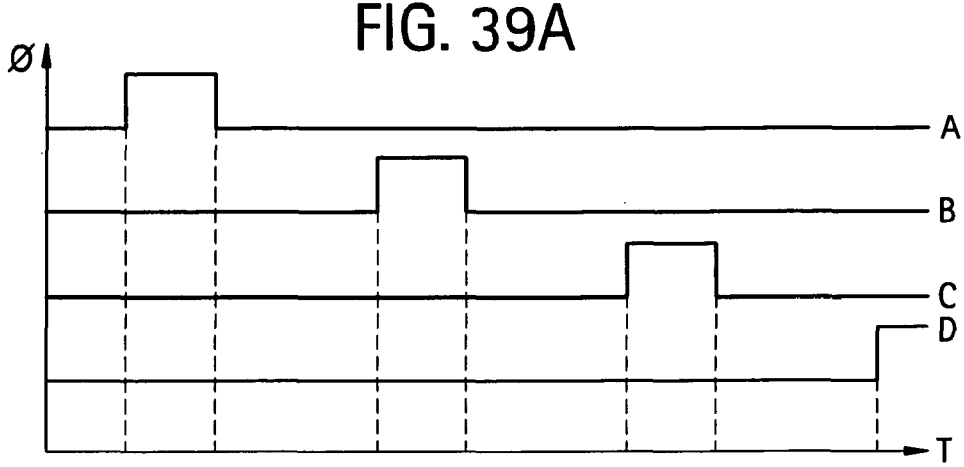
FIG. 39A represents a flow diagram for settling legs operating according to the prior art.
Figure 39B:
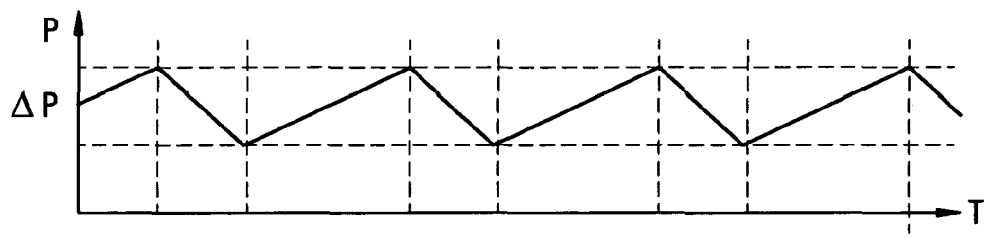
FIG. 39B represents a graph of the pressure measured as a function of time in a reactor operating according to the prior art.

Referring now to FIG. 39A, said Figure represents a flow diagram for settling legs operating according to the prior art. Time is along the abscissa. Each line represents the status Ø of one of the settling leg. For this schematic drawing, four legs A, B, C and D are considered. This number of legs is taken as a matter of example but the method applies to any number of legs larger than one. Each of the four lines has two levels: a low level indicating that that particular leg is closed and a high level indicating that it is open. In this prior art, there is a time interval during which the settling legs are closed and the polymer slurry is not discharged. During such period of time the pressure in the reactor continuously increases due to continuous injection of feed into the reactor. In FIG. 39B a graph illustrating the influence of said discontinuous discharging flow on the pressure in a loop reactor is shown. The pressure is not kept constant and varies greatly between two discharging periods. The pressure increases when all the legs are closed and decreases quickly when one leg opens. Pressure fluctuations ΔP in said loop reactor may be as high as 1 bar.

Said pressure fluctuation causes many problems such as perturbations of the flow pattern, the risk of creation of gas bubbles in the reactor, due to the pressure dependency of the monomer solubility in the diluent, thereby limiting the productivity of the polymerization process. Thus, discontinuous discharge has the further disadvantage of limiting the concentration of the monomers in the loop reactor.

Figure 40A:
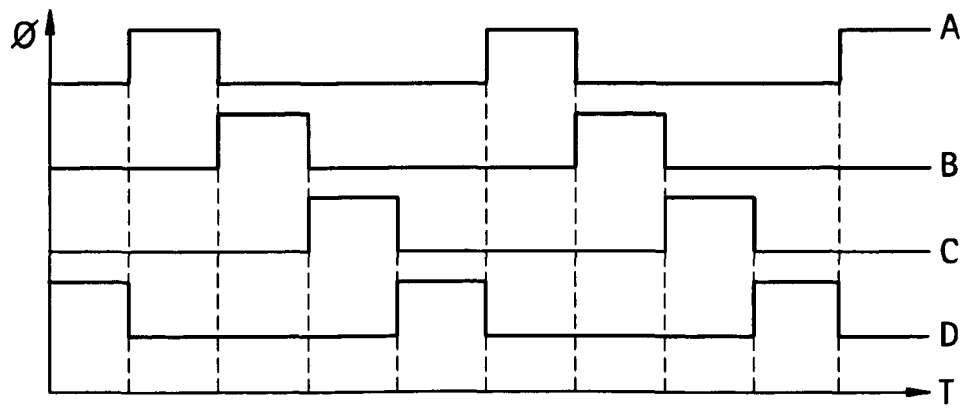
FIG. 40A represents a flow diagram for settling legs operating according to an embodiment of the present invention.

FIG. 40A represents a flow diagram for settling legs operating according to an embodiment of the present invention with sequential discharging of the legs. In this particular embodiment, when a given settling leg closes, the following one opens. In this embodiment, there is always one leg open. The rate of discharge of the polymer slurry is such as to maintain a flow of said settled slurry from said settling legs according to a preferred embodiment. In this preferred embodiment, the aggregate time of discharge for all the legs is equal to 100% of the time interval between two triggerings of the same settling leg.

Figure 40B:
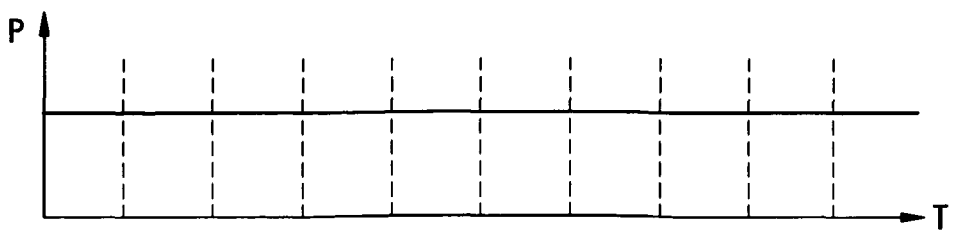
FIG. 40B represents a graph of the pressure measured as a function of time in a reactor operating according to the embodiment of the present invention corresponding to FIG. 40A.

FIG. 40B is a graph illustrating the influence of said sequential discharging with substantially uninterrupted flow on the pressure in the loop reactor is shown according to a preferred embodiment of the present invention. The rate of discharge of said settled slurry is such as to maintain a constant pressure in the slurry reactor and to eliminate intermittent low-pressure pulses associated with a more important and more sudden discharge of a portion of the reactor contents that occurs with the conventional batch operating settling legs on slurry reactors (FIG. 39A).

In a preferred embodiment, the opening/closing of each settling leg as well as the discharge aperture of each settling leg is adjusted and synchronized so as to maintain a constant pressure in the reactors. In another preferred embodiment, the opening/closing of each settling leg as well as the discharge aperture of each settling leg is adjusted so that the aggregate time of closure for all the legs is less than 50%, preferentially less than 20%, preferably less than 5%, most preferably is 0% of the time interval between two triggerings of the same settling leg.

As illustrated in said FIG. 40A the opening time of a settling leg coincides with the closing time of a subsequent settling leg, such sequence carries until the last settling leg has been discharged, and the cycle starts again as to maintain a flow of settled slurry out of said reactor which is substantially uninterrupted.

More in particular, discharging of said polymer slurry from each settling leg sequentially is performed in such a way that once the last settling leg has been discharged the first settling leg is discharged again, said process further comprising one or more cycles of:
(i) closing the discharge valve of a settling leg while simultaneously opening the discharge valve of another settling leg,
(ii) adjusting the flow through the discharge valves of said two or more settling legs so as to regulate the mass balance of the slurry within the reactor. This flow adjustment may be obtained, as an example, by adjusting the aperture of the discharge valve or of any flow-regulating device located close to the discharge valve.

The sequential opening cycle time of the discharge valve of each settling legs according to the present invention allows to maintain a constant pressure in the reactor.

Adjusting the aperture of the discharge valve of the settling leg includes but is not limited to reducing or enlarging the size of the opening of the discharge valve, or adding downstream of said discharge valve another flow regulating device of adjustable smaller aperture or an adjustable reduction of smaller aperture.

In an embodiment of the present process, the opening of a settling leg is triggered by the closing of another settling leg and the dosing of a settling leg triggers the opening of another settling leg.

More in particular, the discharging is adjusted in such a way that the closing of a first settling leg and the opening of a subsequent settling leg start at the same time.

According to the present invention, the synchronizing and the triggering of the opening and closing of said settling legs are controlled by computational means. These computational means allow the adjustment and the control of the periodical opening at predetermined frequencies and sequence of the settling legs to maintain a flow of said settled slurry out of said reactor which is substantially uninterrupted. Other control means such as pressure or temperature controllers and flow controllers, flow transducers and flow sensors may be used to further fine-tune the discharging process.

The present invention encompasses different types of control means which accomplish the purpose of the invention. The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The actuation and the control of the discharging step can be implemented using electrical analog, digital electronic, pneumatic, hydraulic, mechanical or other similar types of equipment or combinations of one or more such equipment types. A computational means is used in the preferred embodiment of this invention to operate and control the process parameters. Computers or other types of computing devices can be used in the invention.

The present invention also relates to computational means comprising a process controller operatively connected to the discharge valves of said settling legs.

The present invention further relates to a process for sequentially discharging through two or more settling legs, polymer slurry from a loop reactor so as to obtain a substantially uninterrupted flow of said slurry into a polymer transfer line between two polymerization reactors or a product recovery zone said process comprising the step of discharging said settled polymer slurry from said two or more settling legs through discharge valves in a predetermined sequential pattern so that the aggregate time of opening for all the legs is more than 50%, preferentially more than 80% and most preferably more than 95% of the time interval between two triggerings of the same settling leg.

It has been observed that by sequentially discharging settled polymer slurry from a loop reactor according to the present process, higher weight percent solids can be circulated in the reactor. Furthermore, increased weight percent solids in the loop reactor increases catalyst residence time, increases catalyst productivity. Higher catalyst productivity also increase the weight percent solids removed from the reactor which reduces the diluent processing cost in recycle equipment. In addition the present invention enables to establish non-fluctuating reaction conditions in a reactor during a polymerization process. More in particular, the processes according to the present invention allow to preserve pressure in the reactor at a certain value and to avoid pressure fluctuation in a polymerization reactor. Furthermore, the process according to the present invention also reduces the pressure fluctuations in the flash tank and the inlet of the recycle compressor what induces benefits in the reliability of said compressor. Furthermore, polymerization product slurry discharging operated according to the present invention allows the monomers concentrations to be adjusted by the monomer solubility in the liquid diluent in the reactor at a higher reference pressure, thereby increasing the specific reaction rate for polymerization and increasing the reactor throughput.

The present invention relates to an apparatus and a process which provide a substantially horizontally transfer of polymer slurry from one to the other reactor in a multiple reactor system.

The following detailed description has been focused on a multiple loop reactor, consisting of at least two loop reactors which are interconnected in series. However, the present invention is not restricted to loop reactors but is also suitable for any other type of multiple reactor, consisting of at least two reactors which are connected in series.

The present invention is suitable for polymerization processes occurring in loop reactors for the production of olefin polymers consisting of the catalytic polymerization of olefins such as $C_2$ to $C_8$ olefins in a diluent containing the monomer to be polymerized. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 1.30 bars, preferably at pressure of from 30 to 50 bars, more preferably at pressure of 37 to 45 bars.

The present invention has in particular been described in terms of the polymerization of ethylene. Suitable "ethylene polymerization" includes but is not limited to homo-polymerization of ethylene, co-polymerization of ethylene and a higher 1-olefin co-monomer such as butene, 1-pentene, 1-hexene, 1-octene or 1-decene. More in particular, the present invention is described in terms of the polymerization of ethylene for manufacturing bimodal polyethylene (PE). "Bimodal PE" refers to PE that is manufactured using two reactors, which are connected to each other in series.

Ethylene polymerizes in a liquid diluent in the presence of a catalyst, optionally a co-catalyst, optionally a co-monomer, optionally hydrogen and optionally other additives, thereby producing polymerization slurry.

As used herein, the term "polymerization slurry" or "polymer slurry" or "slurry" means substantially a multi-phase composition including at least polymer solids and a liquid phase and allows for a third phase (gas) to be at least locally present in the process, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable diluents are well known in the art and include hydrocarbons that are inert or at least essentially inert and liquid under reaction conditions. Suitable hydrocarbons include isobutane, n-butane, propane, n-pentane, i-pentane, neopentane, isohexane and n-hexane, with isobutane being preferred.

Suitable catalysts are well known it the art. Examples of suitable catalysts include but are not limited to chromium oxide such as those supported on silica or aluminium, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

Figure 41:
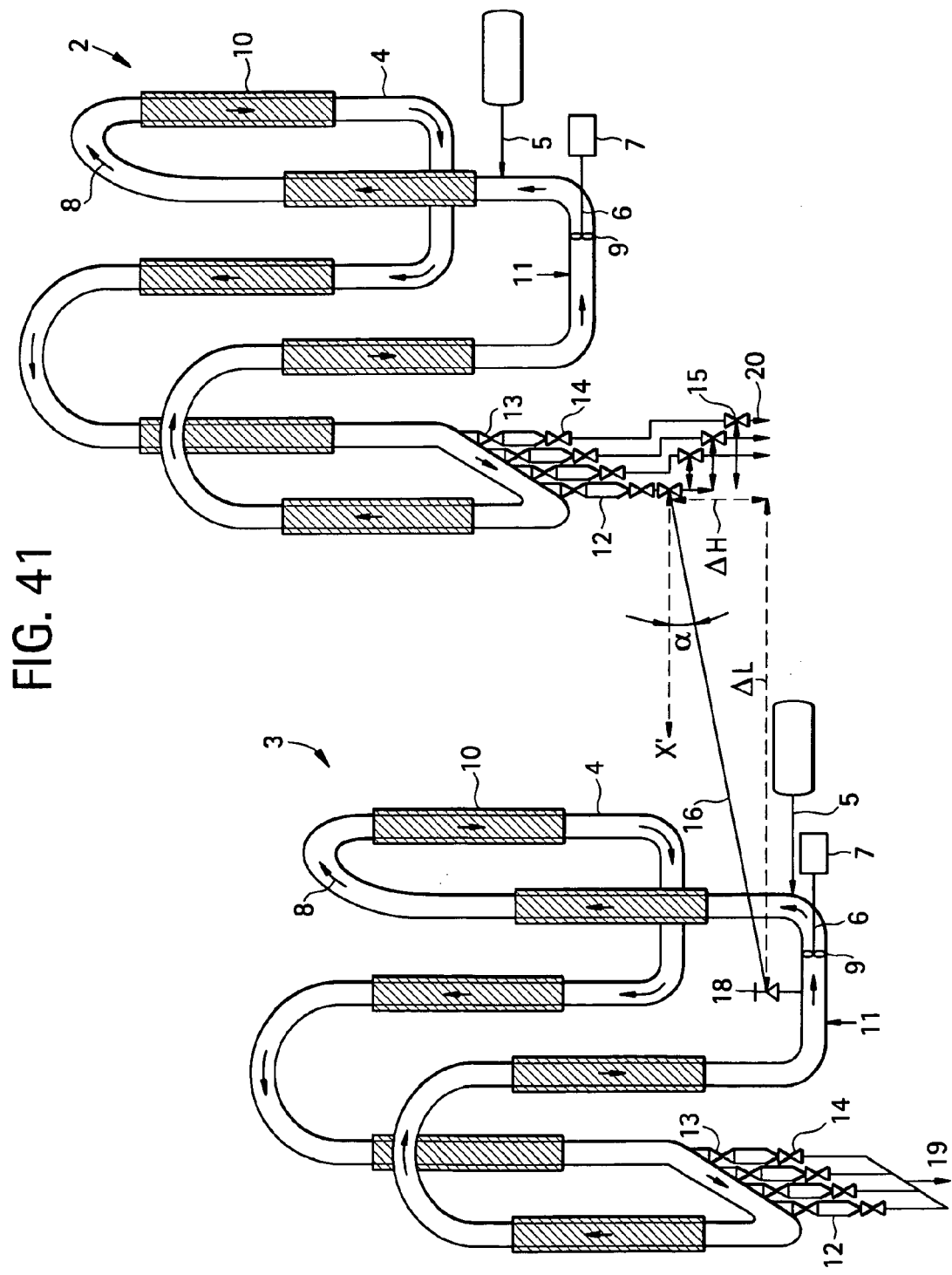

In another embodiment, the present invention relates to a multiple loop reactor suitable for olefin polymerization comprising at least two interconnected loop reactors whereby said connection essentially consists of one or more transfer lines suitable for transferring polymer slurry from a reactor to another reactor and whereby said transfer line extends substantially horizontally. Referring now to FIG. 41, a multiple loop reactor 1 is illustrated comprising at least two polymerization reactors 2, 3, which are interconnected in series in accordance with the present invention. Although, in a preferred embodiment, the invention comprises the use of two separate loop reactors, it will be appreciated by those skilled in the art that the invention also may be practiced using more than two separate reactors.

The two reactors 2, 3 may be operated in series to produce, simultaneously, the same or two different polyolefin products, depending upon the polyolefin feed stock and catalyst provided and the temperature, pressure and other conditions maintained inside the reactors. In the preferred embodiment of the apparatus and method of present invention, the reactors are operated in series so that polymer product produced in one reactor is transferred to another reactor for further polymerization therein.

The final polyolefin product produced by the multiple loop reactor is dependent upon a wide range of variables which may be separately adjusted in at least two loop reactor systems, including compositions of the fluidizing mediums in each loop reactor, the polymerization catalysts, the temperatures, pressures, flow rates and other factors maintained in the different reactor. Thus, polymerization system of the present invention using the present multiple loop reactor 1 has the operating flexibility to produce a broad spectrum of polyolefin polymers with varying physical properties. In a preferred embodiment, loop reactors of the multiple loop reactor system are used in series to produce a sequentially polymerized product containing specific characteristics.

As illustrated on FIG. 41, the multiple loop reactor comprises at least two interconnected loop reactors 2, 3, each consisting of a plurality of interconnected pipes 4 defining a flow path 8 for a polymer slurry. In addition, one or more settling legs 12 connected to the pipes 4 of one reactor 2, are provided. Each of these settling legs 12 is provided with a transfer line 16 for transferring polymer slurry to another reactor 3. One or more settling legs 12 are also connected to the pipes 4 of the other reactor 3 for discharging polymer slurry from the reactor 3 into a product recovery zone. Furthermore, at least one pump 6 suitable for maintaining the polymer slurry in circulation in said multiple loop reactor is provided. The connection of the loop reactors 2, 3 essentially consists of one or more transfer lines 16 and whereby said transfer line extends substantially horizontally from one reactor 2 to the other reactor 3. In particular, the transfer line extends substantially horizontally under an angle of inclination α, with respect to a horizontal axis X-X' which is lower than 45°.

Each loop reactor 2, 3 consists of a plurality of interconnected pipes 4, such as a plurality of vertical pipe segments, a plurality of upper lateral pipe segments, a plurality of lower lateral pipe segments, wherein each of said vertical pipe segment is connected at an upper end thereof to one of said upper lateral pipe segment and is connected at a lower end thereof to one of said lower lateral pipe segments through elbow shaped connecting segments, thus, defining a continuous flow path 8 for a polymer slurry. It will be understood that while the loop reactor 2 and 3 are illustrated with four vertical pipes, said loop reactors 2,3 may be equipped with less or more pipes, such as 4 or more pipes, for example between 4 and 20 vertical pipes. The vertical sections of the pipe segments are preferably provided with heat jackets 10. Polymerization heat can be extracted by means of cooling water circulating in these jackets of the reactor. Said reactors preferably operate in a liquid full mode.

The reactants including monomer ethylene, a light hydrocarbon diluent and optionally a co-monomer and hydrogen are introduced into the reactor 2 by line 5. At least one reactor 2 is also fed with catalyst, optionally in conjunction with a co-catalyst or activation agent, by means of the conduct 11.

The polymerization slurry is maintained in circulation in the loop reactors. The polymerization slurry is directionally circulated throughout the loop reactor 2, 3 as illustrated by the arrows 8 by one or more pumps, such as axial flow pump 6. The pump may be powered by an electric motor 7. As used herein the term "pump" includes any device from compressing driving, raising the pressure of a fluid, by means for example of a piston or set of rotating impellers 9. According to the present invention, the pump is preferably of axial type.

In a preferred embodiment, catalysis are introduced upstream from the circulation pump 6 via line 5, while diluent, monomer, potential co-monomers and reaction additives are preferably introduced downstream of the circulation pump 6 via line 11.

Each loop reactor 2, 3 is further provided with one or more settling legs 12 connected to the pipes 4 of the reactor 2, 3. Intermediate polymer slurry or polymer product may be removed from the loop reactors, by continuous or periodical discharge through one or more settling legs 10 along with some diluent. In the settling legs 12, the solid content is increased with respect to its concentration in the body of the loop reactor. As illustrated in FIG. 41, polymer slurry settled in the settling legs 12 may be removed by means of a three-way valve 15, either to another reactor 3, to which it is transferred by means of a transfer line 16, or to the product recovery zone, for instance by means of a conduit 20.

The settling legs can be located on any segment or any elbow of said loop reactor. In said settling legs the polymerization slurry decants so that the slurry exiting the reactor is more concentrated in solid than the circulating slurry. This permits to limit the quantity of diluent that has to be treated and re-fed to the reactor. It will be understood that the discharge of said settling legs may be operated in a continuous or discontinuous mode.

As illustrated in FIG. 41, one of the horizontal sections of each reactor 2, 3 is provided with four settling legs 12. Although only four settling legs are illustrated in FIG. 41, the present invention encompasses loop reactors comprising one or more settling legs. In an embodiment of the present invention said loop reactor comprises 2 to 20 settling legs, preferably 4 to 12 settling legs, more preferably 6 to 10 settling legs.

The settling legs 12 are preferably provided with an isolation valve 13. These valves 13 may for example be ball valves. Under normal conditions these valves are open. These valves can be closed for example to isolate a settling leg from operation. Said valves 13 can be closed when the reactor pressure falls below a chosen value.

Further the settling legs can be provided with product take off or discharge valves 14. Discharging is performed in such a way that the volume discharged from a settling leg substantially corresponds to the volume of polymer slurry settled in said settling leg since its previous discharge. The discharge valve 14 may be any type of valve, which can permit continuous or periodical discharge of polymer slurry, when it is fully open. An angle valve, or ball valve may be suitably used. For example, the valve may have such a structure that solid matter is prevented from accumulating or precipitating at the main body portion of the valve. However, the type and structure of the discharge valve can be selected by those skilled in the art as required. According an embodiment of the present invention the totality of settled slurry is discharged at each opening of the discharge valve. When a plurality of legs are employed, the discharge of the settled polymer slurry may be discharged in sequence on a rotating basis for more uniform discharging to a subsequent reactor or to a product recovery zone.

Downstream the valve 14, at the exit of the settling leg 12, a three-way valve 15 is provided which allows to transfer polymer slurry settled in the settling legs, either to a product recovery zone, or to another reactor, by means of the transfer line 16.

Each settling leg 10 provided on one reactor 2, which is connected in series with another reactor 3, may be provided with a transfer line 16 for transfer of (intermediate) polymer slurry settled in the settling leg 12 to the other loop reactor 3. Settling legs 12 can also be connected to the pipes of the other loop reactor 3 for discharging settled polymer slurry into a product recovery zone, e.g. by means of conduits 19. As used herein "product recovery zone" includes but is not limited to heated or not heated flash lines, flash tank, cyclones, filters and the associated vapor recovery and solids recovery systems or transfer lines to a following reactor and said following reactor when several reactors are connected in series.

The two loop reactors 2, 3 represented in FIG. 41 are connected in series by means of transfer lines 16. These transfer lines comprise generally cylindrical, intermediate product transfer lines and extend substantially horizontally from the exit of a settling leg of a reactor to the entry in the other reactor. In particular, the transfer line connects the three-way valve 15, provided at the exit of the settling leg 12 of one reactor 2, with the entry in the other reactor 3, where a piston valve 18 is provided.

FIG. 42 is a detailed illustration of the connection of two loop reactors by means of a transfer line 16. As illustrated in FIG. 42, the transfer line extends substantially horizontally under an inclination angle $\alpha$ with respect to a horizontal axis X-X'. In a preferred embodiment, the angle $\alpha$ is lower than 45°, preferably lower than 40°, lower than 35°, lower than 30°, lower than 25°, lower than 20°, lower than 15° and most preferably corresponds to 0°, 1°, 2°, 3°, 4°, 5°, 6°, 7°, 8°, 9° or 10°.

In another embodiment, the tangent of angle $\alpha$ can also be defined as $\Delta H/\Delta L$, whereby $\Delta L$ is the horizontal distance between the exit of a settling leg of a reactor and the entry in another reactor, and whereby $\Delta H$ is the perpendicular distance between the exit of a settling leg of a reactor, in particular the three-way valve 15, and the entry in another reactor, in particular at the piston valve 18. In a preferred embodiment, the perpendicular distance $\Delta H$ between the exit of a settling leg of a reactor and the entry in another reactor is smaller than the horizontal distance $\Delta L$ between the exit of a settling leg of a reactor and the entry in another reactor.

In another preferred embodiment, the transfer line 16 can be further provided with one or more means for controlling temperature, flow or pressure of the polymer slurry in said line. The means for controlling temperature may for instance comprise a jacket. In addition, diluent flushing means 17 can be provided preferably at the inlet of the transfer line 16. Isobutane flushing means 17 enable to flush isobutane through the transfer line 17 and to keep the line unplugged. This is important when the settling leg is put out of service.

One of the advantages of such flush is that a settling leg 12 can be can put back in service after it was taken out of service.

In another embodiment, the transfer line 16 for transferring polymer slurry from one to another loop reactor is equipped by one or more valves, preferably piston valves 18 at the outlet of the transfer line. The piston valves 18 are capable of sealing the orifice by which the transfer line 16 is connected to the loop reactor 3.

It is believed that positioning of loop reactors in a multiple loop reactor system in a substantially horizontal plane and the use of the substantially horizontal intermediate product transfer lines enables to improve operating characteristics for the system by facilitating the installation of the reactors and by enabling the reactors to be installed at larger distances than is the case when using vertically arranged reactors.

Further, such substantially horizontal configuration allows easiness of locating the lines so that they are straight. Obstruction in the transfer line, including curves or any other deviations from a substantially horizontal orientation, and any unnecessary extension of the transfer line, may decrease the rate of transfer between the loop reactors and increases the frequency of plugging in the transfer line.

The polymerization system of the present invention minimizes the opportunity for plugging in the transfer lines by eliminating sites where the polyolefin polymer can begin to accumulate. Thus, in the preferred embodiment, the transfer line is substantially horizontal in orientation and free of any bends or other obstruction. If desired, additional means may be provided in the product transfer line for aiding the flow of polymer product between the loop reactors, e.g. vibration hammers.

As a further safety measure in the event of polymer plugs or obstructions developing in the transfer line during operation, more than one product transfer lines is provided between the polymerization loop reactors.

In the event that the horizontal transfer line becomes plugged or obstructed for any reason, or if a product flow rate beyond the capacity of the transfer line is desired, then polymer slurry can be withdrawn from one reactor through another transfer line and supplied to another polymerization reactor to permit continued operation of the system. The reactors are still working while transfer lines are out of operation.

In a preferred embodiment, more than one product transfer line is not only used from safety point of view, but also from productivity point of view. More than one product transfer line may be used so that the use of settling legs is maximized and the transfer of diluent from the first reactor to the second reactor is minimized. In another embodiment, some transfer lines can be put out of service, e.g. when polymerization is performed at reduced rates and for the start-up.

Preferably, the transfer lines for transferring polymer slurry from one to another reactor, are continuously flushed, e.g. with isobutane, in operation or not.

In another preferred embodiment, by operation in accordance with the present invention, all lines, vessels, pumps, valves, etc. can be kept free of dogging by means of flushing or purging with nitrogen or diluent, i.e. isobutane. It is to be understood that where necessary flushing and purging means and lines are available on the device according to the invention in order to avoid plugging, or blocking. This is useful for example when the reactor is to be completely emptied in order to make an intervention on the reactor.

It is clear from the present description that numbers and dimensions of the different parts of the reactor relate to the size of the polymerization reactors and can be changed in function of the reactor sizes.

In another preferred embodiment, it is to be understood that all lines or conduits applied in accordance with the present invention may be provided, where necessary with flow measuring means.

In a preferred embodiment, the present invention can be applied on a double loop reactor, as depicted on FIG. 43. FIG. 43 represents two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, is injected in the reactor 100 or 116 by means of the conduit 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the valve 111 at the exit of the settling leg 109 of reactor 100, a transfer line 112 is provided which allows to transfer polymer slurry settled in the settling legs 109 to the other reactor 116 preferably through a piston valve 115. Polymer slurry settled in the settling legs 109 of reactor 116 can be removed by means of one or more product recovery lines 113, e.g. to a product recovery zone.

The catalyst's particle size distribution (PSD) $d_{50}$ is measured by laser diffraction analysis on a Malvern type analyzer (Malvern 2000S) after having put the catalyst in suspension in cyclohexane. The particle size distribution d50 is defined as the particle size for which fifty percent by volume of the particles has a size lower than the d50.

The fluff particle size distribution (PSD) $d_{50}$ is measured according to ASTM method D 1921-89 and is defined as the particle size for which fifty percent by weight of the particles has a size lower than the d50.

The particle size distribution of the catalyst used in the present process is lower than previously used in olefin polymerization processes.

It was expected that by using a smaller catalyst size a correspondingly smaller resin particle would be obtained.

In this regard, it has been thought previously in this art that a smaller resin particle size would be disadvantageous because it in fact was thought that it would be more difficult to homogenize the resulting polyolefin because smaller resin grains would not flow as easily through the extruder. It was also expected that smaller resin particles would result in a lower settling efficiency.

By using a smaller catalyst particle size, the size of the grains in the produced polyolefin resin ("fluff") also are smaller. This has been found to have the benefit of improved and easier homogenization during extrusion because the "fluff" is able to be made fully molten.

Other advantages of a smaller resin particle size also have been found unexpectedly. These include:

Improved unit throughput in the process. The smaller resin particles pack together more efficiently in the settling legs. This means that less diluent and more solid resin product is removed per unit volume. This effect may be attributed to improved "fluff" bulk density (BD) which gives higher settled "fluff" mass in the reactor legs (Bulk density is measured following the method of standard test ASTM D 1895).

Comonomer (for example hexene) incorporation is improved because a lower amount of comonomer is necessary to obtain an equivalent density.

Lower pump power consumption to circulate the solids in the reactor.

Resin product can remain in the reactor for longer. This is because higher solids levels can be maintained in the reactor with the same power consumption on the circulation pump. A higher fluff residence time enables an improvement in the catalyst yield. In other words, more product is produced per kg of catalyst.

One way of indirectly measuring the "fluff" bulk density is by obtaining the ratio of diluent to monomer injected into the reactor. This is measured at the reactor feeds. As such, where the diluent is isobutane and the polymer is polyethylene, a ratio isobutane:ethylene can be obtained as an indication of the fluff settling efficiency. This ratio substantially is not effected by decreasing the $d_{50}$ of the catalyst. This is because the lower $d_{50}$ of the "fluff" is compensated by the higher settled "fluff" mass in the reactor legs (due to an improved "fluff" bulk density). Also, it has been found that the level of fines present in the "fluff" is not disadvantageously higher when using a catalyst with a lower $d_{50}$.

The present inventors have found that when using a smaller catalyst particle size, the size of the produced resin particle is not as small as expected. This is because the resin particle size in fact depends on two factors. These are: (1) the catalyst particle size and (2) the catalyst productivity. Unexpectedly, it has been found that productivity is increased when the catalyst particle is made smaller. As such, a smaller difference in resin particle size is observed than was expected (because it was expected that productivity would remain the same).

To exemplify the increase in productivity, it can be reported that, previously, 1 g of catalyst (particle size 23 μm) produced 5,000-10,000 g of resin. It has now been found that 1 g of catalyst (particle size 13 μm) produces 20,000 g of resin. As such, the present invention also provides a process wherein the catalyst has an improved productivity. Increased productivity means a lower catalyst cost per unit resin.

Preferably, the catalyst has a $d_{50}$ of less than 15 μm.
Preferably, the catalyst has a $d_{50}$ of greater than 8 μm.
Most preferably, the catalyst has a $d_{50}$ of about 13 μm.

Desirably, the polyolefin resin mace by the present process has a particle size distribution of less than 500 μm, more desirably about 400 μm. This can be compared with previously known processes where the polyolefin may have had a particle size distribution of greater than 600 μm.

Generally, Ziegler-Natta type catalysts usable in the present process comprise a transition metal compound (compound A) of Group IV-VIII (mainly Ti or V) supported on a carrier. Such catalysts are well known in the art. Examples of Ziegler-Natta catalysts are $TiCl_4$, $TiCl_3$, $VCl_4$, $VOCl_3$. An $MgCl_2$ support is preferred.

Preferably, the Ziegler-Natta catalyst comprises from 10 to 18% Mg by weight and from 3 to 10% Ti by weight. More preferably, the Ziegler-Natta catalyst comprises about 13% Mg by weight and about 7% Ti by weight.

It will be understood in the present process that, where necessary, an activating agent will be needed to activate the catalyst Suitable activating agents, where needed, are well known in this art. Suitable activating agents include organo-metallic or hydride compounds of Group I to III, for example organo-aluminium compounds such as those of general formula $AlR_3$, $R'_2AlCl$ or $R'_2Al_2Cl_3$ in which R, R', and R' each independently is a hydrocarbon radical, preferably an alkyl group with 1 to 16 carbon atoms, preferably from 2 to 12 carbon atoms. Suitable activating agents include, for example $Et_3Al$, $Et_2AlCl$, and $(i-Bu)_3Al$. One preferred activating agent is triisobutylaluminium.

Typically the polymerization process will be carried out in a hydrocarbon diluent. One suitable diluent is isobutane. A separate catalyst diluent may be required.

Suitable catalyst diluents will be known to those skilled in this art.

Preferably, the present process is used to make an ethylene or propylene, homopolymer or copolymer.

Also, preferably the present process is used to make a polymer (for example polyethylene) having a broad molecular weight distribution, such as a bimodal polymer such as bimodal polyethylene. The molecular weight distribution (MWD) can be fully described by means of the graph obtained by gel permeation chromatography. However, the molecular weight distribution can be generally described by a figure which represents the ratio between the mean molecular weight by weight and the mean molecular weight by number (the polydispersisity index). Depending on the applications, the molecular weight distribution required may vary from 10 to 30, preferably of from 12 to 24.

More preferably, the process is used to make a polymer (for example polyethylene) having a typical molecular weight distribution of greater than 15.

Preferably, hydrogen is used to control the molecular weight of the polymer. A higher pressure of hydrogen leads to a lower mean molecular weight.

Any suitable reactors can be used, for example one or more loop reactors and/or one or more continuously stirred reactor. Preferably the present process is carried out in a two-reactor system wherein at least one reactor is a loop reactor.

Preferably, the process for producing polyethylene is carried out in two liquid full loop reactors (a "double loop" reactor) as referred to above.

In this regard, it is preferable that the present process is carried out in accordance with the process of EP 0649860, as described above.

Preferably a low concentration of hydrogen is maintained in the first reactor, for instance between 0 and 0.1% by volume, and a high concentration of hydrogen in the second reactor, for instance between 0.5 and 2.4% by volume.

Where a double loop reactor is used, preferably the polymers formed in the first reactor have an HLMI (high load melt index according to ASTM standard D1238, 190° C./21.6 kg) between 0.01 and 5 grams per 10° preferably between 0.1 and 2 grams per 10°. Preferably, the final polymers have an HLMI higher than 5 grams per 10°.

The properties of the resin are however selected according to the end use of the polymer. Typical properties of resins suitable respectively for pipe, blow-moulding or film applications are summarised in Table 5 (Further advantages will be shown later in the examples with reference to FIG. 44 to FIG. 55.)

TABLE 5

| Use | PIPE range | PIPE typical | BLOW-MOULDING range | BLOW-MOULDING typical | FILM range | FILM typical |
|---|---|---|---|---|---|---|
| density g/cc | 0.948-0.961 | 0.950 0.959$^a$ | | | | |
| MI2 g/10' | nm | nm | nm | 0.25 | nm | nm |
| MI5 g/10' | 0.18-0.38 | 0.28 | | | 0.1-0.5 | 0.4 |

TABLE 5-continued

|  | PIPE | | BLOW-MOULDING | | FILM | |
|---|---|---|---|---|---|---|
| Use | range | typical | range | typical | range | typical |
| HLMI g/10' | 5-12 | 8 | 2-70 | 25 | 4-13 | 10 |
| D = Mw/Mn | 12-24 | 20 | 12-20 | 15 | 15-24 | 20 |

[a]for black grades, the density is higher than for uncoloured resin
nm: means not measurable or smaller than 0.001 g/10 min.
MI2, MI5 and HLMI are measured following the methods of standard test ASTM D 1238 at a temperature of 190° C. and under a load respectively of 2.16 kg, 5 kg and 21.6 kg.

A preferred reaction temperature range in the present process may be said to be from 60 to 120, more preferably from 75 to 100° C.

A preferred applied pressure range may be said to be from 30 to 55 bars, more preferably from 40 to 50 bars.

The reactor pressure to some extent controls the quantity of slurry that is taken out of the reactor.

One embodiment of a "double loop" reactor process can be described as follows:

The process is a continuous process. A monomer (e.g. ethylene polymerizes in a liquid diluent (e.g. isobutane) in the presence of a comonomer (e.g. hexene), hydrogen, catalyst, activating agent and anti-fouling agent. The slurry is maintained in circulation by an axial pump consisting in a reactor essentially of vertical jacketed pipe sections connected by trough elbows. The polymerization heat is extracted by a water cooling jacket. The reactor line includes two reactors that can be used in parallel or in series. The approximate volume of the reactors may be about 100 m³.

The product (e.g. polyethylene) is taken out of the reactor with some diluent through settling legs and discontinuous discharge valves. A small fraction of the total circulating flow is withdrawn. It is moved to a polymer degassing section in which the solid content is increased.

While being depressurised, the slurry is transferred through heated flash lines to a flash tank. In the flash tank, the product and diluent are separated. The degassing is completed in a purge column.

The powder product is transported under nitrogen to fluff silos and extruded into pellets along with some specific additives. A pellet treatment unit comprising silos and hot and cool air flow allows the removal of residual components from the pellets. The pellets then are directed to homogenization silos before final storage.

The gas coming out from the flash tank and from the purge column is treated in a distillation section. This allows the separate recovery of diluent, monomer and comonomer.

This embodiment of the double loop reactor process in fact would be usable with chromium type, Ziegler-Natta type or indeed metallocene catalysts. Each catalyst type would have a specific injection system.

In a single loop reactor, low gel content can be obtained by reducing the throughput for given polymerization conditions. Alternatively, the activity of the catalyst system can be modified either by increasing the amount of triethylaluminium leading to resins having uncontrollable melt index, or by increasing the temperature, leading to resins having poor mechanical properties.

It is an aim of the present invention to reduce the amount of gel in the final polyethylene.

It is another aim of the present invention to retain the throughput in the polymerization process.

Accordingly, the present invention discloses the use of a chromium-based catalyst system, in two serially connected loop reactors, for the homopolymerization of ethylene or for the copolymerization of ethylene with one or more comonomers, to produce at reduced productivity and thus at high throughput, a polyethylene resin having reduced gel content.

The productivity is less than 3500, preferably less than 2500 grams of polymer per gram of catalyst and the gel content is preferably of at most 30 ppm.

Preferably, the polyethylene is a copolymer of ethylene and the comonomer is an alpha-olefin having from 3 to 8 carbon atoms.

The chromium based catalyst component is not particularly limited and can be any chromium-based catalyst system disclosed in prior art such as for example the chromium-based catalyst component supported on a silica-titania support disclosed in EP-A-905145 or such as a chromium-based catalyst component supported on a silica support.

Preferably the chromium-based catalyst comprises a supported chromium oxide catalyst having a titania-containing support, for example a composite silica and titania support. A particularly preferred chromium-based catalyst component may comprise from 0.5 to 5 wt % chromium, preferably around 1 wt % chromium, such as 0.9 wt % chromium based on the weight of the chromium-containing catalyst. The support comprises at least 1 wt % titanium, preferably around 2 to 3 wt % titanium, more preferably around 2.3 wt % titanium based on the weight of the chromium containing catalyst. The chromium-based catalyst may have a specific surface area of from 200 to 700 m²/g, preferably from 400 to 550 m²/g and a pore volume of greater than 1.8 cc/g preferably from 2 to 3 cc/g.

A particularly preferred chromium-based catalyst ("Catalyst 1") for use in the present invention comprises a catalyst which has an average pore radius of 190 A, a pore volume of around 2.1 cc/g, a specific surface area of around 510 m²/g and a chromium content of around 0.9 wt % based on the weight of the chromium-containing catalyst. The support comprises a composite silica and titania support. The amount of titania in the support provides that the catalyst as a whole comprises around 2.3 wt % titanium.

The catalyst may be subjected to an initial activation step in air at an elevated activation temperature. The activation temperature preferably ranges from 500 to 850° C., more preferably 600 to 750° C.

In order to enhance the degree of comonomer incorporation into the polyethylene resin (thereby to lower the density of the resin), the catalyst preferably has a high surface area, preferably greater than 400 m²/g, a large pore volume, preferably larger than 1.8 cc/g, and it may or may not be fluorinated prior to activation. If it is fluorinated, it has a fluorine content of around 1 wt %.

One or more organoaluminium compounds can be used as co-catalysts. An organoaluminium represented by the formula $AlR_3$ can be used wherein each R is the same or different and is selected from halides or from alkoxy or alkyl groups having from 1 to 12 carbon atoms. Especially suitable aluminium alkyls are trialkylaluminium, the most employed being triethylaluminium (TEAL).

In the first loop reactor, preferably ethylene monomer and an alpha-olefinic comonomer comprising from 3 to 8 carbon atoms are fed thereinto in the liquid phase, typically in an inert diluent, preferably isobutane, together with a chromium-based catalyst. Typically, the copolymerization is performed at a temperature of from 90 to 105° C., more typically around 100° C., and at a pressure of from 20 to 60 bars, more typically around 42 bars. A diluent under supercritical conditions may also be employed in the polymerization process, wherein the pressure of the supercritical diluent is of from 37 to 100 bars and the temperature of from 70 to 140° C.

The comonomer preferably comprises 1-hexene, but may alternatively comprise any one or more of 1-butene, 1-pentene, 4-methyl-1-pentene, 1-heptene or 1-octene.

Typically, the ethylene monomer comprises from 2 to 10% by weight and the comonomer comprises from 0.2 to 4% by weight, each based on the total weight of the monomer and comonomer in the inert diluent. A typical polymerization medium may for example comprise, in an inert diluent such as for example isobutane, an ethylene flow of from 2 to 10 wt %, and a 1-hexene flow of up to 4 wt %.

In the first loop reactor, a first polyethylene resin is produced by copolymerization of the ethylene and the comonomer. In accordance with the preferred process, in the first loop reactor the process variables such as the ethylene flow rate and the temperature are controlled so as to produce a polyethylene resin having a specified high load melt index (HLMI) yielding the required mechanical properties of the resin. Typically, the HLMI ranges from 5 to 35 g/10 min, and is most typically from 8 to 25 g/10 min. The high load melt index is determined using the procedures of ASTM D1238 using a load of 21.6 kg at a temperature of 190° C. The HLMI is broadly inversely indicative of the molecular weight of the polymer. In other words, a low melt index is indicative of a high molecular weight for the polyethylene, and vice versa. The amount of comonomer fed to the first reactor controls the density of the polyethylene fraction produced in said first reactor.

The first polyethylene product, together with unreacted ethylene and comonomer in the inert diluent, is fed to the second loop reactor serially connected thereto and additional monomer (ethylene) and comonomer are fed into the second reactor. The same chromium-based catalyst is present in the second reactor as in the first reactor. In the second loop reactor, the process parameters are varied to produce therein a second polyethylene product having other properties. The properties of the first and second polyethylene resins are selected in order to obtain a final polyethylene resin that has the desired properties. The final polyethylene resin can have a monomodal or a broad or bimodal molecular weight distribution. The molecular weight distribution is defined by the polydispersity index D that is the ratio Mw/Mn of the weight average molecular weight Mw to the number average molecular weight Mn.

The polyethylene products prepared according to the present invention are characterised by very low gel content. A small mean gel size was also observed. It is known in the art that the amount of gel decreases with increasing productivity. Typically low catalyst productivity is a consequence of low residence time. In order to increase the plant output, it is desired to reduce the residence time and therefore the productivity, thereby increasing the amount of gel, which is unavoidable in a single loop reactor. The present invention provides a process whereby the amount of gel is substantially decreased even at low productivity and thus at high plant throughput, by using two serially connected loop reactors. This can be seen in FIG. 56 that represents the amount of gel expressed in ppm as a function of productivity expressed in grams of polyethylene per gram of catalyst for a resin prepared in a double loop reactor, for a resin exiting the first reactor and for a prior art resin. It is observed on that Figure that, at equivalent productivity, the resins of the present invention have a significantly lower gel content than the prior art resins, at same productivity. The amount of gel contained in the final polyethylene is at most 30 ppm. More importantly, at same productivity, the amount of gel is substantially reduced.

The low gel polyethylene resins of the present invention are suitable for preparing films.

EXAMPLES

The invention will now be illustrated by the following examples.

Example 1 and Comparative Example A

Example 1 illustrates a production on a commercial-scale double loop reactor. For comparative example A, a conventional catalyst feed system and control were used. The use of the current invention allows the polymerization reactor to be run at higher slurry densities with less variation than with conventional catalyst feeding control. The lower standard deviations indicate that the present invention allows for improved control of the polymerization process and thus higher product consistency.

TABLE 6

|  |  | Example 1 | Comparative example A |
|---|---|---|---|
| Reactor slurry density | kg/m³ | 547 ± 3 | 531 ± 6 |
| Ethylene flow | kg/hr | 3461 ± 23 | 3855 ± 16 |
| Reactor ethylene concentration | wt % | 6.3 ± 0.1 | 6.6 ± 0.3 |
| Catalyst slurry flow | kg/hr | 70.6 ± 1.9 | 91.0 ± 2.8 |
| Catalyst slurry concentration | wt % | 0.35 ± 0.01 | 0.46 ± 0.05 |

Example 2 and Comparative Example B

Comparison of Present Antifouling Agent with Stadis 450

Four resins (A-D) were produced using essentially two different anti-fouling agents;

Comparative Example B:
  Resin A: a bimodal resin produced using 2.2 ppm Stadis 450® in isobutane (IC4);
  Resin B: a film resin produced using 2.4 ppm Stadis 450® in IC4;

Example 2:
  Resin C: a film resin produced using 1.1 ppm anti-fouling agent I (AFAI) in IC4;
  Resin D: a bimodal resin produced using 1.0 ppm anti-fouling agent I (AFAI) in IC4.

Anti-fouling agent I (AFAI) was in accordance with the present invention and had a formula;

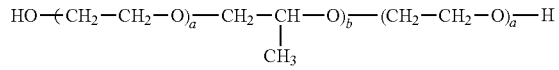

Anti-fouling Agent I had an OH value of 25.5 mg kOH/g, an approximate $M_w$ of 4400, and a 10% w/w ethylene oxide content.

The concentrations of anti-fouling agent I in IC4 and Stadis 450® in IC4 were calculated so as to introduce the same amount of active compound into the reactor in each case. In this regard. Stadis 450® contains about 50% toluene whereas anti-fouling agent I contained no solvent.

The anti-fouling agents (AF) were tested in a polymerization reaction using a Cr on silica-titania catalyst (2.5% titania, 1% Cr, SA of about 500 m²/g and pore volume of 2.5 ml/g.). Activation was performed in a fluidised bed, under airflow for 6 hours, at a given temperature. Complete details of the polymerization process are provided in TABLES 7 and 8 for each of resins A to D.

The reactor parameters and analysis are summarised in TABLE 7 below.

TABLE 7

| | Run | Resin A Stadis | Resin D AFAI |
|---|---|---|---|
| Reactor conditions | Catalyst (dumps/h) | 60.5 | 26.5 |
| | Temperature (° C.) | 96.5 | 97 |
| | Alkyl (ppm) | 1.7 | 1.4 |
| | C2— (kg/h) | 9.0 | 9.0 |
| | C8— (kg/h) | 0.170 | 0.108 |
| | IC4 (kg/h) | 24 | 24 |
| | AF (ppm) | 2.2 | 1.0 |
| Analysis of exiting gas | C2— (wt %) | 4.81 | 4.39 |
| | C6— (wt %) | 0.27 | 0.24 |
| | C6—/C2— | 0.057 | 0.054 |
| Loop analytical results | MI2 (g/10') | 0.077 | 0.060 |
| | HLMI (g/10') | 8.9 | 6.6 |
| | SR2 = HLMI/MI2 | 116 | 110 |
| | Density (g/cm3) | 0.9514 | 0.9501 |
| | Bulk Density (BD) (g/cm3) | 0.433 | 0.403 |
| Analysis of homogenized fluff | Productivity measured by X-ray fluorescence (Prod XRF) (g/g) | 1005 | 2217 |
| | Activity, calculated from g/g/h/% C2 productivity (Activity XRF) | 183 | 443 |
| | Waxes (%) | 5.9 | 4.8 |
| | MI2 (g/10') | 0.088 | 0.0589 |
| | HLMI (g/10') | 10.2 | 6.9 |
| | SR2 = HLMI/MI2 | 116 | 117 |
| | Density (g/cm3) | 0.9536 | 0.9508 |

Resins A and D were produced at the same reactor temperature, equivalent alkyl concentration and the same $C_2$ off-gas. In these experiments, the melt indices MI2 and HLMI were measured following the method of standard test ASTM D 1238 at a temperature of 190° C. and under a load of respectively 2.16 kg and 21.6 kg. The density was measured following the method of standard test ASTM D 1505 at a temperature of 23° C. and the bulk density Bd was measured following the method of standard test ASTM D 1895.

The antifouling agent I as compared to Stadis 450® has a lower poisoning effect, gives higher catalyst productivity and generates lower melt index potential.

After fluff homogenizing, a higher HLMI and density was measured for resin A.

Waxes content was equivalent for both resins A and D.

TABLE 8

| | Run | Resin B Stadis | Resin C AFAI |
|---|---|---|---|
| Reactor conditions | Catalyst (dumps/h) | 35.3 | 36.9 |
| | Temperature (° C.) | 90.5 | 90.5 |
| | Alkyl (ppm) | 1.8 | 1.7 |
| | C2— (kg/h) | 9.0 | 9.0 |
| | C6— (kg/h) | 0.983 | 1.044 |
| | IC4 (kg/h) | 24 | 24 |
| | AF (ppm) | 2.4 | 1.1 |
| Analysis of exiting gas | C2— (wt %) | 5.5 | 5.41 |
| | C6— (wt %) | 1.98 | 2.09 |
| | C6—/C2— | 0.368 | 0.391 |
| Loop analytical results | MI2 (g/10') | 0.158 | 0.155 |
| | HLMI (g/10') | 16.5 | 15.4 |
| | SR2 = HLMI/MI2 | 108 | 101 |
| | Density (g/cm3) | 0.9342 | 0.9348 |
| | Bulk Density (BD) (g/cm3) | 0.433 | 0.408 |
| Analysis of homogenized fluff | Prod XRF (g/g) | 1463 | 1622 |
| | Activity XRF | 233 | 263 |
| | Waxes (%) | 24.4 | 27.5 |
| | MI2 (g/10') | 0.1488 | 0.1535 |

TABLE 8-continued

| Run | Resin B Stadis | Resin C AFAI |
|---|---|---|
| HLMI (g/10') | 14.7 | 15.5 |
| SR2 = HLMI/MI2 | 99 | 101 |
| Density (g/cm3) | 0.9373 | 0.9376 |

Resins B and C were produced at the equivalent reactor conditions as shown in TABLE 8. No significant difference was observed between the anti-fouling agents in resins B and C in terms of properties and productivity, although approximately 10% higher productivity was achieved using anti-fouling agent I in resin C.

Resin Properties

Figure 14:
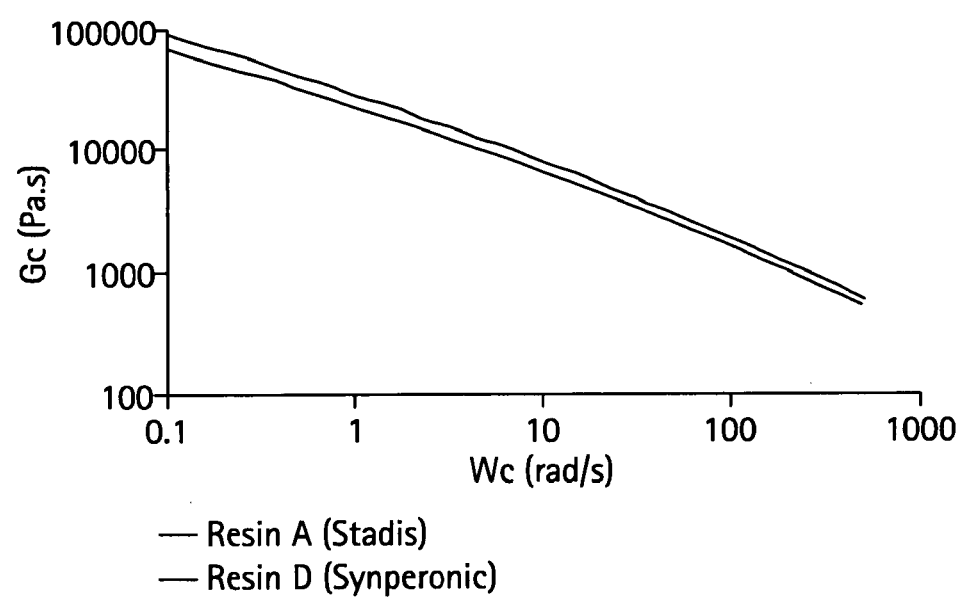
FIG. 14 shows the results of rheological dynamic analysis (RDA), Go expressed in Pa·s as a function of Wc expressed in rad/s performed on resins A and D.
Figure 15:
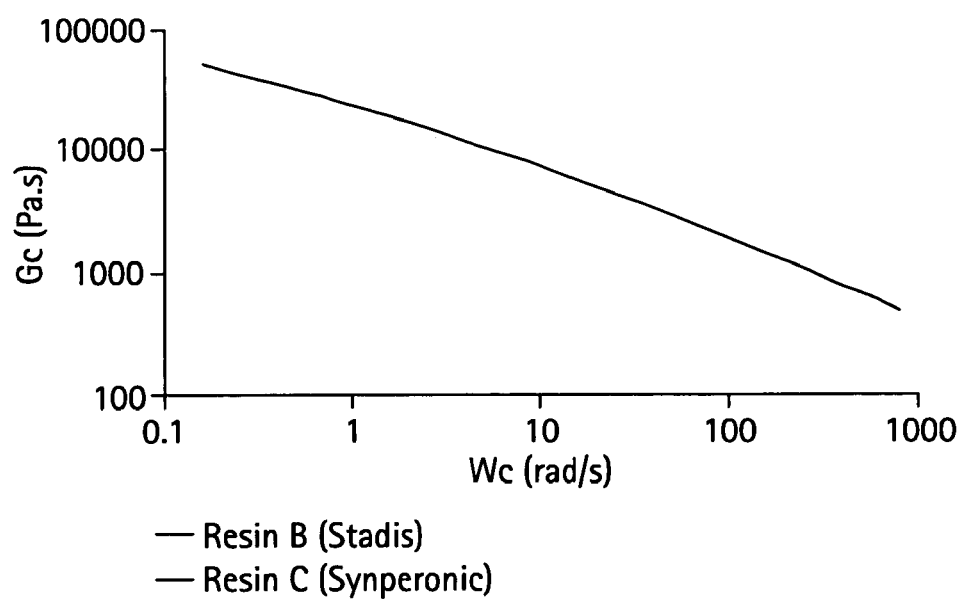
FIG. 15 shows the results of RDA Gc expressed in Pa·s as a function of Wc expressed in rad/s performed on resins B and C.

Gel Permeation Chromatography (GPC) and Rheological Dynamic Analysis (RDA) were performed on all the resins (see FIGS. 14 and 15).

Due to low productivity, the molecular weight distribution (MWD) of resin A is broad (see GPC results), the weight average molecular weight (Mw) being equivalent. Taking into account the melt difference (8.8 g/10° with the anti-fouling agent in resin D and 14.3 with the anti-fouling agent in resin A) and the equivalent SR2, more long chain branching is generated with the anti-fouling agent in resin D and this is related to the higher catalyst productivity. All properties were measured on pellets.

TABLE 9

| Run | Units | Resin A Stadis | Resin D AFAI |
|---|---|---|---|
| Mn | | 11725 | 14363 |
| Mw | | 216965 | 213259 |
| Mz | | 2481877 | 1743835 |
| D = Mw/Mn | | 18.5 | 14.8 |
| D' = Mz/Mw | | 11.4 | 8.2 |
| HLMI | g/10' | 14.3 | 8.8 |
| Wc (COP-RDA) | rad/s | 0.71 | 0.373 |
| Gc (COP-RDA) | Pa · s | 13690 | 12590 |

Mn, Mw and Mz represent respectively the number average molecular weight, the weight average molecular weight and the z average molecular weight. RDA results confirm that the Melt Index of resin A is too high and that resin D contains more long chain branching and/or has a narrower MWD (see FIG. 14)

GPC and RDA curves show that film resins 8 and C are equivalent (see FIG. 15). MWD are broad for both resins indicating low productivity.

TABLE 10

| Run | Units | Resin B Stadis | Resin C AFAI |
|---|---|---|---|
| Mn | | 13059 | 13471 |
| Mw | | 201926 | 282173 |
| Mz | | 2119213 | 4998934 |
| D = Mw/Mn | | 15.5 | 20.9 |
| D' = Mz/Mw | | 10.5 | 17.7 |
| MI2 | g/10' | 0.12 | 0.12 |
| HLMI | g/10' | 15.6 | 15.4 |
| SR2 | | 130 | 128 |
| density | | 0.9372 | 0.9370 |
| Wc (COP-RDA) | rad/s | 2.1 | 2.2 |
| Gc (COP-RDA) | Pa · s | 20240 | 20960 |

Mechanical Properties

ESCR and antioxydant (AO) tests were performed on resins A and D (see TABLE 11) on homogenized fluff and on pellets. Worse product resistance was observed with resin A due to the higher density. Some fractures are also obtained with resin A at 100% Antarox (the average fracture time for the samples is still of 703 hours).

TABLE 11

|  |  | units | Resin A Stadis | Resin D AFAI |
|---|---|---|---|---|
| Homogenized Fluff | MI2 | g/10' | 0.088 | 0.0589 |
|  | HLMI | g/10' | 10.2 | 6.9 |
|  | SR2 |  | 116 | 117 |
|  | Density | g/cc | 0.9536 | 0.9508 |
| Pellets | HLMI | g/10' | 14.3 | 8.8 |
|  | SR2 |  |  |  |
|  | density | g/cc |  |  |
|  | ESCR F50 | hr | >700 | >700 |

The ESCR was measured following the method of standard test ASTM D 1690. The tests were performed on 10 samples of each resin: 6 samples had an average ESCR of slightly above 700 hr and 4 samples had an average ESCR of over 1250 hr.

Example 3

The following example illustrates the effectiveness of the present invention in better controlling polymerization conditions and subsequently polymer properties. The reactor used herein is a commercial double loop reactor with the two loops in sequential configuration equipped with a sampling system as described in the present document. The reactor is used to produce a bimodal polyethylene resin. Polymerization conditions are controlled on both reactors to ensure suitable product properties.

FIG. 27 shows the effects of using the sampling system of the present invention for controlling polymerization conditions on the melt flow index of a bimodal polyethylene. FIG. 27 displays the evolution of the scaled melt index over time. The scaled melt index is calculated after completion of the production run in the following way: from the melt flow indices measured during the first 21 hours an average melt flow is calculated. The scaled melt flow index ("MI fluctuations") is the quotient of the actual real melt flow and the averaged melt flow index of the first 21 hours. For a perfectly controlled system the quotient assumes a value of 1.

In FIG. 27 the first 21 hours show the evolution of the scaled melt flow index when the sampling system of the present invention was in use. The use of the sampling system permits to control the melt flow index of the bimodal polyethylene within very narrow specifications.

After 21 hours the sampling system of the present invention was turned off. This immediately led to a significant increase in the fluctuation of the melt flow index in the bimodal polyethylene.

The data clearly shows that the sampling system of the present invention allows for better control of polymerization conditions and consequently of final product properties.

Example 4 and Comparative Example C

A loop reactor was fitted with a system according to the invention. The loop reactor had the following characteristics:
nominal capacity: 5.5 tons/hr.
volume: 19 m$^3$
number of settling legs: 4
size of the settling legs: 20.3 cm
size of the flash lines: 7.6 cm
size of the PTO valves: 5 cm The double acting actuators 40 of the PTO valves 23 were each provided with a control system according to FIGS. 31A, 31B, and 31C. The conduits 41 and 42 had a 1.25 cm (½") diameter and a 3 m length. The automatic control valves 61 and 62 were Worcester V-flow control valves type V44-66UMPTN90 with a Cv of 8, connected to the system 45 by conduits of 1.9 cm (¾") diameter and 20 cm length.

The stability of the operation of the reactor was measured in regard of the variations of the pressure measured in the reactor. The reactor operation was very stable. Indeed, said variations were lower by 25% when compared to those of a comparative reactor equipped with control valves 61 and 62 of the manually controlled type, the other characteristics of the comparative reactor being the same as those of the example. In addition, in the comparative reactor, the capacity of each settling leg was lower by 10%.

Example 5 and Comparative Example D

The same high-density polyethylene was produced on the same reactors connected in series according to the invention (Ex. 5) and after conventional assembling (Comp. D), in both cases, starting from reactors previously run individually (parallel) The time between "parallel" shut down and "series" start up (Transition Time) is given in TABLE 12 as well as density, melt index and ESCR of each grade and running hours in series.

TABLE 12

|  | Ex. 5 | Comp. D |
|---|---|---|
| Transition Time (hrs) | 12 | 66 |
| Density (g/cm$^3$) | 0.948 | 0.948 |
| MI-2 (dg/min) | 0.28 | 0.28 |
| ESCR [F-50] (hrs) | 1540 | 1540 |
| Running hours w/o problem (hrs) | >7600 | >7565 |

As can be observed from TABLE 12, Transition Time is substantively reduced from 66 hrs to 12 hrs for producing exactly the same product and for the essential same period of time without any leakage or blocking of the valves.

Example 6 and Comparative Example E

A period of one year of production was recorded with and without the benefit of the invention (i.e. with the pipes designed according to the invention on the one hand—Ex. 6—and with the standard procedure of dismounting on the other hand—Comp. E), for the manufacture of essentially the same polyethylene products in both parallel and series configuration, for a given number (12) of switches from parallel to series configuration and vice-versa. The results are gathered in TABLE 13.

TABLE 13

|  | Ex. 6 | Comp. E |
|---|---|---|
| Number of switches | 12 | 12 |
| Running time of prime grade (hrs) | 8254 | 7234 |

As can be observed, for the same number of switches from parallel to series configuration and vice versa, the total running time of prime production is about 14% higher when taking advantage of the invention. 85 hrs in average were gained at each switch of configuration when taking advantage of the invention.

Examples 7 and 8 and Comparative Examples F and G

Starting from the parallel configuration, two 65 m³ polyethylene slurry loop reactors equipped with three- or more-way valves and with the pipes designed according to the invention on the one hand (Ex. 7 and 8) as shown in TABLE 14 and with standard designed pipes on the other hand (Comp. F and G) were run for about one month.

According to the invention, an 0.1 bar over-pressure of isobutane was maintained at the side of the non-used pipe According to the invention, 65 kg of a blend of nitrogen with 3% oxygen was introduced in each of the reactors six hours before transitioning.

According to the present invention, olefin-free isobutane was circulated throughout the reactors for a period of six hours before transitioning.

After that about one month production period, it was then decided to switch to the series configuration. In the examples according to the invention, transition time during the first transition was about 19 hrs. On average, for the 9 further transitions series-parallel and vice-versa of the recorded year period, transition time was about 12 hrs.

With the pipes designed as shown in TABLE 14 for the Comparative Examples, it was simply impossible to switch in either configuration because of several connections and valves blocked by undesirable amounts of polyethylene

TABLE 14

|  | Ex. 7 | Ex. 8 | Comp. F | Comp. G |
|---|---|---|---|---|
| Ratio 'Diameter Flash line/Diameter control valve' | 0.50 | 1.88 | 0.38 | 2.2 |
| Ratio 'Diameter Connection line/Diameter control valve' | 0.71 | 2.0 | 0.18 | 5.7 |
| Ratio 'Diameter Connection line/Diameter Flash line' | 1.47 | 1.1 | 0.47 | 2.6 |
| Ratio 'Length Flash line/Length Connection line' | 10.6 | 10.6 | 20 | 20 |
| Number of switches possible | >10 still running | >10 still running | 0 | 0 |

Example 9 and Comparative Example H

An evaluation was carried out in order to compare a catalyst having a particle size distribution $d_{50}$ of 23 µm (Comp. H) with a catalyst having a particle size distribution $d_{50}$ of 13 µm (Ex. 9).

The evaluation was carried out in a double loop reactor (consisting of Reactor 1 and Reactor 2) and was divided into four time frames as explained below:
- polyethylene production using the standard 23 µm catalyst in a "double loop" reactor,
- polyethylene production using 13 µm catalyst,
- polyethylene production using 13 µm catalyst at maximal reactor throughput,
- polyethylene production using standard 23 µm catalyst.

The conditions have been adjusted to obtain equivalent Reactor 1 melt index and reactor ratio for the 13 µm and 23 µm catalysts, (See FIGS. 44, 45 and 46).

Influence of Fluff Morphology on Reactor Throughput

The particle size distribution (PSD) of 13-µm and 23-µm catalysts are given in FIG. 47. The polyethylene fluff PSD was lower when the 13 µm catalyst was used (See FIG. 48).

The $d_{50}$ is reduced from about 625 µm down to 400 µm. The higher span $[(d_{00}-d_{10})/d_{50}]$ is due to the lower $d_{50}$, the PSD broadness being about the same (See FIG. 49).

FIG. 50 shows that the 13 µm catalyst generates a smaller quantity of large fluff particles (about 1% instead of 6-8% using 23 µm catalyst) but produces the same quantity of fines (bottom and 63 µm sieves). This fluff morphology should be advantageous, when the product is used in pipe-making, for the improvement of the inner aspect of the pipe product.

Despite the lower fluff $d_{50}$ coming from the 13 µm catalyst, the reactor throughput was maintained due to a significant improvement of the bulk density observed in Reactor 1 and Reactor 2 (see FIGS. 51 and 52). This higher bulk density had an important impact on the settling efficiency.

Owing to the lower pump power consumption for the lower fluff particle size using 13-µm catalyst, it was possible to raise the solids content in Reactor 1 and, in this way, increase the solids residence time (See FIGS. 53 and 54) and thus the productivity.

The 13 µm catalyst has the same hydrogen response as the 23 µm catalyst whereas the comonomer incorporation of the 13 µm catalyst is better than that of the 23 µm catalyst.

Taking into account the solids residence time and the ethylene off-gas, the activity of 13-µm catalyst is 20-30% higher to the activity of 23-µm catalyst (See FIG. 55).

The molecular weight distribution is the same for both catalyst grain sizes.

Despite the lower fluff d50 (400 µm instead of 625 µm), the reactor throughput was not penalised thanks to the improvement of fluff bulk density (+0.04) generating good settling and high solids in both reactors.

The lower fluff d50 is due to a lower amount of big particles (1000 µm), the amount of fines (<63 µm) being the same or even lower. This is interesting in terms of settling efficiency and pipe aspect.

Example 10

The commercial catalyst Magnapore 963 produced by Grace Davison was fluorinated using $NH_4BF_4$ in order to contain 1 wt % of fluor. It was then activated by heating at a temperature of 635° C. The cocatalyst was triethylaluminium (TEAL); it was introduced in the first reactor with the chromium-based catalyst in amounts specified in TABLE 15. No TEAL was added in the second reactor.

Final resins R1 and R3 were prepared using similar conditions in both reactors: they had a monomodal molecular weight distribution.

Final resins R2 and R4 were prepared using different reactor conditions, targeting reduced hexene incorporation in the low molecular weight species produced in the first reactor. They had a broad molecular weight distribution.

The production conditions for resins R1 to R4 are summarised in TABLE 15, and the characteristics of the resins are summarised in TABLE 16.

TABLE 15

| | First reactor | | | | | | |
|---|---|---|---|---|---|---|---|
| Resin | C2-% | C6-% | TEAL ppm | Res. t. min | T ° C. | Pr. rate Kg/h | % in R1 |
| R1 | 3.65 | 0.64 | 1.3 | 65.4 | 91 | 25.3 | 54 |
| R2 | 5.51 | 0.44 | 1.2 | 66.6 | 96 | 24.5 | 53 |
| R3 | 7.6 | 0.23 | 1.2 | 69 | 98 | 23.5 | 54 |
| R4 | 6.26 | 0.28 | 1.2 | 67.8 | 102 | 24 | 53 |

TABLE 15-continued

| Resin | Second reactor | | | | | |
|---|---|---|---|---|---|---|
| | C2-% | C6-% | Res. t. min | T °C. | Pr. rate Kg/h | % in R2 |
| R1 | 2.41 | 0.36 | 28.56 | 91 | 21.4 | 46 |
| R2 | 3.08 | 0.66 | 28.32 | 90 | 21.6 | 47 |
| R3 | 5.79 | 0.13 | 32.16 | 98 | 20.1 | 46 |
| R4 | 3.12 | 0.18 | 25.44 | 95 | 21.4 | 47 |

TABLE 16

| Resin | HLMI (g/10') | Density (g/cm$^3$) | MI2 (g/10') | Mn kDa | Mw kDa | D |
|---|---|---|---|---|---|---|
| | First reactor | | | | | |
| R1 | 13.1 | 0.939 | — | 16.8 | 237 | 14.1 |
| R2 | 16.17 | 0.946 | — | 16.6 | 229 | 13.8 |
| R3 | 10.8 | 0.953 | 0.36 | | | |
| R4 | 14.4 | 0.959 | — | 16.7 | 218 | 13.1 |
| | Second reactor | | | | | |
| R1 | 13.23 | 0.939 | | 16.8 | 234 | 13.9 |
| R2 | 14.5 | 0.940 | 0.21 | 17.1 | 218 | 12.7 |
| R3 | 10.4 | 0.953 | 0.17 | 18.4 | 235 | 12.8 |
| R4 | 9.8 | 0.954 | 0.16 | 18.4 | 262 | 14.2 |

Resin samples were retrieved from both the first reactor and the second reactor. They were extruded on a small laboratory extruder to form pellets and the pellets were then extruded to produce films having a thickness of 50 μm. The gels absorb more light than the polyethylene film and they are thus detected above an absorption threshold, high absorption threshold meaning high detection sensitivity. The gel level was determined by sending a beam of light through the film and by measuring the light transmitted through said film with a digital camera. The equipment used was as follows:

The extruder to prepare the films was a Brabender E19/25D (TABLE model) equipped with a 1.2 kW motor, a screw speed regulator of from 1 to 100 rpm, and three zones for temperature control of 1300 W each.

The light source was a halogen lamp DDL, cold light 150 W, 20 A equipped with an optical cross section converter.

The camera was a digital linear camera having a line length of 2048 pixels, each pixel having a dimension of 14 microns×14 microns, a dynamic range of 1000:1, a pixel frequency of 30 MHz, an inspection width of about 100 mm and a resolution of about 50 microns.

The image-processing unit was an Intel 586/133 MHz processor with a memory of 16 Mb RAM, a hard disk of 1.6 Gb, a graphic monitor VGA high resolution, 1024×768, low radiation, a capacity of 12,000,000 pixels/sec.

The results are summarised in TABLE 17.

TABLE 17

| Resin | Number of gels (number/m$^2$) | Amount of gel (ppm) | Mean gel size (micron) |
|---|---|---|---|
| R1 from first reactor | 6900 | 190 | 148 |
| R1 from second reactor | 620 | 10.2 | 121 |
| R2 from first reactor | 4800 | 90 | 130 |
| R2 from second reactor | 760 | 14.7 | 128 |

It is observed that the amount of gel in the first reactor is about 10 times larger than in the second reactor. It is therefore concluded that the gels found in the first reactor are not merely diluted by the product made in the second reactor but that they are destroyed by the polymerization occurring in the second reactor.

Without wishing to be bound by a theory, it is believed that this result is typical of the resins produced with a chromium-based catalyst system. It is believed that the gels created in the first reactor are partly caused by poorly reacted catalyst grains that are in or have just ended their induction period before polymerization. This can be seen in FIG. 57 representing a photograph of the gels in resin R1 retrieved respectively from the first (FIG. 57a) and from the second reactor (FIG. 57b). One can see large catalyst residues in FIG. 57a, appearing as the white comet-shaped marks below the gels represented as black spherical marks. On FIG. 57b this phenomenon is significantly reduced for both the white comet-shaped marks and for the dark spherical marks.

The gel size distribution is represented in FIG. 58 for resin R1 and in FIG. 59 for resin R2. Comparing these two figures, it was observed that the monomodal resin R1 had a smaller gel size in the second reactor than in the first reactor whereas that behaviour was not observed for the bimodal resin R2. The gels had the same size distribution in both reactors for resin R2, although the overall gel content was decreased.

Embodiments of the Invention

In addition to the foregoing description, the following enumerated embodiments are also within the scope of the invention of this application:

1. Apparatus for controlling the injection of catalyst slurry in a polymerization reactor wherein polyethylene is prepared, comprising
   one or more storage vessels for storing catalyst slurry consisting of solid catalyst in a hydrocarbon diluent, whereby each vessel is provided with means for transferring said catalyst slurry from said storage vessels to a mixing vessel,
   a mixing vessel, being connected with said storage vessels by means of said transferring means, for diluting said catalyst slurry to a suitable concentration,
   one or more conduits, connecting said mixing vessel to a polymerization reactor for transferring said diluted catalyst slurry from said mixing vessel to said reactor, whereby each conduit is provided with a pumping means for pumping said slurry to said reactor, and
   the dilution being adapted to the pumping means;
2. Apparatus according to embodiment 1, wherein the pumping means is a membrane pump;
3. Apparatus according to embodiments 1 and 2, wherein the dilution being adapted to the pumping means comprises a solid catalyst diluted with a hydrocarbon diluent to a concentration comprised between 0.1 and 1.5% by weight;
4. Apparatus according to any of embodiments 1-3, wherein said catalyst is a metallocene catalyst, preferably supported;
5. Apparatus according to embodiment 1, wherein said pumping means provided on said conduit is controlled in function of the concentration of a reactant in said reactor;
6. Apparatus according to any of the preceding embodiments, wherein a first means for transferring said catalyst slurry from a first storage vessel to a mixing vessel is interchangeable with a second means for transferring said catalyst slurry from a second storage vessel to a mixing vessel through lines connecting said first means with said second means;
7. Apparatus according to any of the preceeding embodiments, wherein said means for transferring said catalyst slurry from a storage vessel to a mixing vessel, each are provided with a metering valve, provided downstream the connecting lines;

8. Apparatus according to any of the preceeding embodiments, further comprising measuring means on said conduit for measuring catalyst flow rate;

9. Apparatus according to any of the preceeding embodiments, further comprising a co-catalyst feeding system, for bringing a suitable amount of co-catalyst into contact with the catalyst slurry for a suitable period of time before injecting said catalyst slurry to said reactor, said system comprising a co-catalyst storage vessel and a conduit connected thereto for transferring said co-catalyst;

10. Apparatus according to embodiment 9, wherein said conduit is provided with a contact vessel for enhancing the contact time of said co-catalyst with said catalyst slurry in said conduit;

11. Method for controlling the injection of catalyst slurry in a polymerization reactor, wherein polyethylene is prepared, said catalyst consisting of solid catalyst in a hydrocarbon diluent, comprising the subsequent steps of:
providing solid catalyst and a hydrocarbon diluent in one or more storage vessels such that a catalyst slurry is obtained in said vessel,
transferring said catalyst slurry from said storage vessel to a mixing vessel wherein said catalyst slurry is diluted for obtaining a suitable concentration for use in a polymerization reaction,
pumping said diluted catalyst slurry at a controlled flow rate from said mixing vessel to said polymerization reactor through one or more conduits, by means of a pumping means, provided in each of said conduits, and
the dilution being adapted to the pumping means;

12. Method according to embodiment 11, wherein said catalyst is a metallocene catalyst, preferably supported;

13. Method according to embodiments 11-12, wherein said catalyst slurry is diluted with said hydrocarbon diluent in said mixing vessel to a concentration comprised between 0.1 and 10% by weight;

14. Method according to embodiment 11, comprising controlling the flow rate of said catalyst slurry from the mixing vessel to the polymerization reactor by determining the concentration of a reactant, preferably ethylene, in said reactor;

15. Method according to embodiment 11 or 12, comprising transferring said catalyst slurry from said storage vessel to said mixing vessel at a controlled flow by controlling the ratio between diluent and catalyst in the mixing vessel;

16. Method according to embodiment 11, further comprising bringing a suitable amount of co-catalyst into contact with the catalyst slurry for a suitable period of time before injecting said catalyst slurry to said reactor;

17. Method according to embodiment 16, comprising bringing a co-catalyst into contact with said catalyst slurry present in the conduit;

18. Method according to embodiment 17 comprising enhancing the contact time of said co-catalyst with said catalyst slurry in the conduit, by locally enhancing the volume of said conduit;

19. Method according to any of embodiments 11 to 18, comprising continuously supplying said catalyst slurry from said mixing vessel to said reactor through conduits at a suitable flow rate;

20. Use of an apparatus according to any of embodiments 1-10 for controlling the injection of metallocene catalyst slurry in a polymerization reactor wherein polyethylene is prepared;

21. Process for the co-polymerization of ethylene monomer and an olefin co-monomer in a polymerization loop reactor comprising the steps of
feeding monomer, an olefin co-monomer, diluents and optionally hydrogen into the loop reactor,
feeding at least one polymerization catalyst into the reactor,
co-polymerizing said monomer and said co-monomer to produce a polymer slurry comprising essentially liquid diluent and solid olefin co-polymer particles,
allowing said polymer slurry to settle into one or more settling legs connected to the reactor, and
sequentially discharging the settled polymer slurry from said one or more settling legs out of the reactor,
characterized in that said process further comprises the step of controlling the co-monomer/monomer ratio along the path of the reactor;

22. Process according to embodiment 21, comprising reducing the variation in the co-monomer/monomer ratio to a variation which is lower than 40%, preferably lower than 30%, more preferably below 20% and even more preferably lower than 10%;

23. Process according to embodiment 21 or 22, comprising controlling the co-monomer/monomer ratio by providing at least two, preferably at least three spatially separated, feeding entries of monomer along the path of the loop reactor;

24. Process according to embodiment 23, comprising controlling the co-monomer/monomer ratio by multiple, spatially separated, feeding of monomer along the path of the loop reactor;

25. Process according to any of embodiments 21 to 24, further comprising determining suitable positions for multiple, spatially separated, feeding entries of monomer along the path of the loop reactor in order to control the co-monomer/monomer ratio along the path of the reactor;

26. Process according to any of embodiments 21 to 25, comprising the step of controlling the co-monomer/monomer ratio by multiple, spatially separated, feeding of monomer in conjunction with a diluent;

27. Process according to embodiment 26, whereby said monomer/diluent ratio is lower than 5/1;

28. Process according to any of embodiments 21 to 27, comprising separately controlling the flow rate of each, spatially separated, monomer feed along the path of the loop reactor;

29. Process according to any of embodiments 21 to 28, wherein said co-monomer is 1-hexene;

30. Process according to embodiments 21 to 29, when applied to the first loop and/or second loop of a double loop reactor;

31. Process for the co-polymerization of monomer and an olefin co-monomer in a double loop reactor, a second loop reactor being interconnected with a first loop reactor, comprising the steps of:
transferring polymer slurry comprising essentially liquid diluent and solid olefin co-polymer particles from the first reactor to the second reactor,
feeding reactants comprising monomer and diluents and optionally hydrogen, polymerization catalyst and/or additional co-monomer into the second reactor,
further co-polymerizing said reactants in said second reactor to produce a polymer slurry comprising essentially liquid diluent and solid olefin co-polymer particles;
allowing said polymer slurry to settle into one or more settling legs connected to the second reactor, and
discharging the settled polymer slurry from said one or more settling legs out of the second reactor, characterized in that said process comprises the step of controlling the co-monomer/monomer ratio along the path in the first reactor, thereby controlling the amount of co-monomer transferred from said first reactor to the said second reactor;

32. Process according to embodiment 31, comprising controlling the co-monomer/monomer ratio in the first reactor by multiple, spatially separated, feeding of monomer along the path of the first reactor;

33. Process according to any of embodiments 31-32, comprising multiple, spatially separated, feeding of monomer in conjunction with a diluent in said first reactor;

34. Process according to any of embodiments 21 to 33, comprising separately controlling the flow rate of each spatially separated monomer feed along the path of the first reactor;

35. Polymerization loop reactor suitable for the co-polymerization process of a monomer, preferably ethylene and an olefin co-monomer, preferably hexene, comprising:
a plurality of interconnected pipes defining a flow path for a polymer slurry, said slurry consisting essentially of ethylene, a co-monomer, a polymerization catalyst, liquid diluent and solid olefin co-polymer particles,
means for feeding monomer, a co-monomer, diluent and optionally hydrogen in the reactor,
means for feeding a polymerization catalyst in the reactor,
a pump suitable for maintaining the polymer slurry in circulation in said reactor,
one or more settling legs connected to the pipes of said reactor for settling of polymer slurry, and
one or more lines for discharging settled polymer slurry out of the reactor characterized in that said reactor comprises multiple means for feeding monomer, which are positioned spatially separated along the path of the loop reactor;

36. Polymerization reactor according to embodiment 35, characterized in that said reactor comprises multiple, spatially separated additional means for the feeding of monomer in conjunction with a diluent into said first reactor;

37. Polymerization reactor according to embodiment 35 or 36, characterized in that said reactor comprises at least two, preferably at least three additional means for feeding monomer, which are positioned spatially separated along the path of the loop reactor;

38. Polymerization reactor according to embodiment 37 comprising a number of flow controlling means, whereby the number of flow controlling means corresponds to the number of additional means for feeding monomer, which are positioned spatially separated along the path of the loop reactor;

39. Polymerization reactor according to embodiment 37, whereby the number of flow controlling means corresponds to the number of additional means for feeding monomer, which are centralized;

40. Method for optimising catalyst supply to an ethylene slurry loop polymerization reactor comprising the steps of
a) preparing catalyst slurry in a vessel, said slurry comprising solid catalyst in a hydrocarbon diluent having a suitable concentration for use in a polymerization reaction,
b) providing said catalyst slurry from said vessel to a buffer vessel, wherein said slurry is stored, and
c) supplying said catalyst slurry from said buffer vessel to said reactor through conduits at a suitable flow rate,
wherein the catalyst is fed to a polymerization reactor at a suitable flow rate controlled by determining the concentration of a reactant, preferably ethylene, in said reactor, and
wherein said catalyst is a Ziegler-Natta catalyst having general formula $MX_n$, wherein M is a transition metal compound selected from group IV to VII, wherein X is a halogen, and wherein n is the valence of the metal,
wherein the level of catalyst slurry in said buffer vessel is maintained substantially constant, and
further comprising bringing a suitable amount of co-catalyst into contact with the catalyst slurry for a suitable period of time before supplying said catalyst slurry to said reactor;

41. Method according to embodiment 40, comprising maintaining the level of catalyst slurry in said buffer vessel between 80% and 90%;

42. Method according to embodiment 40 or 41, comprising bringing a co-catalyst into contact with said catalyst slurry present in the conduit;

43. Method according to embodiment 42, comprising enhancing the contact time of said co-catalyst with said catalyst slurry in the conduit, by locally enhancing the volume of said conduits;

44. Method according to any one of embodiments 40-43, wherein said co-catalyst is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen;

45. Method according to any one of embodiments 40-44, further comprising the step of transferring solid catalyst from a container vessel, wherein said solid catalyst is stored at a suitable pressure, to the vessel;

46. Method according to any one of embodiments 40-45, comprising continuously supplying said catalyst slurry from said buffer vessel to said reactor through conduits at a suitable flow rate;

47. Device for preparing and supplying catalyst to a polymerization reactor comprising
a vessel for preparing catalyst slurry, said slurry comprising solid catalyst in a hydrocarbon diluent having a suitable concentration for use in a polymerization reaction,
a buffer vessel for storing said catalyst slurry at a suitable concentration for use in a polymerization reaction, said buffer vessel being in connection with said vessel by means of one or more conduits and being provided with one or more conduits suitable for transferring said catalyst slurry from said buffer vessel to said reactor, and
a pumping means, provided on each of said conduits, for controlling the transfer and supply of said catalyst slurry from said buffer vessel to said reactor;

48. Device according to embodiment 47, wherein said conduits connecting said vessel with said buffer vessel comprise tubes controlled by pumping means;

49. Device according to embodiment 47 or 48, wherein said pumping means provided on said conduit are controlled in function of the concentration of a reactant in said reactor;

50. Device according to any one of embodiments 47 to 49, further comprising a co-catalyst distribution system, for bringing a suitable amount of co-catalyst into contact with the catalyst slurry for a suitable period of time before supplying said catalyst slurry to said reactor, said system comprising at least one co-catalyst storage vessel and a conduit connected thereto for transferring said co-catalyst;

51. Device according to any one of embodiments 47 to 50, wherein said conduit is provided with a contact vessel for enhancing the contact time of said co-catalyst with said catalyst slurry in said conduit;

52. Device according to any one of embodiments 47 to 51, further comprising flow measuring means on said conduit, for measuring the catalyst flow rate;

53. Device according to any one of embodiments 47 to 52, further comprising a container vessel for storing solid catalyst at a suitable pressure and for transferring said solid catalyst to the vessel, said container vessel being in connection with said vessel by means of a conduit;

54. Device according to any of embodiments 47 to 53, wherein said polymerization reactor is suitable for preparing polyethylene, and preferably for preparing bimodal polyethylene;

55. Device according to any of embodiments 47 to 54, wherein said catalyst is a Ziegler-Natta catalyst having general formula $MX_n$, wherein M is a transition metal compound selected from group IV to VII, wherein X is a halogen, and wherein n is the valence of the metal;

56. Device according to any of embodiments 50 to 55, wherein said co-catalyst is an organo-aluminium compound, being optionally halogenated, having general formula $AlR_3$ or $AlR_2Y$, wherein R is an alkyl having 1-16 carbon atoms and R may be the same or different and wherein Y is hydrogen or a halogen;

57. Use of a device according to any of embodiments 47 to 56 for preparing and optimising the supply of a Ziegler-Natta catalyst to a polymerization reactor, wherein polyethylene, and preferably bimodal polyethylene, is prepared;

58. Apparatus for preparing and supplying catalyst to an ethylene slurry loop polymerization reactor comprising
   a vessel suitable for containing concentrated catalyst slurry comprising catalyst solid particles suspended in a mineral oil,
   a buffer vessel for diluting said catalyst slurry at a suitable concentration for use in a polymerization reaction, being in connection with said vessel by means of one or more conduits for transferring the concentrated catalyst slurry from said vessel to the buffer vessel and being provided with one or more conduits for transferring the diluted catalyst slurry from said buffer vessel to said reactor,
   a pump provided on each of said conduits for transferring catalyst slurry from said vessel to said buffer vessel and
   a pump provided on each of said conduits for transferring diluted catalyst slurry from said buffer vessel to said reactor;

59. Apparatus according to embodiment 58, wherein said pump provided on each conduit for transferring the concentrated catalyst slurry from said vessel to the buffer vessel comprises a progressive cavity pump;

60. Apparatus according to embodiment 58, wherein said pump provided on each conduit for transferring the diluted catalyst slurry from said buffer vessel to said reactor, comprises a membrane pump, which is controllable in function of the concentration of a reactant in said reactor;

61. Apparatus according to any of embodiments 58-60, further comprising a co-catalyst distribution system, for bringing a suitable amount of co-catalyst into contact with the catalyst slurry for a suitable period of time before supplying said catalyst slurry to said reactor, said system comprising at least one co-catalyst storage vessel and a conduit connected thereto for transferring said co-catalyst;

62. Apparatus according to embodiment 58 or 61, wherein said conduit is provided with a contact vessel for enhancing the contact time of said co-catalyst with said catalyst slurry in said conduit;

63. Apparatus according to any of embodiments 58-62, further comprising flow measuring means provided on conduit and flow measuring means provided on conduit for measuring the catalyst flow rate;

64. Apparatus according to any of embodiments 58-63, wherein said polymerization reactor is suitable for preparing polyethylene, and preferably for preparing bimodal polyethylene;

65. Device according to any of embodiments 58-64, wherein said catalyst is a Ziegler-Natta catalyst having general formula $MX_n$, wherein M is a transition metal compound selected from group IV to VII, wherein X is a halogen, and wherein n is the valence of the metal;

66. Apparatus according to any of embodiments 61-62, wherein said co-catalyst is an organo-aluminium compound, being optionally halogenated, having general formula $AlR_3$ or $AlR_2Y$, wherein R is an alkyl having 1-16 carbon atoms and R may be the same or different and wherein Y is hydrogen or a halogen;

67. Method for optimising catalyst supply to an ethylene slurry loop polymerization reactor comprising the steps of
   a) transferring concentrated catalyst slurry from a vessel to a buffer vessel, said concentrated catalyst slurry comprising catalyst solid particles suspended in a mineral oil,
   b) diluting said catalyst slurry in said buffer vessel by supplying a suitable diluent in said buffer vessel, whereby diluted catalyst slurry is obtained having a suitable concentration for use in a polymerization reaction, and
   c) transferring said diluted catalyst slurry from said buffer vessel to said reactor at a suitable flow rate;

68. Method according to embodiment 67 for optimising catalyst supply to a polymerization reactor, wherein polyethylene, and preferably bimodal polyethylene, is prepared;

69. Method according to embodiment 67 or 68, wherein said catalyst is a Ziegler-Natta catalyst having general formula $MX_n$, wherein M is a transition metal compound selected from group IV to VII, wherein X is a halogen, and wherein n is the valence of the metal;

70. Method according to any of embodiments 67-69, comprising controlling the catalyst flow rate of said catalyst slurry to said reactor by determining the concentration of a reactant, preferably ethylene, in said reactor;

71. Method according to embodiment 67, further comprising bringing a suitable amount of co-catalyst into contact with the catalyst slurry for a suitable period of time before supplying said catalyst slurry to said reactor;

72. Method according to embodiment 71, wherein said co-catalyst is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen;

73. Method according to embodiment 71 or 72, comprising bringing a co-catalyst into contact with said catalyst slurry present in the conduit;

74. Method according to embodiment 73, comprising enhancing the contact time of said co-catalyst with said catalyst slurry in the conduit, by locally enhancing the volume of said conduits;

75. Method according to any of embodiments 67-74, comprising continuously supplying said catalyst slurry from said buffer vessel to said reactor through conduits at a suitable flow rate;

76. Use of an apparatus according to any of embodiments 58-66 for preparing and optimising the supply of a Ziegler- Natta catalyst to a polymerization reactor, wherein polyethylene, and preferably bimodal polyethylene, is prepared;

77. An olefin polymerization process carried out in the presence of an anti-fouling agent and a chromium-type catalyst or Ziegler Natta catalyst; characterised in that the anti-fouling agent comprises an anti-fouling polymer having an average molecular weight (Mw) of greater than 1000 daltons and containing:
one or more blocks —$(CH_2.CH_2.O)_k$— where each k is in the range from 1 to 50; and
one or more blocks —$(CH_2.CH(R)-O)_n$— where each R comprises an alkyl group having from 1 to 6 carbon atoms and each n is in the range from 1 to 50,
and terminated by a R' and a R" end groups, wherein R' is OH or an alkoxy having from 1 to 6 carbon atoms and R" is H or an alkyl having from 1 to 6 carbon atoms;

78. A process according to embodiment 77, wherein R is methyl;

79. A process according to embodiment 77 or embodiment 78, wherein the anti-fouling agent is liquid at room temperature;

80. A process according to embodiment 79, wherein the polymer has a molecular weight of at least about 2000;

81. A process according to any one of embodiments 77-80, wherein the ends of the polymer are hydrophilic;

82. A process according to any one of embodiments 77-81, wherein the anti-fouling agent comprises a block copolymer having general formula (I) or (II):

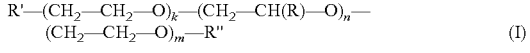

or

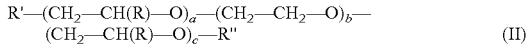

where R comprises an alkyl group; R' and R" are end groups as defined in embodiment 1; k is from 1 to 50; n is from 1 to 50; m≥1; a is from 1 to 50; b is from 1 to 50; and c is from 0 to 50;

83. A process according to embodiment 82, wherein the anti-fouling agent comprises a block copolymer having general formula (II):

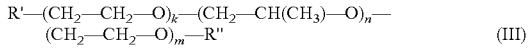

where R', R", k, n, and m independently are as defined in embodiment 5;

84. A process according to embodiment 83, wherein the anti-fouling agent comprises a block copolymer having general formula (V):

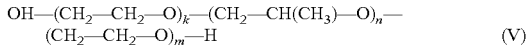

where k, n, and m independently are as defined in embodiment 82;

85. A process according to any one of embodiments 77-84, wherein the process is carried out in at least one loop reactor;

86. A process according embodiment 85, wherein the process is carried out in a double loop reactor;

87. A process according to any one of embodiments 77-86, wherein the process is carried out at a temperature in the range from 40 to 130° C.;

88. A process according to any one of embodiments 77-87, wherein the process is carried out at a pressure in the range from 5 to 200 barg;

89. A process according to any one of embodiments 77-88, wherein the process is used to make a homopolymer or a copolymer of an alpha olefin;

90. A process according to embodiment 89, wherein the process is used to make a homopolymer of ethylene or a copolymer of ethylene and one or more other alpha olefins;

91. A method for controlling the swelling that comprises the steps of:
providing a slurry loop reactor, said reactor being optionally equipped with one or more devices aimed at improving the homogeneity of the circulating slurry,
a) measuring, as a function of time, a plant control parameter that displays an increasing level of fluctuation during swelling;
b) processing these measurements in real-time;
c) identifying in real-time the onset of swelling;
d) progressively diluting the reactor when the fluctuation level reaches a pre-determined level;

92. The method of embodiment 91 wherein the device aimed at improving the homogeneity of the circulating slurry is a by-pass line wherein the circulating slurry has a different travel time than in the main line;

93. The method of embodiment 91 wherein the plant control parameter is the pump power consumption, the reactor temperature, the slurry density or the temperature change experienced by the cooling water when circulating in all or in a portion of the cooling jacket;

94. The method of embodiment 93 wherein the plant control parameter is the pump power consumption;

95. The method of embodiment 91 wherein the processing of step c) includes amplification of the signal to noise ratio;

96. The method of embodiment 91 wherein the dilution is triggered and controlled by any one or more of the standard deviation, or the variance, or the fluctuation range or any other function monotonically related to the variance of a plant control measurement, said plant measurement displaying an increasing fluctuation level when swelling occurs;

97. The method of embodiment 96 wherein the progressive dilution is carried out by progressively increasing the amount of diluent injected in the reactor;

98. The method of embodiment 91 wherein the pre-determined level of fluctuation, defined as a percentage of the fluctuation level measured at low solid content, is of less than 300%;

99. The method of embodiment 98 wherein the pre-determined level of fluctuation is of less than 180%;

100. Use in the production of a polyolefin of a slurry loop reactor wherein all internal parts in contact with the slurry are first polished by a mechanical process to a level of at most 70 RMS roughness value and are subsequently polished by a chemical or electrochemical process, to a final level of at most 40 RMS roughness value;

101. Use according to embodiment 100 wherein the polyolefin is polyethylene;

102. Use according to embodiment 100 or embodiment 101 wherein the second polishing process is a chemical polishing;

103. Use according to embodiment 102 wherein the chemical polishing is carried out with an aqueous solution having a pH of from 1 to 6;

104. Use according to embodiment 103 wherein the aqueous solution comprises
a) orthophosphoric acid and/or condensed phosphoric acids and/or water soluble salts thereof and
b) one or more carboxylic acids having either two or three carboxyl groups;

105. Use according to embodiment 104 wherein the amount of phosphate component is of from 0.2 to 12 wt %, based on the weight of the final in-use aqueous solution;

106. Use according to embodiment 104 or embodiment 105 wherein the amount of carboxylic acid is of from 0.01 to 1 wt %, based on the weight of the final in-use aqueous solution;

107. Use according to any one of embodiments 104 to 106 wherein the polishing is carried out at room temperature;

108. An apparatus for polymerizing an olefin monomer, which apparatus comprises the following
   a) a reactor for polymerizing the olefin monomer;
   b) a means for measuring the presence of gas in the reactor, and
   c) a means for controlling the concentration of olefin monomer in the reactor;
wherein, the means for measuring the presence of gas in the reactor is a means capable of measuring a pressure curve in the reactor to determine whether the pressure curve is characteristic of a hydraulic system or a non-hydraulic system;

109. An apparatus according to embodiment 108, wherein the means for measuring the presence of gas in the reactor comprises a pressure meter and a valve for releasing pressure in the reactor;

110. A method for polymerizing an olefin, which method comprises the following steps;
   a) polymerizing an olefin monomer in a reactor, in a solvent, at a selected olefin monomer concentration;
   b) measuring a pressure curve in the reactor to determine whether the pressure curve is characteristic of a hydraulic system or a non-hydraulic system; and
   c) if the pressure curve is characteristic of a non-hydraulic system, reducing the olefin monomer concentration in the reactor;

111. A method according to embodiment 110, wherein the pressure curve is identified as characteristic of a non-hydraulic system if the curve is not a saw-toothed type curve;

112. A method according to embodiment 109 or embodiment 110, wherein the selected monomer concentration is from 7-15 wt. %;

113. A method according to embodiment 112, wherein the selected monomer concentration is from 10-12 wt. %;

114. A method according to any of embodiments 108-113, wherein the temperature employed in the reactor is from 70-120° C.;

115. A method according to embodiment 114, wherein the temperature employed in the reactor is from 80-110° C.;

116. A method according to any of embodiments 108-115, wherein the solvent employed in the reactor comprises butane, isobutane, and/or hexane;

117. A method according to any of embodiments 108-116, wherein the olefin monomer is selected from ethylene and propylene;

118. Device for taking out and analyzing a sample from a slurry loop polymerization reactor, said sample being representative of the slurry, said device comprising
   one or more sample conduits, for taking a sample out of said reactor and for conducting said sample to one or more sample flash tanks, whereby said conduits each are in communication with said reactor and each are provided with one or more sampling valves,
   one or more sample flash tanks, for separating said solid particles and evaporated gas, whereby said sample flash tanks are connected to said conduits, and
   one or more sample receivers, for purifying said solid particles, whereby said receivers are connected to said sample flash tanks;

119. Device according to embodiment 118 wherein the one or more flash tanks are provided with means for analyzing said evaporated gas;

120. Device according to embodiment 118 or embodiment 119 wherein the one or more sample receivers are provided with means for analyzing said solid particles;

121. Device according to any one of embodiments 118 to 120, for taking out and analyzing a sample from a polymerization reactor, whereby said reactor is suitable for polymerizing ethylene and contains reactive fluid comprising ethylene, a diluent, and a catalyst, and optionally a co-monomer and hydrogen;

122. Device according to any one of embodiments 118-121, wherein said reactor is one of two reactors, preferably the first one;

123. Device according to embodiment 118, whereby said conduits are provided with a first sample valve and a second sample valve, and whereby said conduits are provided with means for periodically sequentially opening and closing said valves in order to take a specific volume of a sample from said reactor;

124. Device according to embodiment 123, wherein said means for periodically sequentially opening and dosing said valves are capable of opening said first valve while maintaining said second valve dosed, closing said first valve while maintaining said second valve closed, opening said second valve while maintaining said first valve closed and closing said second valve while maintaining said first valve closed;

125. Device according to embodiment 118, whereby said sample flash tank consists of a tubular body and a conical bottom, wherein said tubular body and said conical bottom are heatable;

126. Device according to embodiment 118 or embodiment 125, whereby said sample flash tank is connected to said sample receiver by means of a conduit provided with at least two valves;

127. Device according to embodiment 126, whereby said conduit is provided with a first and a second valve, and whereby said conduit is provided with means periodically sequentially opening and closing said valves, in order to provide a specific volume of a sample to said receiving means;

128. Device according to embodiment 127, wherein said means for periodically sequentially opening and dosing said valves are capable of opening said first valve while maintaining said second valve closed, closing said first valve while maintaining said second valve dosed, opening said second valve while maintaining said first valve dosed and closing said second valve while maintaining said first valve closed;

129. Device according to embodiment 118, wherein said sample receiver consists of a tubular body and a conical bottom, wherein said conical bottom is heatable;

130. Device according to embodiment 118 or 129, wherein said sample receiver is further provided with filtering means;

131. Device according to any one of embodiments 118 or 129-130, wherein at least two sample receivers are provided which are interchangeably connectable to a sample flash tank by means of a diverter;

132. Use of a device according to any of embodiments 118-131 for taking a sample out of a slurry loop polymerization reactor and for analyzing said sample;

133. Use of a device according to any of embodiments 118-131, for improving a polymerization reaction in a slurry loop polymerization reactor;

134. Method for improving a polymerization reaction for preparing bimodal polyethylene in a slurry loop polymerization reactor, said reactor comprising a first part connected to a second part, said method comprising the steps of
a) taking a sample out of said first part of said reactor,
b) analyzing said sample to determine said reaction conditions in said first part of said reactor,
c) based on results obtained in step b), adapt reaction conditions in order to improve the polymerization reaction in said reactor;

135. Method for improving a polymerization reaction for preparing bimodal polyethylene in a slurry loop polymerization reactor according to embodiment 134, comprising the steps of
a) taking a sample out of said first part of said reactor,
b) analyzing said sample to determine said reaction conditions in said first part of said reactor,
c) based on results obtained in step b), adapt reaction conditions in said first part of said reactor in order to provide an optimised reaction product, and
d) feeding at a suitable time said optimised reaction product from said second part of said reactor to further processing means;

136. Method according to embodiment 134 or 135, comprising taking a specific volume of a sample from said first part of said reactor;

137. Method according to embodiment 134 or 135, wherein step a) comprises
providing a sample from said first part of said reactor to a sample flash tank, by transferring said sample through a conduit connecting said first part of said reactor to said sample flash tank,
separating in said sample flash tank solid particles from evaporated gas in said sample by controlling the pressure in said flash tank,
supplying said solid particles from said sample flash tank to one or more sample receivers, by transferring said solid particles through a conduit connecting said sample flash tank and said sample receivers, and
purifying said solid particles in said sample receivers, by degassing and drying;

138. Method according to embodiment 134 or 135 wherein step b) comprises
analyzing evaporated gas obtained from said sample flash tanks with analyzing means, and
analyzing solid particles obtained from said sample receivers with analyzing means;

139. Method according to any of embodiments 134-138 for improving a polymerization reaction in a slurry loop polymerization reactor for preparing bimodal polyethylene, comprising
providing a reactor wherein said first part and said second part of said polymerization reactor consists of a first and a second liquid loop reactor, and
connecting said first and a second liquid loop reactor in series by one or more settling legs of the first reactor connected for discharge of slurry from the first reactor to said second reactor;

140. Method according to any of embodiments 134-139, whereby said sample is taken out of a reactor part and analyzed by means of a device according to any of embodiments 118-131;

141. In a polymerization process comprising polymerizing olefins in a liquid diluent to produce a liquid slurry containing particles of normally solid polymer within a loop reactor, allowing the polymer to settle in a settling leg, periodically opening a 180° rotating product take-off valve located at the end of the settling leg to allow a charge of particles to flow out of the settling leg, the product take-off valve being operated by a pneumatically driven double-acting actuator, the pneumatic system being regulated by a system comprising pneumatic control valves, the improvement which consists in using automatic control valves;

142. The process of embodiment 141, wherein the control valves are V-ball valves;

143. Use of automatic control valves to regulate the pneumatically driven double-acting actuator operating a 180° rotating product take-off valve of the settling leg of a loop reactor;

144. Use according to embodiment 143, wherein the control valves are V-ball valves;

145. Loop reactor comprising a settling leg, a 180° rotating product take-off valve located at the end of the settling leg, the 180° rotating product take-off valve being operated by a pneumatically driven double-acting actuator, the pneumatic system being regulated by a system comprising pneumatic control valves, characterised in that the control valves are automatic control valves;

146. Loop reactor according to embodiment 145, wherein the control valves are V-ball valves;

147. Loop reactor suitable for olefin polymerization process comprising:
a plurality of interconnected pipes defining a flow path for a polymer slurry, said slurry consisting essentially of an olefin reactant, a polymerization catalyst, liquid diluent and solid olefin polymer particles,
means for introducing olefin reactant, polymerization catalyst and diluent into said reactor,
a pump suitable for maintaining the polymer slurry in circulation in said reactor,
one or more settling legs connected to the pipes of said reactor,
the improvement of which consists in providing
at least one measuring means suitable for inferring the volume of slurry settled inside the settling legs and
at least one valve control means operatively connected to said measurement means and to the valve of said settling legs;

148. Loop reactor according to embodiment 147, wherein the control means acts on the interval between two openings of the valve;

149. Loop reactor according to embodiment 147, wherein the control means acts on the duration of the opening of the valve;

150. Loop reactor according to embodiment 147, wherein the control means acts on the discharge aperture of the valve;

151. Loop reactor according to embodiments 147-150, wherein the slurry exiting the settling leg is directly injected into a second loop reactor;

152. Polymerization process for producing olefin polymers in a loop reactor comprising the steps of:
introducing into the loop reactor one or more olefin reactants, polymerization catalysts and diluents, and while circulating said reactants, catalysts and diluents,
polymerizing said one or more olefin reactants to produce a polymer slurry comprising essentially liquid diluent and solid olefin polymer particles, said process further comprising one or more cycles of:
  a) allowing said polymer slurry to settle in one or more settling legs connected to said reactor, and
  b) discharging from a settling leg a predetermined volume of polymer slurry corresponding to the volume of polymer slurry settled in said settling leg since its previous discharge, said predetermined volume differing by ±20%, preferably by ±15%, more preferably by ±10%, most preferably by ±5% from the volume of polymer slurry settled in said settling legs since its previous discharge 153. Process according to embodiment 152, comprising one or more cycles of:
  a) allowing said polymer slurry to settle in one or more settling legs connected to said reactor,
  b) monitoring the volume of polymer slurry settled in a settling leg since its previous discharge,
  c) discharging from said settling leg, a predetermined volume of polymer slurry substantially equal to the volume of polymer slurry settled in said settling leg since its previous discharge;

154. Process according to embodiment 153, comprising one or more cycles of:
  a) allowing said polymer slurry to settle in one or more settling legs connected to said reactor,
  b) assessing the time T required for the settling of a predetermined volume of polymer slurry in a given settling leg after the closing of that given settling leg,
  c) triggering the discharge of said predetermined volume of settled polymer slurry from said given settling leg into a product recovery zone, and
  d) discharging during a predetermined period Δt, said predetermined volume of settled polymer slurry from said settling leg, wherein said predetermined volume is substantially equal to the volume of polymer slurry settled in said settling leg since its previous discharge;

155. Process according to any of embodiments 152 to 154, comprising the step of adjusting the opening time of a settling leg such that the volume of polymer slurry to be discharged from said settling leg is substantially equal to the volume of polymer slurry settled in said settling leg since its previous discharge;

156. Process according to any of embodiments 152 to 155, comprising the step of adjusting the time between two discharges for a settling leg such that the volume of polymer slurry to be discharged from said settling leg is substantially equal to the volume of polymer slurry settled in said settling leg since its previous discharge;

157. Process according to any of embodiments 152 to 156, comprising the step of adjusting the discharge aperture of a settling leg such that the volume of polymer slurry to be discharged from said settling leg is substantially equal to the volume of polymer slurry settled in said settling leg since its previous discharge;

158. Process according to any of embodiments 152 to 157, comprising the step of evaluating the volume of polymer settled in a leg since its previous discharge, and adjusting the opening speed of the valve and/or the aperture of a flow adjusting device so that the volume discharged from the leg is substantially equal to the evaluated settled volume;

159. Process according to any of embodiments 152 to 158, comprising the step of discharging from a settling leg a predetermined volume of polymer slurry equal to the volume of polymer slurry settled in said settling leg since its previous discharge;

160. Process according to any of embodiments 152 to 158, comprising the step of discharging from a settling leg a predetermined volume of polymer slurry superior to the volume of polymer slurry settled in said settling leg since its previous discharge;

161. An apparatus defined as a set of loop reactors suitable for the polymerization process of a monomer, preferably ethylene and optionally an olefin co-monomer, comprising for each of said reactors:
  a plurality of interconnected pipes P defining a flow path for a polymer slurry, said slurry consisting essentially of ethylene, optionally a co-monomer, a polymerization catalyst, liquid diluent and solid olefin polymer particles,
  means for feeding monomer, optionally a co-monomer, diluent and optionally hydrogen in the reactor,
  means for feeding a polymerization catalyst in the reactor,
  a pump suitable for maintaining the polymer slurry in circulation in such reactor,
  one or more settling legs connected to the pipes P of such reactor for settling of polymer slurry,
  one or more control valves connected to the outlet of such settling legs, and
  one or more flash lines for discharging settled polymer slurry out of the reactor characterized in that each of said loop reactors comprises a three-or-more-way valve defining three-or-more ends, one end A being positioned at the outlet of said one or more control valves;

162. The apparatus according to embodiment 161, wherein, for each of the three-or-more-way valves
  another end B is connected to said one or more flash lines,
  another end C is connected to the pipes P of another reactor of the set of reactors through a connection pipe K (optionally including valves);

163. The apparatus according to embodiment 162, wherein the settled polymer slurry flows from A to B for operating the reactors in parallel or from A to C for operating the reactors in series;

164. The apparatus according to anyone of embodiments 161 to 163, wherein any end of the three-or-more-way valve, which is not connected to either a flash line or another reactor of the set is flushed with a diluent suitable with the polymerization process;

165. The apparatus according to any of embodiments 161-164 wherein, for each reactor of the set, the diameter of the one or more control valves, flash lines, connection lines K and three-or-more-way valves are within a relative ratio of from 0.5 to 2, preferably of from 0.65 to 1.55 and more preferably of from 0.8 to 1.2;

166. The apparatus according to embodiment 165, wherein, for each reactor of the set, the length of the one or more flash lines divided by the length of the one or more connection pipes K is within a range of from 6 to 14 and preferably from 8 to 12;

167. The apparatus according to any of embodiments 161-166, wherein a continuous over-pressure of a diluent suitable with the polymerization process is maintained at the opposite side of the used connection (said used connection being either A to B when reactors are run in parallel configuration or, A to C when reactors are run in series configuration);

168. A method to switch from series to parallel configuration a set of loop reactors suitable for the polymerization process of a monomer, preferably ethylene and optionally an olefin co-monomer, as described in embodiments 161 to 167, by means of a three-or-more-way valve defining three-or-more ends;

169. The method according to embodiment 168, wherein a diluent suitable with the polymerization process is circulated throughout the reactors for a period of eight hours before transitioning from series to parallel configuration or vice versa;

170. The method according to embodiments 168 or 169 wherein the full capacity of the diluent suitable with the polymerization process, dedicated to all reactors is applied in sequence to each individual reactor during the circulation period;

171. The method according to embodiment 170 wherein the polymerization process is ethylene polymerization and wherein the diluent suitable with the polymerization process is iso-butane;

172. The method according to embodiment 171 wherein the iso-butane is olefin-free recycled iso-butane;

173. The use of the apparatus described in embodiments 161 to 167 to switch polymerization reactors from parallel to series configuration and vice-versa;

174. Polymerization process for producing olefin polymers in a double loop reactor with each reactor comprising two or more settling legs, comprising the steps of:
  introducing into the double loop reactor one or more olefin reactants, polymerization catalysts and diluents, and while circulating said reactants, catalysts and diluents;
  polymerizing said one or more olefin reactants to produce a polymer slurry comprising essentially liquid diluent and solid olefin polymer particles;
said process further comprising one or more cycles of:
  a) allowing said polymer slurry to settle into said settling legs, and
  b) sequentially discharging said settled polymer slurry from said two or more settling legs out of the reactor, whereby the aggregate time of closure of all the legs is less than 50%, preferentially less than 20% and most preferably less than 5% of the time interval between two triggerings of the same settling leg;

175. Process according to embodiment 174, comprising the step of sequentially discharging said settled polymer slurry from said two or more settling legs out of the reactor, whereby the aggregate time of closure of all the legs is 0% of the time interval between two triggerings of the same settling leg;

176. Process according to embodiment 174 or 175, comprising the step of maintaining a flow of settled polymer slurry out of said reactor by sequentially discharging said settling leg;

177. Process according to any of embodiments 174 to 176, wherein the discharging is obtained by synchronizing the opening and closing time of the discharge valve of each settling leg thereby maintaining a flow of settled polymer slurry out of said reactor;

178. Process according to any of embodiments 174 to 177, comprising the step of adjusting the discharge from each individual settling leg so that the amount of settled slurry discharged through the valve into the product recovery zone is less than 10% larger or smaller than the amount that settles in said individual leg between two consecutive openings of said valve;

179. Process according to any of embodiments 174 to 178, wherein the discharging of said polymer slurry from each settling leg is sequentially performed in such a way that once the last settling leg has been discharged the first settling leg is discharged again, said process further comprising one or more cycles of:
  (i) closing the discharge valve of a settling leg while simultaneously opening the discharge valve of another settling leg,
  (ii) adjusting the flow through the discharge valves of said two or more settling legs so as to regulate the mass balance of the slurry within the reactor;

180. Process according to embodiment 179, wherein said flow adjustment is obtained, by adjusting the aperture of the discharge valve or of a flow regulating device;

181. Process according to any of embodiments 174 to 180, wherein the opening of a settling leg is triggered by the closing of another settling leg;

182. Process according to any of embodiments 174 to 181, wherein the closing of a first settling leg and the opening of a subsequent settling leg start at the same time;

183. Process according to any of embodiments 174 to 182, wherein the opening of a first settling leg coincides with the closing of another settling leg;

184. Process according to any of embodiments 174 to 183, wherein the opening and closing of each settling leg is performed by actuating the discharges valve comprised on each settling leg;

185. Process according to any of embodiments 174 to 184, wherein the synchronizing and the triggering of the opening and dosing of said settling legs are controlled by computational means;

186. Process according to any of embodiments 174 to 185, wherein said process is performed in a double loop reactor with each reactor comprising 2 to 20 settling legs, preferably 4 to 12 settling legs, more preferably 6 to 10 settling legs;

187. Process according to any of embodiments 174 to 186, wherein said process is performed in double loop reactors connected in series;

188. Reactor suitable for olefin polymerization comprising at least two interconnected reactors, whereby said connection essentially consists of one or more transfer lines suitable for transferring polymer slurry from a reactor to another reactor and whereby said transfer line extends substantially horizontally;

189. Reactor according to embodiment 188, comprising
  at least two interconnected reactors, each consisting of a plurality of interconnected pipes defining a flow path for a polymer slurry,
  one or more settling legs connected to the pipes of one reactor, each of said settling legs being provided with a transfer line for transferring polymer slurry to another reactor, and
  one or more settling legs connected to the pipes of the other reactor for discharging polymer slurry from the reactor into a product recovery zone, and
  at least one pump suitable for maintaining the polymer slurry in circulation in said multiple reactor,
whereby said connection of said reactors essentially consists of one or more transfer lines and whereby said transfer line extends substantially horizontally;

190. Reactor according to embodiment 188 or 189, whereby the transfer line extends substantially horizontally from the exit of a settling leg of a reactor to the entry in another reactor;

191. Reactor according to any of embodiments 188-190, whereby the perpendicular distance $\Delta H$ between the exit of a settling leg of a reactor and the entry in another reactor, is smaller than the horizontal distance $\Delta L$ between the exit of a settling leg of a reactor and the entry in another reactor;

192. Reactor according to any of embodiments 188-191, whereby the transfer line extends substantially horizontally under an angle of inclination $\alpha$ with respect to a horizontal axis X-X' which is lower than 45°;

193. Reactor according to any of embodiments 188-192, whereby the transfer line extends substantially horizontally under an angle of inclination α with respect to a horizontal axis X-X' which comprises 0°, 1°, 2°, 3°, 4°, 5°, 6°, 7°, 8°, 9° or 10°;

194. Reactor according to any of embodiments 188-193, whereby the transfer line is further provided with one or more means for controlling temperature flow or pressure of the polymer slurry in said line;

195. Process for producing olefin polymers in a reactor, wherein said reactor consists of at least two interconnected reactors, whereby said connection essentially consists of one or more transfer lines suitable for transferring polymer slurry from a reactor to another reactor, comprising the steps of
introducing into a reactor one or more olefin reactants, polymerization catalysts and diluents,
polymerizing said one or more olefin reactants to produce polymer slurry,
pumping said polymer slurry for maintaining the circulation in said reactor,
said process further comprising one or more cycles of:
allowing said polymer slurry to settle in one or more settling legs connected to said reactor, and
substantially horizontally transferring said polymer slurry from said settling legs to another reactor through said one or more transfer lines;

196. Process according to embodiment 195, whereby said polymer slurry is transferred substantially horizontally through said transfer line from the exit of a settling leg of a reactor to the entry in the other reactor;

197. Process according to embodiment 195 or 196, whereby said polymer slurry is transferred substantially horizontally through said transfer line under an angle of inclination α with respect to a horizontal axis X-X' which is lower than 45°;

198. Process according to any of embodiments 195-197, whereby said polymer slurry is transferred substantially horizontally through said transfer line under an angle of inclination α with respect to a horizontal axis X-X' which comprises 0°, 1°, 2°, 3°, 4°, 5°, 6°, 7°, 8°, 9° or 10°;

199. Use of a transfer line for transferring polymer slurry from a reactor to another reactor in a reactor comprising at least two interconnected reactors, whereby said transfer line extends substantially horizontally;

200. Use of a transfer line according to embodiment 199, whereby said transfer line extends substantially horizontally from the exit of a settling leg of a reactor to the entry in the other reactor;

201. Use of a transfer line according to embodiment 199 or 200, whereby said transfer line extends substantially horizontally under an angle of inclination α0 with respect to a horizontal axis X-X' which is lower than 45°;

202. Use of a transfer line according to embodiment 199 or 200, whereby said transfer line extends substantially horizontally under an angle of inclination α with respect to a horizontal axis X-X' which comprises 0°, 1°, 2°, 3°, 4°, 5°, 6°, 7°, 8°, 9° or 10°;

203. A process for polymerizing olefins in two liquid full loop reactors connected in series wherein different molecular weight fractions are produced in the presence of a Ziegler-Natta catalyst system, characterised in that the Ziegler-Natta catalyst has a particle size distribution $d_{50}$ of less than 20 μm and greater than 5 μm;

204. A process according to embodiment 203, wherein the Ziegler-Natta catalyst has a $d_{50}$ of less than 15 μm;

205. A process according to embodiment 203 or embodiment 204, wherein the Ziegler-Natta catalyst has a $d_{50}$ of greater than 8 μm;

206. A process according to any one of embodiments 203-205, wherein the Ziegler-Natta catalyst has a $d_{50}$ of about 13 μm;

207. A process according to any one of embodiments 203-206, wherein the present process is used to form a polyethylene;

208. A process according to embodiment 207, wherein the process is used to make a polyethylene having a typical molecular weight distribution of greater than 15;

209. A process according to any one of embodiments 203-208, wherein the ethylene is injected with a comonomer in the first liquid full loop reactor and the comonomer comprises an alpha-olefin having from 3 to 10 atoms of carbon;

210. A process according to any one of embodiments 203-209, wherein the formed polyolefin is extruded to form pellets;

211. Use of a polyolefin obtained by the process according to any one of embodiments 203 to 210 to prepare pipes;

212. Use of a chromium-based catalyst system in two serially connected loop reactors for homopolymerizing ethylene or for copolymerizing ethylene and a comonomer, to produce a final polyethylene resin at a productivity of less than 3500 grams of polymer per gram of catalyst and thus at increased throughput, said polyethylene resin having an amount of gels of at most 30 ppm;

213. The use according to embodiment 212, wherein the polyethylene is a copolymer of ethylene;

214. The use according to embodiment 213, wherein the comonomer is an alpha-olefin having from 3 to 8 carbon atoms;

215. The use according to any one of embodiments 212 to 214, wherein the first and second reactors are operated under similar conditions;

216. The use according to any one of embodiments 212 to 214, wherein the first and second reactors are operated under different conditions;

217. The use according to any one of embodiments 212-216, wherein the final polyethylene is prepared with a productivity of less than 2500 grams of polymer per gram of catalyst;

218. Polymerization loop reactor comprising elements selected from the group consisting of:

(1) an apparatus for controlling the injection of catalyst slurry, comprising
one or more storage vessels for storing catalyst slurry consisting of solid catalyst in a hydrocarbon diluent, whereby each vessel is provided with means for transferring said catalyst slurry from said storage vessels to a mixing vessel,
a mixing vessel, being connected with said storage vessels by means of said transferring means, for diluting said catalyst slurry to a suitable concentration.
one or more conduits, connecting said mixing vessel to a polymerization reactor for transferring said diluted catalyst slurry from said mixing vessel to said reactor, whereby each conduit is provided with a pumping means for pumping said slurry to said reactor, and
the dilution being adapted to the pumping means;

(2) multiple means for feeding monomer, which are positioned spatially separated along the path of the loop reactor, (3) a device for preparing and supplying catalyst comprising a vessel for preparing catalyst slurry, said slurry comprising solid catalyst in a hydrocarbon diluent having a suitable concentration for use in a polymerization reaction, a buffer vessel for storing said catalyst slurry at a suitable concentration for use in a polymerization reaction, said buffer vessel being in connection with said vessel by means of one or more conduits and being provided with one or more conduits suitable for transferring said catalyst slurry from said buffer vessel to said reactor, and a pumping means, provided on each of said conduits, for controlling the transfer and supply of said catalyst slurry from said buffer vessel to said reactor;

(4) a device for preparing and supplying catalyst comprising a vessel suitable for containing concentrated catalyst slurry comprising catalyst solid particles suspended in a mineral oil, a buffer vessel for diluting said catalyst slurry at a suitable concentration for use in a polymerization reaction, being in connection with said vessel by means of one or more conduits for transferring the concentrated catalyst slurry from said vessel to the buffer vessel and being provided with one or more conduits for transferring the diluted catalyst slurry from said buffer vessel to said reactor, a pump provided on each of said conduits for transferring catalyst slurry from said vessel to said buffer vessel, and a pump provided on each of said conduits for transferring diluted catalyst slurry from said buffer vessel to said reactor;

(5) a) a reactor for polymerizing the olefin monomer;

b) a means for measuring the presence of gas in the reactor and c) a means for controlling the concentration of olefin monomer in the reactor;

wherein, the means for measuring the presence of gas in the reactor is a means capable of measuring a pressure curve in the reactor to determine whether the pressure curve is characteristic of a hydraulic system or a non-hydraulic system;

(6) a device for taking out and analyzing a sample, said sample being representative of the slurry, said device comprising one or more sample conduits, for taking a sample out of said reactor and for conducting said sample to one or more sample flash tanks, whereby said conduits each are in communication with said reactor and each are provided with one or more sampling valves, one or more sample flash tanks, for separating said solid particles and evaporated gas, whereby said sample flash tanks are connected to said conduits, and one or more sample receivers, for purifying said solid particles, whereby said receivers are connected to said sample flash tanks;

(7) a 180 rotating product take-off valve located at the end of each settling leg, the 180° rotating product take-off valve being operated by a pneumatically driven double-acting actuator, the pneumatic system being regulated by a system comprising pneumatic control valves, the control valves being automatic control valves;

(8)
at least one settling leg,
at least one measuring means suitable for inferring the volume of slurry settled inside the settling leg and
at least one valve control means operatively connected to said measurement means and to the valve of said settling leg;

(9) internal parts of the reactor in contact with the slurry which are first polished by a mechanical process to a level of at most 70 RMS roughness value and are subsequently polished by a chemical or electrochemical process, to a final level of at most 40 RMS roughness value;

and (10) any combination of the preceding characteristics;

219. Set of polymerization loop reactors comprising at least two reactors, comprising elements selected from the group consisting of:

(1) an apparatus for controlling the injection of catalyst slurry, comprising one or more storage vessels for storing catalyst slurry consisting of solid catalyst in a hydrocarbon diluent, whereby each vessel is provided with means for transferring said catalyst slurry from said storage vessels to a mixing vessel, a mixing vessel, being connected with said storage vessels by means of said transferring means, for diluting said catalyst slurry to a suitable concentration, one or more conduits, connecting said mixing vessel to a polymerization reactor for transferring said diluted catalyst slurry from said mixing vessel to said reactor, whereby each conduit is provided with a pumping means for pumping said slurry to said reactor, and the dilution being adapted to the pumping means;

(2) multiple means for feeding monomer, which are positioned spatially separated along the path of the loop reactor, (3) a device for preparing and supplying catalyst comprising a vessel for preparing catalyst slurry, said slurry comprising solid catalyst in a hydrocarbon diluent having a suitable concentration for use in a polymerization reaction, a buffer vessel for storing said catalyst slurry at a suitable concentration for use in a polymerization reaction, said buffer vessel being in connection with said vessel by means of one or more conduits and being provided with one or more conduits suitable for transferring said catalyst slurry from said buffer vessel to said reactor, and a pumping means, provided on each of said conduits, for controlling the transfer and supply of said catalyst slurry from said buffer vessel to said reactor;

(4) a device for preparing and supplying catalyst comprising a vessel suitable for containing concentrated catalyst slurry comprising catalyst solid particles suspended in a mineral oil, a buffer vessel for diluting said catalyst slurry at a suitable concentration for use in a polymerization reaction, being in connection with said vessel by means of one or more conduits for transferring the concentrated catalyst slurry from said vessel to the buffer vessel and being provided with one or more conduits for transferring the diluted catalyst slurry from said buffer vessel to said reactor, a pump provided on each of said conduits for transferring catalyst slurry from said vessel to said buffer vessel, and a pump provided on each of said conduits for transferring diluted catalyst slurry from said buffer vessel to said reactor;

(5) a) a reactor for polymerizing the olefin monomer;

b) a means for measuring the presence of gas in the reactor; and c) a means for controlling the concentration of olefin monomer in the reactor;

wherein, the means for measuring the presence of gas in the reactor is a means capable of measuring a pressure curve in the reactor to determine whether the pressure curve is characteristic of a hydraulic system or a non-hydraulic system;

(6) a device for taking out and analyzing a sample, said sample being representative of the slurry, said device comprising one or more sample conduits, for taking a sample out of said reactor and for conducting said sample to one or more sample flash tanks, whereby said conduits each are in communication with said reactor and each are provided with one or more sampling valves, one or more sample flash tanks, for separating said solid particles and evaporated gas, whereby said sample flash tanks are connected to said conduits, and one or more sample receivers, for purifying said solid particles, whereby said receivers are connected to said sample flash tanks;

(7) a 180 rotating product take-off valve located at the end of each settling leg, the 180° rotating product take-off valve being operated by a pneumatically driven double-acting actuator, the pneumatic system being regulated by a system comprising pneumatic control valves, the control valves being automatic control valves;

(8)

at least one settling leg, at least one measuring means suitable for inferring the volume of slurry settled inside the settling leg and at least one valve control means operatively connected to said measurement means and to the valve of said settling leg;

(9) internal parts of the reactor in contact with the slurry which are first polished by a mechanical process to a level of at most 70 RMS roughness value and are subsequently polished by a chemical or electrochemical process, to a final level of at most 40 RMS roughness value;

(10)

a plurality of interconnected pipes P defining a flow path for a polymer slurry, said slurry consisting essentially of ethylene, optionally a co-monomer, a polymerization catalyst, liquid diluent and solid olefin polymer particles, means for feeding monomer, optionally a co-monomer, diluent and optionally hydrogen in the reactor, means for feeding a polymerization catalyst in the reactor, a pump suitable for maintaining the polymer slurry in circulation in such reactor, one or more settling legs connected to the pipes P of such reactor for settling of polymer slurry.

one or more control valves connected to the outlet of such settling legs, and one or more flash lines for discharging settled polymer slurry out of the reactor wherein each of said loop reactors comprises a three-or-more-way valve defining three-or-more ends, one end A being positioned at the outlet of said one or more control valves;

(11) a connection between two reactors essentially consisting of one or more transfer lines suitable for transferring polymer slurry from a reactor to another reactor and whereby said transfer line extends substantially horizontally;

and (12) any combination of the preceding characteristics;

220. Process for the polymerization of monomers selected from the group consisting of (i) ethylene, and (ii) ethylene and an olefin comonomer, using the polymerization reactor according to embodiment 218 or 219;

221. Process for the polymerization of monomers selected from the group consisting of (i) ethylene, and (ii) ethylene and an olefin comonomer, using the polymerization reactor according to embodiment 218 or 219 to obtain a bimodal polymer;

222. A polyolefin resin produced by the polymerization process of embodiment 220 or 221;

223. Articles of manufacture made from the polyolefin resin of embodiment 222;

224. A method or a process for producing a polymer resin comprising:

polymerizing in a circulating liquid diluent at least one monomer in a first loop reactor in the presence of a catalyst to produce a circulating slurry of a first polyolefin fraction, wherein the first loop reactor conditions are controlled to regulate the properties of the first polyolefin fraction;

separating a first portion of the circulating slurry of the first loop reactor and increasing the concentration of the first polyolefin fraction to form a second portion having a solids concentration at least 5% higher than in the circulating slurry in the first loop reactor;

transferring the second portion to a second loop reactor, connected in series with the first loop reactor;

polymerizing in the second loop reactor at least one monomer in the presence of a catalyst to produce a circulating slurry of a second polyolefin fraction in addition to the first polyolefin fraction, the combination of the first and second polyolefin fractions producing a polymer resin fluff, wherein the second loop reactor conditions are controlled to regulate the properties of the polymer resin fluff, and removing the polymer resin fluff from the second loop reactor;

225. The method of embodiment 224 further comprising:

a method for controlling the injection of catalyst slurry in a polymerization reactor, wherein polyethylene is prepared, said catalyst consisting of solid catalyst in a hydrocarbon diluent, comprising the subsequent steps of:

providing solid catalyst and a hydrocarbon diluent in one or more storage vessels such that a catalyst slurry is obtained in said vessel, transferring said catalyst slurry from said storage vessel to a mixing vessel wherein said catalyst slurry is diluted for obtaining a suitable concentration for use in a polymerization reaction.

pumping said diluted catalyst slurry at a controlled flow rate from said mixing vessel to said polymerization reactor through one or more conduits, by means of a pumping means, provided in each of said conduits, and the dilution being adapted to the pumping means;

226. The method of embodiment 224 further comprising:

a method for the co-polymerization of ethylene monomer and an olefin co-monomer in a polymerization loop reactor comprising the steps of feeding monomer, an olefin co-monomer, diluents and optionally hydrogen into the loop reactor, feeding at least one polymerization catalyst into the reactor, co-polymerizing said monomer and said co-monomer to produce a polymer slurry comprising essentially liquid diluent and solid olefin co-polymer particles, allowing said polymer slurry to settle into one or more settling legs connected to the reactor, and sequentially discharging the settled polymer slurry from said one or more settling legs out of the reactor, characterised in that said process further comprises the step of controlling the co-monomer/monomer ratio along the path of the reactor by multiple, spatially separated, feeding of monomer along the path of the loop reactor;

227. The method of embodiment 224 further comprising:
a method for optimising catalyst supply to an ethylene slurry loop polymerization reactor comprising the steps of
  a) preparing catalyst slurry in a vessel, said slurry comprising solid catalyst in a hydrocarbon diluent having a suitable concentration for use in a polymerization reaction,
  b) providing said catalyst slurry from said vessel to a buffer vessel wherein said slurry is stored, and
  c) supplying said catalyst slurry from said buffer vessel to said reactor through conduits at a suitable flow rate,
wherein the catalyst is fed to a polymerization reactor at a suitable flow rate controlled by determining the concentration of a reactant, preferably ethylene, in said reactor, and
wherein said catalyst is a Siegler-Natta catalyst having general formula $MX_n$, wherein M is a transition metal compound selected from group IV to VII, wherein X is a halogen, and wherein n is the valence of the metal,
wherein the level of catalyst slurry in said buffer vessel is maintained substantially constant, and
further comprising bringing a suitable amount of co-catalyst into contact with the catalyst slurry for a suitable period of time before supplying said catalyst slurry to said reactor;

228. The method of embodiment 224 further comprising:
a method for optimising catalyst supply to an ethylene slurry loop polymerization reactor comprising the steps of
  a) transferring concentrated catalyst slurry from a vessel to a buffer vessel, said concentrated catalyst slurry comprising catalyst solid particles suspended in a mineral oil,
  b) diluting said catalyst slurry in said buffer vessel by supplying a suitable diluent in said buffer vessel whereby diluted catalyst slurry is obtained having a suitable concentration for use in a polymerization reaction, and
  c) transferring said diluted catalyst slurry from said buffer vessel to said reactor at a suitable flow rate;

229. The method of embodiment 224, further carried out in the presence of an anti-fouling agent and a chromium-type catalyst or Siegler Natta catalyst; characterised in that the anti-fouling agent comprises an anti-fouling polymer having an average molecular weight (Mw) of greater than 1000 daltons and containing:
one or more blocks —$(CH_2.CH_2.O)_k$— where each k is in the range from 1 to 50; and
one or more blocks —$(CH_2.CH(R)—O)_n$— where each R comprises an alkyl group having from 1 to 6 carbon atoms and each n is in the range from 1 to 50,
and terminated by a R' and a R" end groups, wherein R' is OH or an alkoxy having from 1 to 6 carbon atoms and R" is H or an alkyl having from 1 to 6 carbon atoms;

230. The method of embodiment 224 further comprising:
  a) a method for controlling the swelling that comprises the steps of:
    providing a slurry loop reactor, said reactor being optionally equipped with one or more devices aimed at improving the homogeneity of the circulating slurry;
  b) measuring, as a function of time, a plant control parameter that displays an increasing level of fluctuation during swelling;
  c) processing these measurements in real-time;
  d) identifying in real-time the onset of swelling;
  e) progressively diluting the reactor when the fluctuation level reaches a pre-determined level;

231. The method of embodiment 224 further comprising:
a step of polishing all internal parts in contact with the slurry are first by a mechanical process to a level of at most 70 RMS roughness value and subsequently by a chemical or electrochemical process, to a final level of at most 40 RMS roughness value;

232. The method of embodiment 224 further comprising the steps of:
  a) polymerizing an olefin monomer in a reactor, in a solvent, at a selected olefin monomer concentration;
  b) measuring a pressure curve in the reactor to determine whether the pressure curve is characteristic of a hydraulic system or a non-hydraulic system; and
  c) if the pressure curve is characteristic of a non-hydraulic system, reducing the olefin monomer concentration in the reactor;

233. The method of embodiment 224 further comprising:
a method for improving a polymerization reaction for preparing bimodal polyethylene in a slurry loop polymerization reactor, said reactor comprising a first part connected to a second part, said method comprising the steps of
  a) taking a sample out of said first part of said reactor,
  b) analyzing said sample to determine said reaction conditions in said first part of said reactor,
  c) based on results obtained in step b), adapt reaction conditions in order to improve the polymerization reaction in said reactor;

234. The method of embodiment 224 further comprising:
in a polymerization process comprising polymerizing olefins in a liquid diluent to produce a liquid slurry containing particles of normally solid polymer within a loop reactor, allowing the polymer to settle in a settling leg, periodically opening a 180° rotating product take-off valve located at the end of the settling leg to allow a charge of particles to flow out of the settling leg, the product take-off valve being operated by a pneumatically driven double-acting actuator, the pneumatic system being regulated by a system comprising pneumatic control valves, the improvement which consists in using automatic control valves;

235. The method of embodiment 224 further comprising the steps of:
  introducing into the loop reactor one or more olefin reactants, polymerization catalysts and diluents, and while circulating said reactants, catalysts and diluents,
  polymerizing said one or more olefin reactants to produce a polymer slurry comprising essentially liquid diluent and solid olefin polymer particles,
said process further comprising one or more cycles of:
  a) allowing said polymer slurry to settle in one or more settling legs connected to said reactor, and
  b) discharging from a settling leg a predetermined volume of polymer slurry corresponding to the volume of polymer slurry settled in said settling leg since its previous discharge, said predetermined volume differing by ±20%, preferably by ±15%, more preferably by ±10%, most preferably by ±5% from the volume of polymer slurry settled in said settling legs since its previous discharge;

236. The method of embodiment 224 further comprising:
a method to switch from series to parallel configuration a set of loop reactors suitable for the polymerization process of a monomer, preferably ethylene and optionally an olefin co-monomer by means of a three-or-more-way valve defining three-or-more ends;

237. The method of embodiment 224 further comprising:
in a double loop reactor with each reactor comprising two or more settling legs, the steps of
introducing into the double loop reactor one or more olefin reactants, polymerization catalysts and diluents, and while circulating said reactants, catalysts and diluents;
polymerizing said one or more olefin reactants to produce a polymer slurry comprising essentially liquid diluent and solid olefin polymer particles;
said process further comprising one or more cycles of:
a) allowing said polymer slurry to settle into said settling legs, and
b) sequentially discharging said settled polymer slurry from said two or more settling legs out of the reactor, whereby the aggregate time of closure of all the legs is less than 50%, preferentially less than 20% and most preferably less than 5% of the time interval between two triggerings of the same settling leg;

238. The method of embodiment 224 further comprising:
wherein said reactor consists of at least two interconnected reactors, whereby said connection essentially consists of one or more transfer lines suitable for transferring polymer slurry from a reactor to another reactor, said method comprising the steps of:
introducing into a reactor one or more olefin reactants, polymerization catalysts and diluents,
polymerizing said one or more olefin reactants to produce polymer slurry,
pumping said polymer slurry for maintaining the circulation in said reactor,
said process further comprising one or more cycles of:
allowing said polymer slurry to settle in one or more settling legs connected to said reactor, and
substantially horizontally transferring said polymer slurry from said settling legs to another reactor through said one or more transfer lines;

239. The method of embodiment 224 further comprising:
polymerizing olefins in two liquid full loop reactors connected in series wherein different molecular weight fractions are produced in the presence of a Siegler-Natta catalyst system, characterised in that the Siegler-Natta catalyst has a particle size distribution $d_{50}$ of less than 20 μm and greater than 5 μm;

240. The method of embodiment 224 further comprising:
the use of a chromium-based catalyst system in two serially connected loop reactors for homopolymerizing ethylene or for copolymerizing ethylene and a comonomer, to produce a final polyethylene resin at a productivity of less than 3500 grams of polymer per gram of catalyst and thus at increased throughput, said polyethylene resin having an amount of gels of at most 30 ppm; and 241. The method of embodiment 224 that comprises any one or more of the methods disclosed in any one of embodiments 225 to 240.

The invention claimed is:

1. A method for controlling the injection of catalyst slurry in a polymerization reactor, wherein polyethylene is prepared, said catalyst slurry comprising solid catalyst in a hydrocarbon diluent, the method comprising:
providing solid catalyst and a hydrocarbon diluent in one or more storage vessels such that a catalyst slurry is obtained in said one or more storage vessels;
transferring said catalyst slurry from said one or more storage vessels to a mixing vessel, wherein said catalyst slurry is diluted for obtaining a suitable concentration for use in a polymerization reaction;
pumping said diluted catalyst slurry at a controlled flow rate from said mixing vessel to said polymerization reactor through one or more conduits, by means of a pumping means, provided in each of said conduits, and the dilution being adapted to the pumping means; and
controlling the flow rate of said catalyst slurry from the mixing vessel to the polymerization reactor by determining the concentration of a reactant in said polymerization reactor.

2. The method according to claim 1 wherein said catalyst is a metallocene catalyst.

3. The method of claim 2 wherein the metallocene catalyst is a supported metallocene catalyst.

4. The method according to claim 1 wherein said catalyst slurry is diluted with said hydrocarbon diluent in said mixing vessel to a concentration between 0.1 and 10% by weight.

5. The method of claim 1 wherein the polymerization reactant in said reactor is ethylene.

6. The method according to claim 1 comprising transferring said catalyst slurry from said one or more storage vessels to said mixing vessel at a controlled flow by controlling the ratio between hydrocarbon diluent and solid catalyst in the mixing vessel.

7. The method according to claim 1 further comprising bringing a suitable amount of co-catalyst into contact with the catalyst slurry for a suitable period of time before injecting said catalyst slurry to said polymerization reactor.

8. The method according to claim 7 comprising bringing the co-catalyst into contact with said catalyst slurry present in the one or more conduits.

9. The method according to claim 1 comprising continuously supplying said catalyst slurry from said mixing vessel to said polymerization reactor through the one or more conduits at a suitable flow rate.

10. A method for controlling the injection of catalyst slurry in a polymerization reactor comprising:
providing a storage vessel, wherein the storage vessel comprises a first slurry of solid catalyst in a hydrocarbon diluent, and wherein the first slurry comprises a first concentration of catalyst;
transferring the first slurry from the storage vessel to a mixing vessel;
introducing hydrocarbon diluent into the mixing vessel to dilute the first slurry and form a second slurry comprising a second concentration of catalyst, wherein the second concentration of catalyst is less than the first concentration of catalyst;
pumping the second slurry from the mixing vessel to the polymerization reactor;
contacting ethylene monomer with the catalyst solids within the polymerization reactor to form polyethylene;
withdrawing the polyethylene from the polymerization reactor;
measuring a concentration of the ethylene monomer within the polymerization reactor; and
adjusting flow of the second slurry through a membrane pump to maintain the concentration of ethylene monomer within a predetermined level.

11. The method of claim 10, wherein the catalyst solids comprise a supported metallocene catalyst.

12. The method of claim 10, wherein the first concentration of catalyst comprises at least 10 wt. % catalyst solids and the second concentration of catalyst comprises less than 10 wt. % catalyst solids.

13. The method of claim 10, further comprising introducing a co-catalyst into the polymerization reactor.

14. The method of claim 13, wherein the co-catalyst contacts the second slurry prior to contact with the ethylene monomer within a conduit operably connected to the polymerization reactor and the mixing vessel.

15. The method of claim 10, further comprising continuously supplying the second slurry to the polymerization reactor.

* * * * *